US012784510B2

(12) United States Patent
Merg et al.

(10) Patent No.: US 12,784,510 B2
(45) Date of Patent: Nov. 3, 2026

(54) METHOD AND SYSTEM FOR CONFIGURING VEHICLE SERVICE TOOL WITH CATEGORIZED DESCRIPTORS

(71) Applicant: Snap-on Incorporated, Kenosha, WI (US)

(72) Inventors: Patrick S. Merg, Hollister, CA (US); Jacob G. Foreman, Hollister, CA (US); Ricardo Cebreros-Campos, Gilroy, CA (US); Brett A. Kelley, San Jose, CA (US)

(73) Assignee: Snap-on Incorporated, Kenosha, WI (US)

( * ) Notice: Subject to any disclaimer, the term of this patent is extended or adjusted under 35 U.S.C. 154(b) by 273 days.

(21) Appl. No.: 18/419,774

(22) Filed: Jan. 23, 2024

(65) Prior Publication Data

US 2025/0239108 A1 Jul. 24, 2025

(51) Int. Cl.
*G07C 5/08* (2006.01)
*G07C 5/00* (2006.01)

(52) U.S. Cl.
CPC ........... *G07C 5/008* (2013.01); *G07C 5/0808* (2013.01); *G07C 2205/02* (2013.01)

(58) Field of Classification Search
CPC ............................ G07C 5/008; G07C 2205/02
See application file for complete search history.

(56) References Cited

U.S. PATENT DOCUMENTS

2005/0159923 A1* 7/2005 Huang .................. G06F 11/079 702/183
2018/0047223 A1* 2/2018 Lewis .................... G07C 5/008
2020/0184745 A1 6/2020 Merg et al.
(Continued)

OTHER PUBLICATIONS

International Searching Authority at European Patent Office; International Search Report, PCT Written Opinion of the International Searching Authority, and PCT Notification of Transmittal of the International Search Report and the Written Opinion of the International Searching Authority, or the Declaration, all mailed on Apr. 10, 2025 for International application No. PCT/US2024/059115; 12 pages.

(Continued)

*Primary Examiner* — Dino Kujundzic
(74) *Attorney, Agent, or Firm* — McDonnell Boehnen Hulbert & Berghoff LLP

(57) ABSTRACT

A system and method for configuring a vehicle service tool (VST) to operate in a first state in which a user-selectable control is operable for selecting a category of diagnostic descriptors to use when the VST operates in a second state; receiving, while the VST operates in the first state, a selection of the user-selectable control and configuring the VST to use the category of diagnostic descriptors when operating in the second state; configuring the VST to operate in the second state so that the VST displays a GUI and requests vehicle data messages; receiving, while the VST operates in the second state, vehicle data messages including a diagnostic identifier and corresponding data values determining, from among multiple diagnostic descriptors corresponding to the category of diagnostic descriptors, a diagnostic descriptor corresponding to the diagnostic identifier; and outputting, within the GUI, the diagnostic descriptor and a representation of the data values.

26 Claims, 51 Drawing Sheets

(56) References Cited

U.S. PATENT DOCUMENTS

| | | | | |
|---|---|---|---|---|
| 2020/0242860 | A1* | 7/2020 | Merg | G06Q 10/20 |
| 2023/0252824 | A1 | 8/2023 | Merg et al. | |
| 2023/0252830 | A1 | 8/2023 | Merg et al. | |
| 2023/0267777 | A1 | 8/2023 | Merg et al. | |

OTHER PUBLICATIONS

U.S. Appl. No. 18/484,071, filed Oct. 10, 2023; Inventors: Patrick S. Merg, Jacob G. Foreman, Brett A. Kelley.

* cited by examiner

400

```
<?XML VERSION="1.0"? ENCODING="UTF-8"?>
<RESPONSE XMLNS:I="HTTP://WWW.W3.ORG/2001/XMLSCHEMA-INSTANCE">
<?XML-STYLESHEET TYPE="TEXT/CSS" HREF="TS6.CSS"?>
    <PID-LIST>
        <PID-LIST-NAME>PID LIST 1</PID-LIST-NAME>
        <VEHICLE-ID>VEHICLE ID 1</VEHICLE-ID>
        <PID>
            <HEX-REPRESENTATION>$01</HEX-REPRESENTATION>
            <PID-KEY-OEM>ANGLE BETWEEN CKP & CMP</PID-KEY-OEM>
            <PID-KEY-INDUSTRY-STD>ANGLE BETWEEN CRANKSHAFT POSITION
                CAMSHAFT POSITION</PID-KEY-INDUSTRY-STD>
            <PID-KEY-NORMALIZED>CAMSHAFT ANGLE RELATIVE TO CRANKSHAFT</PID-
                KEY-NORMALIZED>
            <RANGE-TOP>27 DEGREES</RANGE-TOP>
            <RANGE-BOTTOM>15 DEGREES</RANGE-BOTTOM>
            <PID-OP-DESC>OP. DESC. FOR PID $01</PID-OP-DESC>
        </PID>
        <PID>
            <HEX-REPRESENTATION>$02</HEX-REPRESENTATION>
            <PID-KEY-OEM>MANIFOLD AIR PRESSURE SENSOR</PID-KEY-OEM>
            <PID-KEY-INDUSTRY-STD>MAP SENSOR</PID-KEY-INDUSTRY-STD>
            <PID-KEY-NORMALIZED>INTAKE MANIFOLD PRESSURE (KPA)</PID-KEY-
                NORMALIZED>
            <RANGE-TOP>66.43</RANGE-TOP>
            <RANGE-BOTTOM>36.26</RANGE-BOTTOM>
        </PID>
    </PID-LIST>
```

Reference numerals: 401 (first three lines), 402 (PID-LIST), 432 (<PID-LIST>), 403 (PID-LIST-NAME), 404 (VEHICLE-ID), 405 (first PID), 407, 408, 409, 410, 411, 412, 427, 406 (second PID), 413, 414, 415, 416, 417, 418, 433 (</PID>)

FIG. 43

| FIG. 44A |
| --- |
| FIG. 44B |
| FIG. 44C |

FIG. 44

449

```
<?XML VERSION="1.0"? ENCODING="UTF-8"?>
<RESPONSE XMLNS:I="HTTP://WWW.W3.ORG/2001/XMLSCHEMA-INSTANCE">
<?XML-STYLESHEET TYPE="TEXT/CSS" HREF="TS6.CSS"?>                          } 450
  <PID-LIST>  515                                516
      <PID-LIST-NAME>PID LIST 25</PID-LIST-NAME> ←452
      <VEHICLE-ID>VEHICLE ID 1</VEHICLE-ID> ←453
      <PROTOCOL>VDM PROTOCOL A</PROTOCOL> ←454
      <PID>
          <SYSTEM>ANTI-LOCK BRAKES</SYSTEM> ←456
          <HEX-REPRESENTATION>$0A</HEX-REPRESENTATION> ←457
          <PID-KEY-OEM>LF ANTI-LOCK BRAKE SENSOR</PID-KEY-OEM> ←458
          <PID-KEY-INDUSTRY-STD>LF ABS SENSOR</PID-KEY-INDUSTRY-STD> ←459
451       <PID-KEY-NORMALIZED>LF WHEEL SPEED SENSOR</PID-KEY-NORMALIZED>
          <RANGE-TOP>155 MPH</RANGE-TOP> ←461                                 460
          <PID-OP-DESC>OP. DESC. FOR PID $0A</PID-OP-DESC> ←448
  455     <FACET>
              <SUBJECT>WHEEL SPEED SENSOR</SUBJECT> ←463
              <LOCATION>LEFT, FRONT</LOCATION> ←464
      462     <UNITS>MPH</UNITS> ←465
              <MEASUREMENT-TYPE>SPEED</MEASUREMENT-TYPE> ←466
          </FACET>
      </PID>
```

FIG. 44A

METHOD AND SYSTEM FOR CONFIGURING VEHICLE SERVICE TOOL WITH CATEGORIZED DESCRIPTORS

BACKGROUND

Vehicles (e.g., cars and trucks) include systems and components that require servicing from time to time. Many of those systems and components are serviced via use of a vehicle service tool.

SUMMARY

In a first embodiment, a method is provided. The method includes configuring, via a processor, a vehicle service tool to operate in a first state in which a first user-selectable control of the vehicle service tool is operable for selecting a first category of diagnostic descriptors to use when the vehicle service tool operates in a second state. The method also includes receiving, at the processor while the vehicle service tool operates in the first state, a selection of the first user-selectable control and responsively configuring the vehicle service tool to use the first category of diagnostic descriptors when operating in the second state. The method further includes configuring, via the processor, the vehicle service tool to operate in the second state. In the second state the vehicle service tool displays a first graphical user interface and transmits requests for vehicle data messages to a vehicle. Additionally, the method includes receiving, at the processor while the vehicle service tool operates in the second state, vehicle data messages including a first diagnostic identifier and data values corresponding to the first diagnostic identifier. Further, the method includes determining, at the processor from among a group of diagnostic descriptors corresponding to the first category of diagnostic descriptors, a first diagnostic descriptor corresponding to the first diagnostic identifier. Furthermore, the method includes outputting, within the first graphical user interface, the first diagnostic descriptor and a representation of at least a first portion of the data values corresponding to the first diagnostic identifier.

In a second embodiment, a computing system is provided. The computing system comprises a processor and a non-transitory computer-readable memory storing executable instructions. Execution of the executable instructions by the processor causes the computing system to perform functions. The functions include configuring, via the processor, a vehicle service tool to operate in a first state in which a first user-selectable control of the vehicle service tool is operable for selecting a first category of diagnostic descriptors to use when the vehicle service tool operates in a second state. The functions also include receiving, at the processor while the vehicle service tool operates in the first state, a selection of the first user-selectable control and responsively configuring the vehicle service tool to use the first category of diagnostic descriptors when operating in the second state. The functions further include configuring, via the processor, the vehicle service tool to operate in the second state. In the second state the vehicle service tool displays a first graphical user interface and transmits requests for vehicle data messages to a vehicle. Additionally, the functions include receiving, at the processor while the vehicle service tool operates in the second state, vehicle data messages including a first diagnostic identifier and data values corresponding to the first diagnostic identifier. Further, the functions include determining, at the processor from among a group of diagnostic descriptors corresponding to the first category of diagnostic descriptors, a first diagnostic descriptor corresponding to the first diagnostic identifier. Furthermore, the functions include outputting, within the first graphical user interface, the first diagnostic descriptor and a representation of at least a first portion of the data values corresponding to the first diagnostic identifier.

In a third embodiment, a non-transitory computer-readable memory is provided. The non-transitory computer-readable memory has stored therein instructions executable by a processor to cause a computing system to perform functions. The functions include configuring, via the processor, a vehicle service tool to operate in a first state in which a first user-selectable control of the vehicle service tool is operable for selecting a first category of diagnostic descriptors to use when the vehicle service tool operates in a second state. The functions also include receiving, at the processor while the vehicle service tool operates in the first state, a selection of the first user-selectable control and responsively configuring the vehicle service tool to use the first category of diagnostic descriptors when operating in the second state. The functions further include configuring, via the processor, the vehicle service tool to operate in the second state. In the second state the vehicle service tool displays a first graphical user interface and transmits requests for vehicle data messages to a vehicle. Additionally, the functions include receiving, at the processor while the vehicle service tool operates in the second state, vehicle data messages including a first diagnostic identifier and data values corresponding to the first diagnostic identifier. Further, the functions include determining, at the processor from among a group of diagnostic descriptors corresponding to the first category of diagnostic descriptors, a first diagnostic descriptor corresponding to the first diagnostic identifier. Furthermore, the functions include outputting, within the first graphical user interface, the first diagnostic descriptor and a representation of at least a first portion of the data values corresponding to the first diagnostic identifier.

In a fourth embodiment, a computing system having a processing means and a data storage means is provided. The computing system includes means for configuring, via a processor, a vehicle service tool to operate in a first state in which a first user-selectable control of the vehicle service tool is operable for selecting a first category of diagnostic descriptors to use when the vehicle service tool operates in a second state. The computing system also includes means for receiving, at the processor while the vehicle service tool operates in the first state, a selection of the first user-selectable control and responsively configuring the vehicle service tool to use the first category of diagnostic descriptors when operating in the second state. The computing system further includes means for configuring, via the processor, the vehicle service tool to operate in the second state. In the second state the vehicle service tool displays a first graphical user interface and transmits requests for vehicle data messages to a vehicle. Additionally, the computing system includes means for receiving, at the processor while the vehicle service tool operates in the second state, vehicle data messages including a first diagnostic identifier and data values corresponding to the first diagnostic identifier. Further, the computing system includes means for determining, at the processor from among a group of diagnostic descriptors corresponding to the first category of diagnostic descriptors, a first diagnostic descriptor corresponding to the first diagnostic identifier. Furthermore, the computing system includes means for outputting, within the first graphical user interface, the first diagnostic descriptor and a representation of at least a first portion of the data values corresponding to the first diagnostic identifier.

Other embodiments will become apparent to those of ordinary skill in the art by reading the following detailed description, with reference where appropriate to the accompanying drawings.

BRIEF DESCRIPTION OF THE DRAWINGS

Example embodiments are described herein with reference to the drawings.

FIG. 43 shows content of a file, in accordance with the example embodiments.

FIG. 44 shows an arrangement of FIG. 44A, FIG. 44B, and FIG. 44C.

FIG. 44A, FIG. 44B, and FIG. 44C show content of a file, in accordance with the example embodiments.

All the figures are schematic and not necessarily to scale. Like reference numbers are used in the drawings to identify like elements unless the context or description describes otherwise.

DETAILED DESCRIPTION

I. Introduction

Figure 1:
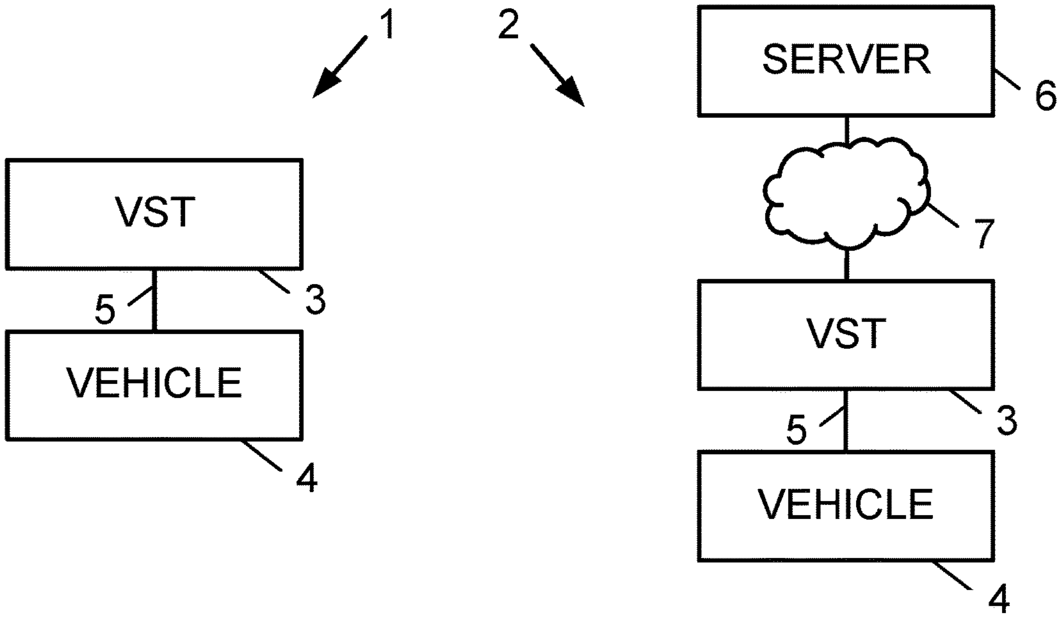
FIG. 1 shows block diagrams of systems, in accordance with the example embodiments.

This description describes several example embodiments, at least some of which pertain to improved methods and systems for servicing a vehicle and/or use of a computing system (e.g., a vehicle service tool (i.e., a VST)) to service a vehicle. Servicing the vehicle can include testing a component of the vehicle. Servicing the vehicle can include replacing a malfunctioning vehicle component with a replacement component and the programming, calibrating or performing a reset procedure to the replacement component via the VST.

As described below, a VST and a vehicle can operatively connect to one another using a wired or wireless connection. The vehicle can transmit a vehicle data message (VDM) according to a VDM protocol. Some vehicles use multiple different VDM protocols to transmit VDMs. A wired connection between the VST and the vehicle can include a connection to one or more vehicle networks. In some embodiments, multiple vehicle networks in the vehicle carry VDMs according to different VDM protocols. The VST can operatively connect to the multiple vehicle networks at the same or different times.

A vehicle can transmit a VDM between two or more electronic control units (ECUs) while the vehicle operates in a normal mode (e.g., a mode in which a VST is not connected to the vehicle or a mode in which a VST is connected to the vehicle, but is not transmitting VDMs to the vehicle). On the other hand, when a VST is connected to the vehicle and operating in a diagnostic mode, the vehicle can continue transmitting a VDM between two or more ECUs, as well as transmit a VDM directed to the connected VST. In some cases, the vehicle transmits the VDM directed to the VST in response to receiving a VDM from the VST.

In accordance with at least some embodiments, the VST can transmit (to a vehicle) a VDM to request a parameter identifier (PID) parameter value. As an example, a PID parameter value can be indicative of an electrical signal received at an ECU from a sensor connected to the ECU. As another example, a PID parameter value can be indicative of a value calculated by an ECU, such as a fuel trim value calculated by an ECU for a powertrain control system.

The VDM to request the PID parameter value can include a PID. The ECU is programmed to receive the PID via the request, read a parameter value corresponding to the PID and transmit a response including the PID parameter value. As an example, a PID is defined using a hexadecimal number. As another example, a PID parameter value is represented using one or more data bits. The ECU may convert an input value determined by the ECU using a particular formula to determine the PID parameter value. For example, a formula to convert a byte representing a percentage from 0 to 100 percent can be the (hexadecimal PID parameter value)×(100/255).

In accordance with at least some embodiments, the VST can transmit (to a vehicle) a VDM to request a diagnostic trouble code (DTC) status from an ECU. The ECU can respond by transmitting (to the VST) a VDM indicative of whether a DTC is set active (i.e., current) or was previously set active (i.e., historical).

In accordance with at least some embodiments, the VST can transmit (to a vehicle) a VDM to request an ECU to perform a functional test or reset procedure. The ECU can respond by performing the requested functional test or reset procedure. During performance of the functional test the VST can gain control over one or more inputs or outputs of the ECU. The VST can transmit (to the vehicle) another VDM to request the ECU to stop or modify performance of the functional test or reset procedure.

As the quantities of ECUs in vehicles have increased and as the desire to more correctly diagnose malfunctions with ECUs has increased, the quantities of PIDs, DTCs, functional tests and reset procedures available in vehicles have also increased (e.g., from hundreds to thousands). One way to provide a technician with the ability to request PIDs or DTCs or to perform functional tests or reset procedures is to provide the technician with user-selectable controls corresponding to each PID, DTC, functional test, or reset procedure. That technician may need to scroll through pages of screens listing the PIDs, DTCs, functional tests, or reset procedures to be able to select which PIDs, DTCs, functional tests, or reset procedures the technician is interested in requesting and/or performing. Such scrolling and selecting is time consuming and burdensome to the technician.

In some cases, the technician knows a symptom or component malfunctioning in a vehicle, but does not know which PIDs, DTCs, functional tests, or reset procedures are applicable to the symptom or component. Selecting PIDs, DTCs, functional tests, or reset procedures by trial and error is time consuming and can be a waste of time if the PIDs, DTCs, functional tests, or reset procedures are inapplicable to the component, symptom, or other aspect of a vehicle being worked. The inability to select a PID, a functional test, a reset procedure, or a component test can be compounded if the technician works or multiple different makes of vehicles and/or vehicles made in different countries (at least one of which can be referred to as a foreign-make vehicle) as the different manufacturers implement PIDs, functional tests, and/or reset procedures for at least some systems using different terms to refer to the PIDs, functional tests, and/or reset procedures.

In at least some embodiments, a user can select the known symptom and/or component via a graphical user interface (GUI) to cause the VST to display PIDs, PID parameter values, and PID facet selectors. The VST can compare the PID parameter values to one or more applicable thresholds and highlight a corresponding PID facet selector to guide a technician to locate applicable tests and reset procedures that can be performed on the vehicle. In response to selection of the PID facet selector, the VST can output on a GUI user-selectable controls selectable to perform or initiate performing a test or reset procedure on the vehicle. In those or other embodiments, the VST can provide facet selectors for locating tests and/or reset procedures corresponding to the facet selectors.

In at least some embodiments, a processor, such as a processor of the VST, can refer to mapping data to determine a group of PIDs, thresholds, tests, reset procedures, and facet selectors corresponding to a symptom or component and generate a GUI for displaying the group of PIDs, PID parameter values received for the PIDs, tests, reset procedures, and the facet selectors. In response to selection of one or more facet selectors, the processor of the VST can output a GUI showing a group of PIDs (e.g., a different group of PIDs) and user-selectable controls corresponding to tests and/or reset procedures.

In at least some embodiments, the mapping data used to determine a group of PIDs for including in a GUI can include data that indicates two different PIDs corresponding to identical operating parameters of a vehicle are available using different VDM protocols. As an example, PID parameter values corresponding to a speed of a vehicle or a speed of an engine (i.e., RPM) can be available via a first VDM protocol, such as a vehicle manufacturer VDM protocol and via a second VDM protocol, such as a government mandated VDM protocol.

As an example, a VST can use a first VDM protocol to send a VDM to request from the vehicle a VDM including a VDM parameter. Assuming transmission of each VDM by the VST or the vehicle using the first VDM protocol takes 0.000130 seconds to complete. Based on that example and assumption, 7,692 VDM can be sent each second (i.e., 3,846 VDM sent by the VST and 3,846 VDM sent by the vehicle). If the VST requests PID parameters for six different PIDs each second, then the VST can request and receive the PID parameters for each of the six PIDs 641 times each second. On the other hand, if the VST can request PID parameter values for two of the six PIDs using a second VDM protocol, then the VST is able to request and receive PID parameters for each of the four other PIDs 961 times each second. Displaying more frequent updates of PID parameter values on the display can be beneficial in discovering a vehicle malfunction more quickly.

As an example, a VST can use a first VDM protocol to send a VDM to request from the =vehicle a VDM including a VDM parameter. Assuming transmission of each VDM by the VST or the vehicle using the first VDM protocol takes 0.000130 seconds to complete. Based on that example and assumption, 7,692 VDM can be sent each second (i.e., 3,846 VDM sent by the VST and 3,846 VDM sent by the vehicle). If the VST requests PID parameters for six different PIDs each second, than the VST can request and receive the PID parameters for each of the six PIDs 641 times each second. On the other hand, if the VST can request PID parameter values for two of the six PIDs using a second VDM protocol, then the VST is able to request and receive PID parameters for each of the four other PIDs 961 times each second. Displaying more frequent updates of PID parameter values on the display can be beneficial in discovering a vehicle malfunction more quickly.

As another example, displaying a GUI including a group of N quantity of PIDs, tests and reset procedures based on a quantity of selections less than N quantity of selections that would be required to individually select the N quantity of PIDs, tests and reset procedures is at least one way in which example embodiments can reduce the amount of time required to set up a VST to service a vehicle.

In this description, a user-selectable control is sometimes abbreviated as USC. A USC can be output on a display screen (or more simply, a display). In embodiments in which the display is configured as a touch screen display, the USC output on the display can be selectable to trigger a processor to perform a function corresponding to the USC. The processor can be configured to detect that a particular USC corresponds to a location of the touch screen display is contacted by a user.

Under some circumstances, however, the USC output on the display may not be selectable. For example, the USC may be output on the display to notify a user that the device including the display has the capability to perform the function, but the USC is not currently enabled to trigger performance of the function. In other words, the USC may be disabled until the user enables the USC (e.g., by paying a subscription fee, obtaining a certification credential to perform the feature, or acknowledging a safety warning).

In at least some embodiments, a USC includes a hardware key or button remote from a display. Selection of such a USC can occur by selecting (e.g., pushing the hardware key or button). Selection of such a USC can cause a change in resistance of a resistor network and a corresponding change in a voltage detected by the processor or an analog-to-digital converter. A USC including a hardware key or button can be reconfigurable. For example, selection of the USC while a first GUI is displayed triggers performance of a first set of functions and selection of the USC while a second GUI is displayed triggers performance of a second set of functions. A USC can include a graphical icon and/or text. The graphical icon and/or text can be a representative description of a set of functions (i.e., one or more functions) that is performed in response to a selection of the USC including the graphical icon and/or text.

In this description, at least some of the embodiments pertain to a GUI that includes one or more containers. A container is an area of a GUI for displaying other component(s) of the GUI. Accordingly, a container can cover at least a portion of an area of the display on which the GUI is displayed. In many instances, multiple components within a container are related to one another. For example, a container can include a PID, a PID parameter value, and a PID flag that indicates whether a PID parameter value corresponding to the PID has breached a threshold corresponding to the PID. Other containers can include aspects corresponding to a component test, a functional test, or a reset procedure. In at least some embodiments, a container is marked using visible borders, such as line segments. In at least some of those embodiments, two containers share a common border. In at least some embodiments, a container distinguishes itself from other containers or other portions of the GUI using shading (e.g., a first color distinctly different from an adjacent second color). A container may include one or more containers. A container within another container can be referred to as a sub-container. On one hand, a container may contact one or more other containers. On the other hand, a container may not contact another container.

A container or some other portion of a GUI can include a user-selectable control (USC). The user-selectable control corresponds to one or more functions that can be initiated and/or performed in response to a selection of the USC. A USC can be embodied in a VST as a hardware USC, such as a hardware key or button. The hardware USC can be reconfigured. A GUI can show an indication of the function(s) corresponding to the hardware USC.

II. Example Systems, Vehicles, and Connectivity

FIG. 1 shows a system 1 and a system 2 in accordance with the example embodiments. The system 1 includes a vehicle service tool (VST) 3, a vehicle 4, and a communication link 5. The system 2 includes the VST 3, the vehicle 4, the communication link 5, a server 6, and a communication network 7. In at least some embodiments, the VST 3 includes and/or is arranged as a computing system. In at least some embodiments, the VST 3 is a part of a computing system, such as a computing system including the VST 3 and the server 6. In at least some embodiments, the VST 3 includes and/or is arranged as a vehicle scan tool, such as a vehicle scan tool configured to transmit and receive vehicle data messages (VDMs) for diagnosing and/or servicing a vehicle. In at least some embodiments, the VST 3 is arranged to perform component tests. In accordance with at least some of those embodiments, the VST 3 is also arranged as a vehicle scan tool configured to transmit and receive vehicle data messages for diagnosing and/or servicing a vehicle.

The communication network 7 can include one or more wireless networks and/or one or more wired networks. The wireless network(s) can carry communications using a wireless communication standard or protocol, examples of which are discussed below. The wired network(s) can carry communications using a wired communication standard or protocol, examples of which are discussed below. The communication network 7 can include one or more networks within the internet and/or a cloud computing network.

The VST 3 is operable to service the vehicle 4. The VST 3 can transmit a vehicle data message (VDM) to the vehicle 4 and can receive a VDM from the vehicle 4. The VST 3 can transmit a message to the server 6 to request information for servicing the vehicle 4 and can receive a message from the server 6 including the information for servicing the vehicle 4. The VST 3 can display at least a portion of the information for servicing the vehicle 4. As an example, the service information can include a diagnostic flowchart, a technical service bulletin, an original equipment manufacturer (OEM) position statement, a video, a schematic diagram, a component location diagram, a repair tip, a commonly-replaced parts graph, PID definitions, a PID graph, a diagnostic trouble code (DTC) definition, a safety warning, a repair order, or some other type of service information. As another example, the information can include an index value (or more simply, an index) to information stored at the VST 3, and the VST 3 can retrieve and then display the information based on the index. As an example, the index can indicate a GUI, a list of PID facet selectors, or a list of PID facets. The index can be one of multiple indices sent to the VST 3.

The VST 3 can transmit a message to the server 6 to request data for configuring the VST 3 to service the vehicle 4. The VST 3 can receive a message from the server including the data for configuring the VST 3 to service the vehicle 4. As an example, the data for configuring the VST 3 can include a GUI, information to populate a GUI, information to configure a GUI, an index value or indices, or mapping data. As another example, the data for configuring the VST 3 can include a file, such as a mark-up language file including data to populate and/or generate a GUI. As an example, a mark-up language file can include a hypertext mark-up language (HTML) file.

The vehicle 4 can include any vehicle described in this description. The vehicle 4 can include a vehicle that includes a vehicle system, component or other aspect described in this description as being a part of a vehicle. In at least some embodiments, the vehicle 4 includes at least a portion of the communication link 5.

The server 6 can operate on a computing system. The server 6 can include the computing system on which it operates. The server 6 can include one or more servers. As an example, the server 6 can be configured to provide a web service to another computing system, such as the VST 3 or a computing system within the vehicle 4. As an example, the web service can include a web service to provide the VST 3 with information for servicing the vehicle. The web service can output a GUI including containers having a descriptor of a PID, a functional test, a component test, a reset procedure, and/or a test set, and a user-selectable control for changing the descriptor from one category of descriptors to another category of descriptors.

The communication link 5 can include a wireless communication link and/or a wired communication link. As an example, the wireless communication link can include a communication link configured to carry communications using a wireless communication standard or protocol, examples of which are discussed below. As another example, the wired communication link can include a communication link configured to carry communications using a wired communication standard or protocol, examples of which are discussed below. The communication link 5 can include and/or be arranged as the wired communication link 14, the wireless communication link 15, and/or the wireless communication link 16, each of which is shown in FIG. 2.

Figure 2:
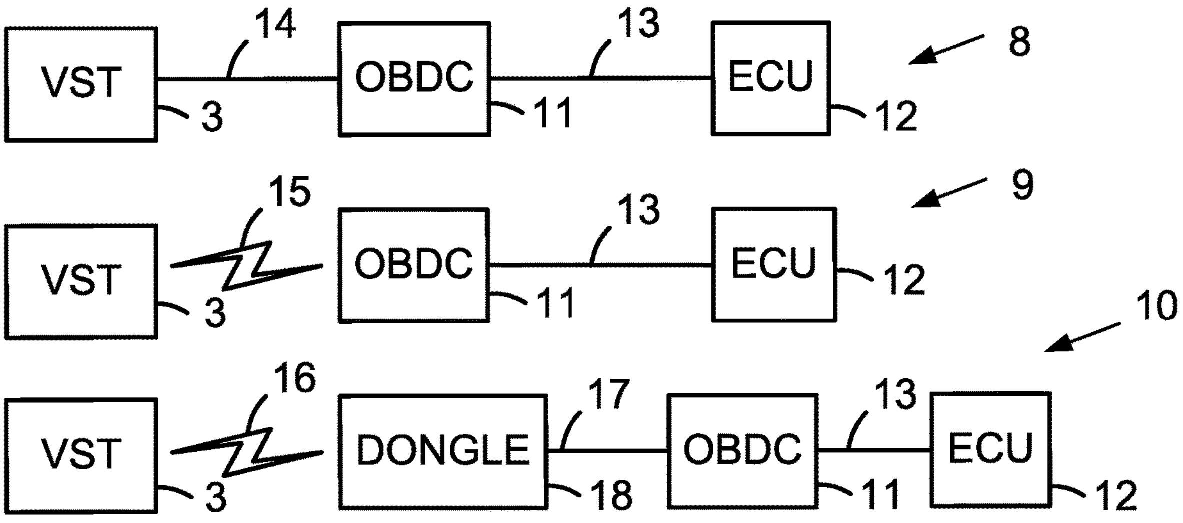
FIG. 2 shows connection arrangements, in accordance with the example embodiments.

Next, FIG. 2 shows an arrangement 8, 9, 10 for operatively connecting the VST 3 to component(s) in a vehicle (e.g., the vehicle 4 shown in FIG. 1). In the arrangement 8, 9, 10, an on-board diagnostic connector (OBDC) 11 is operatively connected to an electronic control unit (ECU) 12 using a vehicle network 13. The ECU 12 can include one or more ECUs in the vehicle, such as the ECU 24, 25, 26, 27 shown in FIG. 3, the ECU 52 shown in FIG. 4, or any other ECU described in this description. The vehicle network 13 can include or be a part of the communication link 5 shown in FIG. 1 and FIG. 2.

In the arrangement 8, the VST 3 is connected directly to the OBDC 11 using a wired communication link 14. As an example, the wired communication link 14 can be contained within a harness with multiple wires, at least one of which is configured to carry a VDM between the VST 3 and the OBDC 11. The harness can include a connector removably attachable to the OBDC 11. The wired communication link 14 can include one or more wires.

In the arrangement 9, the VST 3 is connected directly to the OBDC 11 using a wireless communication link 15. The wireless communication link 15 can include an air interface established to carry a VDM between the VST 3 and the OBDC 11. The wireless communication link 15 and the air interface can be configured in accordance with a wireless communication standard or protocol, such as any wireless communication standard or protocol described in this description.

In the arrangement 10, the VST 3 is connected indirectly to the OBDC 11 using a wireless communication link 16 and a dongle 18. The dongle 18 includes a connector 17 removably attachable to the OBDC 11 and a wireless transceiver and a wired transceiver. The wireless communication link 16 can include an air interface established to carry a VDM between the VST 3 and the dongle 18. The wireless communication link 16 and the air interface can be configured in accordance with a wireless communication standard or protocol, such as any wireless communication standard or protocol described in this description. The wired transceiver of the dongle 18 can receive a VDM transmitted to the OBDC 11 over the vehicle network 13 from an ECU and can transmit a VDM onto the vehicle network 13 for transmission to an ECU connected to the OBDC 11.

Figure 3:
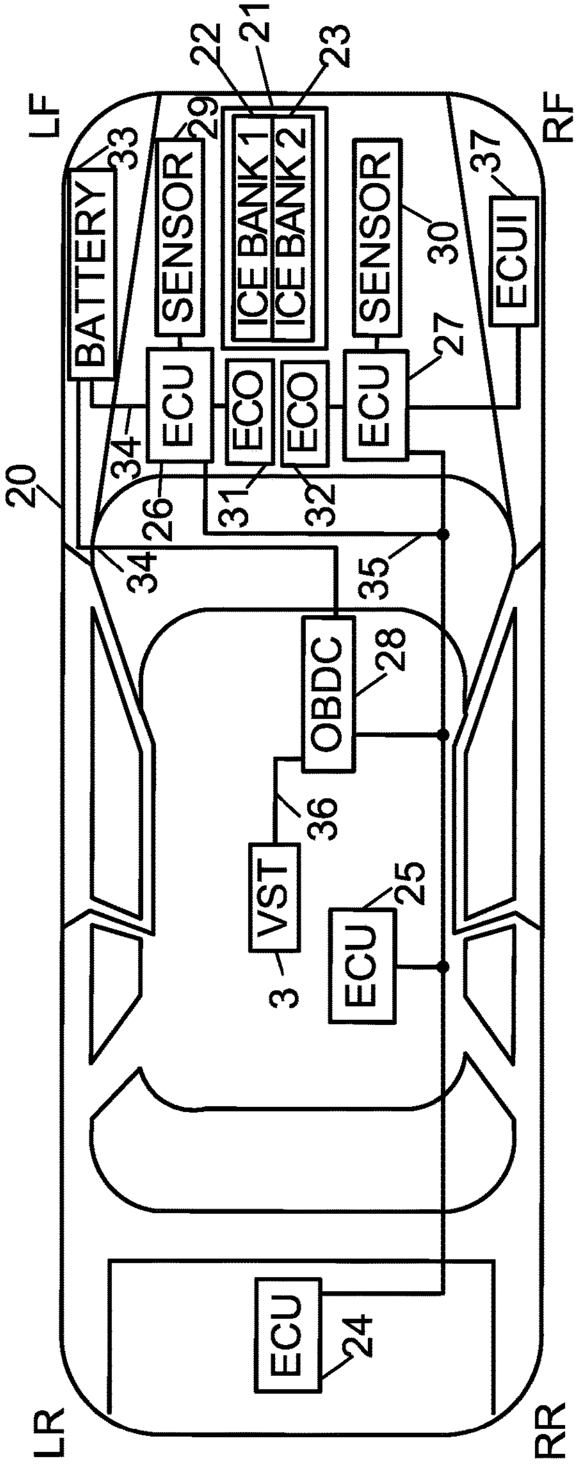
FIG. 3 and FIG. 4 show vehicles, in accordance with the example embodiments.

Next, FIG. 3 shows a vehicle 20 and placement of the VST 3 within the vehicle 20 in accordance with the example embodiments. In at least some embodiments, the vehicle 4 shown in FIG. 1 can be arranged like at least a portion of the vehicle 20. In at least some embodiments, the vehicle 20 can be included within the system 1, 2 in place of or in addition to the vehicle 4.

The vehicle 20 includes an internal combustion engine ICE 21 including a bank 22 and a bank 23. As an example, the bank 22 can be referred to as "bank 1", "left bank," and/or "front bank," and the bank 23 can be referred to as "bank 2," "right bank," and/or "rear bank." The vehicle 20 includes an ECU 24, 25, 26, 27, an OBDC 28, a sensor 29, 30, an ECU controlled output (ECO) 31, 32, a battery 33, and a battery-connected circuit 34. The ECU 24, 25, 26, 27 is operatively connected to the OBDC 28 via the vehicle network 35 to allow transmission of a VDM between the OBDC 28 and the ECU connected to the vehicle network 35. The vehicle network 35 can include a wired and/or wireless network and/or can include or be arranged like the vehicle network 13 shown in FIG. 2. The vehicle 20 also includes an ECU input (ECUI) 37. An ECUI (e.g., the ECUI 37) can include a vehicle component (e.g., a sensor, a key cylinder) operatively connected to an input pin of an ECU.

In at least some embodiments, the OBDC 28 is located within a passenger compartment of the vehicle 20, within an engine compartment of the vehicle 20, or within a storage compartment within the vehicle 20 in front of or behind the passenger compartment. The VST 3 can be removably attachable to the OBDC 28. The VST 3 can connect to the OBDC 28 via a communication link 36. In at least some embodiments, the VST 3 includes the communication link 36 (e.g., a harness). The VST 3 is typically removed after the vehicle 20 has been serviced. In that way, the VST 3 can be used to diagnose other vehicles. The OBDC 28 can be configured like and/or include the OBDC 11 shown in FIG. 2 and the communication link 36 can be configured like and/or include the wired communication link 14, the wireless communication link 15, and/or the wireless communication link 16 and the dongle 18 (all shown in FIG. 2).

The battery-connected circuit 34 can include one or more electrical circuits (e.g., one or more power circuits). FIG. 3 shows the battery-connected circuit 34 extending between the battery 33 and the ECU 26 and between the battery 33 and the OBDC 28. For clarity of FIG. 3, other examples of the battery-connected circuit 34 that extend between the battery 33 and some other vehicle component of the vehicle, such as the ECU 25, 26, 27, the sensor 29, 30, the ECO 31, 32 and the ECUI 37 are not shown in FIG. 3. The battery-connected circuit 34 between the battery 33 and the OBDC 28 can provide an electrical current to provide operational power for the VST 3.

The sensor 29, 30 is a device that provides a signal to the ECU 26, 27, respectively. The signal represents some characteristic of a vehicle the ECU 26, 27 is configured to monitor. As an example, the sensor 29, 30 can include one from among: an accelerometer, a camshaft position sensor, a crankshaft position sensor, a current sensor, a fluid level sensor, a fluid pressure sensor, a fluid temperature sensor, a hall effect sensor, an infrared sensor, a knock sensor, a mass air flow sensor, an oil pressure sensor, an oxygen sensor, a photo transistor, a piezoelectric sensor, a position sensor, a pressure sensor, a rain sensor, a refrigerant sensor, a temperature sensor, a thermistor, a throttle position sensor, a tire pressure sensor, a vehicle speed sensor, a voltage sensor, a wheel speed sensor, a yaw rate sensor, or some other typo of sensor. The signal provided by the sensor 29, 30 can be a target signal that corresponds to a selected functional test. The ECU 26 can output a VDM that includes a data value representative of the signal on an electrical circuit connecting the ECU 26 and the sensor 29. Likewise, the ECU 27 can output a VDM that includes a data value representative of the signal on an electrical circuit connecting the ECU 27 and the sensor 30.

The ECO 31, 32 is a device controlled by the ECU 26, 27, respectively. The ECU 26, 27 can control the ECO 31, 32, respectively, using an output signal or an output condition. The output signal from an ECU can be a target signal that corresponds to a selected functional test. As an example, the ECO 31, 32 can include one from among: a fuel injector, a motor, a pump, a relay, solenoid, a transformer, or a valve. In accordance with at least some embodiments, an ECU is selectable to perform a functional test and/or provide a DTC in accordance with an industry standard, such as the SAE J1979_201202 and/or ISO 15031-5 standards for E/E diagnostic test modes. As an example, the output condition can include establishing a particular voltage level on an electrical circuit operatively connected or connectable to the ECO 31, 32. For instance, the particular voltage level can be a nominal 5-volt reference signal, a nominal 12-volt reference signal, or an electrical ground level signal (e.g., a nominal 0-volt reference level).

The output signal of the ECU 26, 27 (i.e., the ECU output signal) can be any of a variety of electrical or output signals. As an example, the ECU output signal can include an analog or digital electrical signal. As a more particular example, the ECU output signal can include a pulse-width modulated signal, a triangular waveform signal, a saw tooth waveform signal, a rectangular waveform signal, a square waveform signal, or a sinusoidal waveform signal, among others. As another example, the ECU output signal can include a video signal or an audio signal. As yet another example, the digital electrical signal can include a data transmission. As an example, a data transmission can be communicated using a serial peripheral interface (SPI) interface, an inter-integrated circuit ($I^2C$) interface, or a universal asynchronous receiver transmitter (UART) interface, among others. In response to receiving a functional test command, a processor in the ECU can execute program instructions or logic to cause the ECU output condition or output signal to appear at and/or on the ECO 31, 32.

An ECU, such as the ECU 27 can receive from the VST 3 a VDM including an identifier of a reset procedure and responsively send an output signal to the ECO 32 or the ECUI 37 to reset the ECO 32 or the ECUI 37, respectively.

Figure 4:
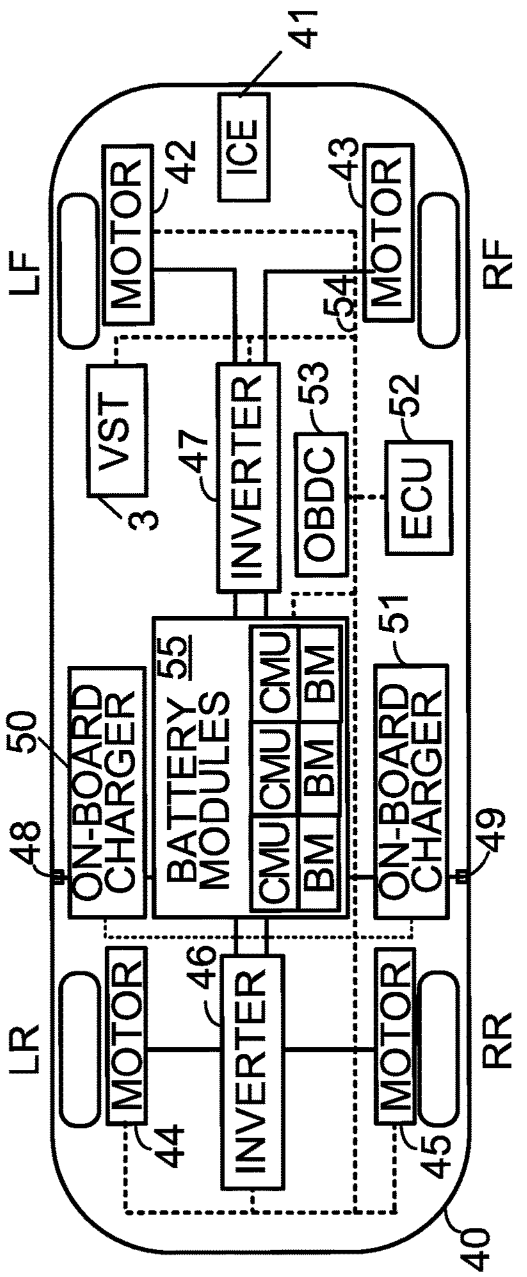

Next, FIG. 4 shows a vehicle 40 and placement of the VST 3 within the vehicle 40 in accordance with the example embodiment. The vehicle 4 shown in FIG. 1 can be arranged like the vehicle 40. The vehicle 40 is an electrical vehicle. In at least some embodiments, the vehicle 40 includes an internal combustion engine (ICE) 41 such that the vehicle 40 is a hybrid vehicle.

As shown in FIG. 4, the vehicle 40 includes a motor 42 at a left front location of the vehicle 40, a motor 43 at a right front location of the vehicle 40, a motor 44 at a left rear location of the vehicle 40, and a motor 45 at a right rear location of the vehicle 40. The vehicle 40 also includes an inverter 46, 47, a charge port 48, 49, an on-board charger 50, 51, an ECU 52, an OBDC 53, and a vehicle network 54. As an example, the charge port 48 can include an AC voltage charge port and the charge port 49 can include a DC voltage charge port. The vehicle 40 can further include battery modules 55 including multiple battery modules (BM) and multiple cell monitoring units (CMU). The CMU can determine parameters regarding the battery modules, such as a battery voltage, a battery temperature, or a battery internal resistance. One or more of the motor 42, 43, 44, 45, the inverter 46, 47, the charge port 48, 49, the battery modules 55, and/or one or more other components (e.g., a conductor or connector connected to the motor 42, 43, 44, 45, the inverter 46, 47, the charge port 48, 49, the battery modules 55) can include a high-voltage component.

Figure 5:
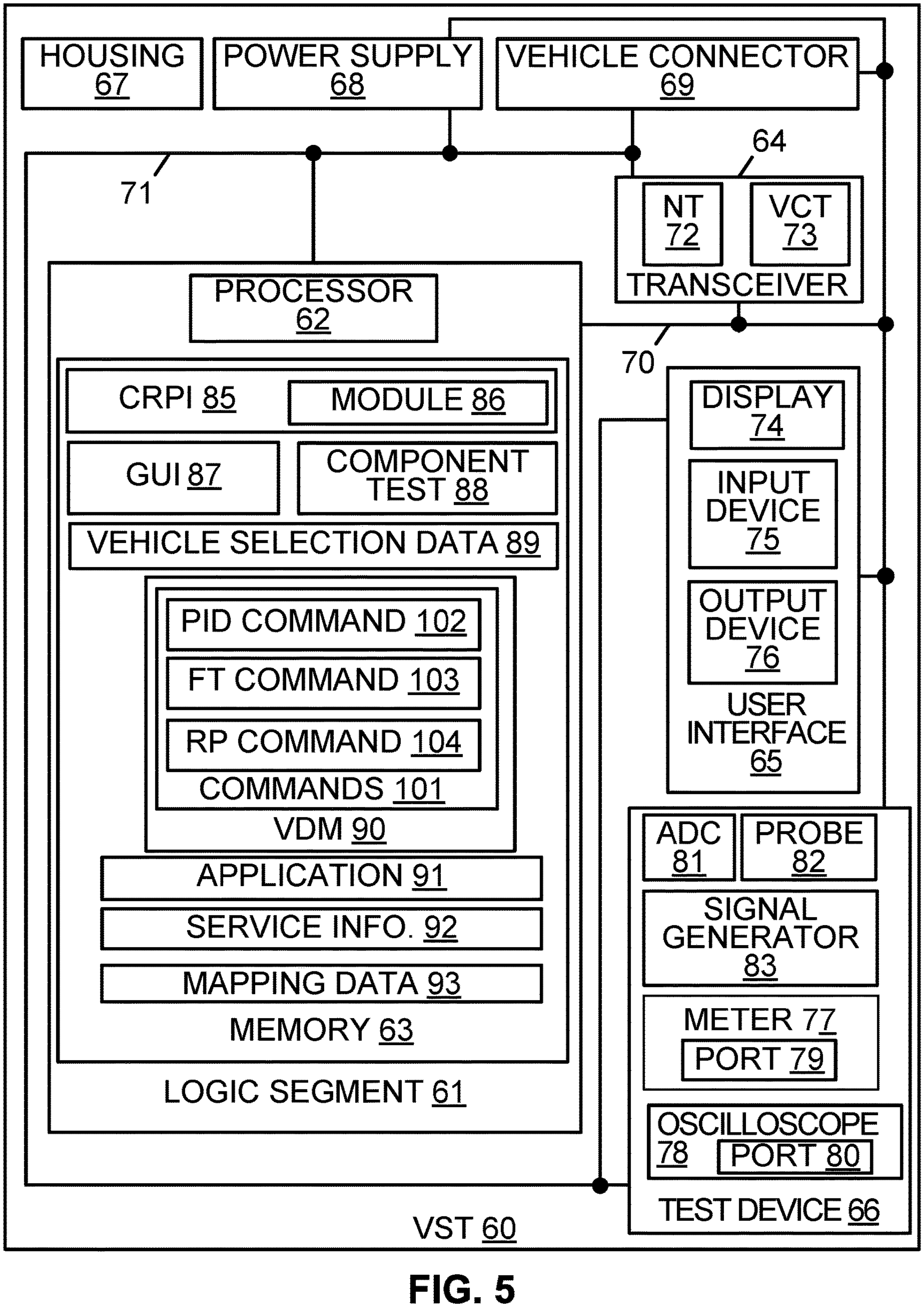
FIG. 5 is a block diagram of a vehicle service tool, in accordance with the example embodiments.

Next, FIG. 5 is a block diagram of a VST 60 in accordance with the example embodiments. The VST 3 shown in FIG. 1 to FIG. 4 can be arranged like the VST 60 and/or include one or more aspects of the VST 60. The VST 60 includes a computing system operable to service a vehicle (e.g., the vehicle 4, 20, 40). The VST 60 can perform any function(s) described in this description as being performed by the VST 3. The VST 3 can perform any function(s) described in this description as being performed by the VST 60.

The VST 60 can include a logic segment 61 including a processor 62 and a memory 63. The VST 60 can also include a transceiver 64, a user interface 65, a test device 66, a housing 67, a power supply 68, a vehicle connector 69, a data bus 70, and/or an electrical circuit 71. The data bus 70 can operatively connect two or more of the processor 62, the memory 63, the transceiver 64, the user interface 65, the test device 66, the power supply 68, or the vehicle connector 69 to one another. In other words, the data bus 70 can provide an operative connection between two or more of the processor 62, the transceiver 64, the memory 63, the user interface 65, the test device 66, the power supply 68, and/or the vehicle connector 69. An operative connection allows for the operatively connected devices to communicate with one another.

A. Processor

A processor, such as the processor 62, 132 (shown in FIG. 11) or any other processor discussed in this description, can include one or more processors. Any processor discussed in this description can thus be referred to as "at least one processor" and/or "one or more processors." Furthermore, any processor discussed in this description can include a general purpose processor (e.g., an INTEL® single core microprocessor or an INTEL® multicore microprocessor), and/or a special purpose processor (e.g., a digital signal processor, a graphics processor, an embedded processor, or an application specific integrated circuit (ASIC) processor). Furthermore still, any processor discussed in this description can include or be operatively connected to a memory controller that controls a flow of data going to and from a memory, such as the memory 63, 133 (shown in FIG. 11).

Any processor discussed in this description can be operable to execute computer-readable program instructions (CRPI). Any CRPI discussed in this description can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language. Any processor discussed in this description can be operable to execute hard-coded functionality in addition to or as an alternative to software-coded functionality (e.g., via CRPI). In at least some embodiments of the VST 60, the processor 62 is a specific processor that is programmed to perform any function(s) described in this description as being performed by the VST 3, 60 and/or with respect to a module.

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some embodiments, the embedded processor can execute an operating system, such as a real-time operating system (RTOS). As an example, the RTOS can include the SMX® RTOS developed by Micro Digital, Inc., such that the embedded processor can include (a) an advanced RISC (reduced instruction set computer) machine (ARM) processor (e.g., an ATSAMS70-DTE processor provided by the Atmel Corporation, San Jose, California), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

A processor can include one or more terminals to receive an electronic signal that indicates whether a USC is selected. Accordingly, a processor or the VST receiving or determining a selection of a USC can include the processor or the VST determining that the electronic signal received on the one or more terminals has a value that indicates the USC is selected. The electronic signal can comprise an analog signal or a digital value.

B. Memory

A memory, such as the memory 63, 133 or any other memory discussed in this description, can include one or more memories. Any memory discussed in this description can thus be referred to as "at least one memory" and/or "one or more memories." A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a tangible, volatile or non-volatile, storage component, such as an optical, magnetic, organic or other memory or disc storage component. Additionally or alternatively, a non-transitory memory can include or be operable as a random-access memory (RAM), a read-only memory (ROM), a programmable read-only memory (PROM), an erasable programmable read-only memory (EPROM), a flash memory, an electrically erasable programmable read-only memory (EEPROM), or a compact disk read-only memory (CD-ROM). The RAM can include static RAM or dynamic RAM. A non-transitory memory can be operable as a removable storage device, a non-removable storage device, or a combination thereof. A removable storage and/or a non-removable storage device can include a magnetic disk device such as a flexible disk drive or a hard-disk drive (HDD), an optical disk drive such as a compact disc (CD) drive and/or a digital versatile disk (DVD) drive, a solid state drive (SSD), or a tape drive.

A transitory memory can include, for example, CRPI or a module provided over a communication network (e.g., the communication network 7), a communication link (e.g., the communication link 5, the wired communication link 14 or the wireless communication link 15, 16), or a data bus (e.g., the data bus 70).

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable mediums." Any of those alternative terms can be preceded by the prefix "transitory" if the memory is transitory or "non-transitory" if the memory is non-transitory. For a memory including multiple memories, two or more of the multiple memories can be the same type of memory or different types of memories.

C. Transceiver

A transceiver, such as the transceiver 64, 134 (shown in FIG. 11) or any other transceiver discussed in this description, can include one or more transceivers. Each transceiver includes one or more transmitters operable to transmit data onto a data bus within the computing system (e.g., the VST 60, the server 130 (shown in FIG. 11)) including the transceiver. Each transceiver includes one or more receivers operable to receive data or a communication carried over a data bus within computing system (e.g., the VST 60 or the server 130) including the transceiver. Unless stated differently, any data described as being transmitted to a device or system is considered to be received by that device or system. Similarly, unless stated differently, any data described as being received from a device or system is considered to be transmitted by that device or system directly or indirectly to the receiving device or system. For some embodiments, a transceiver can include a transmitter and a receiver in a single semiconductor chip. In at least some of those embodiments, the semiconductor chip can include a processor.

For purposes of this description and with respect to a particular vehicle (e.g., the vehicle 4, 20, 40), a network can be operable as a vehicle network, a non-vehicle network, or a multi-purpose network. The vehicle network is at least partly on-board the particular vehicle and has an OBDC and one or more electronic controls units interconnected to the OBDC and/or to each other. In at least some embodiments, the VST 3, 60 includes a harness that operatively connects to the OBDC in the particular vehicle and allows the VST 3, 60 to be disposed outside of the particular vehicle. In those or in other embodiments, the VST 3, 60 is operable to communicate with the OBDC and can be disposed within or outside of the particular vehicle. The non-vehicle network is off-board of the particular vehicle and includes one or more network nodes outside of the particular vehicle. The multi-purpose network is contained at least partly within the particular vehicle and at least partly off-board the particular vehicle. The multi-purpose network can include a vehicle network and a non-vehicle network.

In at least some of the example embodiments, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency."

A radio signal transmitted or received by a radio transceiver can be arranged in accordance with one or more wireless communication standards or protocols such as an Institute of Electrical and Electronics Engineers (IEEE®) standard, such as (i) an IEEE® 802.11 standard for wireless local area networks (wireless LAN) (which is sometimes referred to as a WI-FI® standard) (e.g., 802.11a, 802.11ac, 802.11ad, 802.11ax, 802.11b, 802.11g, or 802.11n), (ii) an IEEE® 802.15 standard (e.g., 802.15.1, 802.15,3, 802.15.4 (ZIGBEE®), or 802.15.5) for wireless personal area networks (PANs), (iii) a BLUETOOTH® version 5.1, 5.2, 5.3, or 5.4 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, (xviii) the LoRaWAN communication standard, or (xix) a 5G new radio (5G NR) communication standard by the 3rd Generation Partnership Project (3GPP) standards organization, such as the 5G NR, phase one or 5G NR, phase two communication standard. Other examples of the wireless communication standards or protocols are possible.

In at least some of the embodiments, a transmitter, such as a transmitter within any transceiver described in this description, can be operable to transmit a signal (e.g., one or more signals or one or more electrical waves) carrying or representing data onto an electrical circuit (e.g., one or more electrical circuits). Similarly, a receiver, such as a receiver within any transceiver described in this description, can be operable to receive via an electrical circuit a signal carrying or representing data over the electrical circuit. The electrical circuit can be part of a non-vehicle network, a vehicle network, or a multi-purpose network. The signal carried over an electrical circuit can be arranged in accordance with a wired communication standard such as a Transmission Control Protocol/Internet Protocol (TCP/IP), an IEEE® 802.3 Ethernet communication standard for a LAN, a data over cable service interface specification (DOCSIS standard), such as DOCSIS 4.0, a universal serial bus (USB) specification, such as a USB4 standard, a vehicle data message (VDM) protocol, or some other wired communication standard or protocol. Examples of a VDM protocol are listed elsewhere in this description. An electrical circuit can include a wire, a printed circuit on a circuit board, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". Transmission of data over the conductor can occur electrically and/or optically.

In accordance with at least some embodiments, the transceiver 64, 134 includes a network transceiver and/or a vehicle communications transceiver. As shown in FIG. 5, the transceiver 64 includes a network transceiver 72 and/or a vehicle communications transceiver 73. The network transceiver is operable to communicate over a non-vehicle network and/or a multi-purpose network. The vehicle communications transceiver is operable to communicate over a vehicle network and/or a multi-purpose network. The transceiver 64, 134 can be operable as a gateway to communicate over a multi-purpose network. The transceiver 64, 134 is also operable to communicate over the data bus 70, 136 (shown in FIG. 11), respectively.

In at least some embodiments, the network transceiver includes a modem, a network interface card, a local area network (LAN) on motherboard (LOM), and/or a chip mountable on a circuit board. As an example, the chip can include a CC3100 Wi-Fi® network processor available from Texas Instruments, Dallas, Texas, a CC256MODx Bluetooth® Host Controller Interface (HCl) module available from Texas instruments, or a different chip for communicating via Wi-Fi®, Bluetooth® or another communication protocol.

A network node that is within and/or connected to a non-vehicle network and/or that communicates via a non-vehicle network or a multi-purpose network using a packet-switched technology can be locally configured for a next 'hop' in the network (e.g., a device or address where to send data to, and where to expect data from). As an example, a device (e.g., a transceiver) operable for communicating using an IEEE® 802.11 standard can be configured with a network name, a network security type, and a password. Some devices auto-negotiate this information through a discovery mechanism (e.g., a cellular phone technology).

The network transceiver 72 can be arranged to transmit a request and/or receive a response using a transfer protocol, such a hypertext transfer protocol (i.e., HTTP), an HTTP over a secure socket link (SSL) or transport layer security (TLS) (i.e., HTTPS), a file transfer protocol (i.e., FTP), or a simple mail transfer protocol (SMTP). The network transceiver 72 can be arranged to transmit an SMS message using a short message peer-to-peer protocol or using some other protocol.

The data transmitted by the transceiver 64 can include a destination identifier or address of a computing system to which the data is to be transmitted. The data or communication transmitted by the transceiver 64 can include a source identifier or address of the VST 60. The source identifier or address can be used to send a response to the VST 60. As an example, this data or communication can include a user identifier corresponding to a user of the VST 60, credential data corresponding to a user of the VST 60, a VDM, a GUI, or other data instead or as well.

D. User Interface

In at least some embodiments, the user interface 65 includes a display 74, an input device 75, and/or an output device 76.

The display 74 can include one or more displays. As an example, each display of the one or more displays includes a capacitive touch screen display, a resistive touch screen display, a plasma display, a light emitting diode (LED) display, a cathode ray tube display, an organic light-emitting diode (OLED) display (such as an active-matrix OLED or a passive-matrix OLED), a liquid crystal display (LCD) device (such as include a backlit, color LCD device), a touch screen display with the LCD device, a capacitive touch screen display, or a resistive touch screen display. The display 74 can include a different type of display as well or instead. Each display can include one or more display screens.

In at least some embodiments, the display 74 is affixed (e.g., removably affixed) to a substrate of the housing 67 and/or to the housing 67. In those or in other embodiments, the display 74 is worn and/or within a wearable device, such as a pair of glasses or goggles, a head-mountable display, or a wrist display, such as a wristwatch (e.g., a smartwatch).

The display 74 is operable to display displayable content. Examples of displayable content are provided throughout this application by describing objects displayed by the display 74. As an example, the display 74 is operable to display a GUI, content of a GUI, a USC of a GUI and/or the user interface 65, a message, a notification, an indicator of a PID condition, a sub-container, a container, a PID, a parameter value, a PID condition, service information, a PID facet list, a PID facet list expander, a PID facet selector, or some other type of information or data.

The display 74 can also be operable to display a still image (such as a visible light image, a thermal image, and/or a blended image based on a visible light image and a thermal image), a video, a text file (such as a text file with a portable document format (PDF) file extension or an XML file extension), a hypertext markup language file, a web page (such as a web page including a search bar and/or a cursor), and/or a GUI. In at least some embodiments, the display 74 is operable to display a horizontal scroll bar and/or a vertical scroll bar. The horizontal scroll bar and the vertical scroll bar can be used to cause the display 74 to display content not currently displayed on the display 74. A web page displayable on the display 74 can include any content shown in or described with respect to any one or more of the GUIs shown in the drawings and/or described in this description. Other examples of content displayable on the display 74 are also possible.

The input device 75 is operable to receive user inputs from a user of the VST 60. As an example, the input device 75 includes a keyboard or keypad including one or more keys operable to be pressed or otherwise manipulated by the user. As another example, the input device 75 includes a microphone operable to receive sound waves, such as sound waves produced by the user speaking words in a vocabulary of the VST 60. In the embodiments in which the display 74 is operable as a touch screen display, the display 74 can receive user inputs from a user of the VST 60, such as a selection of a PID facet selector, a PID facet list expander, or a USC. Accordingly, the input device 75 can include the display 74 when operable as a touch screen display. As another example, the input device 75 can include a camera to capture images (e.g., an image of a user fingerprint, a user face, a vehicle, a vehicle component, a bar code, or a matrix code).

In the embodiments that include the output device 76, the output device 76 can include one or more speakers operable to convert electrical signals to audible sounds. In those or in other embodiments, the output device 76 can include wired headphones and/or wireless headphones. The wired headphones can connect to an audio plug operatively connectable to an audio jack. The wireless headphones can include in-ear headphones, such as the AIRPODS PRO® in-ear headphones by Apple Inc. In the embodiments that include the output device 76, the output device 76 can include the display 74 to display content (e.g., GUIs and service information) output by the processor 62.

E. Test Device

The test device 66 can include one or more test devices, such as one or more test devices to test the vehicle 4, 20, 40. As an example, the test device 66 can include a meter 77 and/or an oscilloscope 78. The meter 77 includes a port 79 (e.g., one or more ports). The oscilloscope 78 includes a port 80 (e.g., one or more ports). The meter 77 can include a digital volt-ohm meter (DVOM). Additionally or alternatively, the meter 77 can include a current (i.e., amperage) meter. The meter 77 includes and/or is operatively connected to the port 79. The port 79 includes one or more ports for receiving an end of a meter lead. An opposite end of the meter lead is connectable to a component on a vehicle. The oscilloscope 78 can include one or more channels. The port 80 includes a port for each channel of the oscilloscope 78. Each port of the port 80 is operable to receive an end of an oscilloscope test lead. An opposite end of the oscilloscope test lead is connectable to a component on a vehicle.

Additionally, the test device 66 can include one or more of the following: an analog-to-digital converter (ADC) 81, a probe 82, and a signal generator 83. The signal generator 83 can output a signal onto a meter lead connected to the port 79 and/or onto an oscilloscope test lead connected to the port 80. The output signal can be used to measure a signal. For instance, the signal generator 83 can output a voltage differential across two meter leads connected to the port 79 (e.g., a red meter lead and a black meter lead) and onto a circuit for use in measuring a resistance of the circuit. The ADC 81 can be operable to convert an analog signal received via a meter lead or an oscilloscope test lead into a digital signal. A digital signal representing a signal detected by the ADC 81 can be output onto the data bus 70 for transmission to the processor 62.

The probe 82 can include one or more probes. As an example, the probe 82 can include a temperature probe, such as a temperature probe including a thermocouple and a connector connectable to the port 79, 80, and/or a temperature adaptor and probe, item EEDMTEMP-1 available from Snap-on Incorporated, Kenosha, Wisconsin. As another example, the probe 82 can include a pressure probe, such a pressure adaptor for digital multimeter, item EEDM5030, available from Snap-on Incorporated, a pressure transducer and cable, item EEPV302AT, or a pressure transducer adaptor, item EEMS324PSA, each available from Snap-on Incorporated. As another example, the probe 82 can include an exhaust probe, such as a standard exhaust probe, item HHGA-7; a 5-gas exhaust probe, item HHGA-9; or a motorcycle exhaust probe, item HHGA-8; each of which is available from Snap-on Incorporated. As yet another example, a probe can include an air velocity and temperature probe, such as a wireless air velocity vane probe, item TPI-555, available Test Products International Inc., Beaverton, Oregon.

F. Additional Components

A power supply, such as the power supply 68, 139 (shown in FIG. 11) or any other power supply discussed in this description, can be arranged in any of a variety of configurations. As an example, the power supply can be operable to include circuitry to receive AC current from an AC electrical supply (e.g., electrical circuits operatively connected to an electrical wall outlet) and convert the AC current to a DC current for supplying to one or more from among the components connected to the power supply 68. As another example, the power supply can be operable to include a battery or be battery operated. As yet another example, the power supply can be operable to include a solar cell or be solar operated. Moreover, a power supply can be operable to include and/or connect to a power distribution circuit to distribute electrical current throughout the device or system including that power supply. In at least some embodiments of the VST 60, the power distribution circuit includes the electrical circuit 71 (i.e., one or more electrical circuits) that connects to the processor 62, the memory 63, the transceiver 64, the user interface 65 the test device 66, and/or the vehicle connector 69. Other examples of a power supply, such as the power supply 68, are also possible.

In at least some embodiments, the VST 60 includes a housing 67. The housing 67 surrounds at least a portion of the following: the processor 62, the transceiver 64, the memory 63, the user interface 65, the test device 66, the power supply 68, the vehicle connector 69, the data bus 70, and/or the electrical circuit 71. The housing 67 can support a substrate, such as a printed circuit board. In at least some example embodiments, at least a portion of the following: the processor 62, the memory 63, the transceiver 64, the user interface 65, the power supply 68, the vehicle connector 69, the data bus 70, and/or the electrical circuit 71 is/are mounted on and/or connected to a substrate of the housing 67. The housing 67 can be made from various materials. For example, the housing 67 can be made from a plastic material (e.g., acrylonitrile butadiene styrene (ABS)) and a thermoplastic elastomer used to form a grip on the housing 67.

The vehicle connector 69 includes one or more vehicle connectors connectable to a vehicle, such as the vehicle 4, 20, 40. The vehicle connector 69 can include a vehicle connector configured to connect to an OBDC. The vehicle connector 69 can include a dongle, such as the dongle 18.

G. Memory Content

The example embodiments can determine, generate, store (e.g., write into a memory), transmit, read, receive, and/or otherwise use a variety of computer-readable data. At least some of the computer-readable data can be stored in a memory, such as the memory 63, 133.

As an example, the memory 63 contains computer-readable programming instructions (CRPI) 85, a module 86 (i.e., one or more modules), a GUI 87 (i.e., one or more GUI), a component test 88 (i.e., one or more component tests), vehicle selection data 89, a vehicle data message 90 (i.e., one or more VDMs or data for generating one or more VDMs), an application 91, service information 92, and/or mapping data 93. Additionally, the memory 63 can contain any of the content within the system memory 674 shown in FIG. 55 and/or within the computer program product 694 shown in FIG. 56.

The CRPI 85 can include program instructions executable by a processor, such as the processor 62. As an example, the CRPI 85 can include program instructions that are executable to cause the VST 60 to perform any function described as being performed by the VST 60, by the processor 62, and/or by some other component of the VST 60. As an example, the CRPI 85 can include program instructions executable by the processor to perform one or more functions of any one or more the function set 600, 610, 615, 620, 625, 630, 640, 645, 650, 660 shown in FIG. 45 to FIG. 54. In at least some embodiments, the CRPI 85 can include the module 86. In at least some embodiments, the module 86 includes at least a portion of the CRPI 85.

Figure 6:
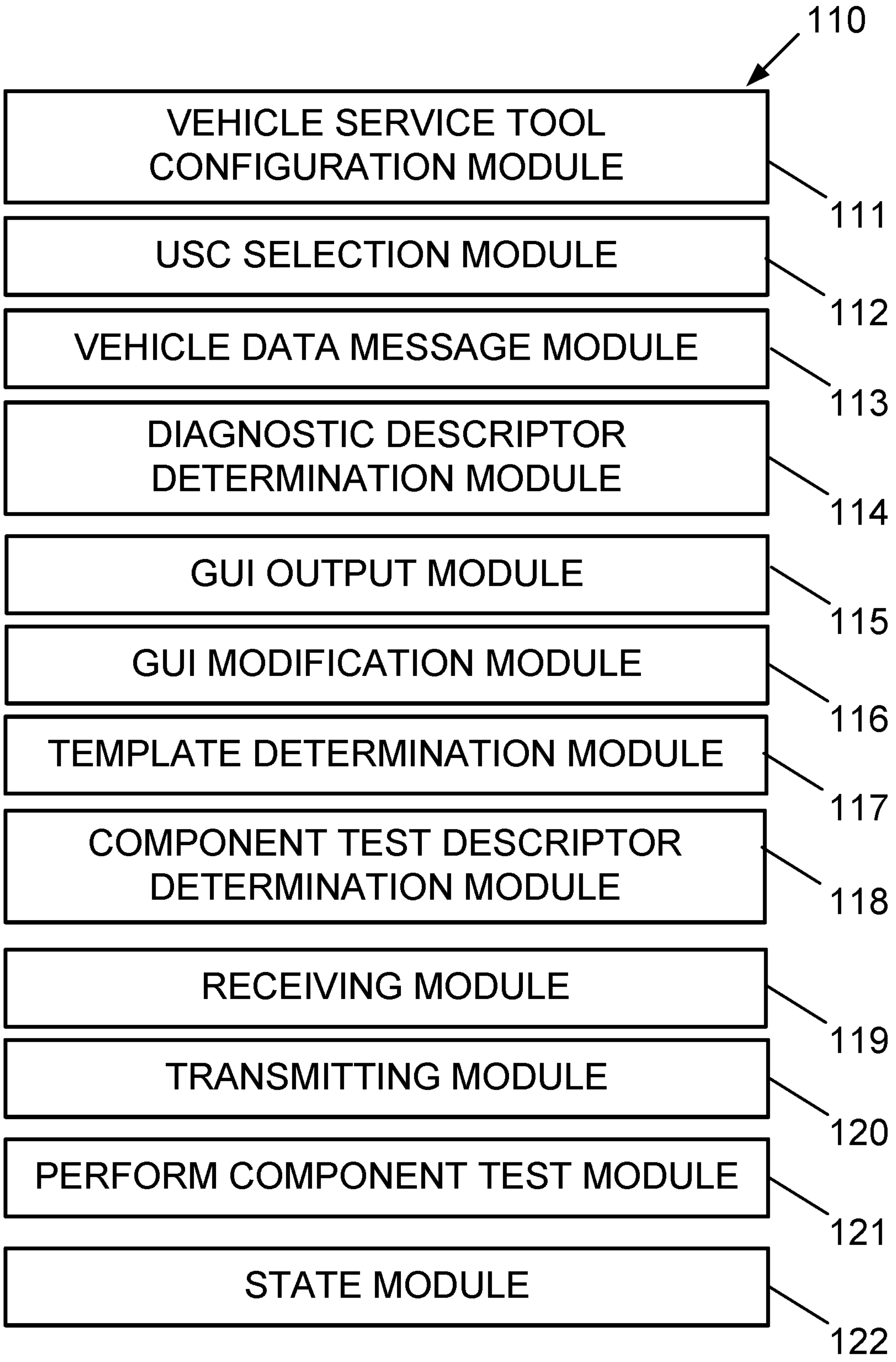
FIG. 6 shows modules, in accordance with the example embodiments.

The module 86 can include one or more modules. Examples of modules within the module 86 are shown in FIG. 6. In at least some embodiments, multiple modules are arranged as an application. In accordance with at least some of those embodiments, that application can include the application 91.

The GUI 87 can include one or more GUIs and/or data for generating one or more GUIs. In at least some embodiments, the GUI 87 includes a GUI transmitted to the VST 60 from the server 130. Examples of a GUI contained within and/or generated based on data contained within the GUI 87 are shown in FIG. 9 to FIG. 42. In at least some embodiments, each GUI corresponds to one or more types of vehicles, one or more systems, one or more vehicle components, one or more symptoms, and/or one or more DTCs. In at least some embodiments, a GUI is populated with vehicle identifying information regarding one or more types of vehicles and/or USCs corresponding to one or more systems or vehicle components. The GUI 87 can include a data map that indicates which type(s) of vehicle(s), vehicle system(s), vehicle component(s), symptoms, or DTCs corresponds to a GUI. The processor can determine the GUI based on the mapping data and data indicative of the type(s) of vehicle(s), system(s), vehicle component(s), symptom(s) or DTC(s). Alternatively or additionally, that data map can be included within the mapping data 93.

The component test 88 can include one or more component tests, such as one or more guided component tests. Each component test can include computer-readable program instructions (e.g., a perform component test module 121) executable to perform the component test. Execution of a component test module can include configuring a test device for performing the component test for the component and/or vehicle to be tested. As an example, a component test can include a voltage test, an amperage test, a frequency test, a resistance test, a duty cycle test, or a pressure test. As another example, a component test can be specified for a particular component, such as a fuel pump voltage test or a fuel pump pressure test. As yet another example, a component test can be specified for a particular vehicle on a particular vehicle, such as a fuel pump voltage test on a 2018 Jeep Cherokee (4WD) with 3.6 L engine, or a fuel pump pressure test on a 2018 Jeep Cherokee (4WD) with a 3.6 L engine.

A guided component test can include a component test performed by the test device 66 (e.g., a test performed by the meter 77 or the oscilloscope 78). The guided component test can include one or more setup instructions executable by the processor 62 or the test device 66 to configure the meter 77 or the oscilloscope 78 to perform a particular component test. As an example, the setup instructions can include an instruction for the processor to select the meter 77 or the oscilloscope 78. As another example, the setup instructions can include an instruction to put the meter 77 in a particular measurement mode (e.g., a voltage measurement mode, an amperage measurement mode, or a resistance measurement mode). As another example, the setup instructions can include an instruction to configure the oscilloscope 78 with a particular display setting, such as a particular sweep rate or volts per division. As yet another example, the setup instructions can include an instruction to configure the oscilloscope 78 with a particular trigger mode.

A guided component test can also include test instructions. As an example, the test instructions can include an instruction to sample input signals received at the test device 66. The instruction to sample input signals can be based on whether the guided component test is for measuring a direct current signal or an alternating current signal. Such instruction can specify a sampling rate for sampling the input signals. As another example, the test instructions can include an instruction for storing the input signal samples in a memory. As yet another example, the test instructions can include an instruction to output a representation of the input signal samples on a display. In accordance with embodiments in which the test device 66, the meter 77 or the oscilloscope 78 is remote from the VST 60, the setup instructions and the test instructions can include an instruction for establishing a communication link between the VST 60 and the test device 66, the meter 77, or the oscilloscope 78 and instruction for transmitting or receiving a communication corresponding to a guided component test via the communication link.

In at least some embodiments, the guided component test includes displayable information, such as test procedures, test device connection guidance, connector views, a graph showing a known good waveform for a component corresponding to the guided component test, a graph showing a known bad waveform for a particular component corresponding to the guided component test, or expected test results.

In at least some embodiments, the component test 88 includes multiple sets of test device configuration parameters and each set of test device configuration parameters is associated with an index value. A server (e.g., the server 6, 130) can determine which set of device configuration parameters is to be used to set up the test device 66 for performing a test of a vehicle component. The server can transmit the determined set of test device configuration parameters to the VST 3, 60. Alternatively, the server can transmit an index value associated with the determined set of test device configuration parameters to the VST 3, 60. In this alternative arrangement, the computing system can determine the appropriate test device configuration parameters for the vehicle ID session based on the index value received at the VST 3, 60. Table A shows example categories of component tests and example component tests. The current probe tests can be performed with a current probe connectable to the test device 66. The two-channel tests are configured to measure or compare two signals. The transducer tests can be performed using a transducer connected to the test device 66. A component test can also include a voltage test.

TABLE A

| Component Test Category | Component Test |
|---|---|
| Current probe test | Fuel injector current ramp |
| Current probe test | Fuel pump current ramp |
| Current probe test | Fuel pump RPM calculation |
| Current probe test | Ignition coil current ramp |
| Current probe test | Parasitic draw |
| Two-channel test | CAN-bus high low |
| Two-channel test | Crankshaft and camshaft relationship |
| Two-channel test | EGR solenoid and position sensor |
| Two-channel test | EVAP solenoid and diagnostic switch |
| Two-channel test | FlexRay bus |
| Two-channel test | Injector and oxygen sensor |
| Two-channel test | Knock sensor and EST |
| Two-channel test | MC dwell and oxygen sensor |
| Two-channel test | Pre and post cat oxygen sensors |
| Two-channel test | Throttle positions 1 & 2 |
| Two-channel test | Wheel speed sensor (Hall effect type) |
| Transducer test | A/T line pressure and shift solenoid |
| Transducer test | A/T line pressure test |
| Transducer test | EGR temperature sensor and EGR valve |
| Transducer test | Exhaust back pressure test |
| Transducer test | Fuel pressure and fuel pump current |
| Transducer test | Fuel pressure and fuel pump voltage |
| Transducer test | Fuel pressure test |

The vehicle selection data 89 can include one or more vehicle selection menus or data for generating the one or more vehicle selection menus that can be output on and/or within a GUI of the GUI 87. The processor 62 can output a vehicle selection menu on the display 74 to allow a user to select a type of vehicle or a particular vehicle. The vehicle selection data 89 can also include data that represents relationships between vehicle model years and the types of vehicles that were built for and/or during each model year. For instance, for a given model year, the vehicle selection data 89 can include data that indicates all vehicle makes that include at least one type of vehicle for the given model year, and for each of those vehicle makes, the vehicle selection data 89 can include data that indicates all vehicle models that correspond to one of the vehicle makes that built at least one type of vehicle for the given model year. FIG. 10 and other figures show a vehicle identifier 201 within a GUI. In at least some embodiments, the vehicle identifier 201 can be output on the GUI based on selections made using one or more vehicle selection menus based on the vehicle selection data 89. As an example, at least a portion of the vehicle selection data 89 can be output on and/or within a GUI, such as the GUI 185 shown in FIG. 9.

The vehicle data message 90 includes one or more vehicle data messages (VDMs) and/or data to generate the one or more VDMs to be transmitted by the VCT 73. A VDM within the vehicle data message 90 can include a VDM received by the vehicle communications transceiver 73. A VDM within the vehicle data message 90 can include a VDM that is to be or has been transmitted by the VCT 73. The vehicle data message 90 can include a message map for decoding a VDM received by the VCT 73 and/or for encoding a VDM that is to be transmitted by the VCT 73. The message map can include a formula for converting data in one or more fields of a VDM to a value represented by the one or more fields. The message map can indicate which field in the VDM is a PID and which field(s) are a PID parameter value. The message map can include a textual description corresponding to each PID so that the processor can know which container or sub-container including PID is to be populated with the textual description and a parameter value corresponding to the PID. As an example, the fields can represent an engine RPM, a battery voltage, an engine coolant temperature, or any PID represented within a GUI, such as the GUI 240 shown in FIG. 16.

The vehicle data message 90 can include one or more buffers to store PIDs and corresponding parameter values. In at least some embodiments, the buffer(s) store the PIDs and corresponding parameter values in a first in, first out (FIFO) format. The processor can read parameter values from the buffer and output the parameter values within a GUI to show a historical representation of the parameter values.

The vehicle data message 90 can include commands 101 can include a PID command 102 (i.e., one or more PID commands), a functional test command 103 (i.e., one or more functional test commands), and a reset procedure command 104 (i.e., one or more reset procedure commands). A PID command can include a PID. A functional test command can include an identifier of a functional test. A reset procedure command can include an identifier of a reset procedure. An identifier of a PID, a functional test identifier, a reset identifier, a component test identifier can be included within mapping data or an index described in this description.

The PID command 102 includes data that indicates how a VDM should be arranged to request a PID parameter value from the vehicle 4 for a particular PID. As an example, the PID command 102 can indicate a particular VDM protocol that is to be used to generate the VDM. As another example, the PID command 102 can include an ECU identifier of the ECU from which the PID parameter value is to be requested. As yet another example, the PID command 102 can include the PID. The processor 62 can determine the PID command 102 based on an index value corresponding to a PID. The PID command 102 can include a PID group identifier for one or more PIDs so that the processor 62 can determine which PIDs belong to a PID group and can populate a container with PID data regarding PIDs in the PID group.

As an example, a VDM can be arranged as $07 $DF $02 $01 $31 $42 $00 $00 $00 $00. In that example VDM, the fifth byte is the PID, the sixth byte is a parameter value. In at least some embodiments, the PID command 102 includes formulas for converting a PID parameter value to a value represented by the PID parameter value.

The functional test command 103 includes data that indicates how a VDM should be arranged for requesting the vehicle 4 to perform a particular functional test. As an example, the functional test command 103 can indicate a particular VDM protocol that is to be used to generate the VDM. As another example, the functional test command 103 can include an ECU identifier of the ECU that is configured to perform the functional test. As yet another example, the functional test command 103 can include the functional test identifier. The processor 62 can determine the functional test command 103 based on an index value corresponding to a functional test identifier. One or more functional test commands can correspond to a notification the processor 62 outputs on the display 74 before the processor 62 transmits the functional test command. As an example, the notification can include a safety alert, or a set-up instruction.

Additionally or alternatively, the processor 62 can determine the functional test command 103 based on a menu selection and program code or data that corresponds to the menu selection. The processor 62 can use data indicating a VDM protocol to determine which VCT of multiple VCTs is to be used to transmit a functional test command and/or the format for generating a VDM including the functional test command.

The reset procedure command 104 includes data that indicates how a VDM should be arranged for requesting the vehicle 4 to perform a particular reset procedure. As an example, the reset procedure command 104 can indicate a particular VDM protocol that is to be used to generate the VDM. As another example, the reset procedure command 104 can include an ECU identifier of the ECU that is configured to perform the reset procedure. As yet another example, the reset procedure command 104 can include the reset procedure identifier. The processor 62 can determine the reset procedure command 104 based on an index value corresponding to a reset procedure identifier. As an example, performing a reset procedure can include modifying a setting within an ECU (e.g., a setting that indicates the oil life setting is 100%, resetting an advanced driver assistance system (ADAS) component after a vehicle collision, or resetting a fuel injector). As another example, performing the reset procedure can include reprogramming an ECU with the vehicle. For instance, reprogramming the ECU can include flash programming a software calibration file into the ECU and/or flash programming an ECU according to SAE standard J2534. In at least some embodiments, performing the reset can include scanning a matrix code (e.g., a QR code), decoding the matrix code, requesting a software download for a component that is to be reprogrammed, receiving the software download, and reprogramming the component with the software download. As yet another example, performing the reset procedure can include re-zeroing a sensor, such as a steering wheel angle sensor. As yet another example, performing the reset procedure can include a level initiation and leveling of headlight reset procedures to adjust, for example, an angle or height of the headlight.

The application 91 can include one or more applications. As an example, the application 91 can include a browser application. As another example, the application 91 can include an application with an application programming interface (API), such as an API configured to transmit a list identifier to a server and to receive a group of diagnostic descriptors.

The application 91 can include and/or execute in conjunction with one or more application drivers. If the application driver(s) are considered to be distinct from an application, then the CRPI 85 can include the application driver. Each application driver can include CRPI that are executable for an application and a device to communicate with each other. As an example, the device can include the display 74 arranged as a touch screen display and the application driver can translate electrical signals resulting from a user contacting the display 74 to a digital value corresponding to an area of the display 74 where the user contact occurred. If the contacted area corresponds to a USC or a portion of a USC, the processor can determine the USC has been selected based on the application driver outputting the digital value.

The service information 92 can include service information for populating into a GUI. The service information can correspond to particular vehicles, particular vehicle components and systems, particular PID facets, or particular PIDs. The service information can correspond to particular tests or reset procedures. As an example, the service information 92 can include instructions, specifications, images, videos, component location information, schematic diagrams, threshold values, corresponding descriptors of PIDs, test, or procedures, or some other type of service information listed in this description or otherwise.

The mapping data 93 can include mapping data that maps a variety of data. The mapping data 93 can be referred to as a database and/or a data map.

As an example, the mapping data 93 can include a computer-readable file. For instance the mapping data 93 can contain the file 400 shown in FIG. 43, and/or the file 449 shown in FIG. 44A to FIG. 44C. The information contained within those files can be mapped to the aspect indicated by the element containing the information. In at least some embodiments, the processor 62 writes the file 400, 449 into the mapping data 93 of the memory 63 after providing a search request to the server 130 and receiving the file 400, 449 from the server 130.

As yet another example, the mapping data 93 can include data that maps vehicle characteristic data to GUI templates. As an example, the vehicle characteristic data can include one or more of the following: a vehicle identifier (e.g., a YMM), a system identifier, a component identifier, or a symptom identifier, such as a DTC identifier. The GUI templates can include a template for arranging the aspects of a GUI shown in the drawings, such as the containers shown in the drawings. Table B shows an example of the aforementioned mapping data. As an example, the GUI 210 shown in FIG. 11 can be arranged according to Template A for PID lists, the GUI 220 shown in FIG. 12 can be arranged according to Template B for test set lists, the GUI 225 shown in FIG. 13 can be arranged according to Template C for functional test lists, the GUI 230 shown in FIG. 14 can be arranged according to Template D for reset procedure lists

TABLE B

| Vehicle ID<br>System ID<br>Component ID | PID List ID<br>Temp. ID | Test Set ID<br>Temp. ID | FT List ID<br>Temp. ID | RP List ID<br>Temp. ID | CT List ID<br>Temp. ID |
|---|---|---|---|---|---|
| YMM-1<br>System-1<br>Component-1 | 1-18<br>Temp. A | 1-6<br>Temp. B | 1-6<br>Temp. C | 1-6<br>Temp. D | 1-6<br>Temp. E |
| YMM-1<br>System-1<br>Component-2 | 1-10, 12, 14<br>Temp. C | 2-8<br>Temp. F | 1-4, 7, 10<br>Temp. C | 8-15<br>Temp. H | 1-6<br>Temp. E |
| YMM-1<br>System-1<br>Component-3 | 2-9, 10, 12<br>Temp. G | 3-9<br>Temp. B | 3-5, 8-10, 12<br>Temp. C | 2-5<br>Temp. I | 2-4, 8, 9<br>Temp. J |

As another example, the mapping data 93 can include PIDs and PID descriptors. The PID descriptors can be mapped to a PID and to a category of PID descriptors. Table D provides an example of such mapping data.

As another example, the mapping data 93 can include functional test identifiers and functional test descriptors. The functional test descriptors can be mapped to a functional test identifier and to a category of functional test descriptors. Table E provides an example of such mapping data.

As another example, the mapping data 93 can include reset procedure identifiers and reset procedure descriptors. The reset procedure descriptors can be mapped to a reset procedure identifier and to a category of reset procedure descriptors. Table F provides an example of such mapping data.

As another example, the mapping data 93 can include component test identifiers and component test descriptors. The component test descriptors can be mapped to a component test identifier and to a category of component test descriptors. Table G provides an example of such mapping data.

As yet another example, the mapping data 93 can include data that maps various data to a USC. Table C shows example mapping data with respect to USCs shown in a GUI 320 shown in FIG. 26 to FIG. 28. The processor can determine which USC within the GUI 320 is selected based on whether any facet is selected and a voltage received at the processor.

TABLE C

| GUI | Selected Facet | Voltage | USC |
|---|---|---|---|
| 320 | None | 2.401 to 2.500 | 324 |
| 320 | None | 2.301 to 2.400 | 325 |
| 320 | None | 2.201 to 2.300 | 326 |
| 320 | None | 2.101 to 2.200 | 327 |
| 320 | F1 | 2.401 to 2.500 | 324 |
| 320 | F1 | 2.301 to 2.400 | 327 |

H. Example Modules

Next FIG. 6 shows a module set 110 (i.e., a set of modules). The module 86 in FIG. 5 and/or a module 141 shown in FIG. 11 can include one or more modules of the module set 110. The module set 110 includes a vehicle service tool configuration module 111, a USC selection module 112, a vehicle data message module 113, a diagnostic descriptor determination module 114, a GUI output module 115, a GUI modification module 116, a template determination module 117, a component test descriptor determination module 118, a receiving module 119, a transmitting module 120, a perform component test module 121, and a state module 122. A processor, such as the processor 62, can execute a module of the module set 110. In that regard, any functionality described with respect to a module of the module set 110 can be functionality performed by the processor.

1) Vehicle Service Tool Configuration Module

Figure 7:
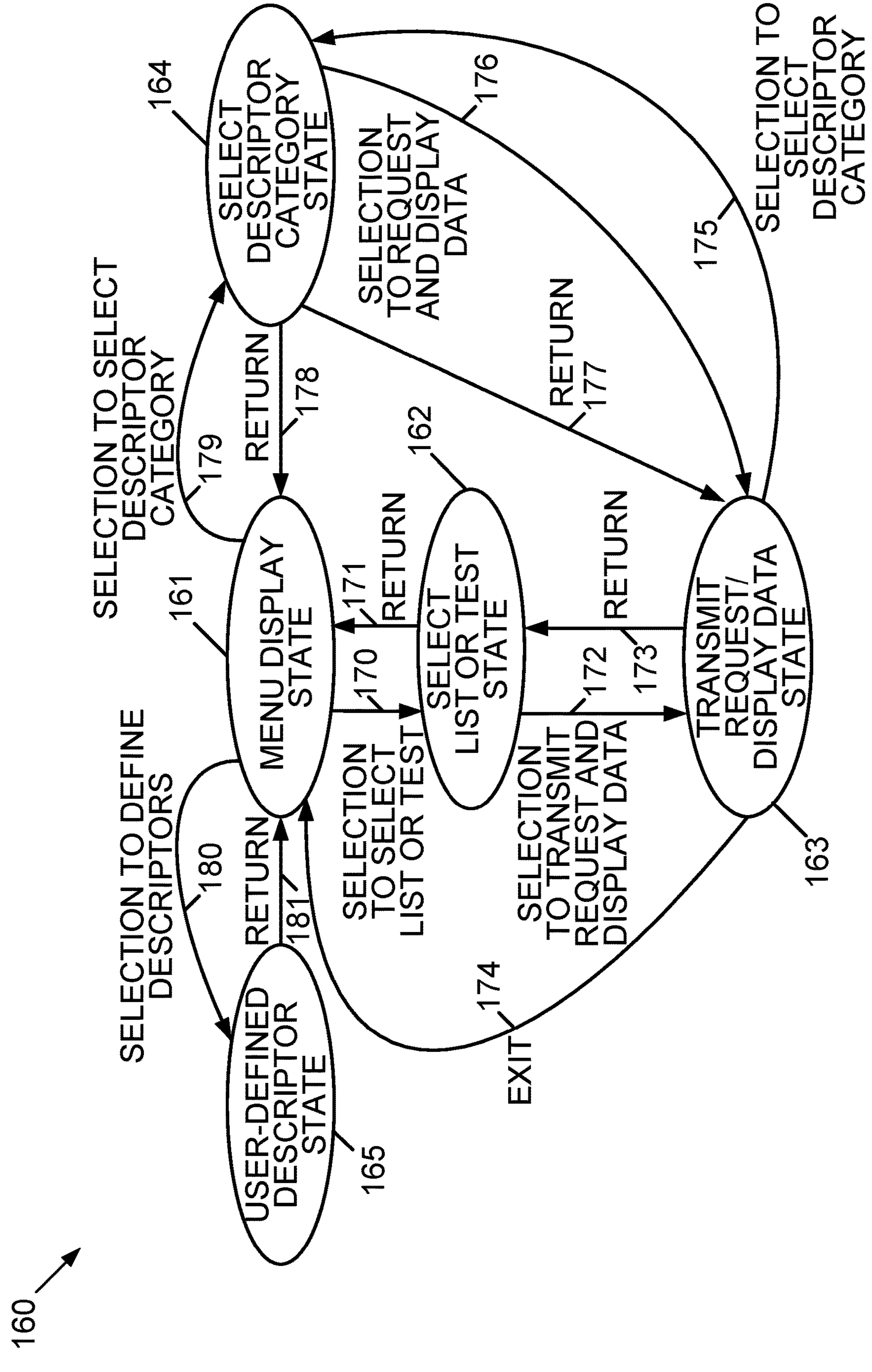
FIG. 7 shows a state diagram, in accordance with the example embodiments.

The vehicle service tool configuration module 111 can be arranged to configure a VST (e.g., the VST 3, 60) to operate in different states. Examples of such states are shown in FIG. 7. Configuring the VST to operate in a different state can occur in response to determining a particular transition event has or is occurring. As an example, a transition event can include a particular USC being selected or a receiving a communication, such as a VDM.

As an example, the vehicle service tool configuration module 111 can be arranged to configure a VST to operate in a first state in which a first USC of the VST is operable for selecting a first category of diagnostic descriptors to use when the VST operates in a second state.

Configuring the VST to operate in a first state can include the VST outputting a particular GUI on a display, such as a GUI different than a GUI output when the VST is operating in the second state or a GUI different than the GUI output just prior to the VST transitioning to the first state. As an example, the particular GUI can include the first USC of the VST is operable for selecting a first category of diagnostic descriptors.

As another example, the vehicle service tool configuration module 111 can be arranged to configure the VST 3, 60 to use the first category of diagnostic descriptors when operating in the second state. Such configuration can occur in response to the VST 3, 60 receiving a selection of the first USC while the VST 3, 60 operates in the first state. In accordance with at least some embodiments, configuring the vehicle service tool to use the first category of diagnostic descriptors when operating in the second state includes modifying a data setting the processor uses to determine which category of diagnostic descriptors to use while the vehicle service tool operates in the second state.

As another example, the vehicle service tool configuration module 111 can be arranged to configure the vehicle service tool to operate in the second state. In the second state, the vehicle service tool displays a first GUI and transmits requests for vehicle data messages to a vehicle.

The vehicle service tool configuration module 111 can be arranged to configure a VST to switch back and forth between multiple states multiple times. As an example, the vehicle service tool configuration module 111 can be arranged to configure a VST to operate in the first state, the second state, the first state again, and then the second state again.

As yet another example, in addition to the first and second states discussed above, the vehicle service tool configuration module 111 can be arranged to configure a VST to operate in a third state and/or a fourth state. In accordance with at least some embodiments, in the third state, a USC (e.g., a second USC) of the VST is operable for selecting a first category of component test descriptors to use when the VST operates in the fourth state, and in the fourth state, the VST displays a GUI (e.g., a second GUI) and outputs within the second GUI a measurement made using an oscilloscope or a meter during performance of a particular component test.

As still yet another example, the VST can include a processor. The processor can communicate with a server via the communication network 7. In accordance with this example, the vehicle service tool configuration module 111 can be arranged to configure the VST to operate in the first state based on a first communication the processor receives from a server, and configure the VST to operate in the second state based on a second communication the first processor receives from the server.

2) USC Selection Module

The USC selection module 112 can be configured to receive a selection of a USC while the VST operates in a particular operating state. For example, USC selection module 112 can be configured to receive, while the VST operates in a first state, a selection of the USC. In accordance with that example, the first state is a state in which the USC of the VST is operable for selecting a first category of diagnostic descriptors to use when the VST operates in a second state. As an example, the diagnostic descriptors of the first category of diagnostic descriptors include descriptors of parameter identifiers, functional test identifiers, or reset procedure identifiers.

Figure 16:
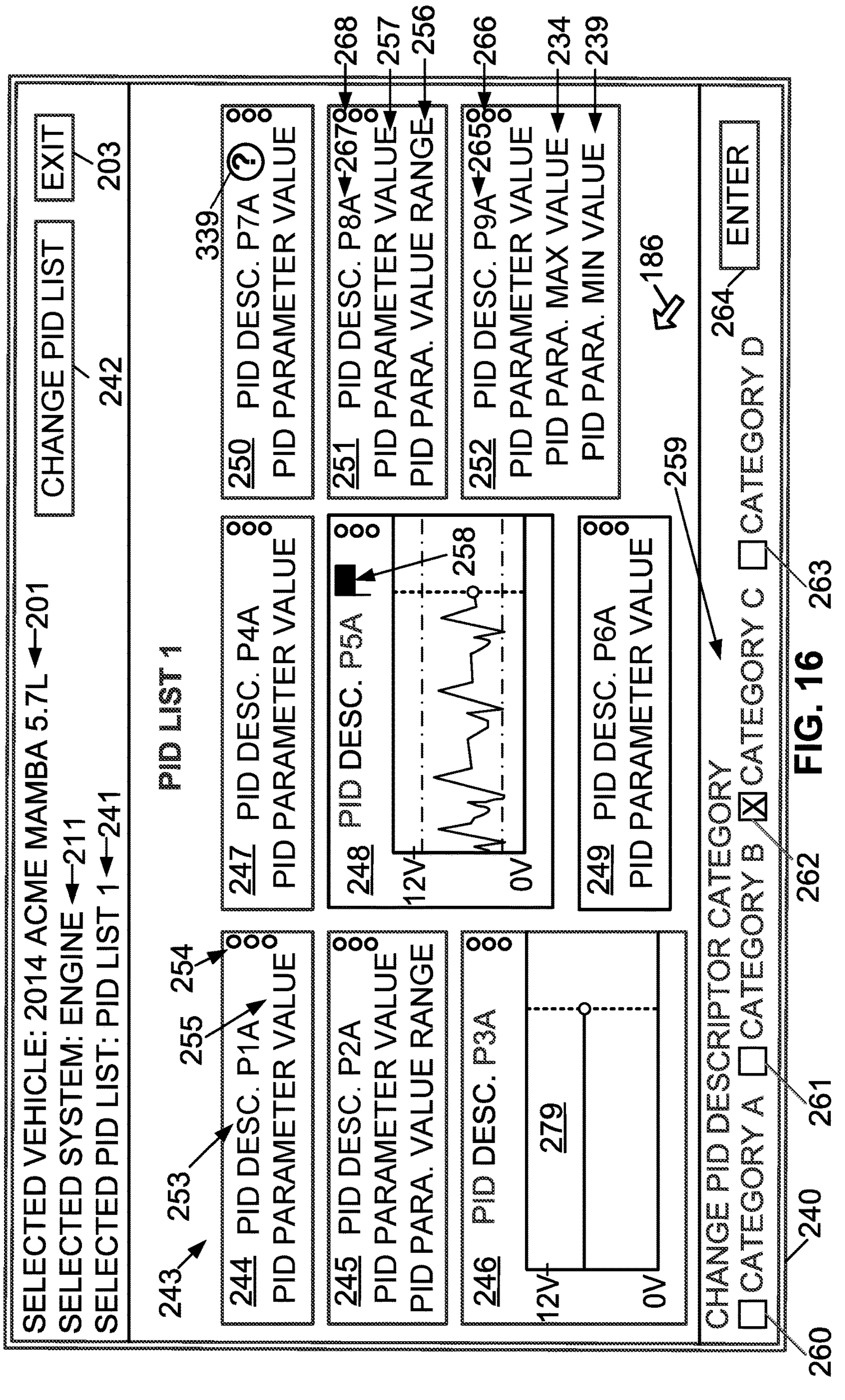

While the USC is available for selecting the first category of diagnostic descriptors, one or more other USCs can be available for selecting one or more other respective categories of diagnostic descriptors. As an example, FIG. 16 shows a USC 260, 261, 262, 263 corresponding to PID descriptor categories listed as Category A, Category B, Category C, and Category D. As another example, the USC can correspond to an area (e.g., a position) of a touch screen display that corresponds to selecting a category of diagnostic descriptors for use by the VST.

The USC selection module 112 can be configured to monitor one or more inputs to the processor 62. In at least some embodiments, one of those inputs includes a particular input that is connected to the USC and perhaps to a resistor network, one or more other USCs, and a reference voltage (e.g., 5 volts DC). In accordance with those embodiments, the USC can include a button, key, or switch. A processor and the USC selection module 112 can determine a voltage at the particular input corresponds to a voltage that indicates the USC has been selected (e.g., pressed). In at least some embodiments, the inputs monitored by the USC selection module 112 are inputs connected to the display 74 arranged as a touch screen display. A processor and the USC selection module 112 can determine a voltage at the inputs connected to the display 74 corresponds to a voltage that indicates the USC has been selected (e.g., pressed). The USC selection module 112 can determine a voltage or digital value for comparison to mapping data to determine which USC has been selected without any indication of the voltage or digital value being displayed.

The USC selection module 112 can be configured to receive, while the vehicle service tool operates in the first state, a selection of a second user-selectable control corresponding to a second category of diagnostic descriptors. The diagnostic descriptor determination module 114 can determine a second diagnostic descriptor that corresponds to the first diagnostic identifier. The first diagnostic descriptor and the second diagnostic descriptor can be from different categories of diagnostic descriptors.

The USC selection module 112 can be configured to receive, while the vehicle service tool operates in a second state, a selection of a second user-selectable control corresponding to a second category of diagnostic descriptors. The diagnostic descriptor determination module 114 can determine a second diagnostic descriptor that corresponds to the first diagnostic identifier.

In accordance with at least some embodiments, the USC selection module 112 includes and/or is arranged as an application driver between the processor 62 and the display 74 arranged as a touch screen display. In this regard, the USC selection module 112 can translate electrical signals resulting from a user contacting the display 74 to a digital value corresponding to an area of the display 74 where the user contact occurred.

3) Vehicle Data Message Module

The vehicle data message module 113 can be configured to generate a VDM. The vehicle data message module 113 can be configured to transmit the VDM or instruct the transmitting module 120 to transmit the VDM. The VDM can include a PID, a functional test identifier, or a reset procedure identifier. The vehicle data message module 113 can be configured to generate the VDM according to a VDM protocol used by a vehicle connected to the VST 3, 60.

The vehicle data message module 113 can be configured to parse a VDM generated by a vehicle. The vehicle data message module 113 can be configured to receive the VDM from the received module 119 or directly from the VCT 73. Parsing a VDM including a PID and PID parameter value can include obtaining the PID and PID parameter value from the VDM and providing the PID and PID parameter value to the GUI output module 115 for populating the PID parameter value into a container corresponding to the PID. The processor can be configured to determine which data within VDM is the PID and which data within the VDM is the PID parameter value based on the protocol used to generate the VDM, which the processor can determine based on the vehicle and component that sent the VDM.

4) Diagnostic Descriptor Determination Module

The diagnostic descriptor determination module 114 can be configured to determine a diagnostic descriptor corresponding to a diagnostic identifier. As an example, the diagnostic identifier can comprise a parameter identifier (i.e., PID) within a VDM sent by an ECU that controls an engine within a particular vehicle. The VDM does not include the diagnostic descriptor, but does include a PID parameter value corresponding to the PID. As an example, the PID can be hexadecimal value $0C and the PID parameter value can be hexadecimal value $IF40. The PID parameter value corresponds to how many revolutions the crankshaft turns per minute. The processor can determine the RPM by applying the PID parameter to the formula (256N+M)/4, where the N equals the first byte ($1F) of the PID parameter value in decimal (i.e., 31) and the M equals the second byte ($40) of the PID parameter value in decimal (i.e., 64). Based on that example, the engine RPM is 2,000.

The diagnostic descriptor determination module 114 can be configured to determine a diagnostic descriptor corresponding to a diagnostic identifier without the diagnostic descriptor, the PID, or any data that maps the diagnostic descriptor to the PID being displayed. Instead, a processor can search a computer-readable memory containing the mapping data based on the PID. In some cases, the processor retrieves (from the memory multiple) diagnostic descriptors corresponding to the PID, each of those descriptors belonging to a different category of diagnostic descriptors. In other cases, the processor's search of the memory is further based on a previously-selected category of diagnostic descriptors such that the processor (retrieves from the memory) a single diagnostic descriptor corresponding to the PID. Retrieving one or more diagnostic descriptors includes reading the diagnostic descriptor from the memory. For an embodiment in which two different categories of diagnostic descriptors are determined, those categories can be referred to as a first category of diagnostic descriptors and a second category of diagnostic descriptors.

As an example, the diagnostic descriptor determination module 114 can be configured to determine, from among a group of diagnostic descriptors corresponding to a first category of diagnostic descriptors, a particular diagnostic descriptor corresponding to a first diagnostic identifier. As an example, the first diagnostic identifier can include a PID, a functional test identifier, a reset procedure identifier, or a test set identifier. Determining the first diagnostic identifier can be carried out while determining multiple diagnostic identifiers, such as diagnostic identifiers corresponding to multiple different PIDs, diagnostic identifiers corresponding to multiple different functional tests, diagnostic identifiers corresponding to multiple different component tests, or diagnostic identifiers corresponding to multiple different reset procedures.

As another example, the diagnostic descriptor determination module 114 can be configured to determine, from among the second category of diagnostic descriptors, a second diagnostic descriptor that corresponds to the first diagnostic identifier in the vehicle data messages.

As yet another example, the first category of diagnostic descriptors includes a component test descriptor to use when the VST operates in a particular state (e.g., a state in which the VST displays a GUI and outputs within the GUI a measurement made using an oscilloscope or a meter during performance of a particular component test. The first category of diagnostic descriptors can be a particular category of diagnostic descriptors from among multiple categories of component test descriptors.

In accordance with at least some embodiments, the multiple categories of diagnostic descriptors include one or more of the following categories: an OEM category of diagnostic descriptors, an industry standard defined category of diagnostic descriptors, a normalized category of diagnostic descriptors, or a user-defined category of diagnostic descriptors. In at least some embodiments, diagnostic descriptors within the normalized category of diagnostic descriptors can be determined by a computing system remote from the VST 3, 60. The computing system can include and/or connect to the server 6, 130. The diagnostic descriptors within the normalized category of diagnostic descriptors can be determined from (e.g., based on) diagnostic identifiers corresponding to a common vehicle function, but from different vehicle makes and/or manufacturers.

In accordance with at least some embodiments, determining diagnostic identifiers for each category of multiple categories of diagnostic descriptors occurs in response to the processor determining a USC corresponding to each category of diagnostic descriptors has been selected. For example, diagnostic descriptors for PIDs with a Category A of diagnostic descriptors can be determined in response to a selection of the USC 260 within the GUI 240 shown in FIG. 16.

Table D shows mapping data corresponding to PIDs and PID descriptors. For example, Table D shows PIDs in a left-most column and PID descriptors of four categories of PID descriptors in the four right-most columns. The Category A descriptors, the Category B descriptors, the Category C descriptors, and the Category D descriptors can be any of the example categories of diagnostic descriptors discussed above or some other category of diagnostic descriptors. The PIDs in the left-most column represent PIDs contained in and/or insertable into vehicle data messages. In accordance with at least some embodiments, the PIDs listed in the left-most column represent PIDs that take the form of hexadecimal numbers. The PID descriptors shown in Table D and in the drawings are represented as the PID plus a suffix A, B, C, or D. A person having ordinary skill in the art will understand that the PID descriptors shown in Table D and in the drawings represent textual phrases that describe vehicle functionality corresponding to each PID. As an example, the PID descriptor PIA can represent the textual phrase "vehicle speed sensor," the PID descriptor PIB can represent the textual phrase "VSS," the PID descriptor PIC can represent the textual phrase "vehicle speed," and the PID descriptor PID can represent the textual phrase "speed."

TABLE D

| PID | Category A Descriptor | Category B Descriptor | Category C Descriptor | Category D Descriptor |
|---|---|---|---|---|
| P1 | P1A | P1B | P1C | P1D |
| P2 | P2A | P2B | P2C | P2D |
| P3 | P3A | P3B | P3C | P3D |
| P4 | P4A | P4B | P4C | P4D |
| P5 | P5A | P5B | P5C | P5D |
| P6 | P6A | P6B | P6C | P6D |
| P7 | P7A | P7B | P7C | P7D |
| P8 | P8A | P8B | P8C | P8D |
| P9 | P9A | P9B | P9C | P9D |
| P10 | P10A | P10B | P10C | P10D |

Table E shows mapping data corresponding to functional test identifiers and functional test descriptors. For example, Table E shows functional test identifiers in a left-most column and functional test descriptors of four categories of functional test descriptors in the four right-most columns. The Category A descriptors, the Category B descriptors, the Category C descriptors, and the Category D descriptors can be any of the example categories of diagnostic descriptors discussed above or some other category of diagnostic descriptors. The functional test identifiers in the left-most column represent functional test identifiers contained in and/or insertable into vehicle data messages. In accordance with at least some embodiments, the functional test identifiers listed in the left-most column represent functional test identifiers that take the form of hexadecimal numbers. The functional test descriptors shown in Table E and in the drawings are represented as the functional test identifier plus a suffix A, B, C, or D. A person having ordinary skill in the art will understand that the functional test descriptors shown in Table E and in the drawings represent textual phrases that describe vehicle functionality and/or testing corresponding to each functional test identifier. As an example, the functional test descriptor FT1A can represent the textual phrase "fuel pump control," the functional test descriptor FT1B can represent the textual phrase "fuel pump engage," the functional test descriptor FT1C can represent the textual phrase "fuel pump on/off," and the functional test descriptor FT1D can represent the textual phrase "fuel pump."

TABLE E

| Functional Test ID | Category A Descriptor | Category B Descriptor | Category C Descriptor | Category D Descriptor |
|---|---|---|---|---|
| FT1 | FT1A | FT1B | FT1C | FT1D |
| FT2 | FT2A | FT2B | FT2C | FT2D |
| FT3 | FT3A | FT3B | FT3C | FT3D |
| FT4 | FT4A | FT4B | FT4C | FT4D |
| FT5 | FT5A | FT5B | FT5C | FT5D |
| FT6 | FT6A | FT6B | FT6C | FT6D |
| FT7 | FT7A | FT7B | FT7C | FT7D |
| FT8 | FT8A | FT8B | FT8C | FT8D |
| FT9 | FT9A | FT9B | FT9C | FT9D |
| FT10 | FT10A | FT10B | FT10C | FT10D |

Table F shows mapping data corresponding to reset procedures identifiers and reset procedure descriptors. For example, Table F shows reset procedure identifiers in a left-most column, and reset procedure descriptors of four categories of reset procedure descriptors in the four right-most columns. The Category A descriptors, the Category B descriptors, the Category C descriptors, and the Category D descriptors can be any of the example categories of reset procedure descriptors discussed above or some other category of diagnostic descriptors. The reset procedure identifiers in the left-most column represent reset procedure identifiers contained in and/or insertable into vehicle data messages. In accordance with at least some embodiments, the reset procedure identifiers listed in the left-most column represent reset procedure identifiers that take the form of hexadecimal numbers. The reset procedure descriptors shown in Table F and in the drawings are represented as the reset procedure identifier plus a suffix A, B, C, or D. A person having ordinary skill in the art will understand that the reset procedure descriptors shown in Table F and in the drawings represent textual phrases that describe vehicle functionality and/or reset procedures corresponding to each reset procedure identifier. As an example, the reset procedure descriptor RP1A can represent the textual phrase "motor oil life," the reset procedure descriptor RP1B can represent the textual phrase "engine lubricant life," the reset procedure descriptor RP1C can represent the textual phrase "engine oil life," and the reset procedure descriptor RP1D can represent the textual phrase "oil life."

TABLE F

| Reset Procedure ID | Category A Descriptor | Category B Descriptor | Category C Descriptor | Category D Descriptor |
|---|---|---|---|---|
| RP1 | RP1A | RP1B | RP1C | RP1D |
| RP2 | RP2A | RP2B | RP2C | RP2D |
| RP3 | RP3A | RP3B | RP3C | RP3D |
| RP4 | RP4A | RP4B | RP4C | RP4D |
| RP5 | RP5A | RP5B | RP5C | RP5D |
| RP6 | RP6A | RP6B | RP6C | RP6D |
| RP7 | RP7A | RP7B | RP7C | RP7D |
| RP8 | RP8A | RP8B | RP8C | RP8D |
| RP9 | RP9A | RP9B | RP9C | RP9D |
| RP10 | RP10A | RP10B | RP10C | RP10D |

In accordance with at least some embodiments, the group of diagnostic descriptors includes multiple diagnostic descriptors corresponding to the first diagnostic identifier. The multiple diagnostic descriptors include the first diagnostic descriptor corresponding to the first diagnostic identifier. The multiple diagnostic descriptors correspond to different categories of diagnostic descriptors, such as a diagnostic descriptor from the following descriptor categories: Category A, Category B, Category C, and Category D.

5) GUI Output Module

Figure 55:
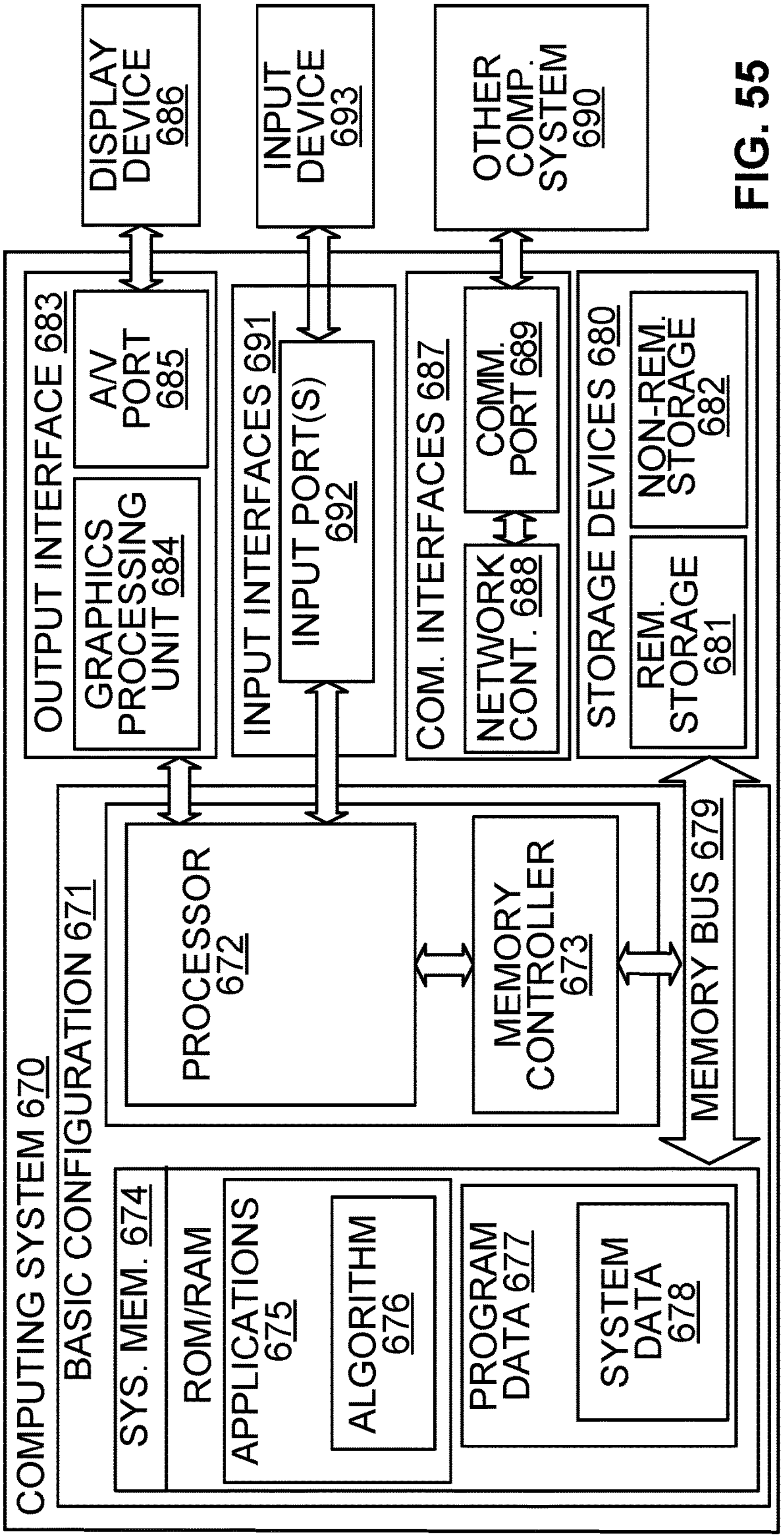
FIG. 55 is a block diagram illustrating a computing system that is arranged in accordance with the example embodiments.

The GUI output module 115 can be configured to output a GUI on a display, such as the display 74 shown in FIG. 5 or the display device 686 shown in FIG. 55. The GUI output on the display can include data such as data stored in and read from a memory and/or received via a transceiver.

As an example, the GUI output module 115 can output the first diagnostic descriptor and a representation of at least a first portion of the data values corresponding to the first diagnostic identifier. The GUI output module 115 can also be configured to output, on the first GUI, the second diagnostic descriptor and a representation of at least the first portion of the data values or at least a second portion of the data values. The GUI 240 shown in FIG. 16 to FIG. 22, the GUI 285 shown in FIG. 23 to FIG. 25, the GUI 375 shown in FIG. 35 to FIG. 37 and the other GUIs shown in the drawings are examples of the GUI output by the GUI output module 115.

As another example, the GUI output module 115 can be configured to output a GUI as part of configuring the VST 3, 60. In that regard, the vehicle service tool configuration module 111 can be configured to call for the execution of the GUI output module 115 to output the GUI. As another example, the GUI output module 115 can be configured to output a second GUI including the first USC. The GUI output module 115 can output the second GUI as part of configuring the VST 3, 60 to operate in the first state.

As yet another example, the GUI output module 115 can be configured to output, within the first GUI, a set of multiple operable USCs, each USC of the set of multiple operable USCs corresponds to a different category of diagnostic descriptors.

As still yet another example, the GUI output module 115 can be configured to output, on the first GUI, the second diagnostic descriptor and a representation of at least the first portion of the data values or a second portion of the data values.

As still yet another example, the GUI output module 115 can be configured to output within a GUI a measurement made using an oscilloscope or a meter during performance of a particular component test. Additionally, the GUI output module 115 can be configured to output, within a GUI, the particular component test descriptor and the measurement made using the oscilloscope or the meter during performance of the particular component test.

According to a further example, the GUI output module 115 can be configured to output a second GUI. In accordance with at least some embodiments, the second GUI includes a second USC corresponding to a second category of diagnostic descriptors different than the first category of diagnostic descriptors. The first category of diagnostic descriptors and the second category of diagnostic descriptors both include a different one of: an original equipment manufacturer category of diagnostic descriptors, an industry standard defined category of diagnostic descriptors, a normalized category of diagnostic descriptors, or a user-defined category of diagnostic descriptors.

In accordance with at least some embodiments, the GUI output module 115 outputs a GUI in which a diagnostic descriptor is contained in a USC or a container. In accordance with at least some embodiments, the GUI output module 115 outputs a GUI in which a diagnostic descriptor is located in proximity to a USC or a container and in location relative to the USC or the container such that user understands the descriptor corresponds to the USC or container. In that regard, the descriptor is closer to the USC than any other descriptor.

6) GUI Modification Module

The GUI modification module 116 can be configured to modify a GUI. In that regard, the GUI modification module 116 can modify a GUI before the GUI is output on the display 74 and/or while the GUI is output on the display 74. Based on that latter example, the GUI modification module 116 can modify a GUI output by the GUI output module 115.

As an example, the GUI modification module 116 can be configured to modify a GUI by outputting additional PID parameters, such as the PID parameter values most-recently received from a vehicle.

Figure 26:
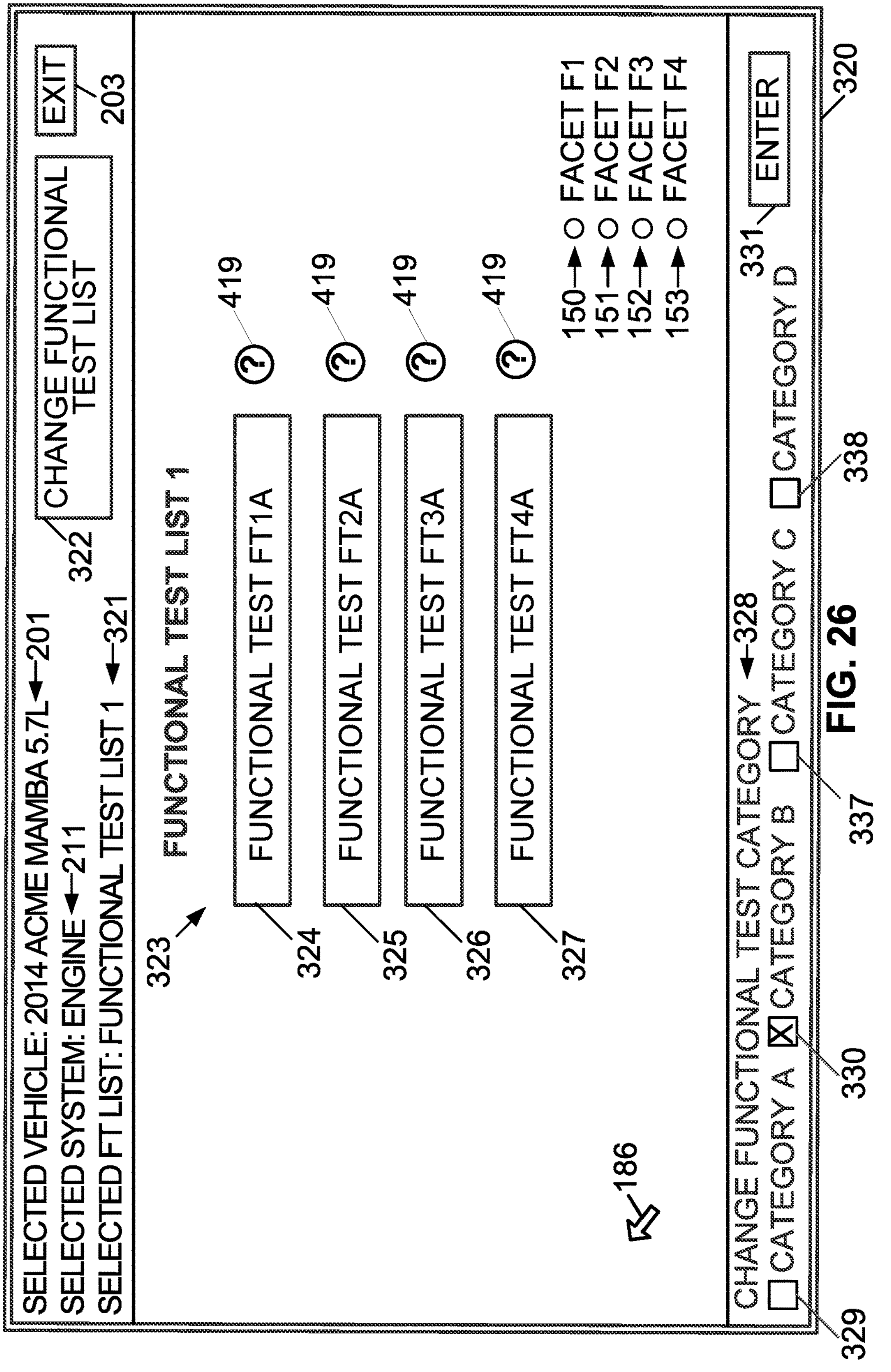
Figure 27:
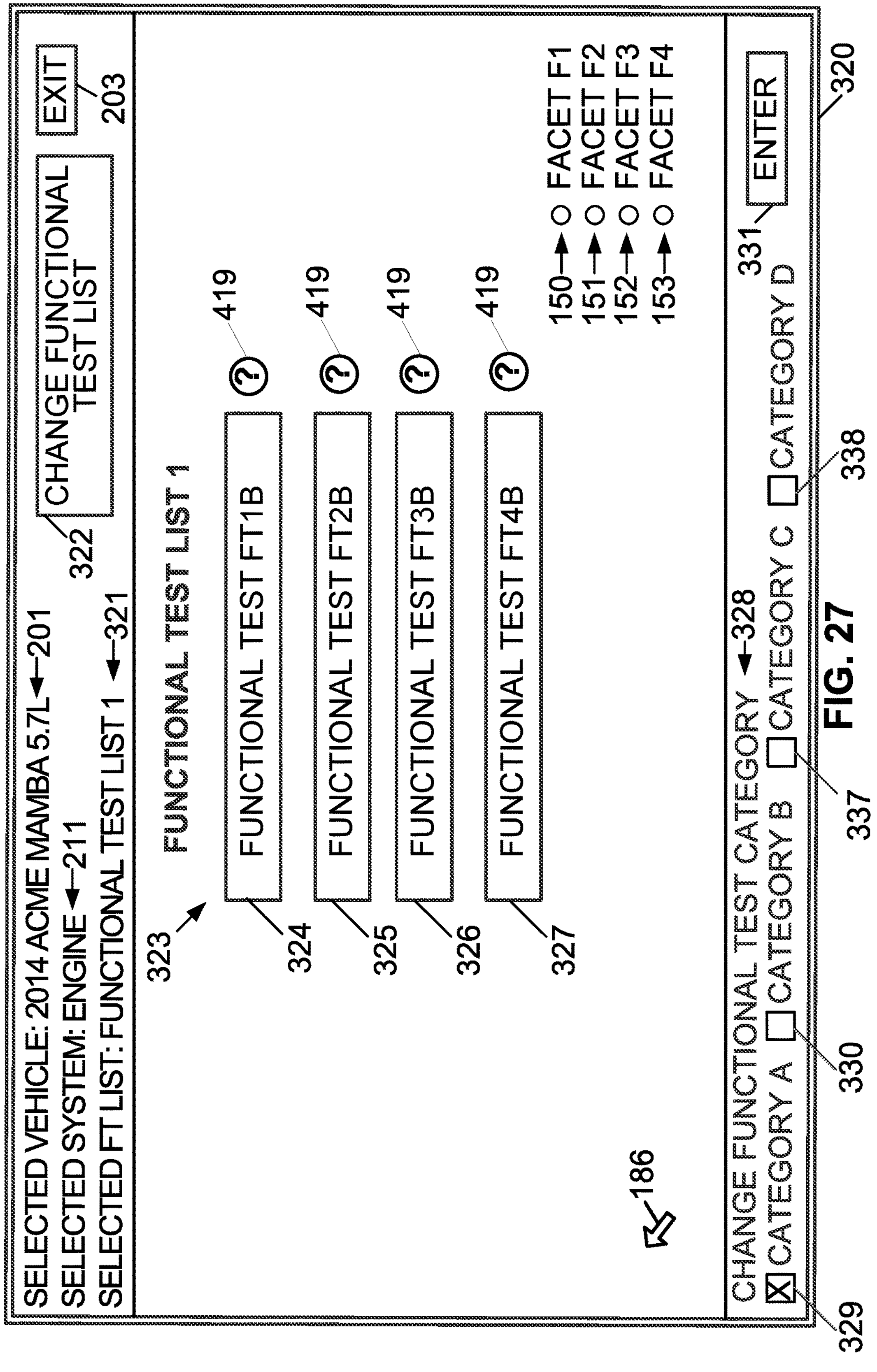
Figure 29:
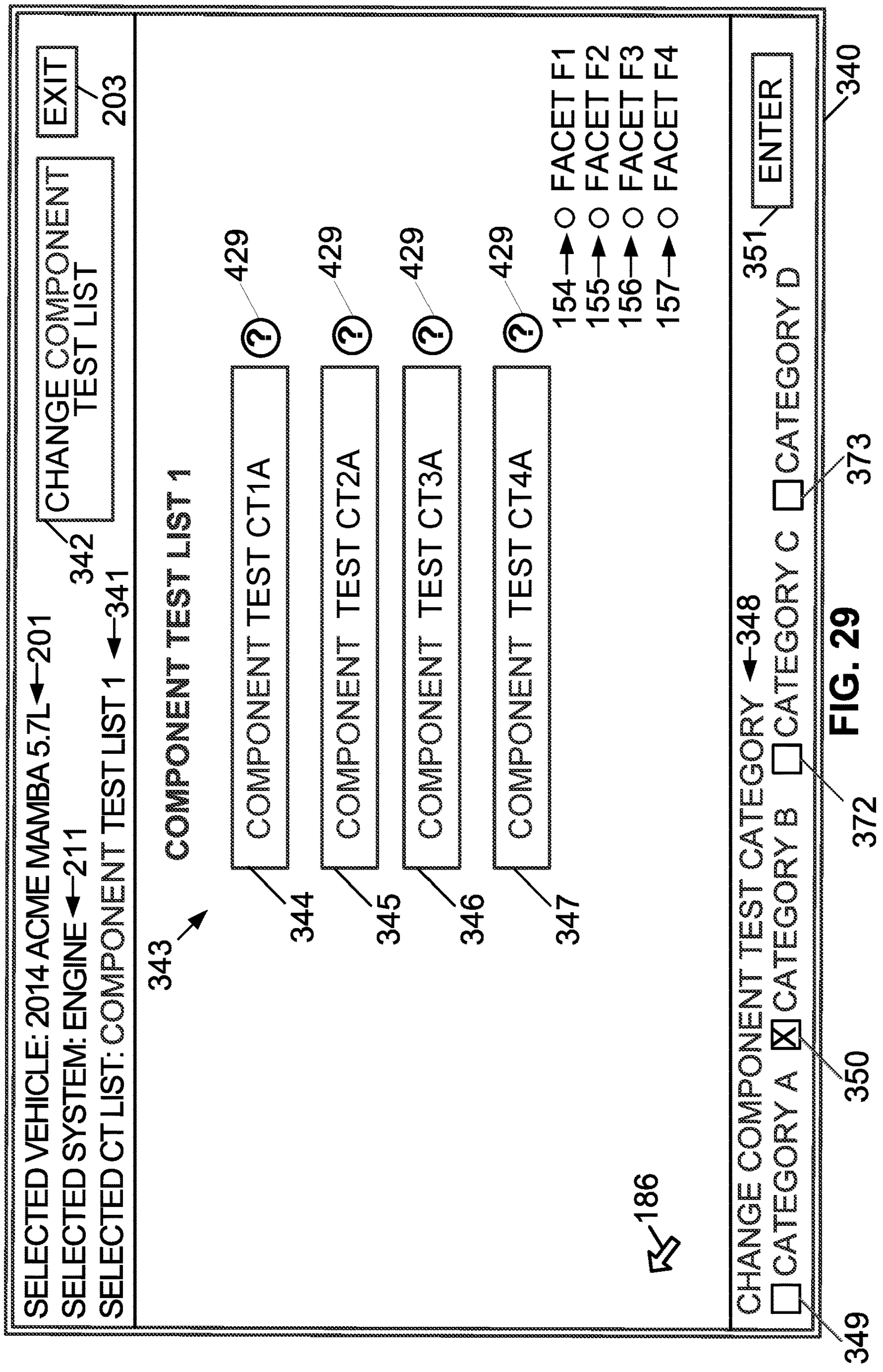
Figure 30:
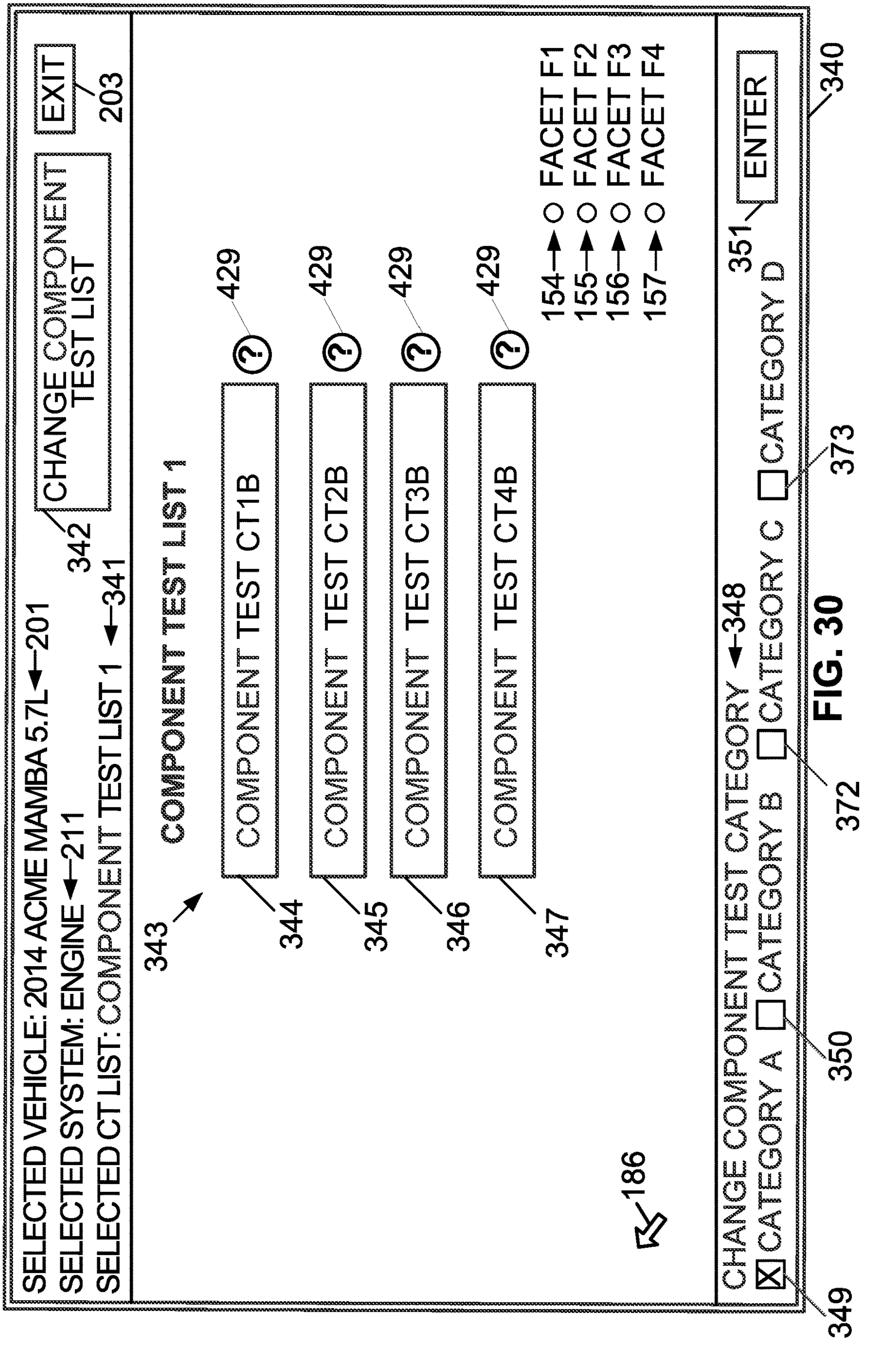

As another example, the GUI modification module 116 can be configured to modify a GUI to display a second diagnostic descriptor that corresponds to a first diagnostic identifier (e.g., a first PID) and a representation of at least the first portion of the data values corresponding to the first diagnostic identifier or a second portion of the data values corresponding to the first diagnostic identifier. In accordance with this example, the GUI modification module 116 can perform such modification in response to selection of a USC corresponding to category of diagnostic descriptors different than a currently-selected category of diagnostic descriptors. FIG. 26 and FIG. 27 shows how diagnostic descriptors for functional tests can change based on which category of diagnostic descriptors is selected. FIG. 29 and FIG. 30 shows how diagnostic descriptors for component tests can change based on which category of diagnostic descriptors is selected.

As yet another example, the GUI modification module 116 can be configured to modify a GUI by removing a container and/or a USC in response to selection of a facet selector. Part of that modification can include altering an arrangement of USCs and/or containers that remain on the GUI.

As still yet another example, the GUI modification module 116 can be configured to modify a GUI as that GUI is modified as shown in the drawings.

7) Template Determination Module

The template determination module 117 can be configured to determine, based on the list of diagnostic identifiers, a template for configuring a GUI (e.g., a first GUI) to display the data values corresponding to the first diagnostic identifier and to other data values contained in the vehicle data messages. As an example, a template determined by the template determination module 117 can include a quantity of containers corresponding to a quantity of diagnostic identifiers within the list of diagnostic identifiers. As another example, a template determined by the template determination module 117 can include one or more facet selectors for filtering out containers corresponding to data unrelated to the facet selectors. In accordance with at least some embodiments, a template for configuring a GUI can be stored within the memory 63, 133.

8) Component Test Descriptor Determination Module

The component test descriptor determination module 118 can be configured to determine, from among a group of component test descriptors corresponding to the first category of component test descriptors, a particular component test descriptor corresponding to the particular component test. As an example, the first category of component test descriptors can be a particular category of component test descriptors from among multiple categories of component test descriptors. In at least some embodiments, the multiple categories of component test descriptors include one or more of the following categories: an OEM category of component test descriptors, an industry standard defined category of component test descriptors, a normalized category of component test descriptors, or a user-defined category of component test descriptors.

Table G shows mapping data corresponding to component test identifiers and component test descriptors. For example, Table G shows component test identifiers in a left-most column and component test descriptors of four categories of component test descriptors in the four right-most columns. The Category A descriptors, the Category B descriptors, the Category C descriptors, and the Category D descriptors can be any of the example categories of diagnostic descriptors discussed above or some other category of diagnostic descriptors. The component test identifiers in the left-most column represent component test identifiers contained in and/or insertable into instructions to the test device 66 (e.g., the meter 77 or the oscilloscope 78). In accordance with at least some embodiments, the component test identifiers listed in the left-most column represent component test identifiers that take the form of hexadecimal numbers. The component test descriptors shown in Table G and in the drawings are represented as the component test identifier plus a suffix A, B, C, or D. A person having ordinary skill in the art will understand that the component test descriptors shown in Table G and in the drawings represent textual phrases that describe component tests corresponding to each component test identifier. As an example, the component test descriptor CT1A can represent the textual phrase “mass air flow voltage,” the component test descriptor CT1B can represent the textual phrase “MAF volts,” the component test descriptor CT1C can represent the textual phrase “MAF sensor voltage,” and the component test descriptor CT1D can represent the textual phrase “MAF sensor volts.”

TABLE G

| Component Test ID | Category A Descriptor | Category B Descriptor | Category C Descriptor | Category D Descriptor |
|---|---|---|---|---|
| CT1 | CT1A | CT1B | CT1C | CT1D |
| CT2 | CT2A | CT2B | CT2C | CT2D |
| CT3 | CT3A | CT3B | CT3C | CT3D |
| CT4 | CT4A | CT4B | CT4C | CT4D |
| CT5 | CT5A | CT5B | CT5C | CT5D |
| CT6 | CT6A | CT6B | CT6C | CT6D |
| CT7 | CT7A | CT7B | CT7C | CT7D |
| CT8 | CT8A | CT8B | CT8C | CT8D |
| CT9 | CT9A | CT9B | CT9C | CT9D |
| CT10 | CT10A | CT10B | CT10C | CT10D |

As an example, a Component Test List 1 shown in FIG. 15, and FIG. 29 to FIG. 31 can be based on a component test list including component tests CT1, CT2, CT3, and CT4 shown in Table G. The component test descriptor determination module 118 can be configured to determine component descriptors corresponding to the component tests CT1, CT2, CT3, and CT4 depending on whether Category A, Category B, Category C, or Category D is a currently selected category of component test descriptors.

9) Receiving Module

The receiving module 119 can be configured to receive various types of data. The received data can be arranged as a message, an instruction, a list, a list identifier, a file, a descriptor or some other type of data. As an example, the file can include a markup language file (an XML file or an HTML file), a PDF file, or a comma separated variable (CSV) file. The receiving module 119 can be configured to output data to a transceiver and/or a receiver, such as the transceiver 64, 134, the network transceiver 72, or the vehicle communication transceiver 73. The receiving module 119 can receive data without any portion of that data being visible to a human.

As an example, the receiving module 119 can be configured to receive a group of diagnostic descriptors via execution of an application programming interface to the server 130.

As another example, the receiving module 119 can be configured to receive, from the server, one or more of the following: the list of diagnostic identifiers, a maximum data value threshold corresponding to the first diagnostic identifier, a minimum data value threshold corresponding to the first diagnostic identifier, a detailed description of the first diagnostic identifier, or a facet characteristic. As receiving those one or more aspects can include the receiving module 119 receiving a computer-readable file (e.g., a markup language file) containing those one or more aspects. The facet characteristic can indicate which diagnostic identifiers within the list of diagnostic identifiers correspond to the facet characteristic. The facet characteristic can correspond to a USC (i.e., a filter selector). As an example, the file can include the file 400, 449 or a file including aspects arranged like aspects of the file 400, 449.

As yet another example, the receiving module 119 can be configured to receive, while the VST 3, 60 operates in the first state, a selection of the first USC. Again, the first USC can be operable for selecting a first category of diagnostic descriptors to use when the VST operates in a second state.

As still yet another example, the receiving module 119 can be configured to receive, while the VST 3, 60 operates in the second state, vehicle data messages including a diagnostic identifier and data values corresponding to the diagnostic identifier. As an example, the diagnostic identifier in the vehicle data messages can include the same diagnostic identifier, such as a first diagnostic identifier or a second diagnostic identifier. As another example, the diagnostic identifier in the vehicle data messages can include different diagnostic identifiers, such as the first diagnostic identifier in a first portion of the vehicle data messages and the second diagnostic identifier in a second portion of the vehicle data messages. As yet another example, the different diagnostic identifiers can include more than two different diagnostic identifiers with respective portions of the vehicle data messages.

As still yet another example, the receiving module 119 can be configured to receive a selection indicative of a list of diagnostic identifiers selected for displaying within the first GUI. In accordance with that example, the receiving module 119 can also be configured to receive a group of diagnostic descriptors. Receipt of the group of diagnostic descriptors can occur in response to the transmitting module 120 transmitting the list identifier to the server 130. The group of diagnostic descriptors can include multiple diagnostic descriptors that correspond to a different diagnostic identifier in the list of diagnostic identifiers. The multiple diagnostic descriptors can include the first diagnostic descriptor. The multiple diagnostic descriptors can include a diagnostic descriptor from each of one of multiple categories of diagnostic descriptors.

As still yet another example, the receiving module 119 can be configured to receive a selection of a USC and responsively set the VST to use the first category of component test descriptors when the VST operates in a fourth state. In the fourth state, the VST displays a GUI and outputs within the GUI a measurement made using an oscilloscope or a meter during performance of a particular component test. The receiving module 119 can receive the USC selection while the VST operates in a third state in which a USC of the VST is operable for selecting a first category of component test descriptors to use when the VST operates in a fourth state.

As still yet another example, the receiving module 119 can be configured to receive multiple diagnostic descriptors. The multiple diagnostic descriptors can include diagnostic descriptors from different categories of diagnostic descriptors, but for a common diagnostic identifier. The multiple diagnostic descriptors can include diagnostic descriptors from a single category of diagnostic descriptors, but for different diagnostic identifiers. The multiple diagnostic descriptors can include diagnostic descriptors from different categories of diagnostic descriptors and for different diagnostic identifiers.

As still yet another example, the receiving module 119 can be configured to receive a GUI and/or data for populating a GUI.

10) Transmitting Module

The transmitting module 120 can be configured to transmit various types of data. The transmitted data can be arranged as a message, an instruction, a list, a list identifier, a file, a descriptor or some other type of data. The transmitting module 120 can be configured to output data to a transceiver and/or a transmitter, such as the transceiver 64, 134, the network transceiver 72, or the vehicle communication transceiver 73. The transmitting module 120 can transmit data without any portion of that data being visible to a human. The transmission of such data can occur over a communication link (e.g., the communication link 5, 36), a network (e.g., the communication network 7) or a data bus (e.g., the data bus 70).

As an example, the transmitting module 120 can be configured to transmit a list identifier via execution of an application programming interface to the server 130.

As another example, the transmitting module 120 can be configured to transmit, to a server, a list identifier corresponding to the list of diagnostic identifiers. The list of diagnostic identifiers can include a list selected for displaying within the first GUI.

As yet another example, the transmitting module 120 can configured to transmit a VDM over a communication link within a vehicle and/or connected to an OBD connector or ECU within a vehicle. The VDM can include an identifier, such as PID, a functional test identifier, or a reset procedure identifier. The VDM can include a request for the ECU and/or the vehicle to send a VDM in response to the request. As an example, the request in the VDM can include a PID and the response VDM can include the PID and a PID parameter value, or a DTC, or a VIN.

As still yet another example, the transmitting module 120 can be configured to transmit an instruction, such as an instruction to an ECU within a vehicle or an instruction to the test device 66. An instruction sent to the ECU can include an instruction to perform a functional test or reset procedure. An instruction set to the test device can include an instruction to configure the test device to perform a particular component test.

11) Perform Component Test Module

The perform component test module 121 can be arranged to configure a VST (e.g., the VST 3, 60) for performing a component test (e.g., a guided component test). As an example, configuring the VST 3, 60 can include configuring the test device 66 for performing the component test. As an example, configuring the test device 66 can include configuring the meter 77, the oscilloscope 78, and/or the signal generator 83 for performing the component test. As an example, configuring the signal generator 83 can include configuring the signal generator 83 to output a particular electrical signal (e.g., a sine wave with a particular frequency and amplitude, or a square wave with a particular frequency, duty cycle and amplitude) for providing to a component on the vehicle in order to see how the component responds to the particular electrical signal.

As another example, executing the perform component test module 121 can include outputting within a GUI (e.g., the GUI 216 shown in FIG. 39 or the GUI 217 shown in FIG. 40) a representation of a measurement made by performing the component test. In at least some embodiments, the measurement includes a voltage, a resistance, a current, a frequency, a pressure, a percentage, a weight, or a force. The representation, in at least some embodiments, includes a textual or graphical representation. As an example, the graphical representation includes a heat map or a line graph.

The perform component test module 121 can be configured to perform the component test in response to selection of a USC corresponding to a component test, such as the USC 344 shown in FIG. 29. In at least some embodiments, execution of the perform component test module 121 causes the processor to output another USC that has to be selected before beginning the component test (e.g., a measurement) and/or or a USC (e.g., the USC 319, 336) to switch from an oscilloscope to a meter, or vice versa.

12) State Module

The state module 122 can be configured to determine operating states of the VST 3, 60 and/or to determine events that trigger the VST 3, 60 to change from one operating state to another operating state. The state module 122 can monitor various inputs to the processor (e.g., inputs from the transceiver 64, user interface 65, or the test device 66) or other aspects (e.g., a clock) to determine whether a triggering event has occurred.

As an example, in a first state of the VST 3, 60, a first user-selectable control of the VST 3, 60 is operable for selecting a first category of diagnostic descriptors to use when the VST 3, 60 operates in a second state. As another example, in the second state, the VST 3, 60 displays a first GUI and transmits requests for vehicle data messages to a vehicle. As yet another example, in a third state of the VST 3, 60, the VST 3, 60 displays a second GUI and outputs within the second GUI a measurement made using an oscilloscope or a meter during performance of a particular component test. As still yet another example, in a fourth state of the VST 3, 60, a second USC of the VST is operable for selecting a first category of component test descriptors to use when the vehicle service tool operates in the third state.

In accordance with yet another example, the state module 122 can be configured to cause the VST 3, 60 to operate in accordance with the states and transitions shown in a state diagram 160 shown in FIG. 7.

I. State Diagram

Next, FIG. 7 shows a state diagram 160 including a state 161, 162, 163, 164, 165, and a transition 170, 171, 172, 173, 174, 175, 176, 177, 178, 179, 180, 181. The VST 3, 60 can operate in one or more of the states shown in the state diagram 160 and transition from one state to another state based on the transitions shown in the state diagram 160. For example, the logic segment 61 can implement the state(s) using the processor 62 and the CRPI 85 and/or the module 86. One or more of the transitions (e.g., the transition 173, 174, 177, 178, 181) that pertains to returning to a different state can be performed in response to selection of a USC, such as the USC 203 shown in one or more of the example GUIs.

The state 161 includes a state for displaying a menu. As an example, the VST 3, 60 can enter the state 161 upon powering on in response to selection of an on/off switch. While the VST 3, 60 operates in the state 161, the display 74 can output a GUI with a menu having one or more items selectable via use of the user interface 65. As an example, while the VST 3, 60 operates in the state 161, the display 74 can output a GUI, such as a GUI shown in FIG. 9 to FIG. 15.

The VST 3, 60 can enter (e.g., transition to) the state 161 from the state 162, 163, 164, 165 via the transition 171, 174, 178, 181, respectively.

The state 162 includes a state for selecting a list, a test, and/or a test set. The VST 3, 60 can enter (e.g., transition to) the state 162 from the state 161, 163 via the transition 170, 173, respectively. As an example, the list can include a PID list (i.e., a list of one or more PIDs), a list of test sets, a functional test list (i.e., a list of one or more functional tests), a reset procedure list (i.e., a list of one or more reset procedures), or a component test list (i.e., a list of one or more component tests).

As an example, the VST 3, 60 can enter (e.g., transition to) the state 162 after selection of a system and then in response to a selection of the USC 206 shown in FIG. 10. While the VST 3, 60 operates in the state 162, the display 74 can output a GUI to indicate one or more lists, tests, and/or test sets that can be selected using the user interface 65. As an example, while the VST 3, 60 operates in the state 162, the display 74 can output a GUI, such as a GUI 210, 220, 225, 230, 235 shown in FIG. 11, FIG. 12, FIG. 13, FIG. 14, FIG. 15, respectively for selecting a list. As another example, while the VST 3, 60 operates in the state 162, the display 74 can output a GUI shown in FIG. 26 to FIG. 28 for selecting a test or reset procedure. The tests discussed with respect to the aspects of the state diagram 160 can include a reset procedure.

The state 163 includes a state for transmitting a request and/or displaying data. As an example, the state 163 can include a state for transmitting a request to a vehicle (e.g., a VDM) and displaying (on the display 74) data based on a response received in response to the request. The response to the request can include a VDM including a PID and corresponding parameter value, or a VDM including data corresponding a functional test or reset procedure requested to be performed. The VST 3, 60 can output a GUI to display the PID and corresponding parameter value. Examples of such a GUI are shown in FIG. 16 to FIG. 25.

Figure 39:
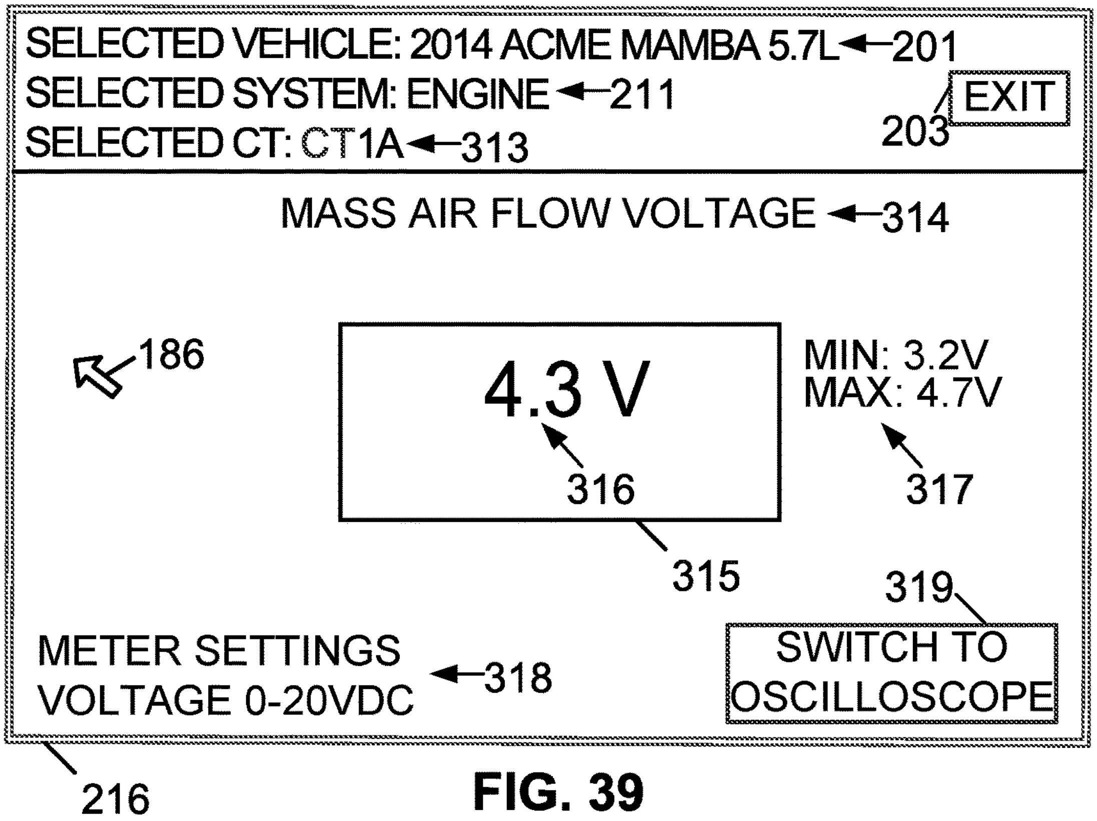
Figure 40:
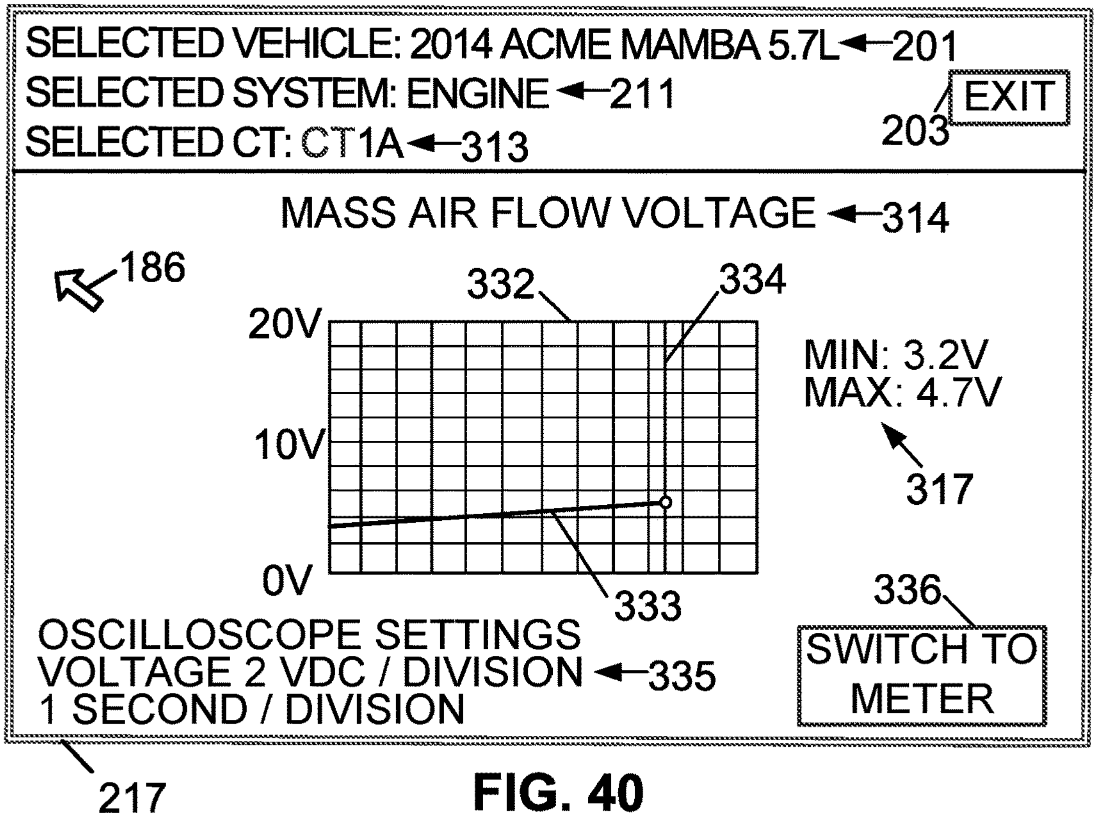

As another example, the state 163 can include a state for transmitting a request to the meter 77 or the oscilloscope 78 to configure itself to make a measurement and to displaying (on the display 74) data indicative of the measurement made by the meter 77 or the oscilloscope 78 as configured according to the request. That request can include and/or be referred to as an instruction. The VST 3, 60 can output a GUI to display the measurement. Examples of such a GUI are shown in FIG. 39 and FIG. 40.

The VST 3, 60 can enter (e.g., transition to) the state 163 from the state 162 via the transition 172 and/or from the state 164 via the transition 176, 177.

The state 164 includes a state for selecting a descriptor category state. As an example, the state for selecting the descriptor category state includes a state in which the VST 3, 60 includes one or more USCs operable to select a descriptor category state. As an example, the VST 3, 60 can output a GUI 240 shown in FIG. 16 to FIG. 22, the GUI 285 shown in FIG. 23, the GUI 320 shown in FIG. 26 to FIG. 28, the GUI 340 shown in FIG. 29 to FIG. 31, the GUI 360 shown in FIG. 32 to FIG. 34, or the GUI 375 shown in FIG. 35 to FIG. 38 in which one or more USCs for selecting a descriptor category are provided.

Figure 17:
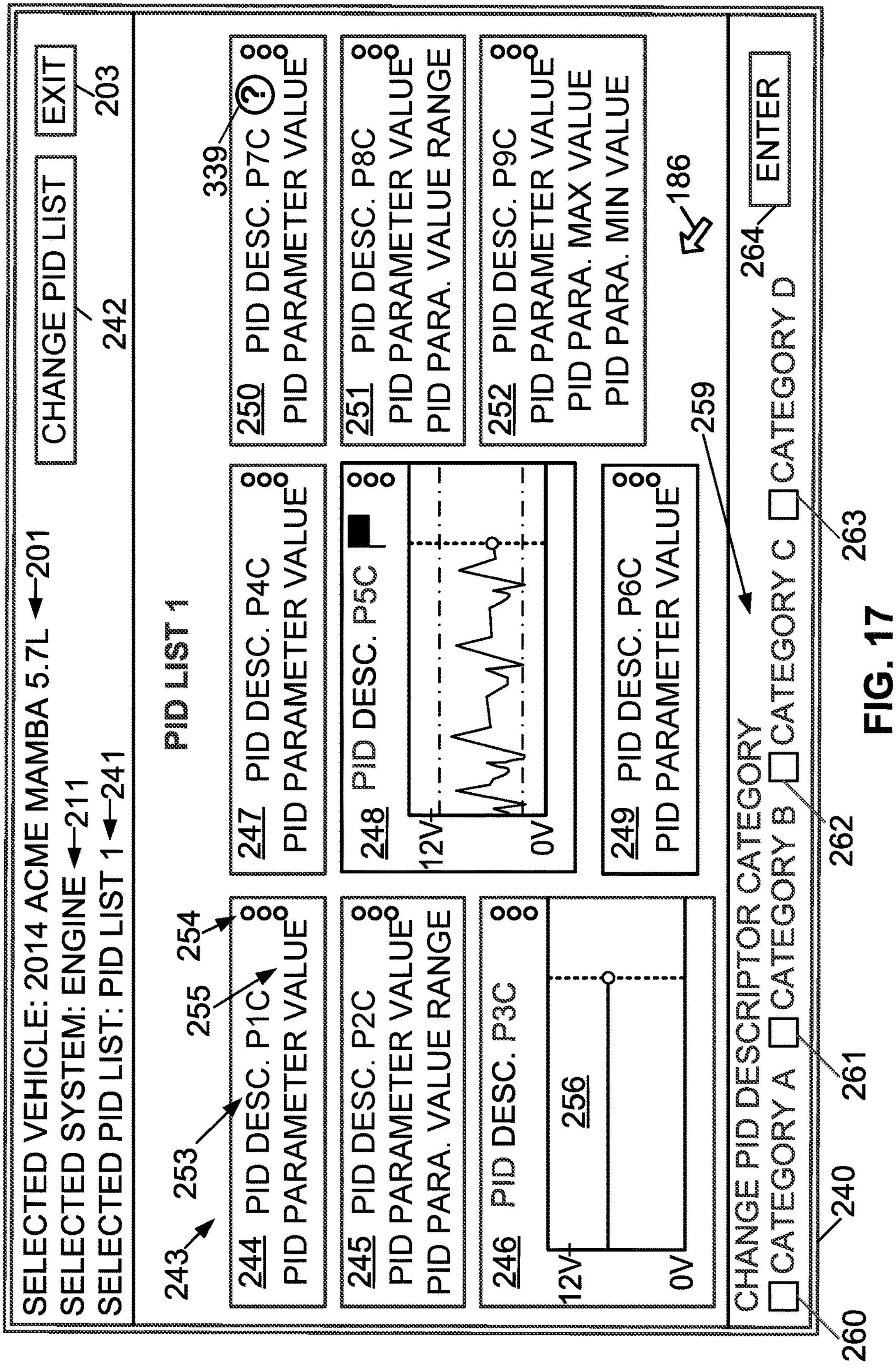

In at least some embodiments, while the VST 3, 60 operates in the state 164, the VST 3, 60 can change the diagnostic descriptors displayed within a GUI from a first category of diagnostic descriptors to diagnostic descriptors from a second category of diagnostic descriptors. FIG. 16 and FIG. 17 shows an example of such changes to the diagnostic descriptors.

The VST 3, 60 can enter (e.g., transition to) the state 164 from the state 161, 163 via the transition 179, 175, respectively. In at least some embodiments, the VST 3, 60 can transition to the state 164 for selecting the descriptor category state in response to selecting a USC for selecting a descriptor category.

The state 165 includes a state for defining descriptors (e.g., one or more descriptors corresponding to PIDs, functional tests, reset procedures, or components tests). The descriptors defined while the VST 3, 60 can be contained within a user-defined category of diagnostic descriptors.

The VST 3, 60 can enter (e.g., transition to) the state 165 from the state 161 via the transition 180. As an example, the VST 3, 60 can transition to the state 165 in response to selecting a USC, such as the USC 277 shown in FIG. 21. As another example, while the VST 3, 60 operates in the state

165, the VST 3, 60 can operate a USC (e.g., the USC 278 shown in FIG. 21) for defining a PID descriptor based on a user preference.

J. Example Server

Figure 8:
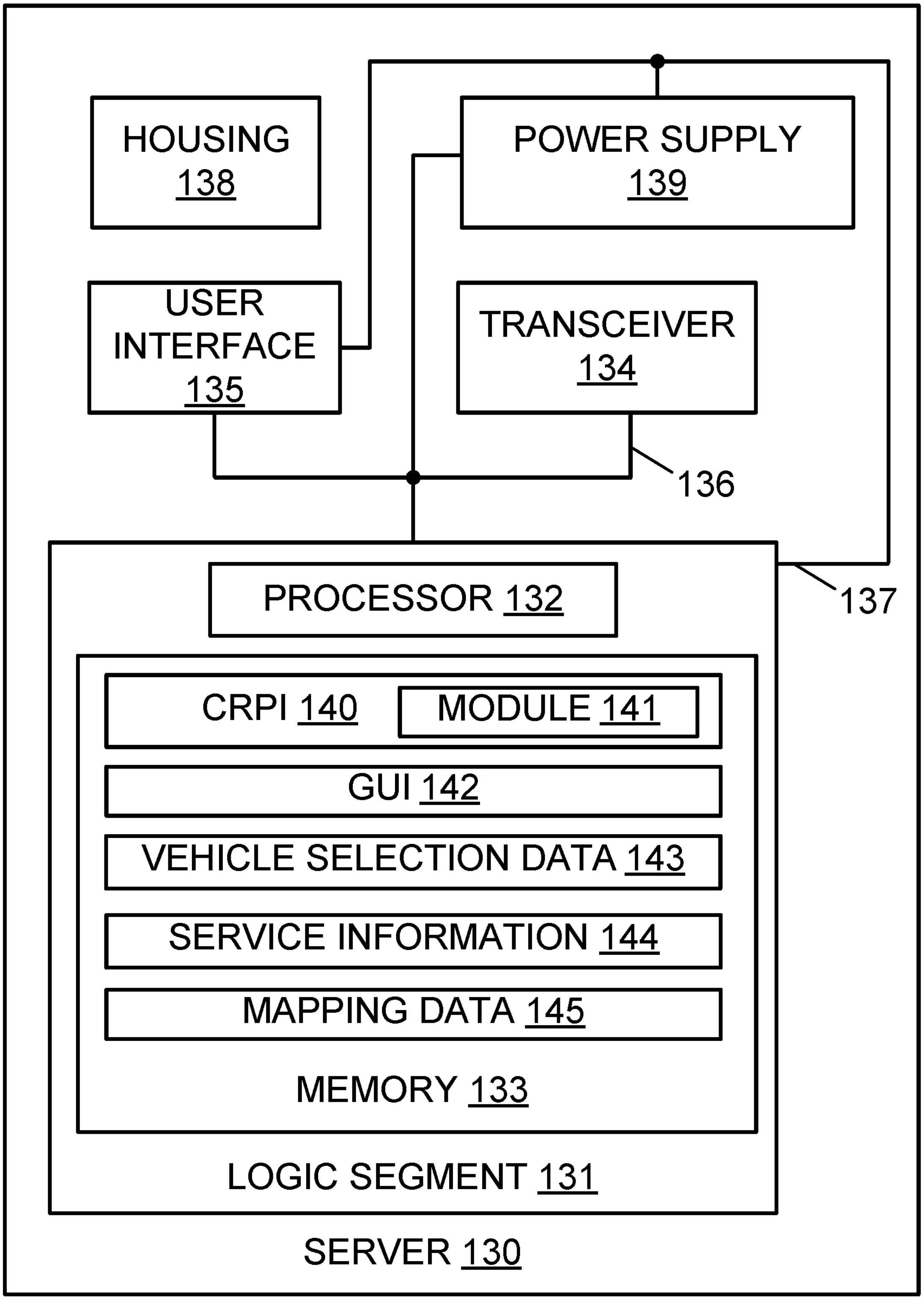
FIG. 8 is a block diagram of a server, in accordance with the example embodiments.

Next, FIG. 8 is a block diagram of a server 130 in accordance with the example embodiments. The server 6 shown in FIG. 1 can include one or more aspects of the server 130 and/or be arranged like the server 130. The server 130 can operate within the system 2 as the server 6 and/or in addition to the server 6. The server 130 can perform any function(s) described in this description as being performed by the server 6. The server 6 can perform any function(s) described in this description as being performed by the server 130.

The server 130 includes a logic segment 131 including a processor 132 and a memory 133. The server 130 also includes a transceiver 134, a user interface 135, a data bus 136, an electrical circuit 137, a housing, 138, and/or a power supply 139. The data bus 136 can operatively connect the logic segment 131 (e.g., the processor 132 and/or the memory 133), the transceiver 134, the user interface 135, and/or the power supply 139 to one another. In other words, the data bus 136 can provide an operative connection between two or more of the logic segment 131 (e.g., the processor 132 and/or the memory 133), the transceiver 134, the user interface 135, or the power supply 139. Examples of the processor 132, the memory 133, and the transceiver 134 are described elsewhere in this description. In at least some embodiments of the server 130, the processor 132 is a specific processor that is programmed to perform any function(s) described in this description as being performed by the server 6, 130.

The electrical circuit 137 (i.e., one or more electrical circuits) is configured to distribute electrical current throughout the server 130 and/or provide a voltage within various nodes of electrical components within the server 130. For example, the electrical circuit 137 can comprise one or more electrical circuits for carrying an electrical current from the power supply 139 to the processor 132, the memory 133, the transceiver 134, and/or the user interface 135, and one or more electrical circuits for carrying an electrical current from the processor 132, the memory 133, the transceiver 134, and/or the user interface 135 to the power supply 139. Examples of the power supply 139 are described elsewhere in this description.

The housing 138 surrounds at least a portion of the following: the logic segment 131 (e.g., the processor 132 and/or the memory 133), the transceiver 134, the user interface 135, the data bus 136, the electrical circuit 137 and/or the power supply 139. The housing 138 can support a substrate. In at least some example embodiments, at least a portion of the following: the logic segment 131 (e.g., the processor 132 and/or the memory 133), the transceiver 134, the user interface 135, the data bus 136, the electrical circuit 137 and/or the power supply 139 is/are mounted on and/or connected to a substrate of the housing 138. The housing 138 can include a server rack.

The user interface 135 can include an input device and an output device. The user interface 135 can include a display, such as a display discussed with respect to the display 74. The display can be configured as an input device and/or an output device. The user interface 135 can display a GUI output by the processor 132. The input device is configured to allow a user to input data into the processor 132.

The memory 133 can include CRPI 140, a GUI 142, vehicle selection data 143, service information 144, and/or mapping data 145. The CRPI 140 can include a module 141 (i.e., one or more modules). The module 141 can include one or more modules of the module set 110 shown in FIG. 6.

The CRPI 140 can include program instructions executable by a processor, such as the processor 132. As an example, the CRPI 140 can include program instructions that are executable to cause the server 130 to perform any function described as being performed by the server 130, by the processor 132, and/or by some other component of the server 130. As an example, the CRPI 140 can include program instructions executable by the processor to perform at least a portion of one or more functions of any one or more the function set 600, 610, 615, 620, 625, 630, 640, 645, 650, 660 shown in FIG. 45 to FIG. 54.

The GUI 142 includes one or more GUIs. The GUI 142 can include a GUI that the server 130 transmits (as a service) to the VST 60. As an example, the GUI 142 can include one or more GUI in the GUI 87 shown in FIG. 5. The GUI 142 can also include a GUI that the server 130 outputs on a display of the user interface 135. The GUI 142 can include information the server 130 provides to the VST 60 to populate within a GUI on the display 74, such as any GUI shown in FIG. 9 to FIG. 42.

The vehicle selection data 143 can include and/or be arranged as the vehicle selection data 89. The vehicle selection data 143 can include vehicle selection data for different types of vehicles (e.g., vehicles identified by different year, make and model characteristics).

The service information 144 can include service information to populate within a GUI at the server 130 before transmission to the VST 3, 60 or at the VST 3, 60 by the VST 3, 60. As an example, the service information 144 can include vehicle specifications, component specification, maintenance information, repair instructions, diagnostic instructions, diagnostic flowcharts, fluid capacity information, connector drawings, or connector pinout information. Other examples of the service information are possible.

The mapping data 145 can include some or all of the mapping data 93 shown in FIG. 4. As an example, the server 130 can use the mapping data 145 to select a GUI, vehicle selection data, and/or service information for developing a response to transmit to the VST 3, 60.

III. Example Graphical User Interfaces

As noted, the computing systems (e.g., the VST 3, 60, and/or the server 6, 130) can include a display for displaying a GUI. The drawings show various aspects of GUIs in accordance with the example embodiments. Those aspects include a USC configured to trigger a processor to perform function(s) corresponding to the USC. In at least some embodiments, a USC includes an icon indicative of a function corresponding to the USC. FIG. 9 to FIG. 42 shows various views of GUIs in accordance with the example embodiments.

In accordance with at least some embodiments, the processor executes program instructions to output a GUI (such as any GUI described in this description) on a display. If the GUI includes a USC, then the processor can execute program instructions to arm the USC such that selection of the USC while the GUI is output on the display causes a signal change at the processor to interrupt the processor to cause the processor to execute program instructions corresponding to the USC. The program instructions to arm the USC can arm other USCs within the GUI such that selection of the other USCs while the GUI is output on the display causes a signal change at the processor to interrupt the processor to cause the processor to execute program instructions corresponding to the other USCs. The processor can execute program instructions to disarm the USC when the GUI is no longer output on the display.

Figure 9:
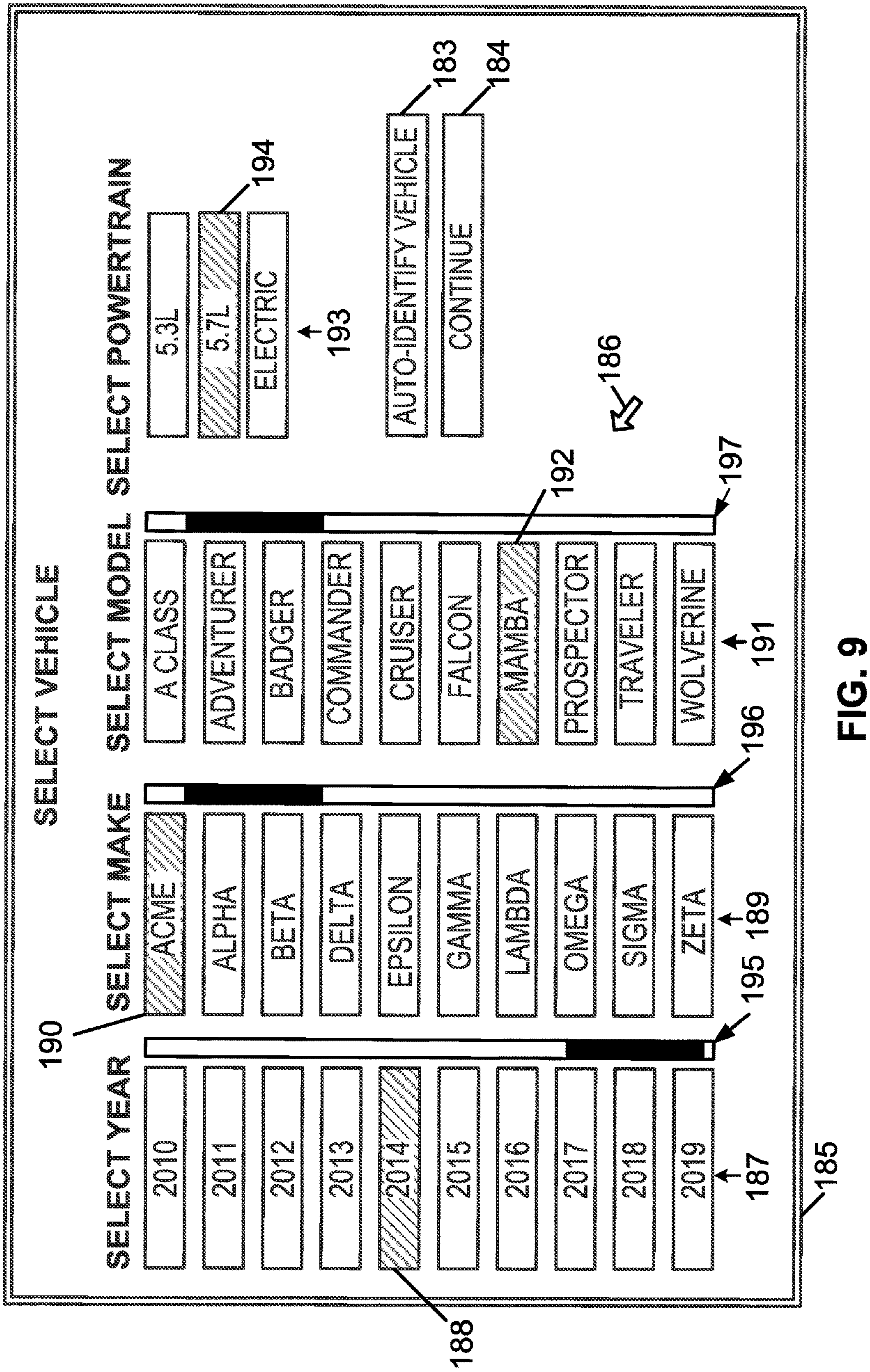
FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, and FIG. 42 show a graphical user interface (GUI), in accordance with the example embodiments.
Figure 10:
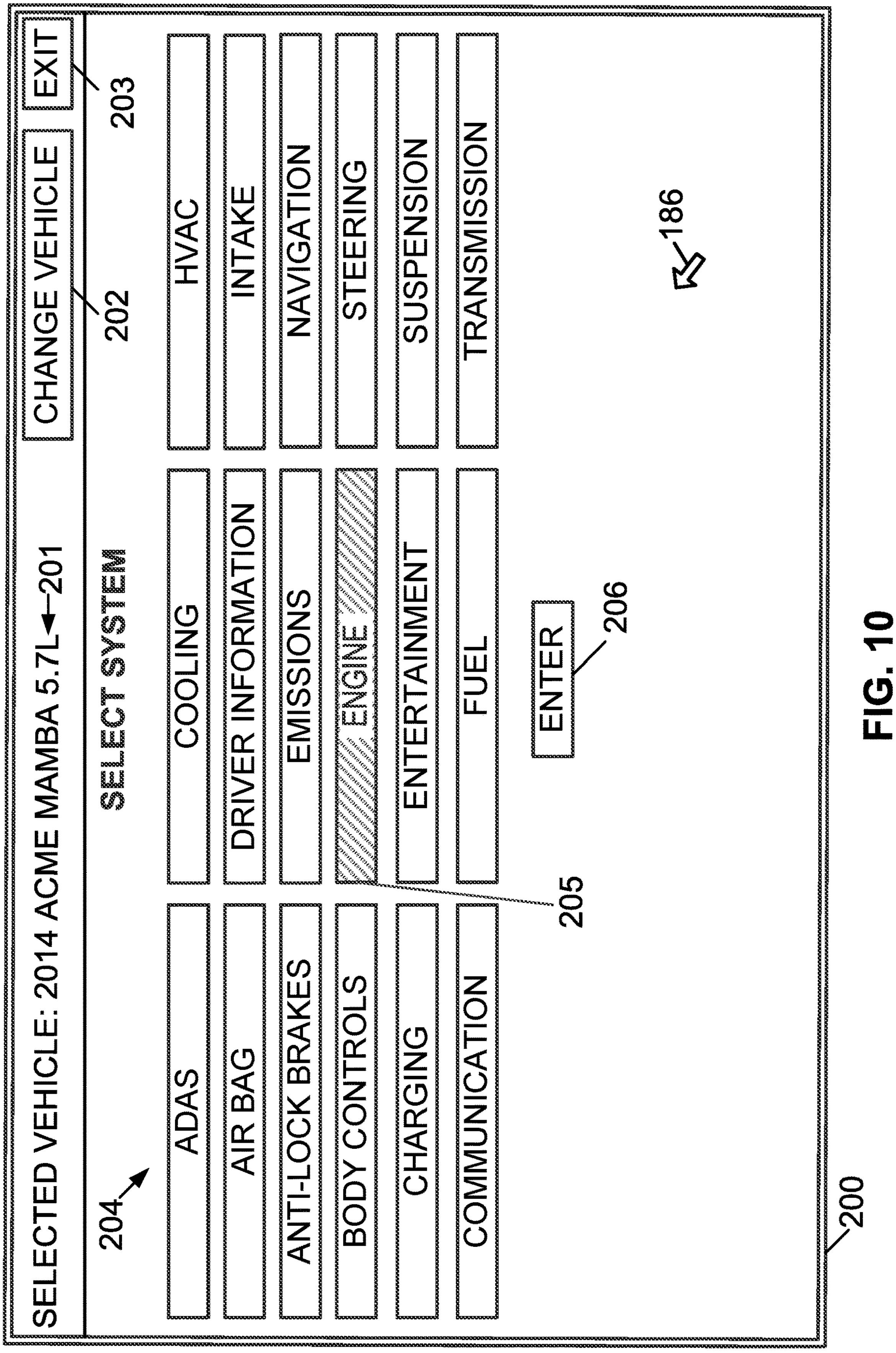

FIG. 9 shows a GUI 185 that includes a vehicle selection menu. The vehicle selection data 89 shown in FIG. 5 can also include data that represents relationships between vehicle model years and the types of vehicles that were built for and/or during each model year. For instance, for a given model year, the vehicle selection data 89 can include data that indicates all vehicle makes that include at least one type of vehicle for the given model year, and for each of those vehicle makes, the vehicle selection data 89 can include data that indicates all vehicle models that correspond to one of the vehicle makes that built at least one type of vehicle for the given model year. In at least some embodiments, the vehicle selection data 89 can include data that indicates all engines that are used in each vehicle model. The vehicle selection data 89 can include data that indicates other criteria that can be used to distinguish different groups of common (i.e., like) vehicles. The processor 62 can generate a vehicle selection menu based on the other data within the vehicle selection data 89.

The GUI 185 can include a cursor 186 movable to point to a USC or another item of the GUI 185. The processor 62 can detect the USC or the other item of the GUI 185 is selected when the cursor 186 is disposed on the USC or the other item of the GUI 185 and a mouse or other selector is used to enter a single or double click input. The other GUIs shown in the figures can also include a cursor, similar to the cursor 186, for use in selecting an item of that GUI. For embodiments in which the display 74 includes a touch screen display, the GUIs shown in FIG. 9 to FIG. 42 may or may not include a cursor.

As shown in FIG. 9, the GUI 185 includes a year selection menu 187 in which a year selector 188 representing the year 2014 has been selected. The GUI 185 includes a make selection menu 189 in which a make selector 190 representing an example make "Acme" has been selected. The GUI 185 includes a model selection menu 191 in which a model selector 192 representing the example model "Mamba" has been selected. The GUI 185 includes a powertrain selection menu 193 in which an engine selector USC 194 representing the 5.7 liter engine has been selected. The year selection menu 187 includes a scroll bar 195 to cause the year selection menu 187 to display year(s) not currently shown in the year selection menu 187. Similarly, the make selection menu 189 includes a scroll bar 196 to cause the make selection menu 189 to display make(s) not currently shown in the make selection menu 189. Likewise, the model selection menu 191 includes a scroll bar 197 to cause the model selection menu 191 to display model(s) not currently shown in the model selection menu 191. Other examples of a selected year, make, model, and engine are also possible.

In at least some embodiments, the make selection menu 189 is populated with vehicle makes after a year is selected from the year selection menu 187. Similarly, in at least some embodiments, the model selection menu 191 is populated with vehicle models after a year is selected from the year selection menu 187 and after a make is selected from the make selection menu 189. Similarly, in at least some embodiments, the powertrain selection menu 193 is populated with powertrain identifiers after a model is selected from the model selection menu 191 is populated with vehicle models after a year is selected from the year selection menu 187 and after a make is selected from the make selection menu 189. In alternative embodiments, each of the year selection menu 187, the make selection menu 189, the model selection menu 191, or the powertrain selection menu 193 is in a separate GUI without the other of the year selection menu 187, the make selection menu 189, the model selection menu 191, and the powertrain selection menu 193.

The GUI 185 includes a USC 183 selectable to cause the VST 3, 60 to transmit a VDM to the vehicle 4, 20, 40 to request a VIN corresponding to the vehicle and to cause the processor 62 to identify the vehicle based on a response to the VDM sent to the vehicle. In at least some embodiments, the processor 62 can populate the year selection menu 187, the make selection menu 189, the model selection menu 191, and the powertrain selection menu 193 with selections based on the VIN received in the response to the VDM.

In at least some embodiments, the GUI 185 includes a USC 184 for continuing after one or more of a year, make, model and powertrain were selected using the year selection menu 187, the make selection menu 189, the model selection menu 191, and the powertrain selection menu 193, respectively. Continuing after selection of the USC 184 can include the VST 3, 60 outputting a different GUI on the display 74.

Next, FIG. 10 shows a GUI 200 for selecting a system in accordance with the example embodiments. The GUI 200 (and other GUIs shown in the drawings) includes a vehicle identifier 201. The vehicle identifier 201 can be based on a vehicle and/or a vehicle identifier determined by selections made via the GUI 185 shown in FIG. 9 and/or a vehicle and/or a vehicle identifier determined in response to a selection of the USC 183 within the GUI 185.

The GUI 200 includes a USC 202 to cause the VST 3, 60 to present options for changing the vehicle identifier 201. As an example, the VST 3, 60 can output the GUI 185 in response to determining the USC 202 was selected.

The GUI 200 (and other GUIs shown in the drawings) includes a USC 203 to cause the VST 3, 60 to exit the GUI including the USC 203. As an example, the VST 3, 60 can exit the GUI 200 by selecting the USC 203 and then display a different GUI, such as the GUI 185.

The GUI 200 includes a set of user-selectable controls 204. Each of those user-selectable controls corresponds to a different system of a vehicle indicated by the vehicle identifier 201. The set of user-selectable controls 204 includes a USC 205 for selecting a system referred to on the USC 205 as "Engine." The GUI 200 shows the USC 205 with cross-hatched lines to represent that the USC 205 has been selected.

The GUI 200 includes a USC 206 for entering a system selected via a USC of the set of user-selectable controls 204. In accordance with at least some embodiments, the USC 206 can be selected after one or more user-selectable controls of the set of user-selectable controls 204 are selected.

Figure 11:
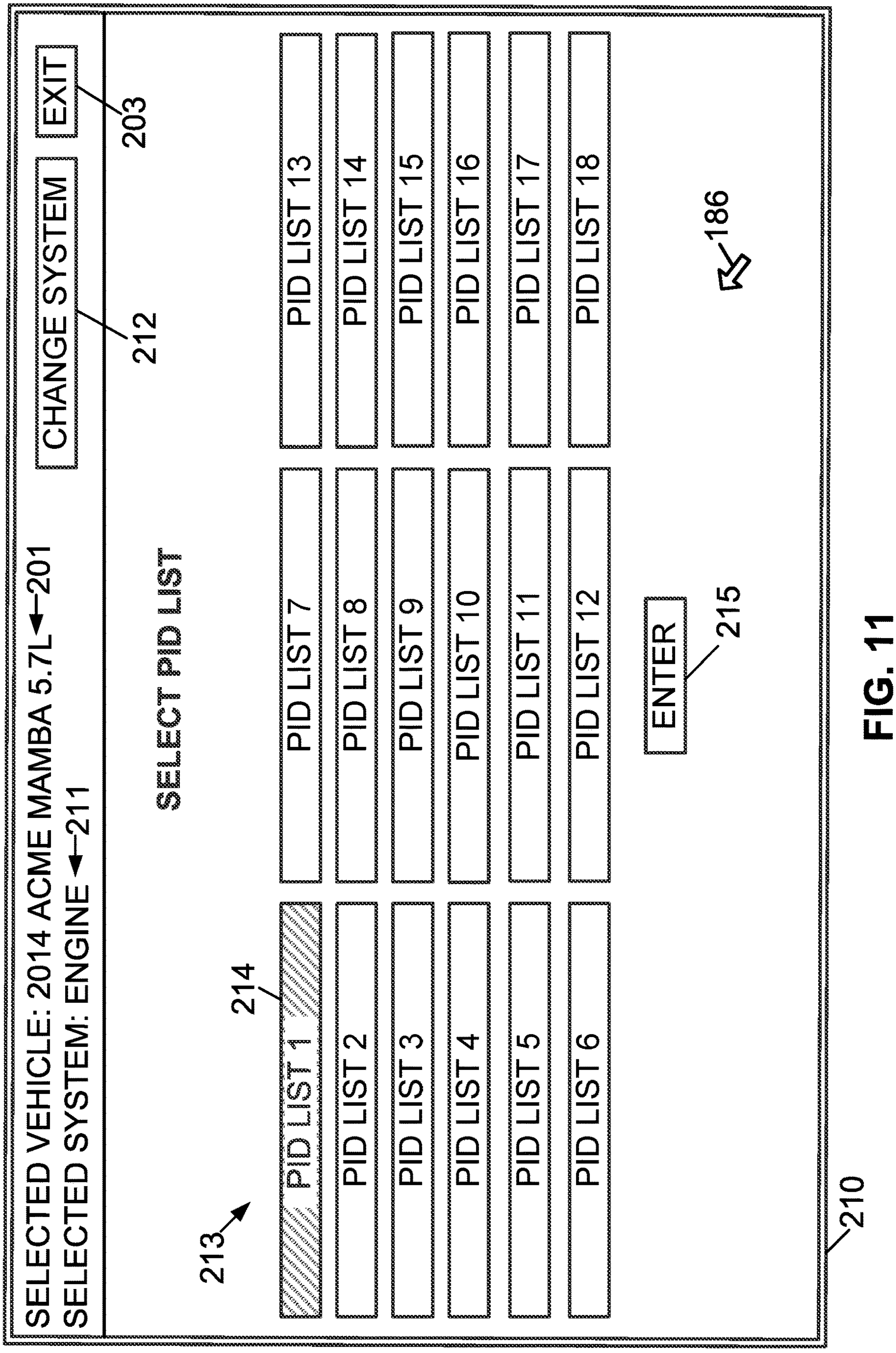

Next, FIG. 11 shows a GUI 210 for selecting a PID list in accordance with the example embodiments. The GUI 210 includes the vehicle identifier 201 and the USC 203, both discussed above. The GUI 210 (and other GUIs shown in the drawings) includes a system identifier 211. The system identifier 211 can be based on a system and/or a system identifier determined by selections made via the GUI 200 shown in FIG. 10.

A PID list includes a list of one or more PIDs. The PIDs in a PID list can be equivalent to a PID used by a vehicle or data mapped to a PID used by the vehicle. As an example, a PID list can be contained within a computer-readable file, such as a markup language file or a Java script object notation (JSON) file. As an example, the markup language file can include a hypertext markup language (HTML) file or an extensible markup language (XML) file. As another example, a PID list can be contained within database stored within a computer-readable memory.

The GUI 210 includes a USC 212 to cause the VST 3, 60 to present options for changing the system identifier 211. As an example, the VST 3, 60 can output the GUI 200 in response to determining the USC 212 was selected.

The GUI 200 includes a USC set 213 (i.e., a set of USCs). Each USC within the USC set 213 corresponds to a different PID list corresponding to a vehicle indicated by the vehicle identifier 201. The USC set 213 includes a USC 214 for selecting a PID list referred to on the USC 214 as "PID List 1." The GUI 200 shows the USC 214 with cross-hatched lines to represent that the USC 214 has been selected.

The GUI 200 includes a USC 215 for entering a PID list selected via a USC of the USC set 213. In accordance with at least some embodiments, the USC 215 can be selected after one or more user-selectable controls of the USC set 213 are selected.

Figure 12:
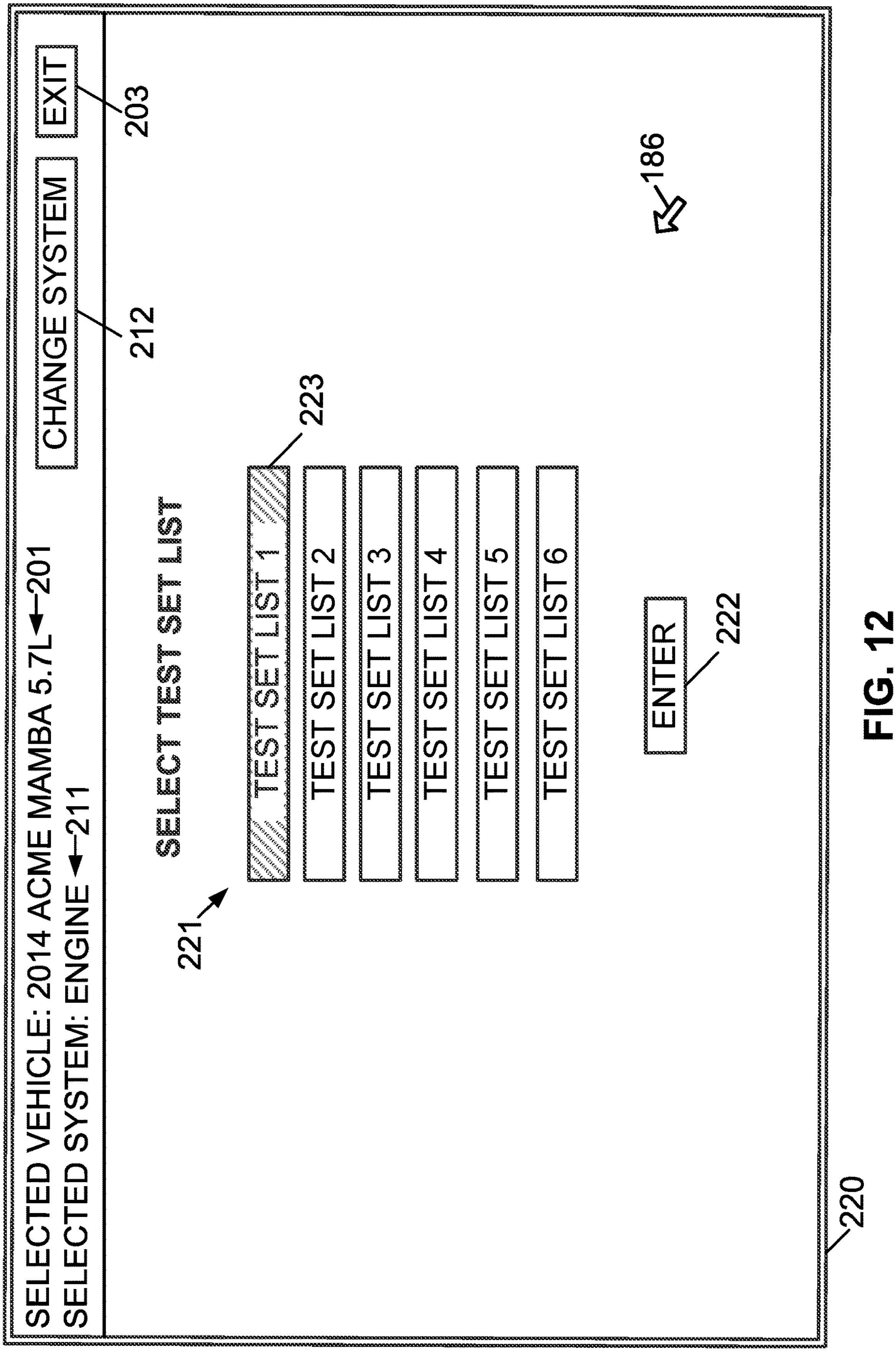

Next, FIG. 12 shows a GUI 220 for selecting a test set list in accordance with the example embodiments. The GUI 220 includes the vehicle identifier 201, the USC 203, the system identifier 211, and the USC 212, each of which is discussed above.

A test set list includes a list of test sets. A test set within a test set list includes a set of tests and related diagnostics and procedures for servicing a vehicle. As example, the tests can include one or more functional tests or component tests. As another example, the diagnostics and procedures can include one or more PID requests or reset procedures. The GUI 375 shown in FIG. 35 to FIG. 38 includes aspects of a test set. A test set can include USCs for selecting functional tests and reset procedures for one or more systems within a vehicle. That test set or a different test can include USCs for selecting component test for one or more components within the vehicle and/or containers for PIDs and PID parameter values for one or more components within the vehicle. Outputting a test set corresponding to multiple systems and/or components within a GUI is advantageous in that the controls and containers for the multiple systems and/or components are available at a single GUI and the user doesn't need to exit a first GUI and search for a second GUI that can be displayed to show some aspect of the test set not included within the first GUI.

The GUI 220 includes a USC set 221. Each USC within the USC set 221 corresponds to a different test set corresponding to a vehicle indicated by the vehicle identifier 201 and a system indicated by the system identifier 211. The USC set 221 includes a USC 223 for selecting a test set referred to on the USC 214 as "Test Set 1." The GUI 200 shows the USC 223 with cross-hatched lines to represent that the USC 223 has been selected.

The GUI 220 includes a USC 222 for entering a test set selected via a USC of the USC set 221. In accordance with at least some embodiments, the USC 222 can be selected after one or more user-selectable controls of the USC set 221 are selected.

Figure 13:
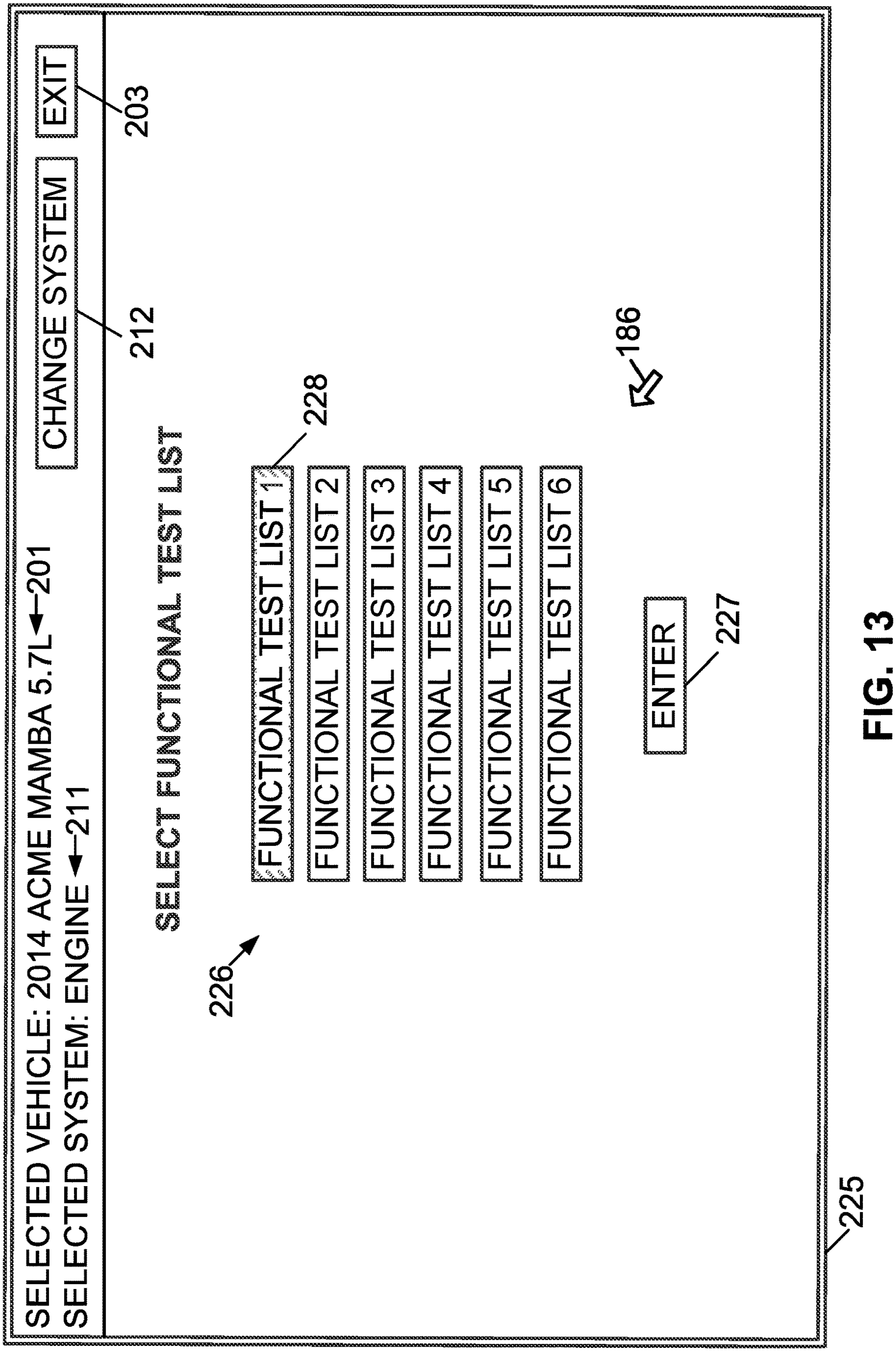

Next, FIG. 13 shows a GUI 225 for selecting a functional test list in accordance with the example embodiments. The GUI 225 includes the vehicle identifier 201, the USC 203, the system identifier 211, and the USC 212, each of which is discussed above.

A functional test list includes a list of functional tests. A functional test within a functional test list can be performed to diagnose or test a vehicle and/or vehicle component. As an example, a functional test can include a toggle test to switch a component, such as a solenoid, relay, or switch between two operating states, or a variable control test to command a certain value for a system or component, such as varying a spark timing in one degree increments or an EGR valve duty cycle in ten percent increments.

The GUI 225 includes a USC set 226. Each USC within the USC set 226 corresponds to a different functional test list corresponding to a vehicle indicated by the vehicle identifier 201 and a system indicated by the system identifier 211. The USC set 226 includes a USC 228 for selecting a test set referred to on the USC 228 as "Functional Test List 1." The GUI 225 shows the USC 228 with cross-hatched lines to represent that the USC 228 has been selected.

The GUI 225 includes a USC 227 for entering a functional test list selected via a USC of the USC set 226. In accordance with at least some embodiments, the USC 227 can be selected after one or more user-selectable controls of the USC set 226 are selected.

Figure 14:
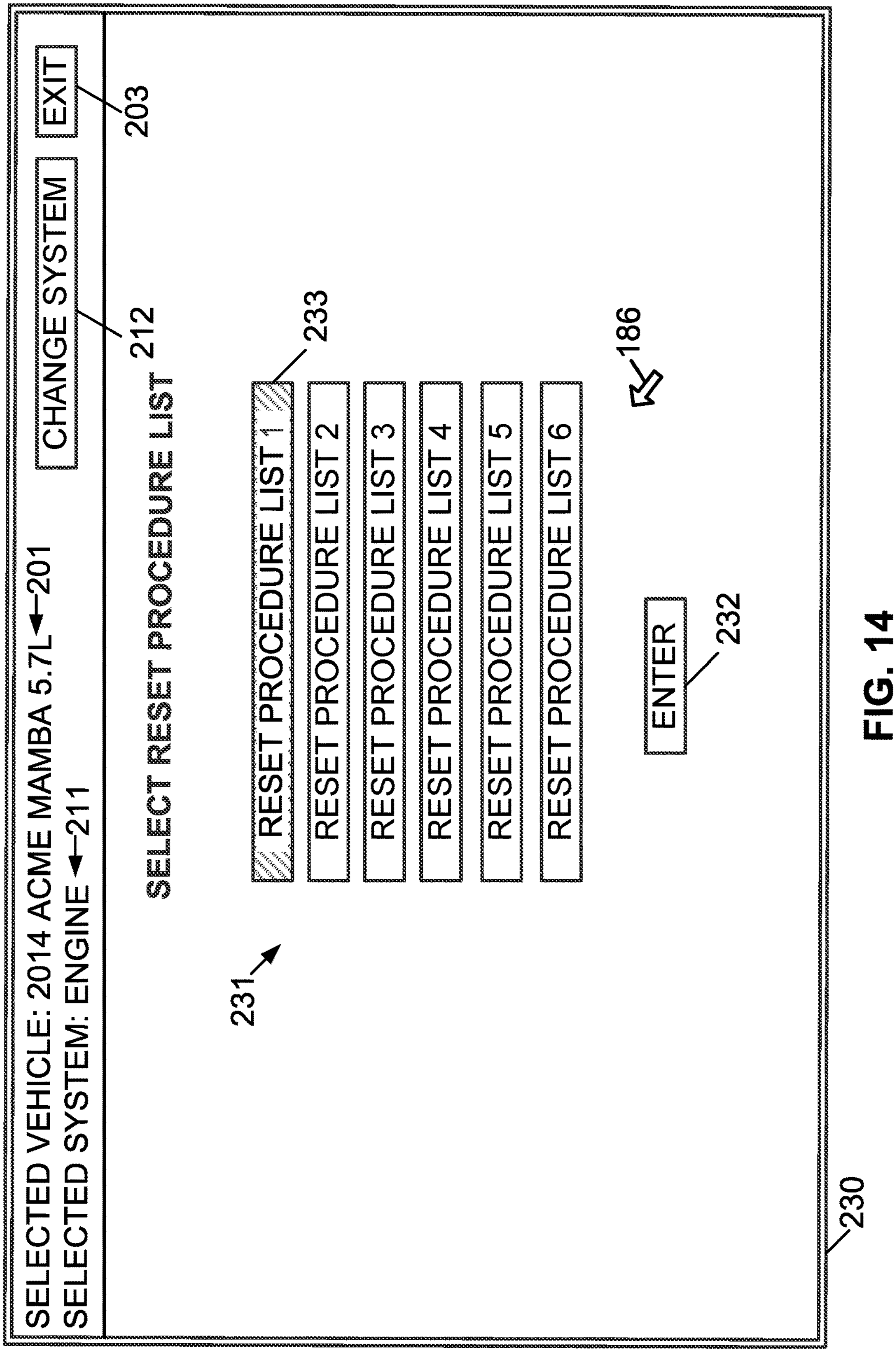

Next, FIG. 14 shows a GUI 230 for selecting a reset procedure list in accordance with the example embodiments. The GUI 230 includes the vehicle identifier 201, the USC 203, the system identifier 211, and the USC 212, each of which is discussed above.

A reset procedure list includes identifiers of one or more reset procedures. In FIG. 14, each USC of the USC set 226 includes a reset procedure list identifier. A person having ordinary skill in the art will understand that a reset procedure list identifier can include text indicative of the reset procedures that can be performed if the USC is selected. In at least some embodiments, the text indicative of the reset procedures can be based on a currently selected category of diagnostic descriptors. As an example, the reset procedure list identifier corresponding to the USC 233 can be "Engine Oil Life Reset."

The GUI 230 includes a set of user-selectable controls 231. Each of those user-selectable controls corresponds to a different reset procedure list corresponding to a vehicle indicated by the vehicle identifier 201 and a system indicated by the system identifier 211. The set of user-selectable controls 231 includes a USC 233 for selecting a reset procedure list referred to on the USC 233 as "Reset Procedure List 1." The GUI 230 shows the USC 233 with cross-hatched lines to represent that the USC 233 has been selected.

The GUI 230 includes a USC 232 for entering a reset procedure list selected via a USC of the set of user-selectable controls 231. In accordance with at least some embodiments, the USC 232 can be selected after one or more user-selectable controls of the set of user-selectable controls 231 are selected.

Figure 15:
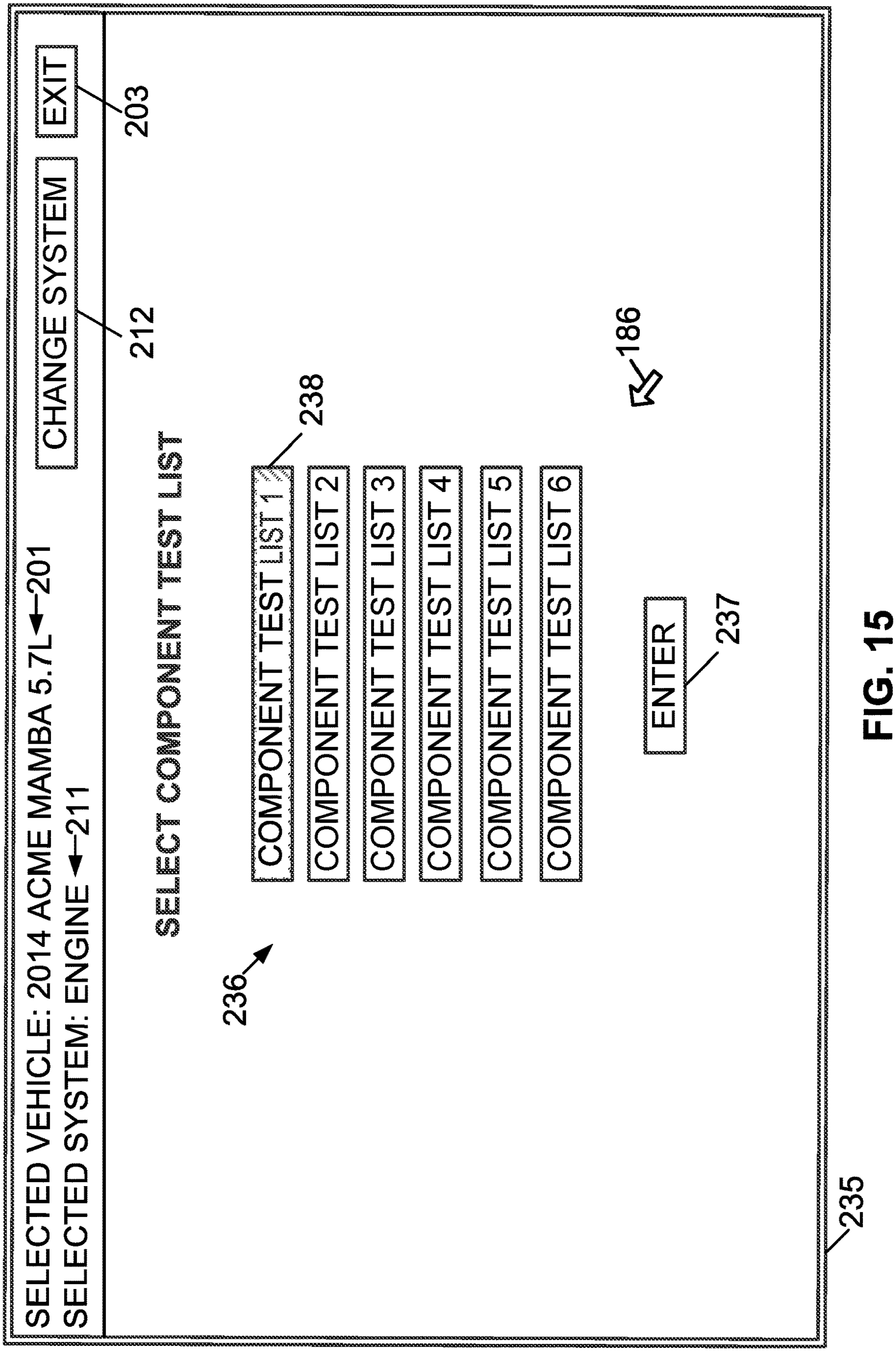

Next, FIG. 15 shows a GUI 235 for selecting a component test list in accordance with the example embodiments. The GUI 235 includes the vehicle identifier 201, the USC 203, the system identifier 211, and the USC 212, each of which is discussed above.

A component test list includes a list of component tests. A component test within a component test list can be performed to diagnose or test a vehicle and/or vehicle component. As an example, a component test within the list of component tests can include a component test discussed with respect to Table A or any other component test discussed in this description.

The GUI 235 includes a USC set 236. Each of those user-selectable controls corresponds to a different component test list corresponding to a vehicle indicated by the vehicle identifier 201 and a system indicated by the system identifier 211. The USC set 236 includes a USC 238 for selecting a component test list referred to on the GUI 235 as "Component Test List 1." The GUI 235 shows the USC 238 with cross-hatched lines to represent that the USC 238 has been selected.

The GUI 235 includes a USC 237 for entering a component test list selected via a USC of the USC set 236. In accordance with at least some embodiments, the USC 237 can be selected after one or more user-selectable controls of the USC set 236 are selected.

Next, FIG. 16 shows a GUI 240 that shows a PID list (i.e., PID LIST 1) in accordance with the example embodiments. The GUI 240 includes the vehicle identifier 201, the USC 203, and the system identifier 211, each of which is discussed above. The GUI 240 includes a PID list identifier 241. The PID list identifier 241 can be based on a PID list determined by selection(s) made via the GUI 210 shown in FIG. 11. The GUI 240 can be displayed in response to a selection of the USC 215 after a selection of the USC 214 within the GUI 210, all shown in FIG. 11.

The GUI 240 includes a USC 242 selectable to cause the VST 3, 60 to present options for changing the PID list identifier 241. As an example, the VST 3, 60 can output the GUI 210 in response to determining the USC 242 was selected from the GUI 240.

The GUI 240 includes a container set 243 (e.g., PID containers or a set of containers). As shown in FIG. 16, the container set 243 includes a container 244, 245, 246, 247, 248, 249, 250, 251, 252. In accordance with the embodiment shown in FIG. 16, at least some of the containers of the container set 243 include different types of data compared to other container(s) within the container set 243. For example, the container 251 includes a PID parameter value range 256 and the container 252 includes a PID parameter maximum value 234 and a PID parameter minimum value 239. As an example, the PID parameter maximum value 234 can represent a maximum value of any parameter value corresponding to the PID defined by the PID descriptor 265 while the VST 3, 60 is connected to the vehicle identified by the vehicle identifier 201 and while the GUI 240 is being displayed. As another example, the PID parameter minimum value 239 can represent a minimum value of any parameter value corresponding to the PID defined by the PID descriptor 265 while the VST 3, 60 is connected to the vehicle identified by the vehicle identifier 201 and while the GUI 240 is being displayed.

The container 244 includes a PID descriptor 253 and a USC 254 selectable to show other user-selectable controls corresponding to a PID indicated by the PID descriptor 253. Each of the other containers within the container set 243 also includes a PID descriptor and a USC (similar to the USC 254) selectable to show other user-selectable controls corresponding to a PID indicated by the PID descriptor within the container 244. For example, the container 252 includes a PID descriptor 265 and a USC 266 selectable to show other user-selectable controls corresponding to a PID indicated by the PID descriptor 265, and the container 251 includes a PID descriptor 267 and a USC 268 selectable to show other user-selectable controls corresponding to a PID indicated by the PID descriptor 267. All of the PID descriptors shown in the container set 243 are shown to include a suffix "A" to represent that those PID descriptors are arranged according to a category A of PID descriptors.

Each container within the container set 243 includes one or more PID parameter values. For example, the container 244 includes a PID parameter value 255. A person having ordinary skill in the art will understand that the PID parameter value 255 can be numeric (e.g., 12.0, as in 12.0 volts, or 35, as in 35 PSI). As another example, the container 246 includes PID parameter values arranged as a graph 279 of multiple PID parameter values. A PID parameter value can be accompanied by a unit identifier (e.g., volts, amperes, kilopascals, pounds per square inch (PSI), revolutions per minute (RPM), among others).

A PID container can include a PID parameter value range. For example, the container 251 includes a PID parameter value range 256 corresponding to a PID parameter value 257. As an example, if the PID parameter value 257 represents a voltage, the PID parameter value range 256 can include two voltage values such as 0.10 volts and 5.25 volts, such that the PID parameter value 257 can be expected to be between 0.10 volts and 5.25 volts when the system indicated by the system identifier 211 is operating without malfunctioning.

A PID container can include malfunction indicator to indicate when a parameter value corresponding to a particular PID has breached a threshold value corresponding to the particular PID. The threshold value can be an upper or lower value of a PID parameter value range. As an example, a malfunction indicator can include a flag icon, such as the flag icon 258 within the container 248. The flag icon 258 can be configured using a particular color (e.g., red or black) after a malfunction has been detected. The flag icon 258 can be configured using a different color (e.g., green or white) if no malfunction corresponding to the particular PID has been detected. In at least some embodiments, the flag icon 258 is not present if the malfunction for the particular PID has not been detected.

The GUI 240 also includes a user-selectable control set 259 including a USC 260, 261, 262, 263. The USC 260, 261, 262, 263 is operable for selecting a PID descriptor category. The GUI 240 represents the PID descriptor categories as Category A, Category B, Category C, and Category D. The GUI 240 includes a USC 264 that is selectable to cause the VST 3, 60 to change the PID descriptors within the container set 243 from a currently-selected PID descriptor category to a PID descriptor category selected using the USC 260, the USC 261, the USC 262, or the USC 263. As discussed above, the PID descriptors within the container set 243 are arranged according to the Category A of PID descriptors.

The container 250 includes a USC 339. The USC 339 can be referred to as an information button. Any other or all other containers including a PID descriptor can include a USC like the USC 339, but that USC is not shown in all drawings including such container to improve clarity of the drawings. The USC 339 is selectable to cause the processor to determine supplemental information regarding the PID corresponding to the container including the USC 339. As an example, the processor 62 can determine supplemental information from one or more data sources (e.g., the server 130 and/or the memory 63). In accordance with at least some embodiments, the supplemental information accessible via use of the USC 339 can be accessed for display via a USC (like the USC 254) within the same container as the USC 339. The description corresponding to FIG. 18 includes further details regarding use of the USC 339.

Next, FIG. 17 shows a different view of the GUI 240. In this view, the PID descriptors shown in the container set 243 are shown to include a suffix "C" to represent that those PID descriptors are arranged according to a category C of PID descriptors. The GUI 240, as shown in FIG. 17, can be displayed in response to a selection of the USC 264 after a selection of the USC 262 within the GUI 240, as shown in FIG. 16.

Figure 18:
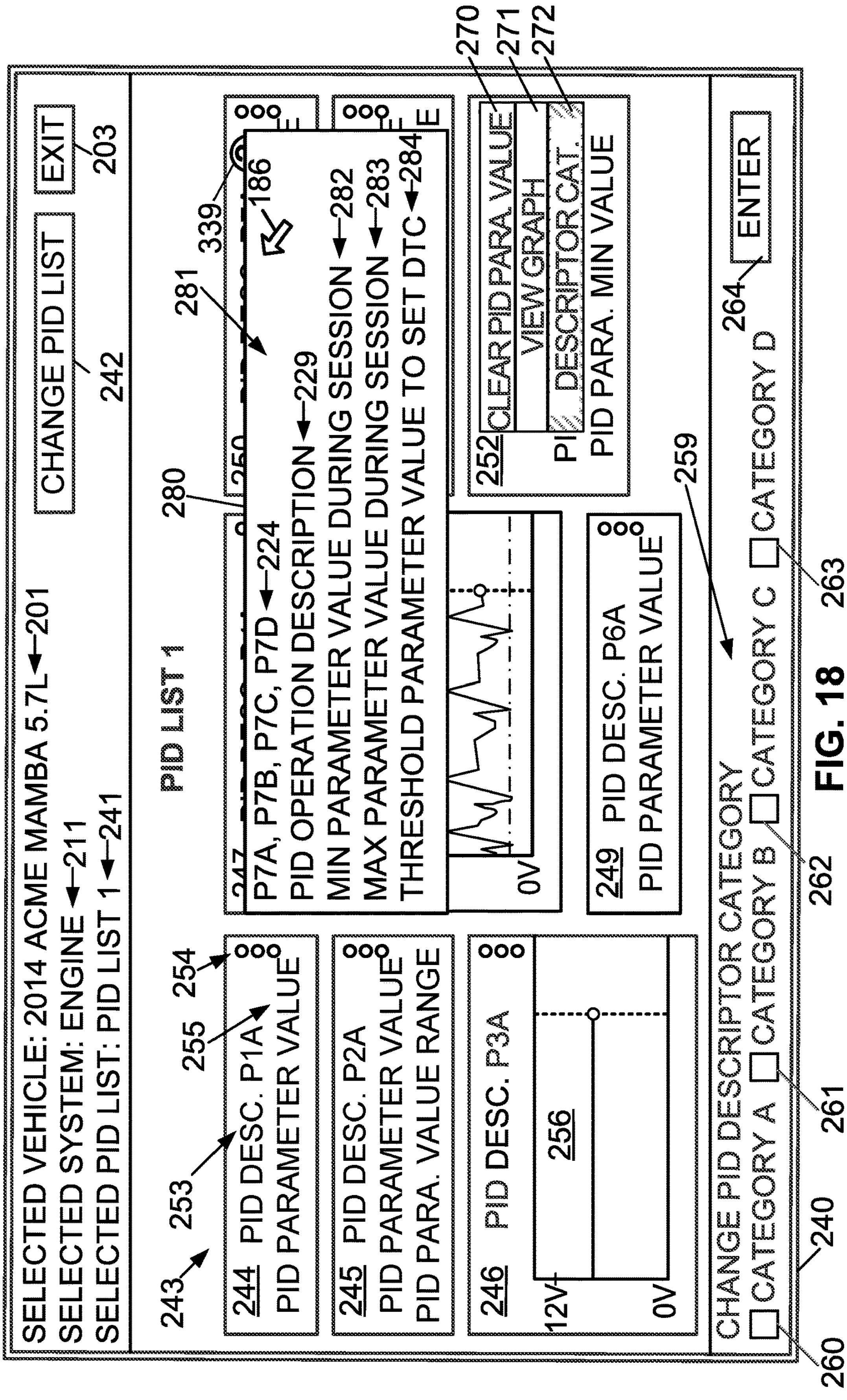

Next, FIG. 18 shows a different view of the GUI 240. In this view, the GUI 240 includes a USC 270, 271, 272. The GUI 240, as shown in FIG. 18, can be displayed in response to a selection of the USC 266 within the container 252, as shown in FIG. 16.

The USC 270 is selectable to cause the VST 3, 60 clear PID parameter values corresponding to the PID associated with the container 252. In some embodiments, the USC 270 is selectable to cause the VST 3, 60 clear PID parameter values corresponding to all PIDs for which PID parameter values are being received. As an example, clearing PID parameter values can include the VST 3, 60 deleting PID parameter values stored in a computer-readable memory and/or storing PID parameter values received after selecting the USC 270 over PID parameter values stored in the computer-readable memory prior to selecting the USC 270. As an example, clearing PID parameter values can include clearing a minimum PID parameter value, a maximum PID parameter value, and/or a graph of PID parameter values.

The USC 271 is selectable to cause the VST 3, 60 to display a graph of PID parameter values within the container 252. The VST 3, 60 can change a size of the container 252 so that the graph fits within the container 252. The VST 3, 60 can remove a PID parameter value, a PID parameter maximum value, and/or PID parameter value from within the container 252 in response to a selection of the USC 271.

Figure 19:
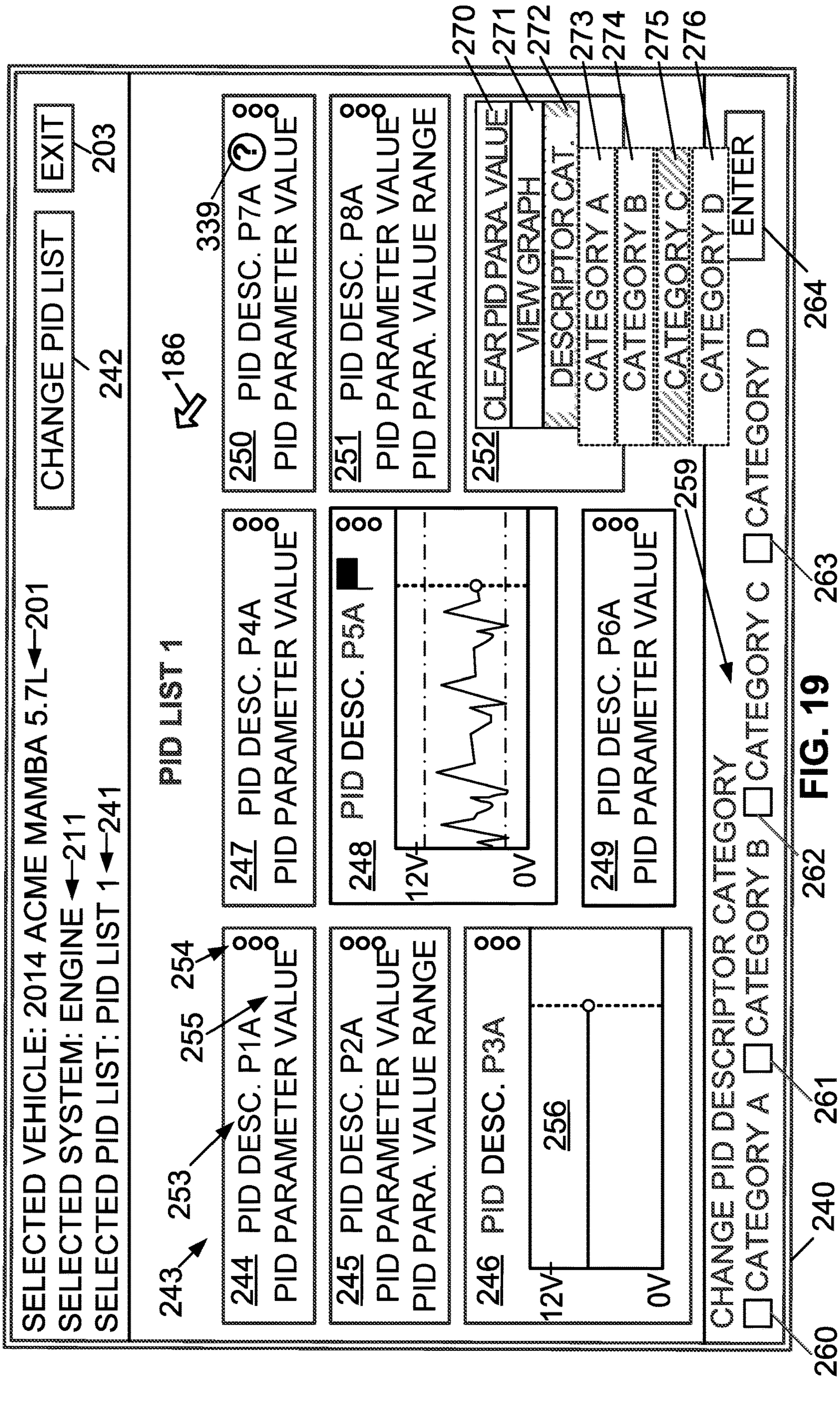

The USC 272 is selectable to cause the VST 3, 60 to change a descriptor category of the PID descriptor 265 or to cause the VST 3, 60 to output one or more USC that are selectable to cause the VST 3, 60 to change the descriptor category of the PID descriptor 265. Examples of those one or more USC are shown in FIG. 19.

Other examples of functions available to be performed by the VST 3, 60 in response to selection of a USC that is available upon selection of a USC within a container, such as the USC 254 within the container 244 or the USC 266 within the container 252 are also possible.

FIG. 18 also shows a container 280 that the processor 62 generates and populates with information in response to selection of the USC 339 corresponding to the container 250. The cursor 186 can be used to select the USC 339. The cursor 186 can be active within the container 280. The container 280 can be displayed continuously while the cursor 186 is positioned within the container 280. The container 280 includes supplemental information 281 corresponding to the PID P7. A container including supplemental information as a result of selecting the USC 339 corresponding to another PID comprises supplemental information corresponding to the other PID.

Selection of the USC 339 can act an interrupt to cause the processor to search for and/or request supplemental information corresponding to the PID. For example, the processor can search the memory 63 for the supplemental information. In at least some embodiments, supplemental information corresponding to a PID is stored in the memory 63, such as within the service information 92 and/or the mapping data 93 (e.g., supplemental information contained within a file, such as the file 400, 449). As another example, if the memory 63 does not include the supplemental information corresponding to the PID, then the processor can transmit to the server 130 a request for the supplemental information corresponding to the PID. Upon receiving the supplemental information, the processor can write the supplemental information into the memory 63 and/or cause the supplemental information to be output on the display. Examples of displaying supplemental information corresponding to a PID are discussed below.

As an example, the supplemental information 281 includes alternative PID descriptors 224 corresponding to PID P7 (i.e., P7B, P7C, P7D) as well as the PID descriptor (i.e., P7A) within the container 250 when the USC 339 was selected. As another example, the supplemental information 281 can include a PID operation description 229 corresponding to PID P7. As still yet another example, the supplemental information 281 includes minimum parameter value 282 and maximum parameter value 283 (received during a current data session) corresponding to the PID indicated by the container including the USC 339. The current data session can be initiated by connection of the VST 60 to the vehicle. The supplemental information 281 also includes a threshold value 284, such as a threshold parameter value that corresponds to one or more signals the ECU monitors to determine whether to set a diagnostic trouble code corresponding to the PID. Other examples of supplemental information output within the container 280 in response to a selection of the USC 339 are also possible.

As an example, a PID operation description for a PID corresponding to short-term fuel trim can describe how the engine controller ECU adjusts an amount of fuel being provided to the engine to maintain stoichiometrically balanced combustion in the engine over a relatively short time period. As another example, a PID operation description for a PID corresponding to long-term fuel trim can describe how the engine controller ECU adjusts an amount of fuel being provided to the engine to maintain stoichiometrically balanced combustion in the engine over a relatively long time period. The aforementioned PID operation descriptions may include descriptions for a particular bank of the engine. As yet another example, a PID operation description for an oxygen sensor can indicate how a ratio for the oxygen sensor is calculated, a minimum value, a maximum value and a units indicator. Other examples of PID operation descriptions are possible.

Although FIG. 18 shows the container 280 and the USC 270, 271, 272 being displayed simultaneously, in at least some embodiments, the GUI 240 displays the container 280 after a selection of the USC 339 or the USC 270, 271, 272 in response to a selection of the USC 266 (shown in FIG. 16), but not the container 280 and the USC 270, 271, 272 at the same time. In at least some embodiments, the processor 62 modifies the GUI 240 in response to a selection of the USC 339. In that regard, the processor 62 modifies the GUI 240 by outputting container 280 within the GUI 240. In at least some of those embodiments, the container 280 is arranged as a pop-up container that overlays at least a portion of the container 250 that includes the USC 339. A pop-up container can be referred to as a pop-up window. In at least some other embodiments, the container 280 is displayed in proximity to the container 250 without overlaying any portion of the container 250. As an example, the proximity two containers to one another can be defined as a quantity of pixel columns or pixel rows, such as a 1-200 pixel columns or 1-200 pixel rows.

Next, FIG. 19 shows a different view of the GUI 240. In this view, the VST 3, 60 outputs a USC 273, 274, 275, 276 within the GUI 240. The GUI 240, as shown in FIG. 19, can be displayed in response to a selection of the USC 272, as shown in FIG. 18.

The USC 273, 274, 275, 276 is selectable to cause the VST 3, 60 to use the category A of PID descriptors, category B of PID descriptors, category C of PID descriptors, or category D of PID descriptors, respectively for the PID descriptor 265. FIG. 19 shows the USC 275 with cross-hatched lines to represent that the USC 275 has been selected or is being selected.

Figure 20:
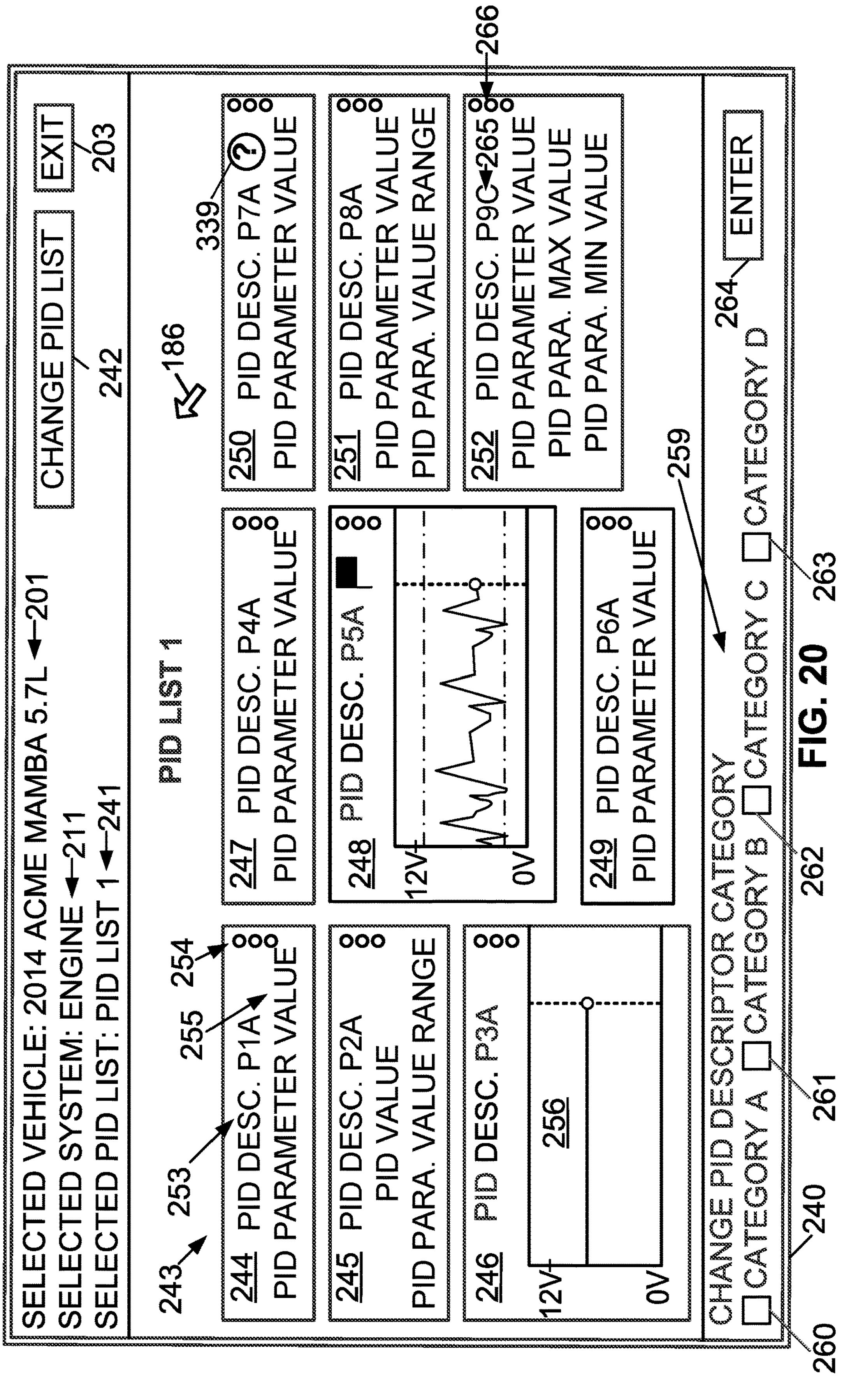

Next, FIG. 20 shows a different view of the GUI 240. In this view, the PID descriptor 265 is shown to include a suffix "C" to represent that the PID descriptor is arranged according to a category C of PID descriptors, whereas the PID descriptors within the container 244, 245, 246, 247, 248, 249, 250, 251 is shown to include a suffix "A" to represent that those PID descriptors are arranged according to a category A of PID descriptors. The GUI 240, as shown in FIG. 20, can be displayed in response to a selection of the USC 275, as shown in FIG. 19. In other words, the VST 3, 60 allows a user to show PID descriptors of multiple categories of PID descriptors simultaneously. Even more, the VST 3, 60 allows for changing a PID descriptor category for one or more PID descriptors.

Figure 21:
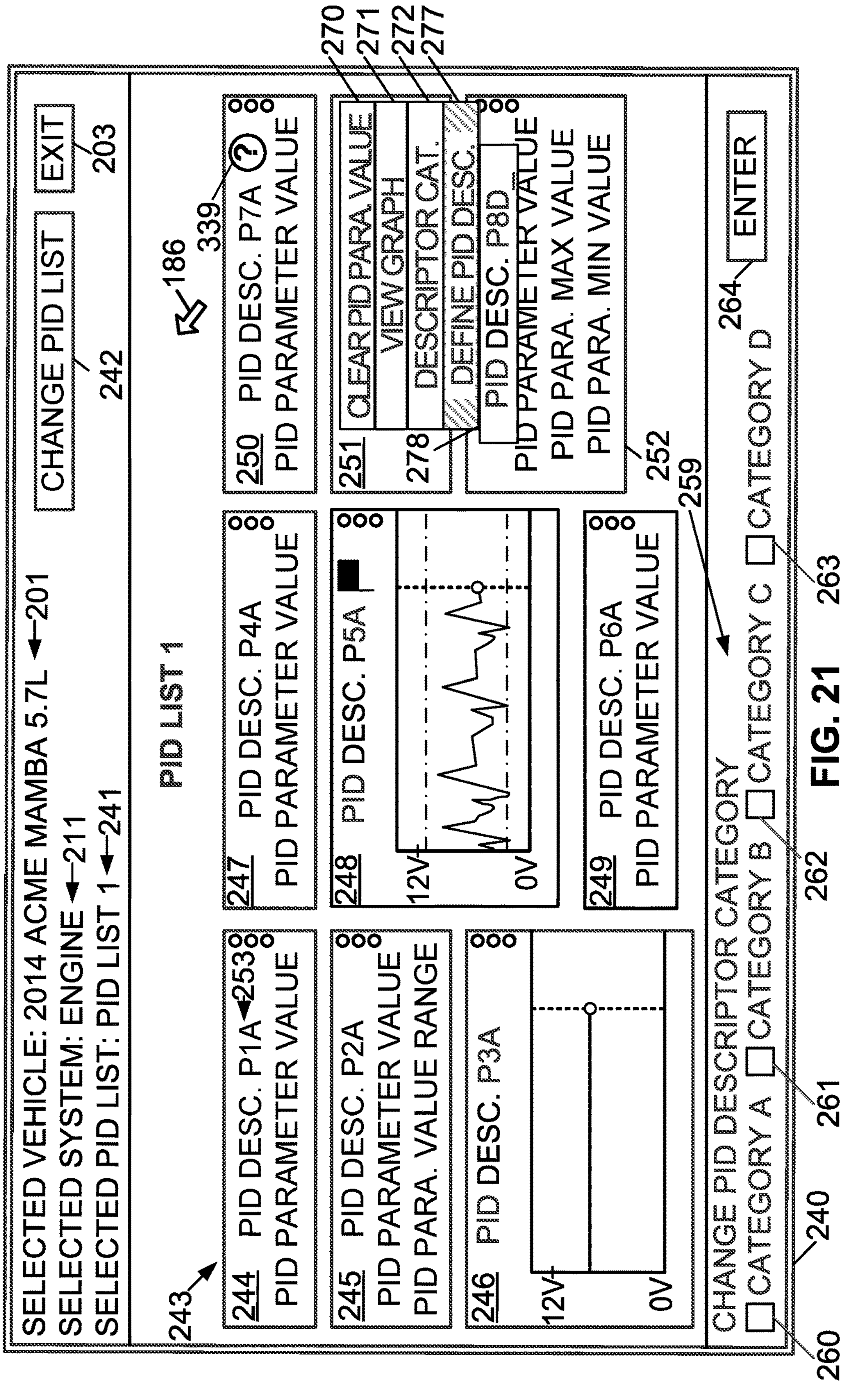

Next, FIG. 21 shows a different view of the GUI 240. In this view, the VST 3, 60 includes the USC 270, 271, 272 (previously discussed with respect to FIG. 18) and a USC 277, 278. The GUI 240, as shown in FIG. 21, can be displayed in response to a selection of the USC 268, as shown in FIG. 16 and then a selection of the USC 277. The USC 277 is selectable to cause the VST 3, 60 to output the USC 278 for defining a PID descriptor for the container 251. As an example, the USC 278 can be configured to allow a user to type the PID descriptor within the USC 278. As shown in FIG. 21, the USC 278 includes the PID descriptor "8D," a PID descriptor within the category D of PID descriptors. In at least some embodiments, defining a PID descriptor via a USC, such as the USC 278, can cause the VST 3, 60 to store the PID descriptor with the memory 133.

Figure 22:
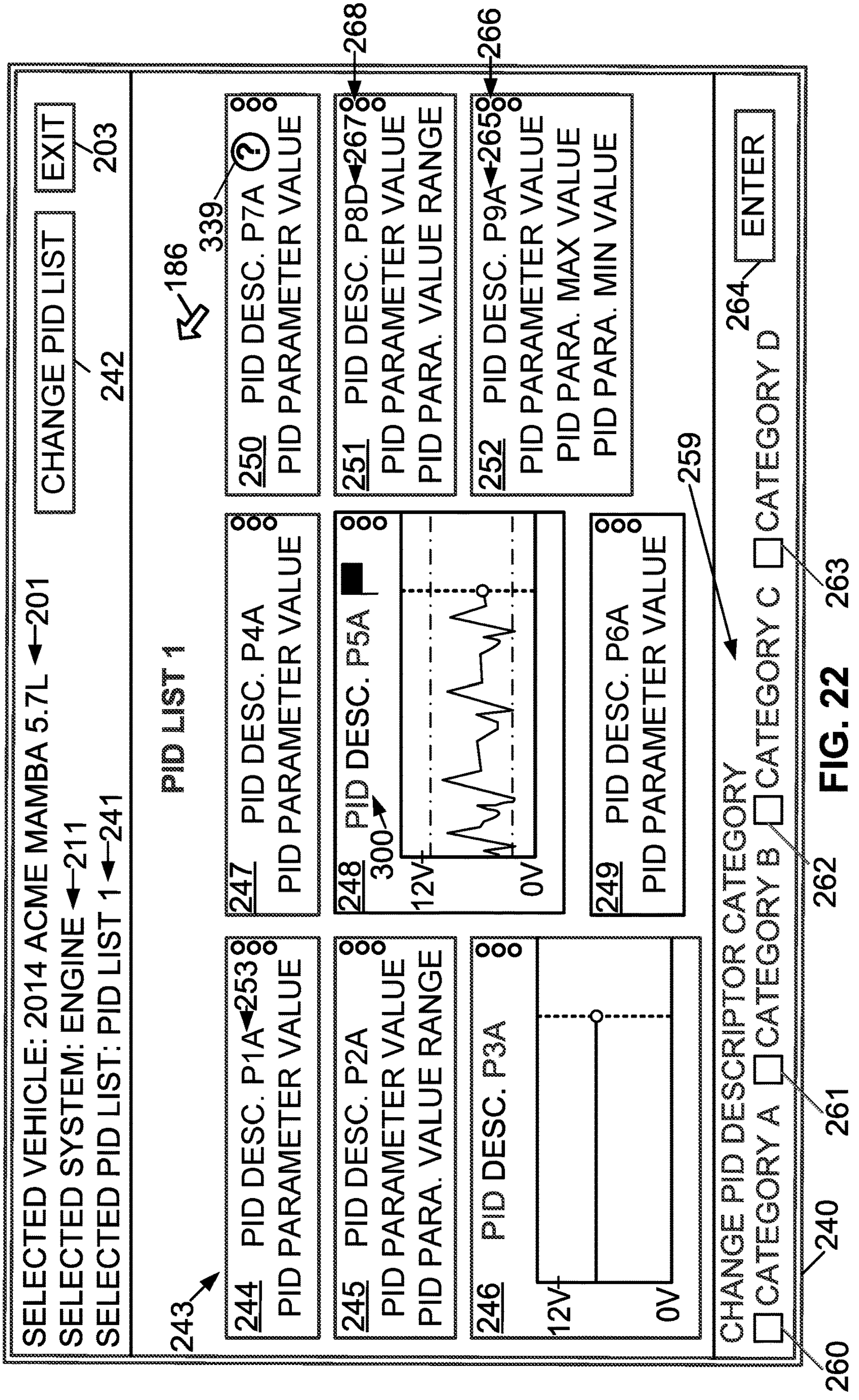

Next, FIG. 22 shows a different view of the GUI 240. In this view, the PID descriptor 267 is shown to include a suffix "D" to represent that the PID descriptor is arranged according to a category D of PID descriptors, whereas the PID descriptors within the container 244, 245, 246, 247, 248, 249, 250, 251 is shown to include a suffix "A" to represent that those PID descriptors are arranged according to a category A of PID descriptors. The GUI 240, as shown in FIG. 22, can be displayed in response to using the USC 277 and the USC 278, as shown in FIG. 21.

Figure 23:
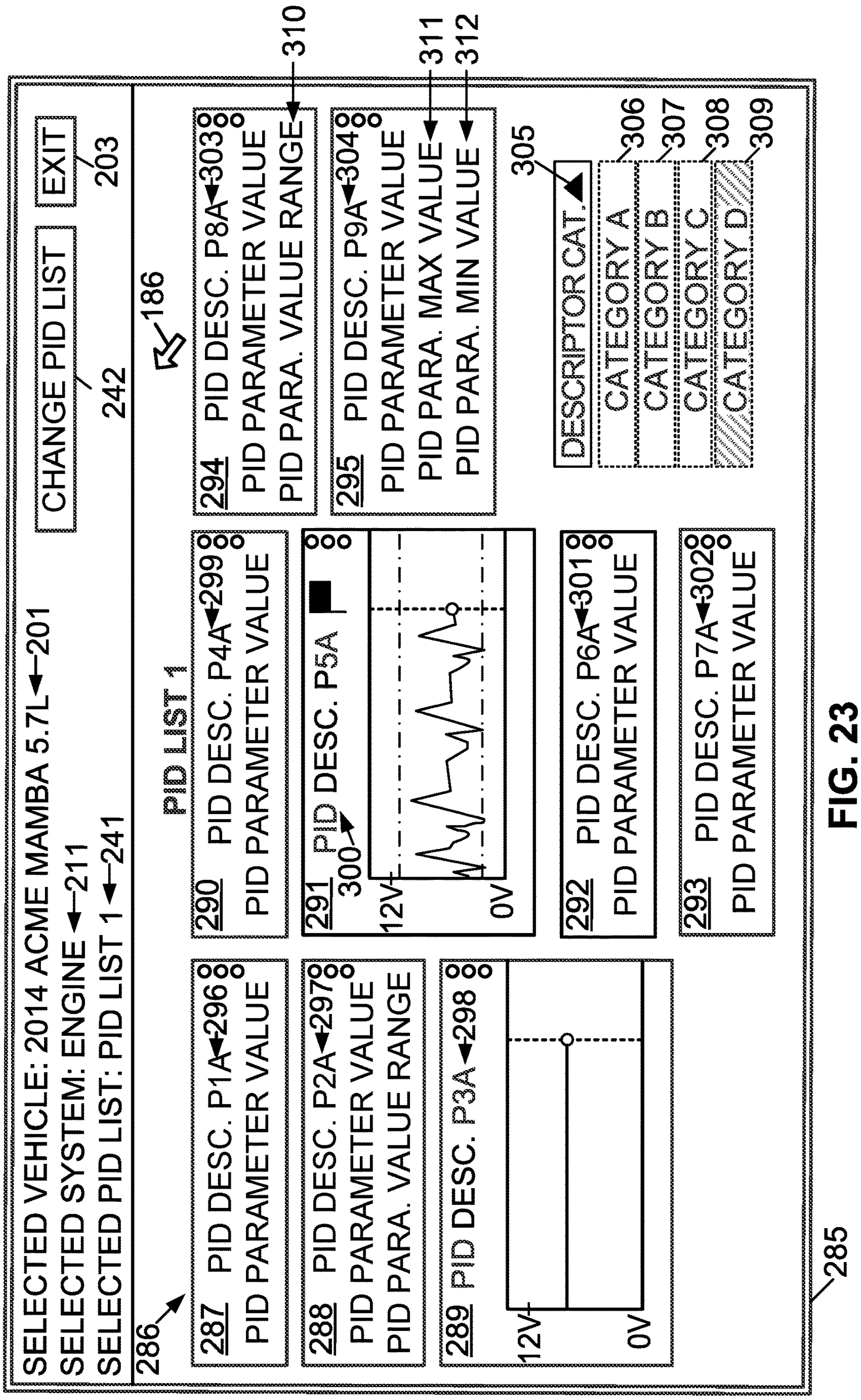

Next, FIG. 23 shows a GUI 285 that includes several aspects described with respect to other drawings. For example, the GUI 285 includes the vehicle identifier 201, the USC 203, the system identifier 211, the PID list identifier 241, and the USC 242. The GUI 285 can be displayed in response to a selection of the USC 215 after a selection of the USC 214 within the GUI 210, all shown in FIG. 11.

The GUI 285 includes a set of containers 286 (e.g., PID containers). As shown in FIG. 23, the set of containers 286 includes a container 287, 288, 289, 290, 291, 292, 293, 294, 295. In accordance with the embodiment shown in FIG. 23, at least some of the containers of the set of containers 286 include different types of data compared to other container(s) within the set of containers 286. For example, the container 294 includes a PID parameter value range 310 and the container 295 includes a PID parameter maximum value 311 and a PID parameter minimum value 312. The container 287, 288, 289, 290, 291, 292, 293, 294, 295 includes a PID descriptor 296, 297, 298, 299, 300, 301, 302, 303, 304, respectively. In FIG. 23, each PID descriptor 296, 297, 298, 299, 300, 301, 302, 303, 304 includes a suffix A to represent that the PID descriptor 296, 297, 298, 299, 300, 301, 302, 303, 304 is part of the PID descriptor category A.

The GUI 285 also includes a USC 305 that is selectable to cause the VST 3, 60 to output a USC for selecting a PID descriptor category. As an example, the USC 305 can be configured as a drop-down menu to output a USC 306, 307, 308, 309 when the USC 305 is selected. As shown in FIG. 23, the VST 3, 60 outputs the USC 306, 307, 308, 309 for selecting the PID descriptor category A, the PID descriptor category B, the PID descriptor category C, the PID descriptor category D, respectively. FIG. 23 shows the USC 309 with cross-hatched lines to represent that the USC 309 has been selected or is being selected.

Figure 24:
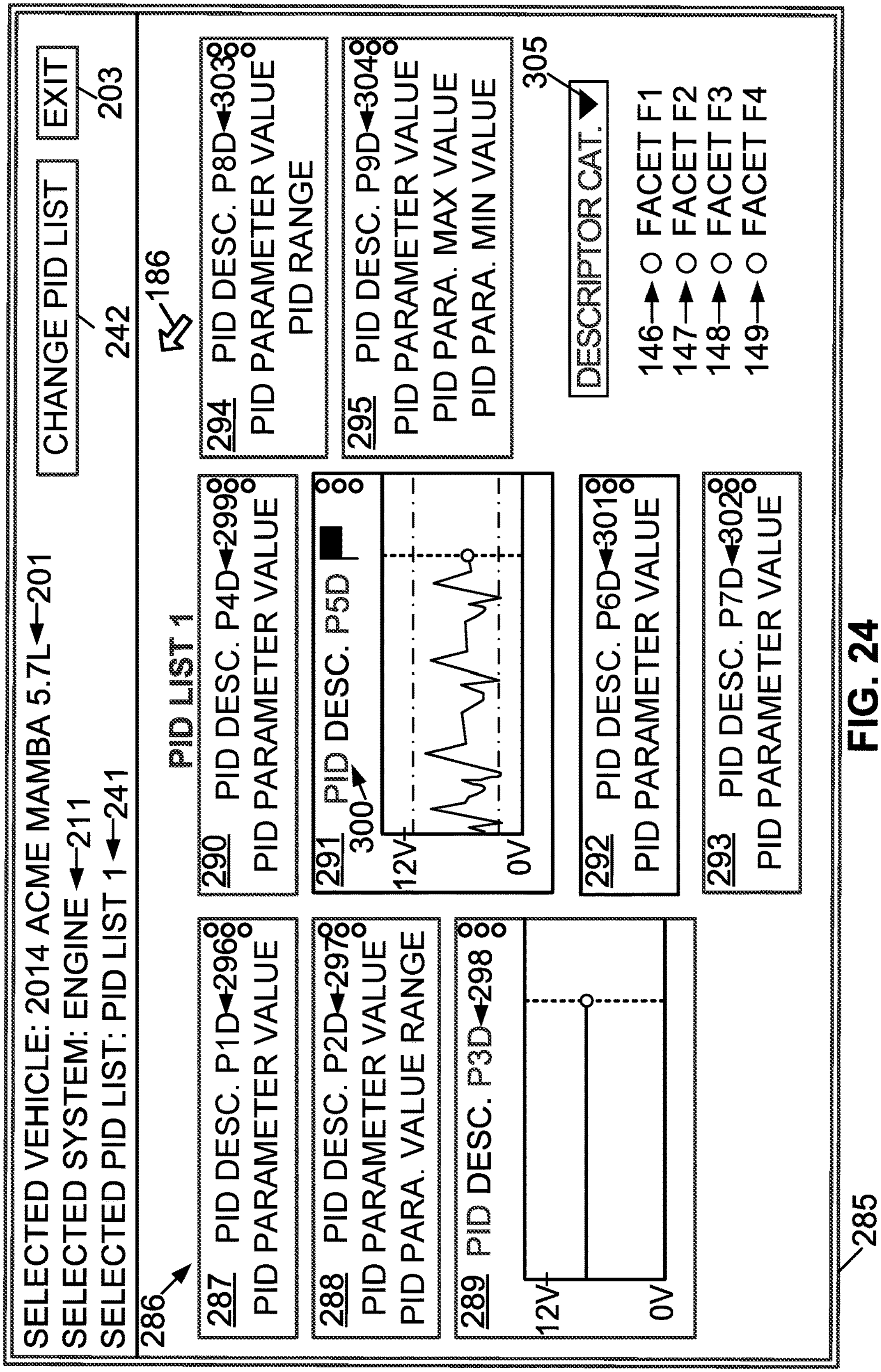

Next, FIG. 24 shows another view of the GUI 285. In this view, the USC 305 is not currently selected such that the USC 306, 307, 308, 309 is not output within the GUI 285. In FIG. 23, each PID descriptor 296, 297, 298, 299, 300, 301, 302, 303, 304 includes a suffix D to represent that the PID descriptor 296, 297, 298, 299, 300, 301, 302, 303, 304 is part of the PID descriptor category D. As an example, the GUI 285 as shown in FIG. 24 can be output on the display 74 in response to a selection of a USC to select the category D of PID descriptors (e.g., the USC 309 shown in FIG. 23).

FIG. 24 also shows the GUI 285 including a USC 146, 147, 148, 149 for selecting a facet F1, F2, F3, F4. The facet F1, F2, F3, F4 can include any of a variety of facets, such a spatial position facet, a units facet, or any other facet characteristic for filtering the PID data shown within the GUI 285. In accordance with at least some embodiments, the facets in two different GUIs are identical. In accordance with at least some other embodiments, one or more facets in two different GUIs are different from one another. Other examples of facets include sensor type, engine cylinder number, engine bank identifier (e.g., engine bank number), and measurement type. As an example, the measurement type can include pressure, voltage, ratio, temperature, or counts. As another example, the units facet can include percent, KPA, PSI, volts DC, volts AC, amps DC, amps AC, miles per hour, kilometers per hour, grams per second, degrees Fahrenheit, or degrees Celsius, among others.

Figure 25:
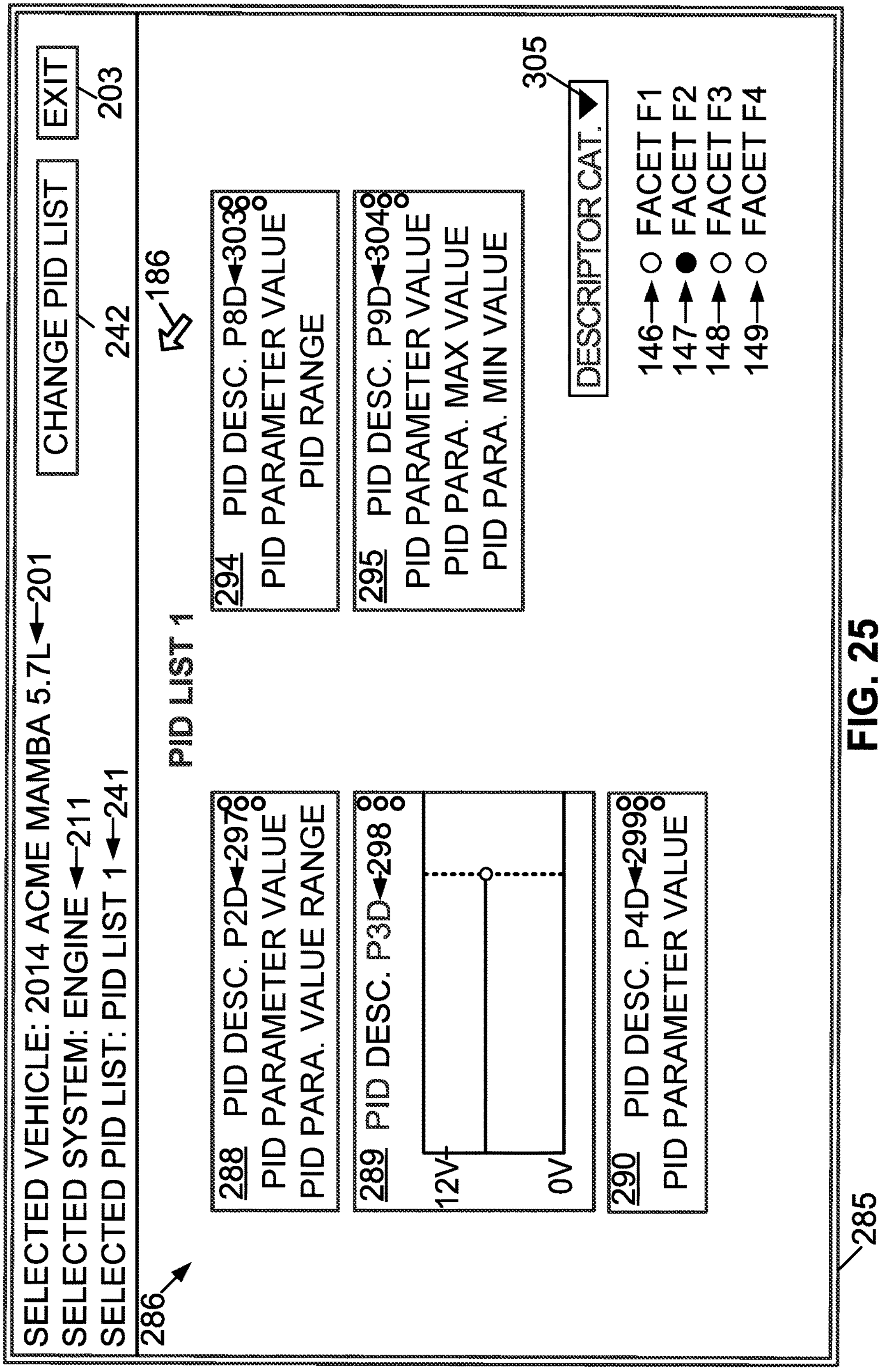

Next, FIG. 25 shows another view of the GUI 285. In this view, the USC 147 for facet selector F2 is selected (represented with black fill) and the processor has filtered which PID data is shown within the GUI 285 as compared to the PID data shown within the GUI 285 when none of the USC 146, 147, 148, 149 is selected. Based on the view of the GUI 285 in FIG. 25, the PIDs P2, P3, P4, P8, P9 correspond to the facet F2. As an example, if the facet F2 represents temperature, then the PIDs P2, P3, P4, P8, P9 correspond to temperature, and the other PIDs P1, P5, P6, P7 shown in the GUI 285 in FIG. 24 do not correspond to temperature. A person having ordinary skill in the art will understand that a GUI can include a quantity of USC corresponding to a facet other than four USCs.

By comparing FIG. 24 and FIG. 25, it can be seen that by selecting a USC corresponding to a facet characteristic, such as the USC147, the VST 3, 60 and/or the processor 62 can modify a GUI by removing containers and/or data that do not correspond to the facet characteristic without displaying or providing a user with data that can be used to determine which containers and/or data are to be removed in response to a selection of a USC corresponding to a facet characteristic.

Next, FIG. 26 shows a GUI 320 that shows a functional test list (i.e., FUNCT1ONAL TEST LIST 1) in accordance with the example embodiments. The GUI 320 includes the vehicle identifier 201, the USC 203, and the system identifier 211, each of which is discussed above. The GUI 320 includes a functional test list identifier 321. The functional test list identifier 321 can be based on a functional test list determined by selection(s) made via the GUI 225 shown in FIG. 13. The GUI 320 can be displayed in response to a selection of the USC 227 after a selection of the USC 228 within the GUI 225, all shown in FIG. 13.

The GUI 320 includes a USC 322 selectable to cause the VST 3, 60 to present options for changing the functional test list identifier 321. As an example, the VST 3, 60 can output the GUI 225 in response to determining the USC 322 was selected from the GUI 320.

The GUI 320 includes a USC set 323. As shown in FIG. 26, the USC set 323 includes a USC 324, 325, 326, 327. The USC 324, 325, 326, 327 includes a functional test descriptor FT1A, FT2A, FT3A, FT4A, respectively. Each of those functional test descriptors includes a suffix A to indicate that the function descriptor is part of a category A of functional test descriptors.

The suffix A or B is used in FIG. 26 and FIG. 27 to show that a functional test corresponding to the functional test descriptor belongs to a particular category of functional test descriptors. A person skilled in the art will understand that a functional test descriptor need not include any suffix. For example, the functional test descriptor FT1A, FT2A, FT3A, FT4A can be represented as "enable EGR valve," "disable EGR valve," "enable WPS valve," "disable WPS valve," respectively. Other examples of functional test descriptors without a suffix are possible.

The GUI 320 also includes a USC set 328 including a USC 329, 330, 337, 338. The USC 329, 330, 337, 338 is operable for selecting a functional test descriptor category. The GUI 320 represents the functional test descriptor categories as Category A, Category B, Category C, and Category D. The GUI 320 includes a USC 331 that is selectable to cause the VST 3, 60 to change the functional test descriptors within the USC set 323 from a currently-selected functional test descriptor category to a functional test descriptor category selected using the USC 329, the USC 330, the USC 337, or the USC 338. In the view of the GUI 320 shown in FIG. 26, the functional test descriptors within the USC set 323 are arranged according to the Category A of functional test descriptors.

A person having ordinary skill in the art will understand that the USC set 328 can include fewer than or more than four USCs to respectively select from among a number of categories of functional test descriptors less than or greater than four. The USC 330 is shown with an X to indicate that the USC 330 has been selected. In at least some embodiments, selecting a functional test descriptor category via a USC, such as the USC 330 causes the VST 3, 60 to change the functional test descriptors within and/or corresponding to that USC to select a functional test descriptor category without having to select another USC, such as the USC 331.

Figure 28:
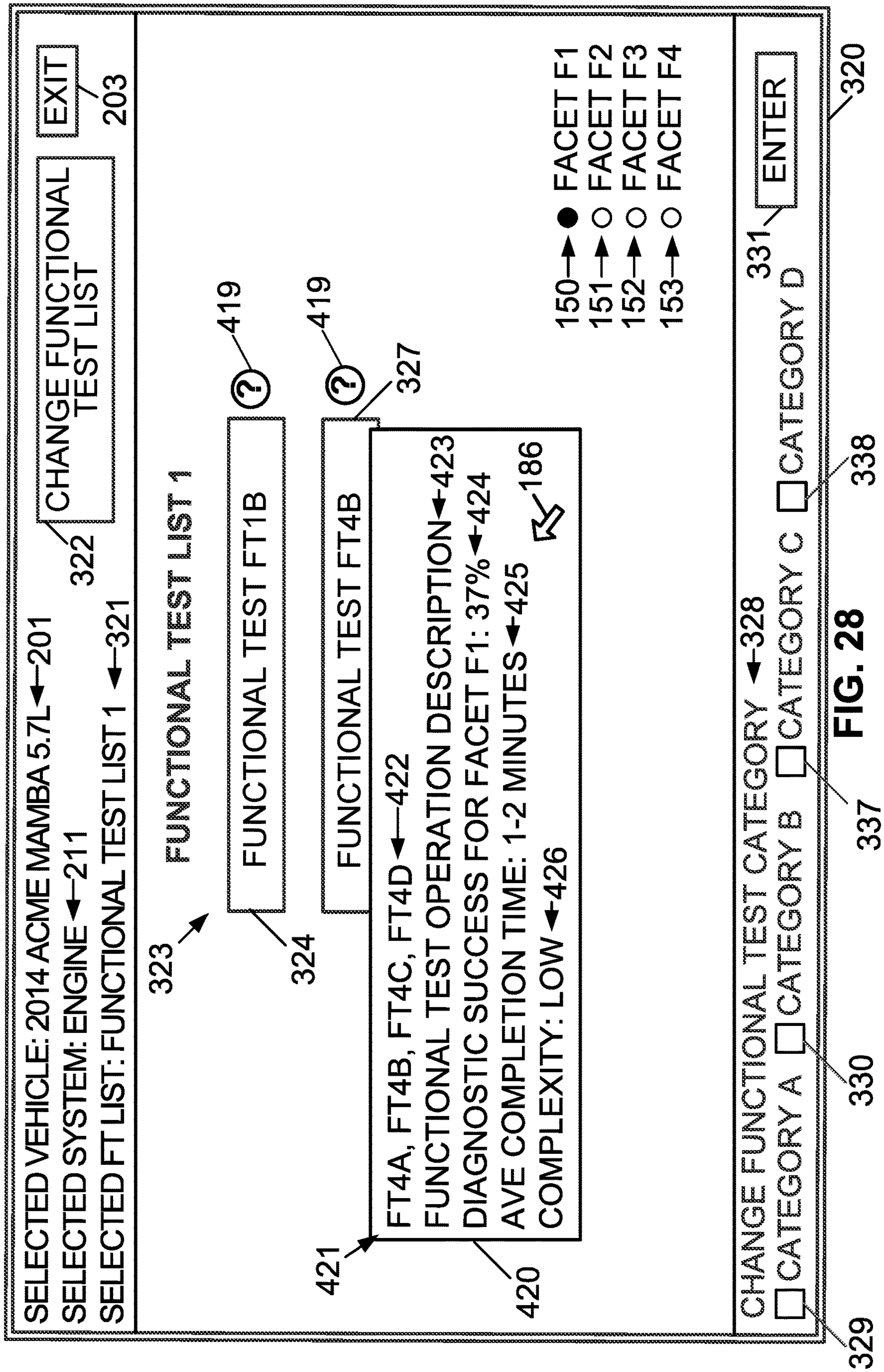

FIG. 26 also shows the GUI 320 including a USC 150, 151, 152, 153 for selecting a facet F1, F2, F3, F4. The facet F1, F2, F3, F4 can include any of a variety of facets, such a spatial facet, a units facet, or any other facet characteristic for filtering the functional tests shown within the GUI 320. Filtering the functional tests can include the processor 62 removing containers including functional test descriptors that do not correspond to the facet for the selected USC. The processor 62 can rearrange within a GUI one or more containers including a function test descriptor that corresponds to the facet for the selected USC. FIG. 27 and FIG. 28 show how containers including a function test descriptor are filtered or arranged in response to a selection of the USC 150.

The USC 324, 325, 326, 327 includes a USC 419. The USC 419 can be referred to as an information button. Any other or all other containers including a functional test descriptor can include a USC like the USC 419, but that USC is not shown in all drawings including such container to improve clarity of the drawings. The USC 419 is selectable to cause the processor to determine supplemental information regarding the functional test corresponding to the container including the USC 419. As an example, the processor 62 can determine supplemental information from one or more data sources (e.g., the server 130 and/or the memory 63). The description corresponding to FIG. 28 includes further details regarding use of the USC 419.

Next, FIG. 27 shows another view of the GUI 320. In this view, the USC 324, 325, 326, 327 includes a functional test descriptor FT1B, FT2B, FT3B, FT4B, respectively. Each of those functional test descriptors includes a suffix B to indicate that the function descriptor is part of a category B of functional test descriptors. For example, the functional test descriptor FT1B, FT2B, FT3B, FT4B can be represented as "enable exhaust gas recirculation valve," "disable exhaust gas recirculation valve," "enable wastegate purge solenoid valve," "disable wastegate purge solenoid valve," respectively.

In accordance with at least some embodiments, one or more aspects of the GUI 320 as shown in FIG. 27 can be output on the display in response to a selection of the USC 330 and then a selection of the USC 331 when the GUI 320 is output as shown in FIG. 26.

In FIG. 27, the USC 329 is shown with an X to indicate that the USC 329 has been selected. In at least some embodiments, after selecting the USC 329 and then the USC 331, the VST 3, 60 can output the GUI 320 as shown in FIG. 26 (i.e., with functional test descriptors from the category A of functional test descriptors).

Next, FIG. 28 shows another view of the GUI 320. In this view, the USC 150 for facet selector F1 is selected (represented with black fill) and the processor has filtered which functional tests are shown within the GUI 320 as compared to the functional tests shown within the GUI 320 when none of the USC 150, 151, 152, 153 is selected. Based on the view of the GUI 320 in FIG. 28, the functional tests FT1B, FT2B correspond to the facet F1. As an example, if the facet F1 represents pressure, then the functional tests FT1, FT2 correspond to pressure, and the other functional tests FT3, FT4 shown in the GUI 320 in FIG. 27 do not correspond to pressure.

Additionally, the view of the GUI 320 shown in FIG. 28 also includes a container 420 that the processor 62 generates and populates with information in response to selection of the USC 419 corresponding to the USC 327. The cursor 186 can be used to select the USC 419. The cursor 186 can be active within the container 420. The container 420 can be displayed continuously while the cursor 186 is positioned within the container 420. The container 420 includes supplemental information 421 corresponding to the functional test FT4. A container including supplemental information as a result of selecting the USC 419 corresponding to another functional test comprises supplemental information corresponding to the other functional test.

Selection of the USC 419 can act an interrupt to cause the processor to search for and/or request supplemental information corresponding to the functional test. For example, the processor can search the memory 63 for the supplemental information. In at least some embodiments, supplemental information corresponding to a functional test is stored in the memory 63, such as within the service information 92 and/or the mapping data 93. As another example, if the memory 63 does not include the supplemental information corresponding to the functional test, then the processor can transmit to the server 130 a request for the supplemental information corresponding to the functional test. Upon receiving the supplemental information, the processor can write the supplemental information into the memory 63 and/or cause the supplemental information to be output on the display. Examples of displaying supplemental information corresponding to a functional test are discussed below.

As an example, the supplemental information 421 includes alternative functional test descriptors 422 corresponding to functional test FT4 (i.e., FT4A, FT4C, FT4D) as well as the functional test descriptor (i.e., FT4B) within the USC 327 when the USC 419 was selected. As another example, the supplemental information 421 can include a functional test operation description 423 corresponding to functional test FT4. As yet another example, the supplemental information 421 includes a diagnostic success rate 424, an average completion time 425, and a complexity value 426. The diagnostic success rate 424 can include data that indicates how successful technicians were in repairing a vehicle based on performing the functional test to a similar vehicle. The average completion time 425 can include data that indicates how long it typically takes to perform the functional test. The complexity value 426 can include data that indicates how challenging technicians find performing the functional test relative to other functional tests for the vehicle and/or component being diagnosed. Other examples of supplemental information output within the container 420 in response to a selection of the USC 419 are also possible.

The functional test operation description 423 includes data that describes functional test operation of a functional test indicated at and/or within the USC 327. As an example, a functional test operation description can indicate which vehicle component(s) are controlled during performance of the test and/or which circuits (e.g., electrical circuits) within the vehicle are affected directly by performance of the test. As another example, a functional test operation description can indicate whether a functional test is a toggle test that switches a vehicle component and/or circuit between two operating states, or a variable control test that commands a vehicle component and/or circuit to a particular value from among more than two possible values (such as multiple duty cycle values of a pulse width modulated (PWM) signal.

In at least some embodiments, the processor 62 modifies the GUI 320 in response to a selection of the USC 419. In that regard, the processor 62 modifies the GUI 320 by outputting container 420 within the GUI 320. In at least some of those embodiments, the container 420 is arranged as a pop-up container that overlays at least a portion of the USC 327 that includes the USC 419 selected to cause output of the container 420. In at least some other embodiments, the container 420 is displayed in proximity to the USC 327 without overlaying any portion of the USC 327.

Next, FIG. 29 shows a GUI 340 that shows a component test list (i.e., COMPONENT TEST LIST 1) in accordance with the example embodiments. The GUI 340 includes the vehicle identifier 201, the USC 203, and the system identifier 211, each of which is discussed above. The GUI 340 includes a component test list identifier 341. The component test list identifier 341 can be based on a component test list determined by selection(s) made via the GUI 235 shown in FIG. 15. The GUI 340 can be displayed in response to a selection of the USC 237 after a selection of the USC 238 within the GUI 235, all shown in FIG. 15.

The GUI 340 includes a USC 342 selectable to cause the VST 3, 60 to present options for changing the component test list identifier 341. As an example, the VST 3, 60 can output the GUI 235 in response to determining the USC 342 was selected from the GUI 340.

The GUI 340 includes a USC set 343. As shown in FIG. 29, the USC set 343 includes a USC 344, 345, 346, 347. The USC 344, 345, 346, 347 includes a component test descriptor CT1A, CT2A, CT3A, CT4A, respectively. Each of those component test descriptors includes a suffix A to indicate that the function descriptor is part of a category A of component test descriptors.

The suffix A or B is used in FIG. 29 and FIG. 30 to show that a component test corresponding to the component test descriptor belongs to a particular category of component test descriptors. A person skilled in the art will understand that a functional test descriptor need not include any suffix. For example, the component test descriptor CT1A, CT2A, CT3A, CT4A can be represented as "measure EGR valve voltage," "measure EGR current," "measure WPS valve voltage," "measure WPS valve current," respectively. Other examples of component test descriptors without a suffix are possible.

The GUI 340 also includes a USC set 348 including a USC 349, 350, 372, 373. The USC 349, 350, 372, 373 is operable for selecting a component test descriptor category. The GUI 340 represents the component test descriptor categories as Category A, Category B, Category C, and Category D. The GUI 340 includes a USC 351 that is selectable to cause the VST 3, 60 to change the component test descriptors within the USC set 343 from a currently-selected component test descriptor category to a component test descriptor category selected using the USC 349 or the USC 350. In the view of the GUI 340 shown in FIG. 29, the component test descriptors within the USC set 343 are arranged according to the Category A of component test descriptors.

A person having ordinary skill in the art will understand that the USC set 348 can include fewer than or more than four USCs to respectively select from among a number of categories of functional test descriptors less than or greater than four. The USC 350 is shown with an X to indicate that the USC 350 has been selected. In at least some embodiments, selecting a component 1 test descriptor category via a USC, such as the USC 350 causes the VST 3, 60 to change the component test descriptors within and/or corresponding to that USC to select a component test descriptor category without having to select another USC, such as the USC 351.

Figure 31:
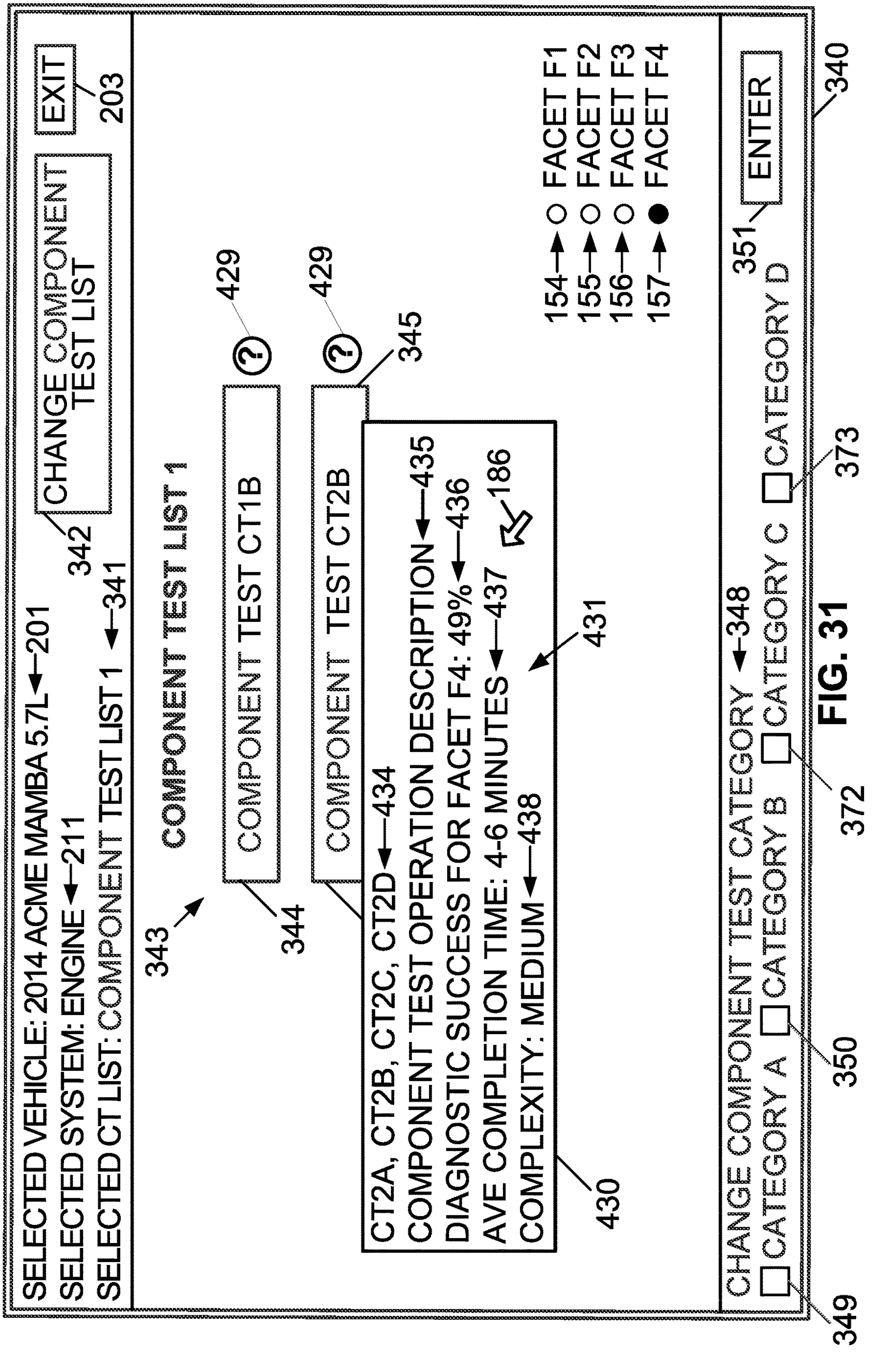

FIG. 29 also shows the GUI 340 including a USC 154, 155, 156, 157 for selecting a facet F1, F2, F3, F4. The facet F1, F2, F3, F4 can include any of a variety of facets, such a spatial facet, a units facet, or any other facet characteristic for filtering the component tests shown within the GUI 340. Filtering the component tests can include the processor 62 removing containers including component test descriptors that do not correspond to the facet for the selected USC. The processor 62 can rearrange within a GUI one or more containers including a component test descriptor that corresponds to the facet for the selected USC. FIG. 30 and FIG. 31 show how containers including a component test descriptor are filtered or arranged in response to a selection of the USC 157.

The USC 344, 345, 346, 347 includes a USC 429. The USC 429 can be referred to as an information button. Any other or all other containers including a component test descriptor can include a USC like the USC 429, but that USC is not shown in all drawings including such container to improve clarity of the drawings. The USC 429 is selectable to cause the processor to determine supplemental information regarding the component test corresponding to the container including the USC 429. As an example, the processor 62 can determine supplemental information from one or more data sources (e.g., the server 130 and/or the memory 63). The description corresponding to FIG. 31 includes further details regarding use of the USC 429.

Next, FIG. 30 shows another view of the GUI 340. In this view, the USC 344, 345, 346, 347 includes a component test descriptor CT1B, CT2B, CT3B, CT4B, respectively. Each of those component test descriptors includes a suffix B to indicate that the function descriptor is part of a category B of component test descriptors. As an example, one or more aspects of the GUI 340 as shown in FIG. 30 can be output on the display in response to a selection of the USC 350 and then a selection of the USC 351 when the GUI 340 is output as shown in FIG. 29.

In FIG. 30, the USC 349 is shown with an X to indicate that the USC 349 has been selected. In at least some embodiments, after selecting the USC 349 and then the USC 351, the VST 3, 60 can output the GUI 340 as shown in FIG. 29 (i.e., with component test descriptors from the category A of component test descriptors).

Next, FIG. 31 shows another view of the GUI 340. In this view, the USC 157 for facet selector F4 is selected (represented with black fill) and the processor has filtered which component tests are shown within the GUI 340 as compared to the component tests shown within the GUI 340 when none of the USC 154, 155, 156, 157 is selected. Based on the view of the GUI 340 in FIG. 31, the component tests CT1, CT2 correspond to the facet F4. As an example, if the facet F4 represents the spatial location "front," then the component tests CT1 and CT2 correspond to the spatial location "front," and the other component tests CT3, CT4 shown in the GUI 340 in FIG. 30 do not correspond to the spatial location "front."

Additionally, the view of the GUI 340 shown in FIG. 31 also includes a container 430 that the processor 62 generates and populates with information in response to selection of the USC 429 corresponding to the USC 345. The cursor 186 can be used to select the USC 429. The cursor 186 can be active within the container 430. The container 430 can be displayed continuously while the cursor 186 is positioned within the container 430. The container 430 includes supplemental information 431 corresponding to the component test CT2B. A container including supplemental information as a result of selecting the USC 429 corresponding to another component test comprises supplemental information corresponding to the other component test.

Selection of the USC 429 can act an interrupt to cause the processor to search for and/or request supplemental information corresponding to the component test. For example, the processor can search the memory 63 for the supplemental information. In at least some embodiments, supplemental information corresponding to a component test is stored in the memory 63, such as within the service information 92 and/or the mapping data 93. As another example, if the memory 63 does not include the supplemental information corresponding to the component test, then the processor can transmit to the server 130 a request for the supplemental information corresponding to the component test. Upon receiving the supplemental information, the processor can write the supplemental information into the memory 63 and/or cause the supplemental information to be output on the display. Examples of displaying supplemental information corresponding to a component test are discussed below.

As an example, the supplemental information 431 includes alternative component test descriptors 434 corresponding to functional test CT2 (i.e., CT2A, CT2C, CT2D) as well as the component test descriptor (i.e., CT2B) within the USC 345 when the USC 429 was selected. As another example, the supplemental information 431 can include a component test operation description 435 corresponding to component test CT2. As yet another example, the supplemental information 431 includes a diagnostic success rate 436, an average completion time 437, and a complexity value 438. The diagnostic success rate 436 can include data that indicates how successful technicians were in repairing a vehicle based on performing the component test to a similar vehicle. The average completion time 437 can include data that indicates how long it typically takes to perform the component test. The complexity value 438 can include data that indicates how challenging technicians find performing the component test relative to other component tests for the vehicle and/or component being diagnosed. Other examples of supplemental information output within the container 430 in response to a selection of the USC 429 are also possible.

The component test operation description 435 includes data that describes component test operation of a component test indicated at and/or within the USC 345. As an example, a component test operation description can indicate what type of test is performed by a component test corresponding to the component test operation description. As an example, a component test operation description can indicate a type of measurement made during the test, such as a voltage, current, resistance, frequency, pressure, or timing measurement. As another example, a component test description can indicate a type of measurement device (e.g., an oscilloscope, a multi-meter, or a probe specified for the component test). As yet another example, a component test operation description can indicate how the measurement device is to be connected to a vehicle to carry out the component test. Other examples of a component test operation description are also possible.

In at least some embodiments, the processor 62 modifies the GUI 340 in response to a selection of the USC 429. In that regard, the processor 62 modifies the GUI 340 by outputting container 430 within the GUI 340. In at least some of those embodiments, the container 430 is arranged as a pop-up container that overlays at least a portion of the USC 345 that includes the USC 429 selected to cause output of the container 430. In at least some other embodiments, the container 430 is displayed in proximity to the USC 345 without overlaying any portion of the USC 345.

Figure 32:
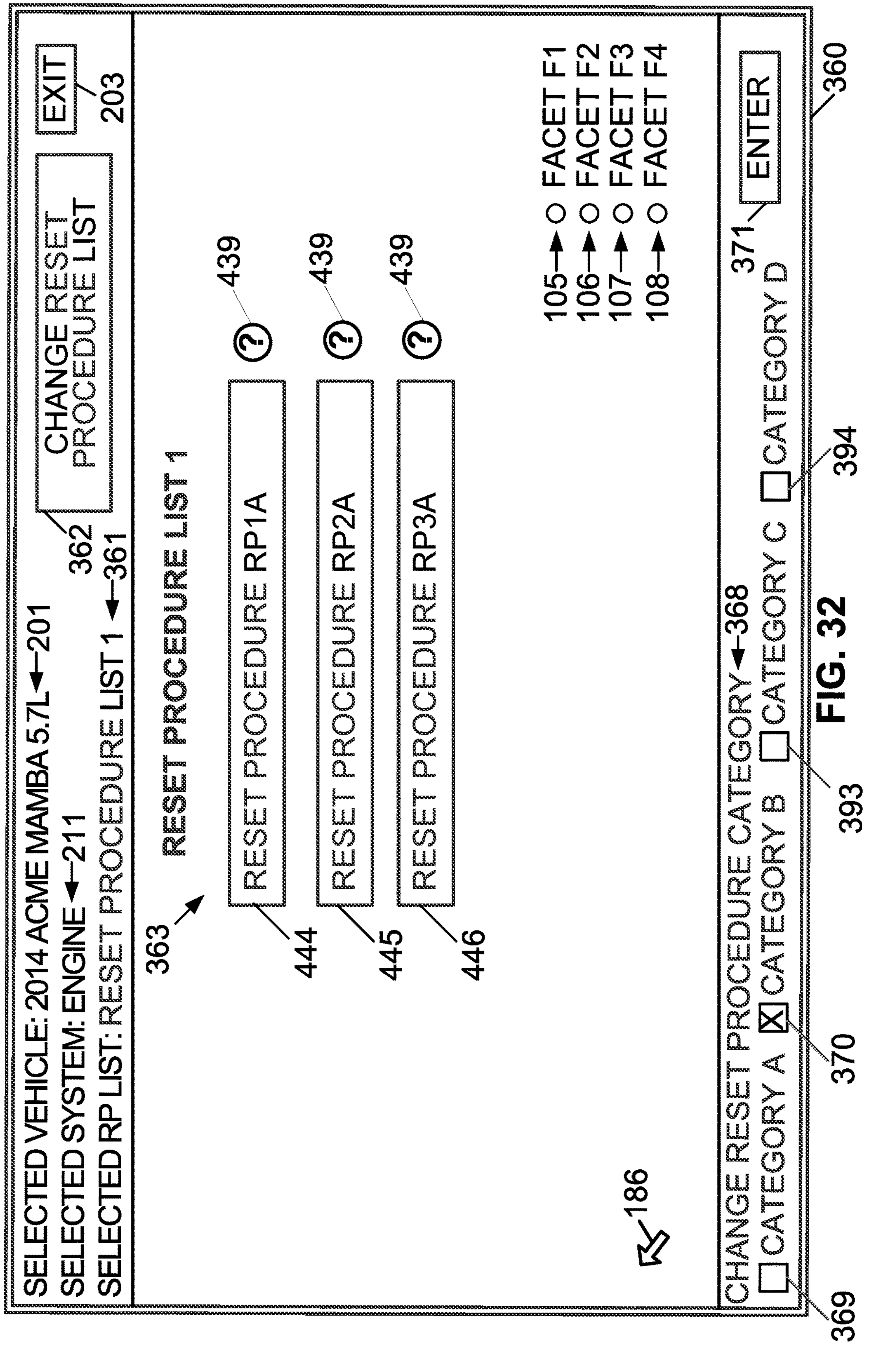

Next, FIG. 32 shows a GUI 360 that shows a reset procedure list (i.e., RESET PROCEDURE LIST 1) in accordance with the example embodiments. The GUI 360 includes the vehicle identifier 201, the USC 203, and the system identifier 211, each of which is discussed above. The GUI 360 includes a reset procedure list identifier 361. The reset procedure list identifier 361 can be based on a reset procedure list determined by selection(s) made via the GUI 230 shown in FIG. 14. The GUI 360 can be displayed in response to a selection of the USC 232 after a selection of the USC 233 within the GUI 230, all shown in FIG. 14.

The GUI 360 includes a USC 362 selectable to cause the VST 3, 60 to present options for changing the reset procedure list identifier 361. As an example, the VST 3, 60 can output the GUI 230 in response to determining the USC 362 was selected from the GUI 360.

The GUI 360 includes a USC set 363. As shown in FIG. 32, the USC set 363 includes a USC 364, 365, 366. The USC 364, 365, 366 includes a reset procedure descriptor RP1A, RP2A, RP3A, respectively. Each of those reset procedure descriptors includes a suffix A to indicate that the function descriptor is part of a category A of reset procedure descriptors.

Figure 33:
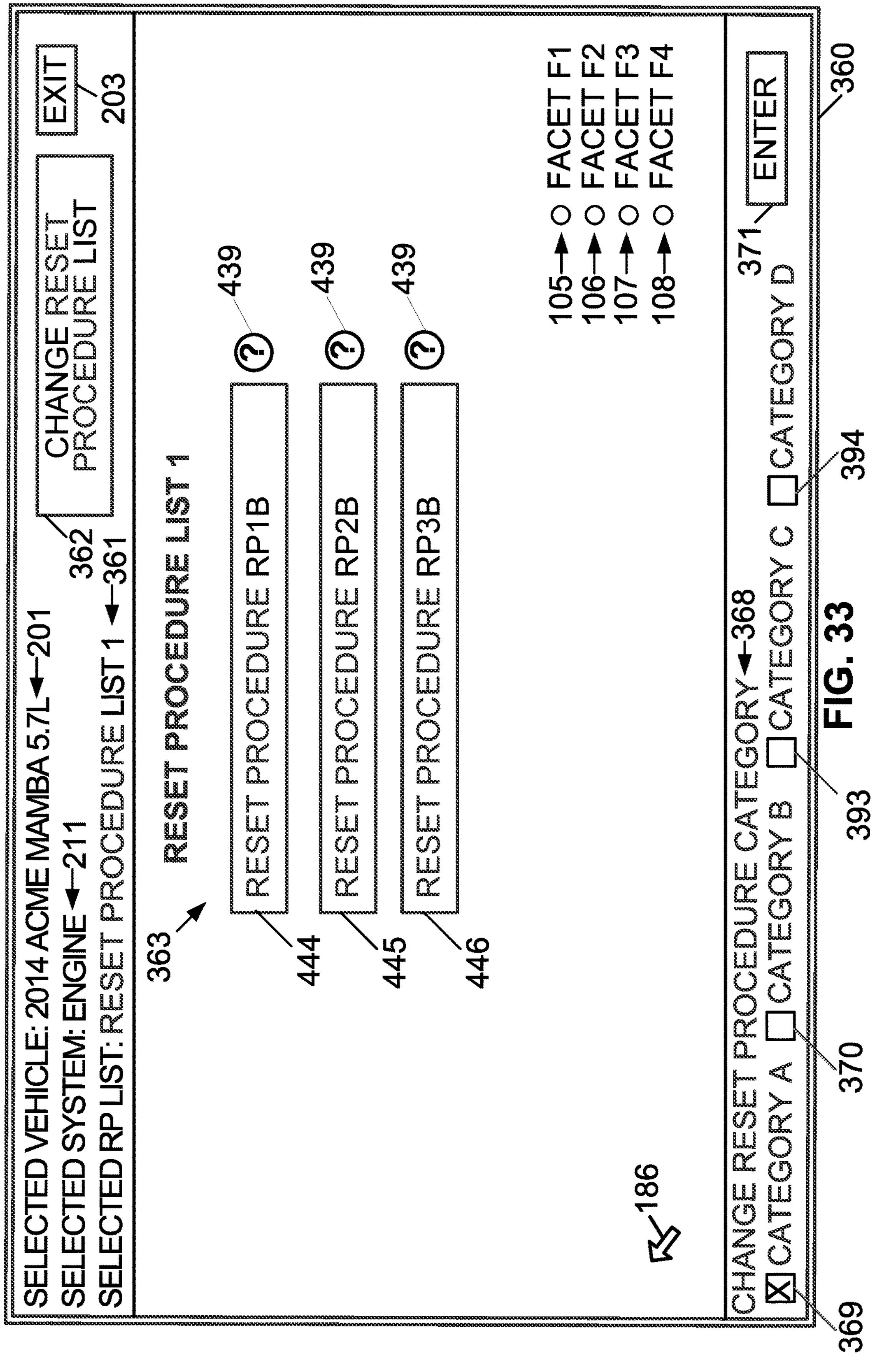

The suffix A or B is used in FIG. 32 and FIG. 33 to show that a reset procedure corresponding to the reset procedure descriptor belongs to a particular category of reset procedure descriptors. A person skilled in the art will understand that a reset procedure descriptor need not include any suffix. For example, the reset procedure descriptor RP1A, RP2A, RP3A can be represented as "reset oil life," "reset ST block learn," "reset LT block learn," respectively. ST refers to short term, whereas LT refers to long term. Other examples of reset procedure descriptors without a suffix are possible.

The GUI 360 also includes a USC set 368 including a USC 369, 370, 393, 394. The USC 369, 370, 393, 394 is operable for selecting a reset procedure descriptor category. The GUI 360 represents the reset procedure descriptor categories as Category A, Category B, Category C, and Category D. The GUI 360 includes a USC 371 that is selectable to cause the VST 3, 60 to change the reset procedure descriptors within the USC set 363 from a currently-selected reset procedure descriptor category to a reset procedure descriptor category selected using the USC 369, the USC 370, the USC 393, or the USC 394. In the view of the GUI 360 shown in FIG. 32, the reset procedure descriptors within the USC set 363 are arranged according to the Category A of reset procedure descriptors.

A person having ordinary skill in the art will understand that the USC set 368 can include fewer than or more than four USCs to respectively select from among a number of categories of functional test descriptors less than or greater than four. The USC 370 is shown with an X to indicate that the USC 370 has been selected. In at least some embodiments, selecting a reset procedure descriptor category via a USC, such as the USC 370 causes the VST 3, 60 to change the reset procedure descriptors within and/or corresponding to that USC to select a reset procedure descriptor category without having to select another USC, such as the USC 371.

Figure 34:
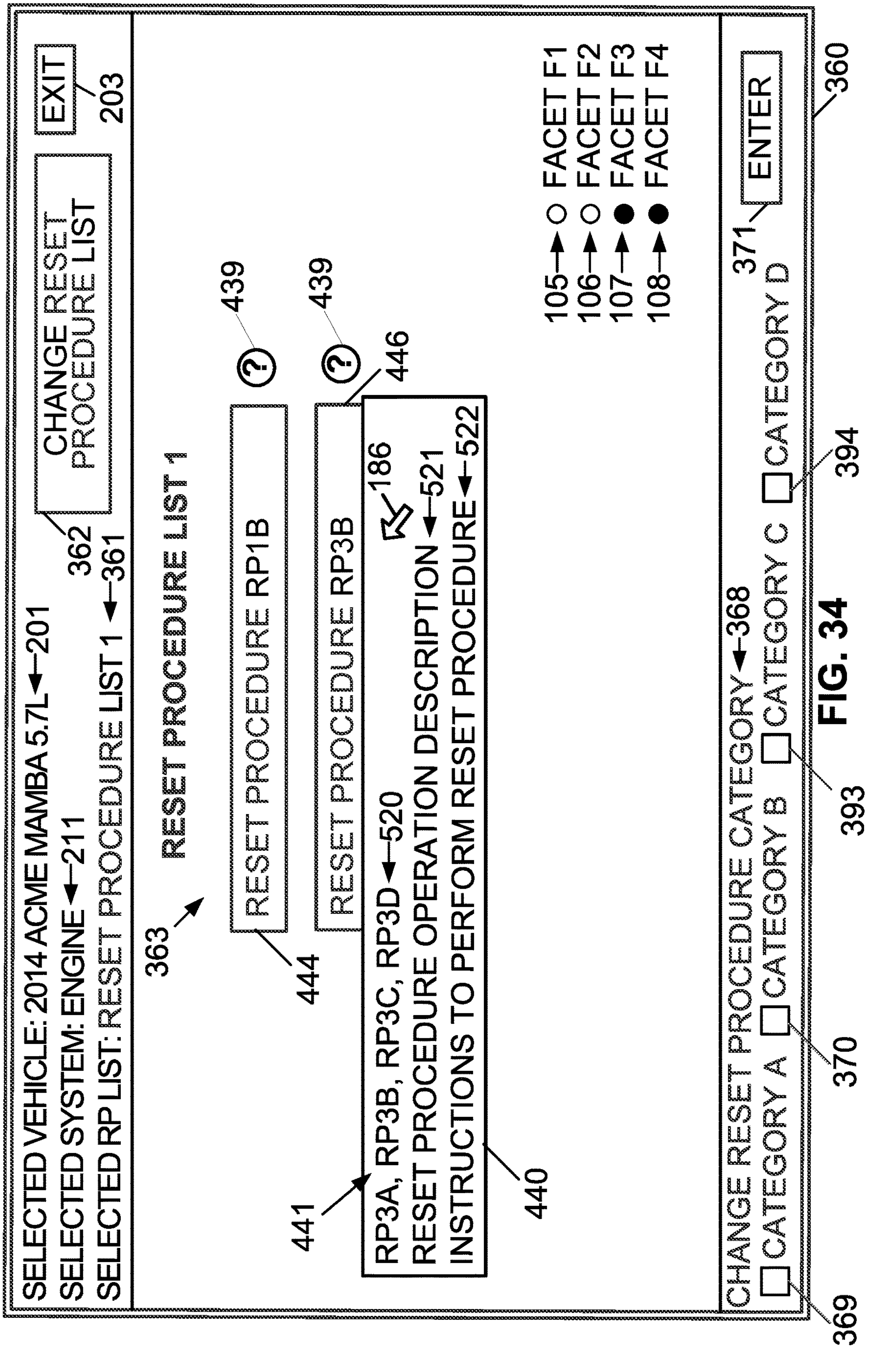

FIG. 32 also shows the GUI 360 including a USC 105, 106, 107, 108 for selecting a facet F1, F2, F3, F4. The facet F1, F2, F3, F4 can include any of a variety of facets, such a spatial facet, a units facet, or any other facet characteristic for filtering the reset procedures shown within the GUI 360. Filtering the reset procedures can include the processor 62 removing containers including reset procedure descriptors that do not correspond to the facet for the selected USC. The processor 62 can rearrange within a GUI one or more containers including a reset procedure descriptor that corresponds to the facet for the selected USC. FIG. 33 and FIG. 34 show how containers including a reset procedure descriptor are filtered or arranged in response to a selection of the USC 107 and the USC 108.

The USC 444, 445, 446 includes a USC 439. The USC 439 can be referred to as an information button. Any other or all other containers including a reset procedure descriptor can include a USC like the USC 439, but that USC is not shown in all drawings including such container to improve clarity of the drawings. The USC 439 is selectable to cause the processor to determine supplemental information regarding the reset procedure corresponding to the container including the USC 439. As an example, the processor 62 can determine supplemental information from one or more data sources (e.g., the server 130 and/or the memory 63). The description corresponding to FIG. 28 includes further details regarding use of the USC 439.

Next, FIG. 33 shows another view of the GUI 360. In this view, the USC 364, 365, 366 includes a reset procedure descriptor RP1B, RP2B, RP3B, respectively. Each of those reset procedure descriptors includes a suffix B to indicate that the function descriptor is part of a category B of reset procedure descriptors. As an example, the reset procedure descriptor RP1B, RP2B, RP3B can be represented as "reset engine oil life," "reset short-term block learn," "reset long-term block learn," respectively. As another example, one or more aspects of the GUI 360 as shown in FIG. 33 can be output on the display in response to a selection of the USC 370 and then a selection of the USC 371 when the GUI 360 is output as shown in FIG. 32.

In FIG. 33, the USC 369 is shown with an X to indicate that the USC 369 has been selected. In at least some embodiments, after selecting the USC 369 and then the USC 371, the VST 3, 60 can output the GUI 360 as shown in FIG. 32 (i.e., with reset procedure descriptors from the category A of reset procedure descriptors).

Next, FIG. 34 shows another view of the GUI 360. In this view, the USC 107 for facet selector F3 and the USC 108 for facet selector F4 are selected (represented with black fill) and the processor has filtered which reset procedures are shown within the GUI 360 as compared to the reset procedures shown within the GUI 360 when none of the USC 105, 106, 107, 108 is selected. Based on the view of the GUI 360 in FIG. 34, the reset procedures RP1, RP3 correspond to the combination of facet F3 and facet F4. As an example, if the facet F3 represents a rear spatial location and the facet F4 represents a front spatial location, then the reset procedures correspond to the rear spatial location and the front spatial location, and the other reset procedures RP2 shown in the GUI 360 in FIG. 33 do not correspond to the rear spatial location and the front spatial location. This example shows that more than one USC corresponding to a facet characteristic can be selected to modify a GUI based on the selected facet characteristic(s). By the way, unselecting USC(s) previously selected can cause the GUI to show content previously shown in the GUI. For example, unselecting the USC 107 and the USC 108 (shown as selected in FIG. 34) can cause the VST 3, 60 to output the GUI 360 as shown in FIG. 33.

Additionally, the view of the GUI 360 shown in FIG. 34 also includes a container 440 that the processor 62 generates and populates with information in response to selection of the USC 439 corresponding to the USC 446. The cursor 186 can be used to select the USC 439. The cursor 186 can be active within the container 440. The container 440 can be displayed continuously while the cursor 186 is positioned within the container 440. The container 440 includes supplemental information 441 corresponding to the reset procedure RP3B. A container including supplemental information as a result of selecting the USC 439 corresponding to another reset procedure comprises supplemental information corresponding to the other reset procedure.

Selection of the USC 439 can act an interrupt to cause the processor to search for and/or request supplemental information corresponding to the reset procedure. For example, the processor can search the memory 63 for the supplemental information. In at least some embodiments, supplemental information corresponding to a reset procedure is stored in the memory 63, such as within the service information 92 and/or the mapping data 93. As another example, if the memory 63 does not include the supplemental information corresponding to the reset procedure, then the processor can transmit to the server 130 a request for the supplemental information corresponding to the reset procedure. Upon receiving the supplemental information, the processor can write the supplemental information into the memory 63 and/or cause the supplemental information to be output on the display. Examples of displaying supplemental information corresponding to a reset procedure are discussed below.

As an example, the supplemental information 441 includes alternative reset procedure descriptors 520 corresponding to reset procedure RP3 (i.e., RP3A, RP3C, RP3D) as well as the reset procedure descriptor (i.e., RP3B) within the USC 446 when the USC 439 was selected. As another example, the supplemental information 441 can include a reset procedure operation description 521 corresponding to component test PR3. As yet another example, the supplemental information 441 includes instructions 522 to perform a reset procedure (e.g., the reset procedure RP3). Other examples of supplemental information output within the container 440 in response to a selection of the USC 439 are also possible.

The reset procedure operation description 521 includes data that describes reset procedure operation of a reset procedure indicated at and/or within the USC 446. As an example, a reset procedure operation description can indicate what an ECU within the vehicle does when it performs the reset. As another example, a reset procedure operation description can indicate how long it takes to perform the reset procedure. As yet another example, a reset procedure operation description can indicate an instruction for how the VST is to be operated and/or an operating state of the vehicle required for the reset procedure to be performed.

In at least some embodiments, the processor 62 modifies the GUI 360 in response to a selection of the USC 439. In that regard, the processor 62 modifies the GUI 360 by outputting container 440 within the GUI 360. In at least some of those embodiments, the container 440 is arranged as a pop-up container that overlays at least a portion of the USC 446 that includes the USC 439 selected to cause output of the container 440. In at least some other embodiments, the container 440 is displayed in proximity to the USC 446 without overlaying any portion of the USC 446.

Figure 35:
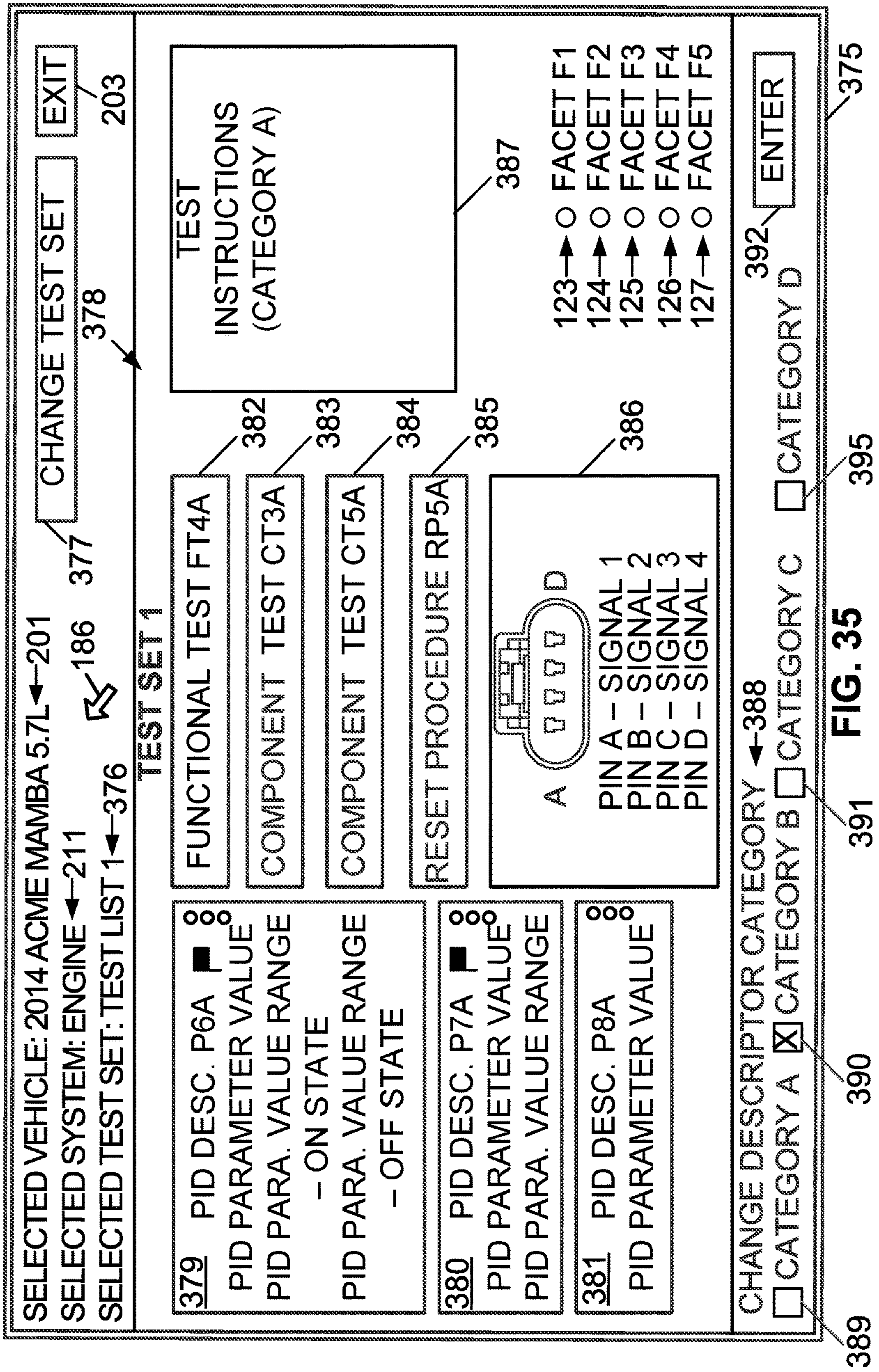

Next, FIG. 35 shows a GUI 375 that shows a test set (i.e., TEST SET 1) in accordance with the example embodiments. The GUI 375 includes the vehicle identifier 201, the USC 203, and the system identifier 211, each of which is discussed above. The GUI 375 includes a test set identifier 376. The test set identifier 376 can be based on a test set determined by selection(s) made via the GUI 220 shown in FIG. 12. The GUI 375 can be displayed in response to a selection of the USC 222 after a selection of the USC 223 within the GUI 220, all shown in FIG. 12.

The GUI 375 includes a USC 377 selectable to cause the VST 3, 60 to present options for changing the test set identifier 376. As an example, the VST 3, 60 can output the GUI 220 in response to determining the USC 377 was selected from the GUI 375.

The GUI 375 includes a set of containers 378 (e.g., test set containers). As shown in FIG. 35, the set of containers 378 includes a container 379, 380, 381, 382, 383, 384, 385, 386, 387. The container 379, 380, 381 includes a parameter identifier descriptor P6AA, P7AA, P8A, respectively. The container 382 includes a functional test identifier FT4A. The container 383, 384 includes a component test identifier CT3A, CT5A, respectively. The container 385 includes a reset procedure descriptor RP5A. All of those descriptors include includes a suffix A to indicate that the descriptor is part of a category A of descriptors. The container 386 includes connector information regarding a connector in the vehicle corresponding to the vehicle identifier 201. The container 387 includes a test instruction arranged according to Category A. As an example, the test instruction can include a textual instruction, a graphical instruction, and/or a video instruction.

The suffix A or B is used in FIG. 35 to FIG. 38 to show various aspects of the test set corresponding to the descriptor belonging to a particular category of descriptors. A person skilled in the art will understand that a descriptor for a PID, a functional test, a component test, a reset procedure, or a test set need not include any suffix.

The GUI 375 also includes a user-selectable control set 388 including a USC 389, 390, 391, 395. The USC 389, 390, 391, 395 is operable for selecting a descriptor category. The GUI 375 represents the descriptor categories as Category A, Category B, Category C, and Category D. The GUI 375 includes a USC 392 that is selectable to cause the VST 3, 60 to change the descriptors within the set of containers 378 from a currently-selected descriptor category to a descriptor category selected using the USC 389, the USC 390, the USC 391, or the USC 395. In the view of the GUI 375 shown in FIG. 35, the descriptors within the set of containers 378 are arranged according to the Category A of descriptors.

A person having ordinary skill in the art will understand that the user-selectable control set 388 can include a different quantity of USC to respectively select from different quantities of category descriptors. The USC 390 is shown with an X to indicate that the USC 390 has been selected. In at least some embodiments, selecting a descriptor category via a USC, such as the USC 390 causes the VST 3, 60 to change the descriptors within and/or corresponding to that USC to select a descriptor category without having to select another USC, such as the USC 392.

FIG. 35 also shows the GUI 375 including a USC 123, 124, 125, 126, 127 for selecting a facet F1, F2, F3, F4, F5. The facet F1, F2, F3, F4, F5 can include any of a variety of facets, such a spatial facet, a units facet, or any other facet characteristic for filtering the PIDs, functional tests, component tests, or reset procedures shown within the GUI 375.

Figure 36:
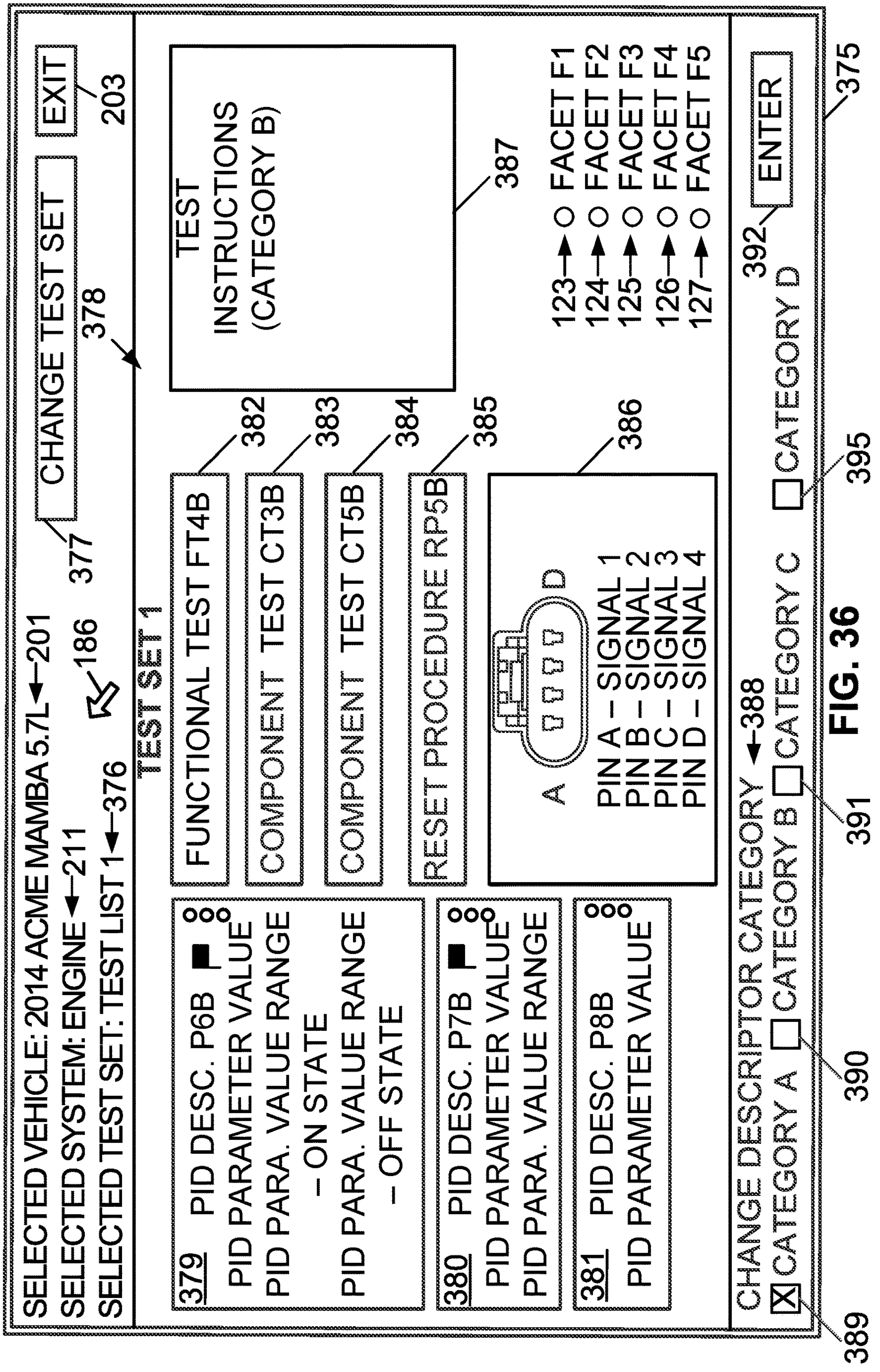

Next, FIG. 36 shows another view of the GUI 375. The container 379, 380, 381 includes a parameter identifier descriptor P6B, P7B, P8B, respectively. The container 382 includes a functional test identifier FT4B. The container 383, 384 includes a component test identifier CT3B, CT5B, respectively. The container 385 includes a reset procedure descriptor RP5B. All of those descriptors include a suffix B to indicate that the descriptor is part of a category B of descriptors.

In FIG. 36, the USC 389 is shown with an X to indicate that the USC 389 has been selected. In at least some embodiments, after selecting the USC 389 and then the USC 392, the VST 3, 60 can output the GUI 375 as shown in FIG. 35 (i.e., with descriptors from the category A of descriptors).

Figure 37:
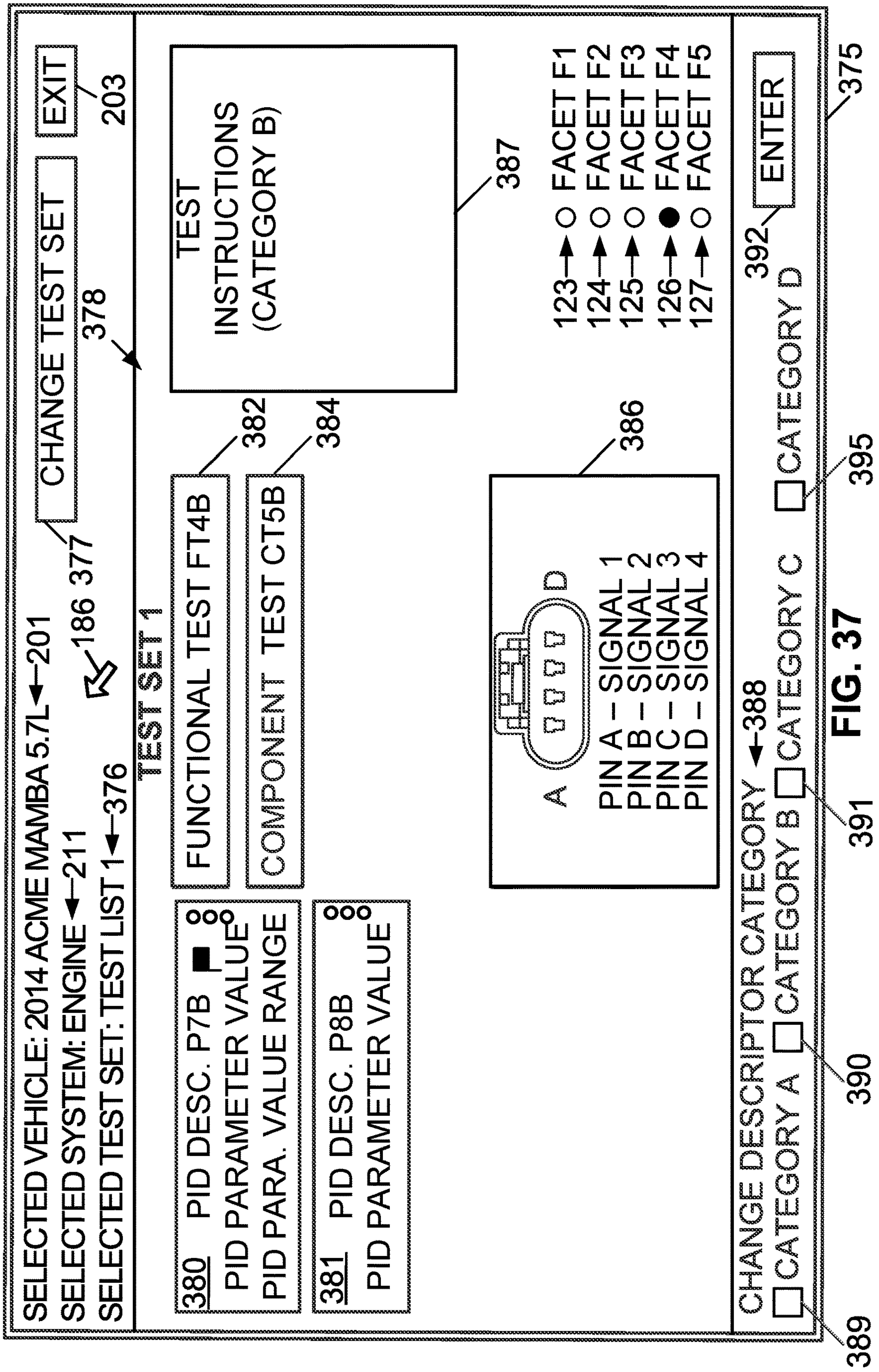

Next, FIG. 37 shows another view of the GUI 375. In this view, the USC 126 for facet selector F4 is selected (represented with black fill) and the processor has filtered which test set data is shown within the GUI 375 as compared to the test set data shown within the GUI 375 when none of the USC 123, 124, 125, 126, 127 is selected. Based on the view of the GUI 375 in FIG. 37, the PIDs P7, P8, the functional test FT4, and the component test CT5 correspond to the facet F4. As an example, if the facet F4 represents engine speed, then the PIDs P7, P8, the functional test FT4, and the component test CT5 correspond to engine speed, and the other PIDs P6, the component test CT3, and the reset procedure RP5 shown in the GUI 375 in FIG. 35 do not correspond to engine speed.

Figure 38:
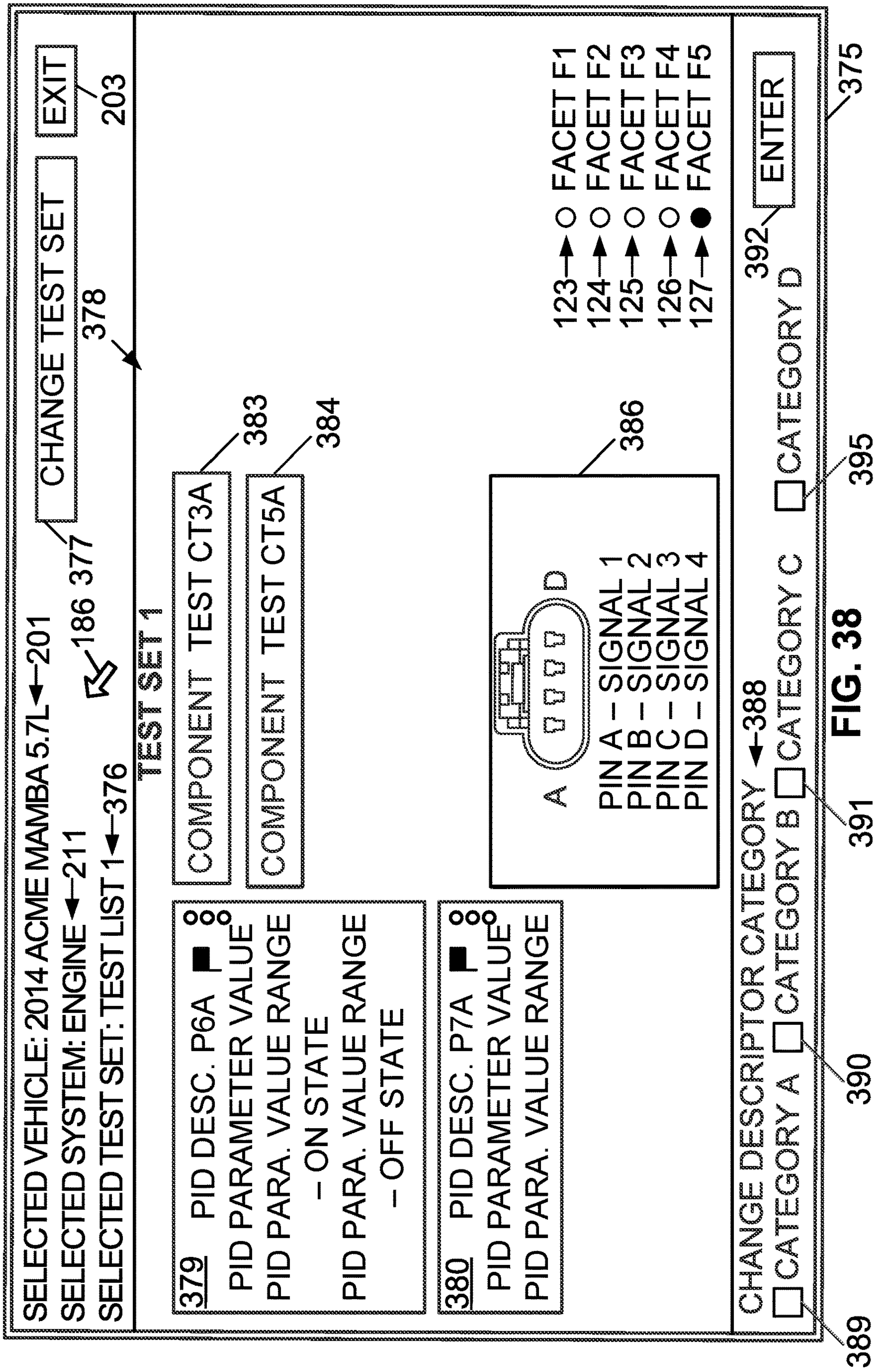

Next, FIG. 38 shows another view of the GUI 375. In this view, the USC 127 for facet selector F5 is selected (represented with black fill) and the processor has filtered which test set data is shown within the GUI 375 as compared to the test set data shown within the GUI 375 when none of the USC 123, 124, 125, 126, 127 is selected. In accordance with this example, the facet selector F5 is a facet corresponding to PIDs associated with received PID parameter values that breach an associated PID parameter value threshold. Based on the view of the GUI 375 in FIG. 38, the PID P6, P7 and the component test CT3, CT5 correspond to the facet F5. As an example, the component test CT3 can include a component test for testing a component with respect to PID P6 and the component test CT5 can include a component test for testing a component with respect to PID P7. The GUI 375 in FIG. 38 shows the Category A descriptors for PID P6, P7 and component test CT3, CT5.

Next, FIG. 39 shows a GUI 216 that shows aspects of a component test in accordance with the example embodiments. The GUI 216 includes the vehicle identifier 201, the USC 203, and the system identifier 211, each of which is discussed above. The GUI 216 includes a component test identifier 313. The component test identifier 313 can be based on a component test determined by a selection of the USC 344 made via the GUI 340 shown in FIG. 29.

The GUI 216 includes a container 315 including a textual measurement 316. As an example, the textual measurement 316 is a textual voltage measurement. The VST 3, 60 can be configured to show other textual measurements within the container 315, such as an electrical current, an electrical resistance, a pressure or some other type of measurement that can be made using the meter 77. The GUI 216 includes textual historical measurement values 317 (e.g., a minimum and maximum measurement value). The GUI 216 includes meter settings 318 to indicate how the processor configured the meter 77 to perform the component test corresponding to the component test descriptor 314. The GUI 216 includes a USC 319 that is selectable to cause the VST 3, 60 to configure the oscilloscope 78 for performing the component test corresponding to the component test descriptor 314. Additionally, the VST 3, 60 can output a different GUI (e.g., a GUI 217 shown in FIG. 40) to show aspects corresponding to the oscilloscope 78 performing that component test.

Next, FIG. 40 shows a GUI 217 that shows aspects of a component test in accordance with the example embodiments. The GUI 217 includes the vehicle identifier 201, the USC 203, the system identifier 211, the component test identifier 313, and the component test descriptor 314, each of which is discussed above.

The GUI 217 includes a container 332 including a graphical measurement 333 and a cursor 334 indicative of a most-recent measurement. As an example, the graphical measurement 333 is a graphical voltage measurement. The VST 3, 60 can be configured to show other textual measurements within the container 332, such as an electrical current, an electrical resistance, a pressure or some other type of measurement that can be made using the oscilloscope 78. The GUI 217 includes the textual historical measurement values 317. The GUI 217 includes oscilloscope settings 335 to indicate how the processor configured the oscilloscope 78 to perform the component test corresponding to the component test descriptor 314. The GUI 217 includes a USC 336 that is selectable to cause the VST 3, 60 to configure the meter 77 for performing the component test corresponding to the component test descriptor 314. Additionally, the VST 3, 60 can output a different GUI (e.g., a GUI 216 shown in FIG. 39) to show aspects corresponding to the meter 77 performing that component test.

Figure 41:
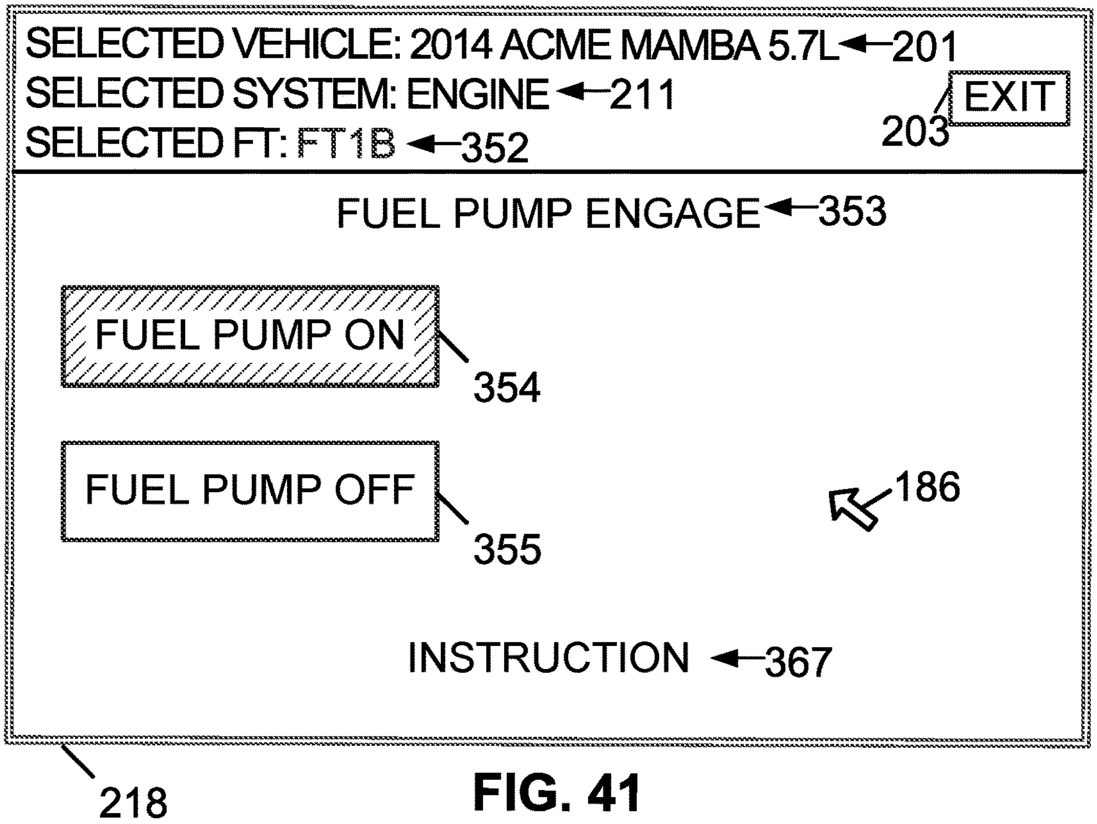

Next, FIG. 41 shows a GUI 218 that shows aspects corresponding to a functional test in accordance with the example embodiments. The GUI 218 includes the vehicle identifier 201, the USC 203, and the system identifier 211, each of which is discussed above. The GUI 218 includes a functional test identifier 352. The functional test identifier 352 can be based on a functional test determined by a selection of the USC 324 made via the GUI 320 shown in FIG. 27.

The GUI 218 includes a functional test descriptor 353, which is an example of the functional test descriptor FT1B corresponding to the USC 324 in FIG. 27. The GUI 218 includes a USC 354, 355. The USC 354 is selectable to cause the VST 3, 60 to transmit a VDM to cause the vehicle to initiate and/or perform the functional test corresponding to the functional test descriptor 353. The USC 355 is selectable to cause the VST 3, 60 to transmit a VDM to cause the vehicle to stop performance of the functional test corresponding to the functional test descriptor 353 or to perform a function different than the function performed by the vehicle in response to a selection of the USC 354. As an example, selection of the USC 354 causes the VST 3, 60 to send a VDM to the vehicle to cause the vehicle to turn a fuel pump on and selection of the USC 355 causes the VST 3, 60 to send a VDM to the vehicle to cause the vehicle to turn a fuel pump off.

The GUI 218 includes an instruction 367. The instruction 367 can include guidance for use of the USC 354 and the USC 355. As an example, the instruction 367 can include guidance indicating that the USC 354 and the USC 355 are active or reacted to by the vehicle when a speed of the vehicle is zero. The VST 3, 60 can highlight the USC 354 or the USC 355 to indicate that the USC 354 or the USC 355 was the most-recently selected USC. FIG. 41 shows such highlighting by cross-hatched lines within the USC 354. Other examples of highlighting a USC are also possible.

Figure 42:
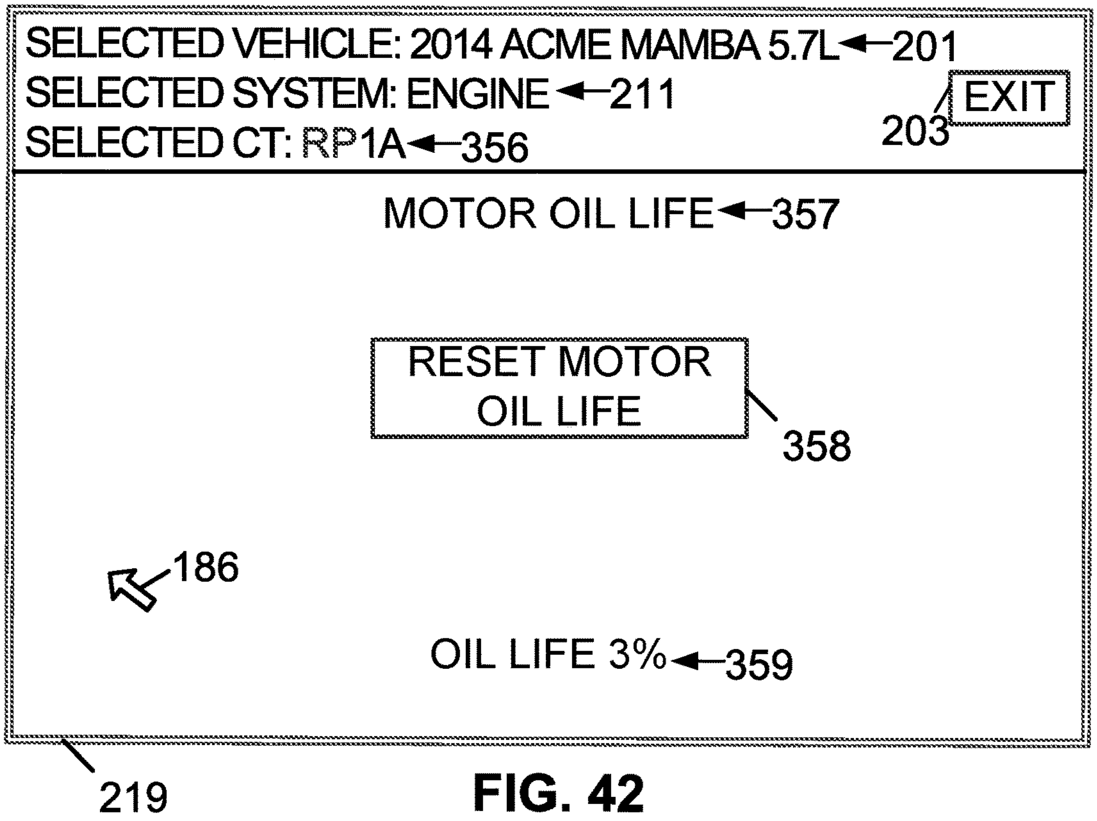

Next, FIG. 42 shows a GUI 219 that shows aspects corresponding to a reset procedure in accordance with the example embodiments. The GUI 219 includes the vehicle identifier 201, the USC 203, and the system identifier 211, each of which is discussed above. The GUI 219 includes a reset procedure identifier 356. The reset procedure identifier 356 can be based on a reset procedure determined by a selection of the USC 364 made via the GUI 360 shown in FIG. 32.

The GUI 219 includes a reset procedure descriptor 357, which is an example of the reset procedure descriptor RP1A corresponding to the USC 364 in FIG. 32. The GUI 219 includes a USC 358. The USC 358 is selectable to cause the VST 3, 60 to transmit a VDM to a vehicle to cause the vehicle to initiate and/or perform the reset procedure corresponding to the reset procedure descriptor 357. As an example, selection of the USC 358 causes the VST 3, 60 to send a VDM to the vehicle to cause the vehicle to reset a motor oil life setting stored within a memory of an ECU in the vehicle.

The GUI 219 includes an indicator 359. The indicator 359 indicates an oil file is three percent. After selection of the USC 358 and the ECU resetting the motor oil life setting, the indicator 359 can indicate one hundred percent. Other examples of indicators corresponding to different reset procedures are possible.

IV. Example Files

Next, FIG. 43 shows a file 400 in accordance with the example embodiments. The file 400 includes content for generating and/or populating a GUI. The file 400 is arranged as an XML file. The content within the file 400 can be contained with a file arranged according to a different markup language or according to another standard.

The file 400 includes header elements 401. The header elements 401 include an XML declaration and references. The XML declaration lists a version and an encoding attribute of the XML file. The references refer to a schema location, and a type of style sheet. Other examples of data contained within the header elements 401 are also possible.

The file 400 includes elements 402-418. The elements are between an opening tag and a closing tag. Each opening tag includes two brackets like the two brackets shown in an opening tag 432. Each closing tag includes two brackets and a forward slash like the two brackets and slash shown in a closing tag 433.

The file 400 includes a PID list element 402 that includes elements 403-418. The element 403 includes a PID list descriptor. The element 404 includes a vehicle identifier. The element 405, 406 includes PID characteristics.

The element 405 includes an element 407 listing a hexadecimal representation of a PID, an element 408 listing a PID descriptor from a first PID descriptor category, an element 409 listing a PID descriptor from a second PID descriptor category, an element 410 listing a PID descriptor from a third PID descriptor category, an element 411 listing a maximum range value, an element 412 listing a minimum range value, and an element 427 including a PID operation description. Other elements of a file, such as the file 400, the file 449 (shown in FIG. 44A to FIG. 44C), or a file including elements regarding a functional test, a component test, or a reset procedure can include an element including an operation description, such as a PID operation description for an element corresponding to a PID, a functional test operation description for an element corresponding to a functional test, a component test operation description for an element corresponding to a component test, and/or a reset procedure operation description for an element corresponding to a reset procedure.

The element 406 includes an element 413 listing a hexadecimal representation of a PID, an element 414 listing a PID descriptor from a first PID descriptor category, an element 415 listing a PID descriptor from a second PID descriptor category, an element 416 listing a PID descriptor from a third PID descriptor category, an element 417 listing a maximum range value, and an element 418 listing a minimum range value.

As an example, the first, second, and third PID descriptor categories referenced with respect to the file 400 can pertain to Category A, Category B, and Category C, respectively, of the PID descriptor categories shown in FIG. 17. A person having ordinary skill in the art will understand that a file including diagnostic descriptors (e.g., PID descriptors) can include diagnostic descriptors for one or more categories of diagnostic descriptors.

Figure 44B:
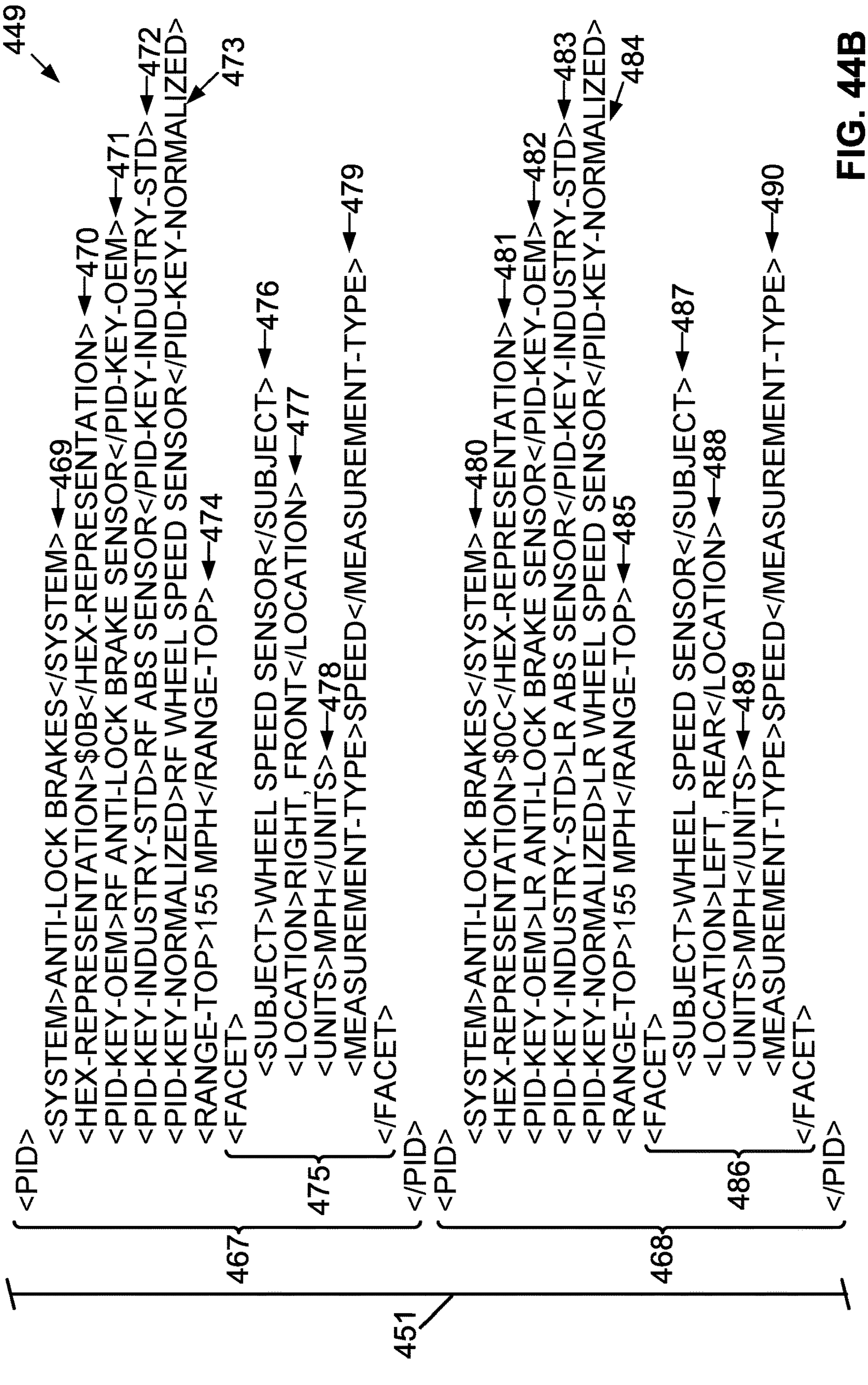
Figure 44C:
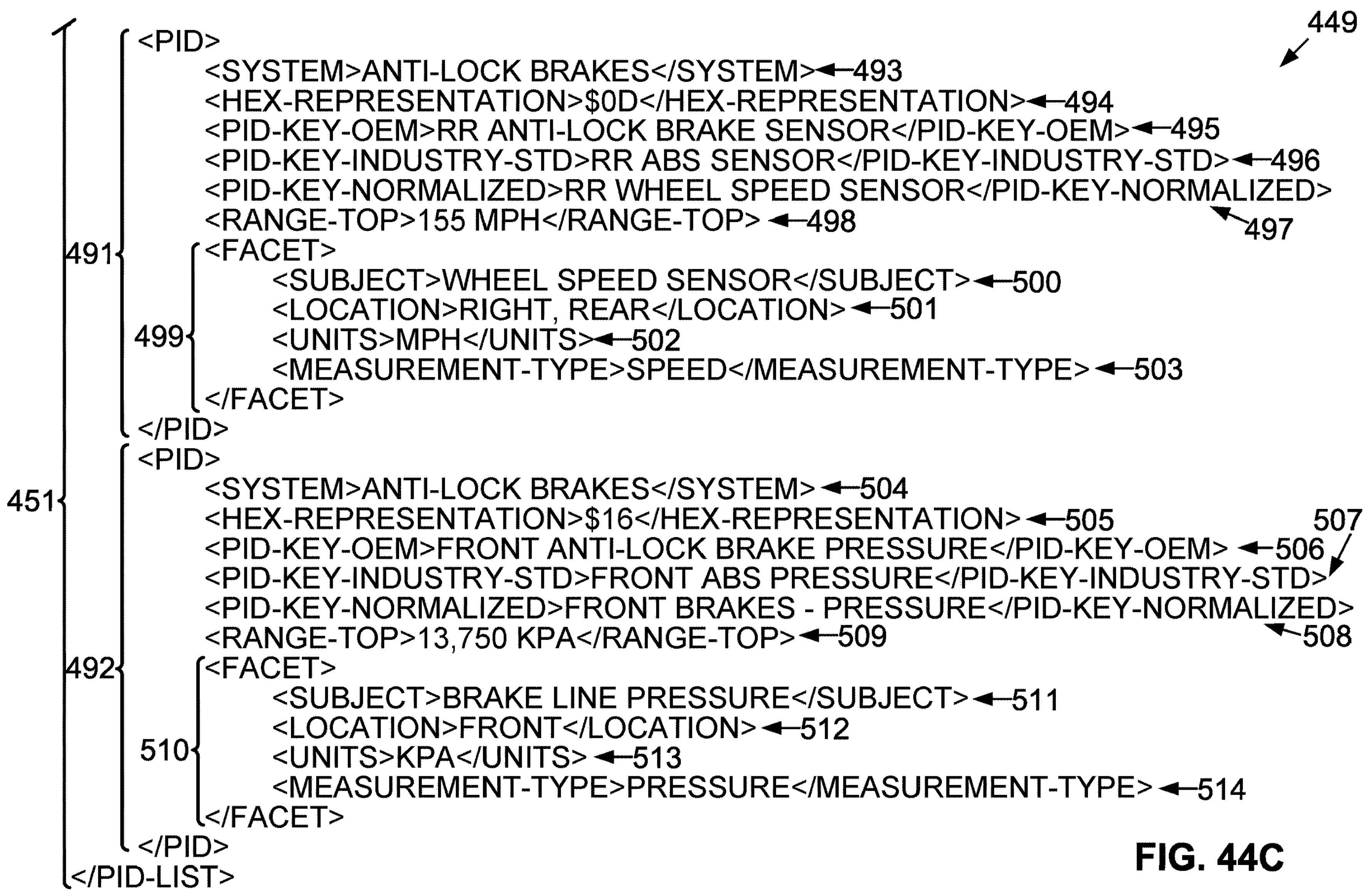

Next, FIG. 44 shows an arrangement of FIG. 44A, FIG. 44B, and FIG. 44C, each of which shows a portion of a file 449 in accordance with the example embodiments.

FIG. 44A shows a first portion of the file 449. The file 449 includes content for generating and/or populating a GUI. The file 449 is arranged as an XML file. The content within the file 449 can be contained with a file arranged according to a different markup language or according to another standard.

The file 449 includes header elements 450. The header elements 450 include an XML declaration and references. The XML declaration lists a version and an encoding attribute of the XML file. The references refer to a schema location, and a type of style sheet. Other examples of data contained within the header elements 450 are also possible.

The file 449 includes elements 451-514. The elements are between an opening tag and a closing tag. Each opening tag includes two brackets like the two brackets shown in an opening tag 515. Each closing tag includes two brackets and a forward slash like the two brackets and slash shown in a closing tag 516.

The file 449 includes a PID list element 451 that includes elements 452-514. The element 452 includes a PID list descriptor. The element 453 includes a vehicle identifier. The element 454 includes a protocol identifier (e.g., VDM protocol used by a vehicle identified by the vehicle identifier in element 453). The element 455, 467, 468, 491, 492 includes PID characteristics. The element 467, 468 is shown in FIG. 44B. The element 491, 492 is shown in FIG. 44C.

The element 455 includes an element 456 listing a system identifier, an element 457 listing a hexadecimal representation of a PID, an element 458 listing a PID descriptor from a first PID descriptor category, an element 459 listing a PID descriptor from a second PID descriptor category, an element 460 listing a PID descriptor from a third PID descriptor category, an element 461 listing a maximum range value, an element 448 including a PID operation description, and an element 462 listing aspects of a facet (e.g., a facet characteristic or a PID facet characteristic). The element 462 includes an element 463 listing a facet subject, an element 464 listing a location facet, an element 465 listing a units type, and an element 466 listing a measurement type.

Turning to FIG. 44B, the element 467 includes an element 469 listing a system identifier, an element 470 listing a hexadecimal representation of a PID, an element 471 listing a PID descriptor from a first PID descriptor category, an element 472 listing a PID descriptor from a second PID descriptor category, an element 473 listing a PID descriptor from a third PID descriptor category, an element 474 listing a maximum range value, and an element 475 listing aspects of a facet (e.g., a facet characteristic). The element 475 includes an element 476 listing a facet subject, an element 477 listing a location facet, an element 478 listing a units type, and an element 479 listing a measurement type.

The element 468 includes an element 480 listing a system identifier, an element 481 listing a hexadecimal representation of a PID, an element 482 listing a PID descriptor from a first PID descriptor category, an element 483 listing a PID descriptor from a second PID descriptor category, an element 484 listing a PID descriptor from a third PID descriptor category, an element 485 listing a maximum range value, and an element 486 listing aspects of a facet (e.g., a facet characteristic). The element 486 includes an element 487 listing a facet subject, an element 488 listing a location facet, an element 489 listing a units type, and an element 490 listing a measurement type.

Turning to FIG. 44C, the element 491 includes an element 493 listing a system identifier, an element 494 listing a hexadecimal representation of a PID, an element 495 listing a PID descriptor from a first PID descriptor category, an element 496 listing a PID descriptor from a second PID descriptor category, an element 497 listing a PID descriptor from a third PID descriptor category, an element 498 listing a maximum range value, and an element 499 listing aspects of a facet (e.g., a facet characteristic). The element 499 includes an element 500 listing a facet subject, an element 501 listing a location facet, an element 502 listing a units type, and an element 503 listing a measurement type.

The element 492 includes an element 504 listing a system identifier, an element 505 listing a hexadecimal representation of a PID, an element 506 listing a PID descriptor from a first PID descriptor category, an element 507 listing a PID descriptor from a second PID descriptor category, an element 508 listing a PID descriptor from a third PID descriptor category, an element 509 listing a maximum range value, and an element 510 listing aspects of a facet (e.g., a facet characteristic). The element 510 includes an element 511 listing a facet subject, an element 512 listing a location facet, an element 513 listing a units type, and an element 514 listing a measurement type.

Additionally or alternatively, a file including elements like the file 400, 449 can include elements corresponding to a functional test, a component test, a reset procedure, and/or a test.

V. Example Operation

Figure 45:
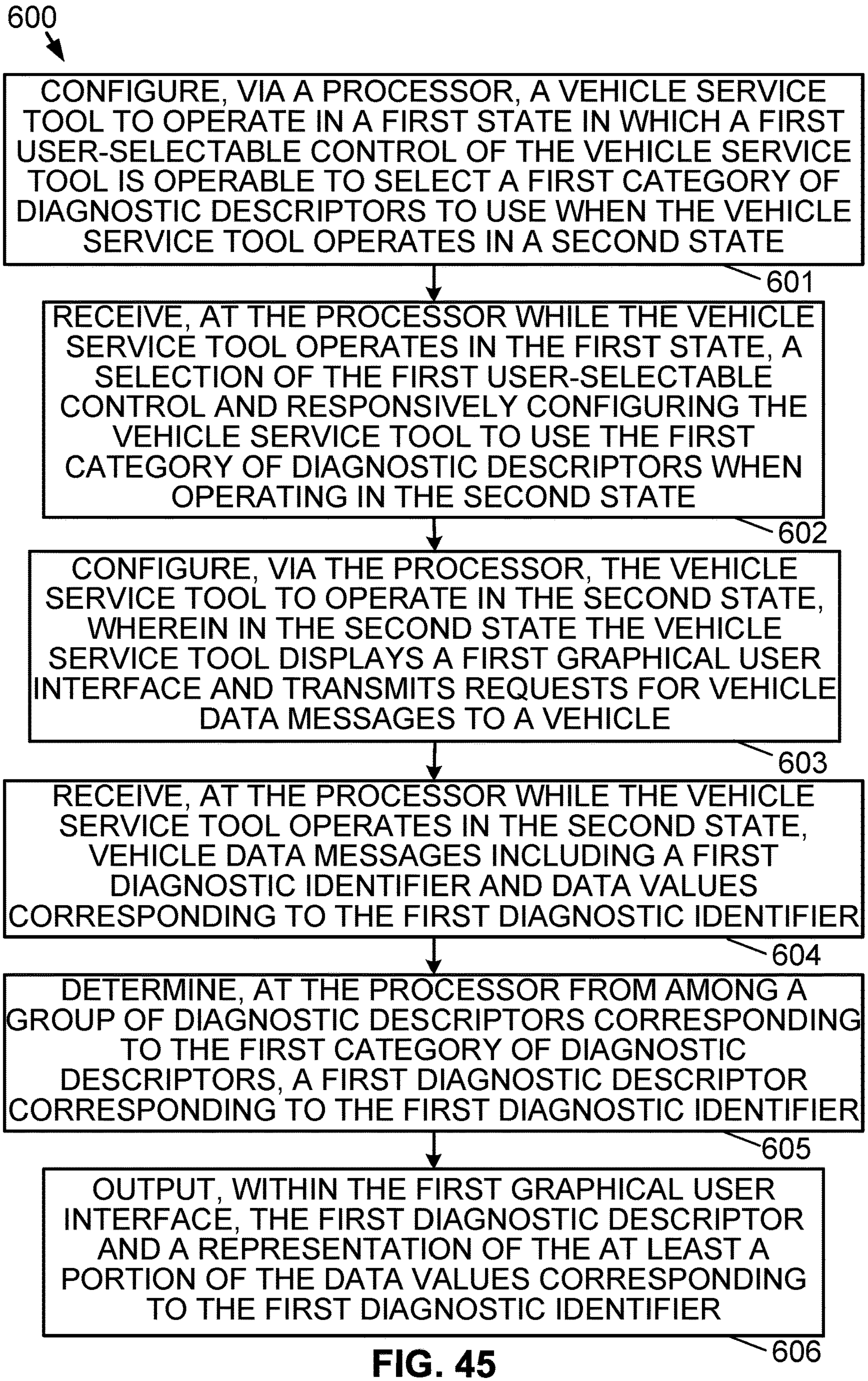
FIG. 45 shows a flow chart, in accordance with the example embodiments.

Next, FIG. 45 is a flow chart showing a function set 600 (e.g., a set of function(s)) of a method in accordance with the example embodiments. The functions of the function set 600 are shown in a block 601, 602, 603, 604, 605, 606 and are arranged as a flowchart. Two or more functions and/or portions of two or more functions of the function set 600 can be performed at the same time. The functions of the function set 600 can be performed by one or more computing systems, such as one or more computing systems shown in FIG. 2 or configured to operate as a computing system shown in FIG. 2 or FIG. 55. For example, the functions of the function set 600 can be performed by one or more of the VST 3, the VST 60, the server 6, or the server 130. A computing system configured to perform a function of the function set 600 can perform other function(s) besides those shown in FIG. 45. As an example, those other function(s) can include one or more functions of one or more of the functions sets shown in FIG. 46 to FIG. 54.

Block 601 includes configuring, via a processor, a vehicle service tool to operate in a first state in which a first USC of the vehicle service tool is operable for selecting a first category of diagnostic descriptors to use when the vehicle service tool operates in a second state. The function(s) of block 601 can be performed by a processor (e.g., one or more hardware processors) configured by machine-readable instructions including a module that is the same or similar to the vehicle service tool configuration module 111, in accordance with the example embodiments. As an example, the processor can configure a vehicle service tool to operate in a first state in which a first USC of the vehicle service tool is operable for selecting a first category of diagnostic descriptors to use when the vehicle service tool operates in a second state, as discussed with respect to the vehicle service tool configuration module 111.

Next, block 602 includes receiving, at the processor while the vehicle service tool operates in the first state, a selection of the first user-selectable control and responsively configuring the vehicle service tool to use the first category of diagnostic descriptors when operating in the second state. The function(s) of block 602 can be performed by a processor (e.g., one or more hardware processors) configured by machine-readable instructions including a module that is the same or similar to the receiving module 119 and a module that is the same or similar to the vehicle service tool configuration module 111, in accordance with the example embodiments. As an example, the processor can receive a selection of the first user-selectable control while the vehicle service tool operates in the first state, as discussed with respect to the receiving module 119. Additionally, the processor can responsively configure the vehicle service tool to use the first category of diagnostic descriptors when operating in the second state, as discussed with respect to the vehicle service tool configuration module 111.

Next, block 603 includes configuring, via the processor, the vehicle service tool to operate in the second state, wherein in the second state the vehicle service tool displays a first graphical user interface and transmits requests for vehicle data messages to a vehicle. The function(s) of block 603 can be performed by a processor (e.g., one or more hardware processors) configured by machine-readable instructions including a module that is the same or similar to the vehicle service tool configuration module 111, in accordance with the example embodiments. As an example, the processor can configure the vehicle service tool to operate in the second state so that the vehicle service tool can display a first graphical user interface and transmit requests for vehicle data messages to a vehicle, as discussed with respect to the vehicle service tool configuration module 111.

Next, block 604 includes receiving, at the processor while the vehicle service tool operates in the second state, vehicle data messages including a first diagnostic identifier and data values corresponding to the first diagnostic identifier. The function(s) of block 604 can be performed by a processor (e.g., one or more hardware processors) configured by machine-readable instructions including a module that is the same or similar to the receiving module 119, in accordance with the example embodiments. As an example, the processor can receive vehicle data messages including a first diagnostic identifier and data values corresponding to the first diagnostic identifier while the vehicle service tool operates in the second state, as discussed with respect to the receiving module 119.

Next, block 605 includes determining, at the processor from among a group of diagnostic descriptors corresponding to the first category of diagnostic descriptors, a first diagnostic descriptor corresponding to the first diagnostic identifier. The function(s) of block 605 can be performed by a processor (e.g., one or more hardware processors) configured by machine-readable instructions including a module that is the same or similar to the diagnostic descriptor determination module 114, in accordance with the example embodiments. As an example, the processor can determine, from among a group of diagnostic descriptors corresponding to the first category of diagnostic descriptors, a first diagnostic descriptor corresponding to the first diagnostic identifier, as discussed with respect to the diagnostic descriptor determination module 114.

Next, block 606 includes outputting, within the first graphical user interface, the first diagnostic descriptor and a representation of at least a first portion of the data values corresponding to the first diagnostic identifier. The function(s) of block 606 can be performed by a processor (e.g., one or more hardware processors) configured by machine-readable instructions including a module that is the same or similar to the GUI output module 115, in accordance with the example embodiments. As an example, the processor can output, within the first graphical user interface, the first diagnostic descriptor and a representation of at least a first portion of the data values corresponding to the first diagnostic identifier, as discussed with respect to the GUI output module 115.

Figure 46:
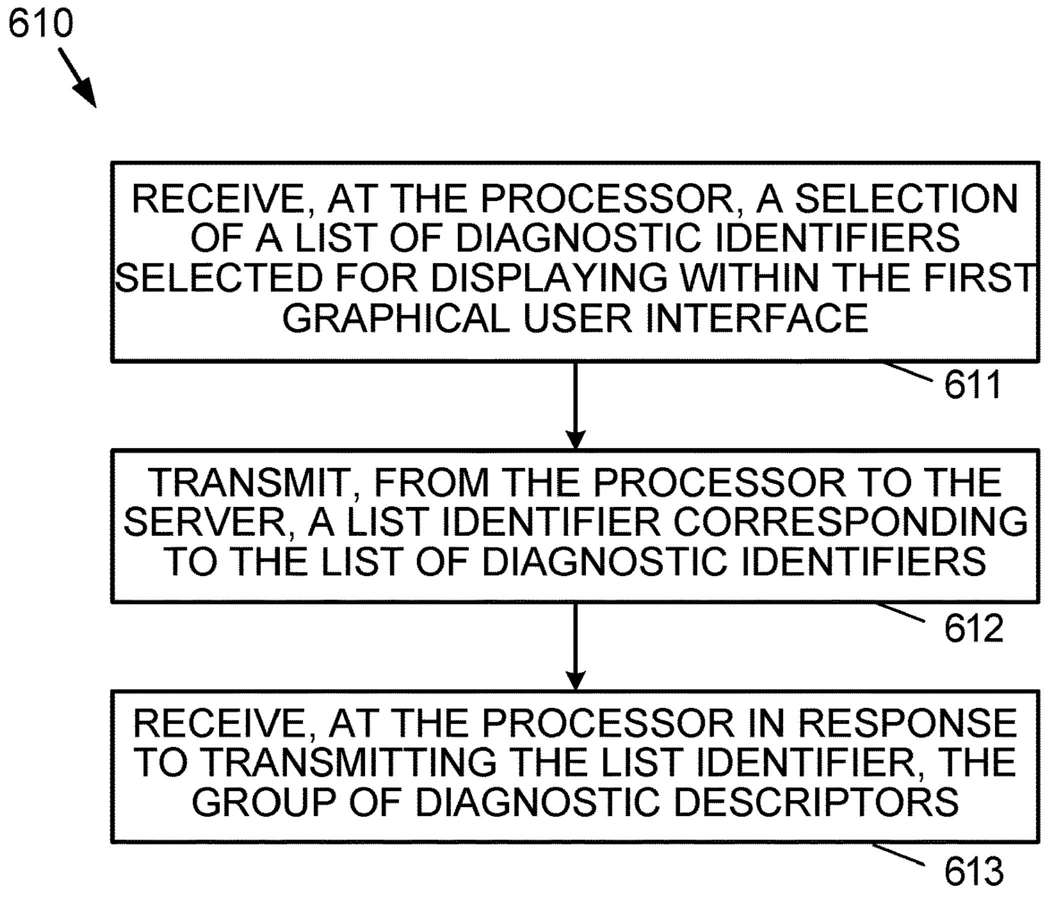
FIG. 46, FIG. 47, FIG. 48, FIG. 49, FIG. 50, FIG. 51, FIG. 52, FIG. 53, and FIG. 54 show a function set, in accordance with the example embodiments.

Next, FIG. 46 shows a function set 610. In accordance with the example embodiments, a method including the function(s) of the function set 610 can include one or more functions of the function set 600. Additionally, in accordance with at least some example embodiments, a method including the function(s) of the function set 610 can include one or more functions discussed with respect to any one or more figures of FIG. 45 and FIG. 47 to FIG. 54.

Block 611 includes receiving, at the processor, a selection of a list of diagnostic identifiers selected for displaying within the first graphical user interface. The function(s) of block 611 can be performed by a processor (e.g., one or more hardware processors) configured by machine-readable instructions including a module that is the same or similar to the receiving module 119, in accordance with the example embodiments. As an example, the processor can receive a selection of a list of diagnostic identifiers selected for displaying within the first graphical user interface, as discussed with respect to the receiving module 119.

Next, block 612 includes transmitting, from the processor to the server, a list identifier corresponding to the list of diagnostic identifiers. The function(s) of block 612 can be performed by a processor (e.g., one or more hardware processors) configured by machine-readable instructions including a module that is the same or similar to the transmitting module 120, in accordance with the example embodiments. As an example, the processor can transmit a list identifier corresponding to the list of diagnostic identifiers, as discussed with respect to the transmitting module 120.

Next, block 613 includes receiving, at the processor in response to transmitting the list identifier, the group of diagnostic descriptors. The function(s) of block 613 can be performed by a processor (e.g., one or more hardware processors) configured by machine-readable instructions including a module that is the same or similar to the receiving module 119, in accordance with the example embodiments. As an example, the processor can receive the group of diagnostic descriptors in response to transmitting the list identifier, as discussed with respect to the receiving module 119.

Figure 47:
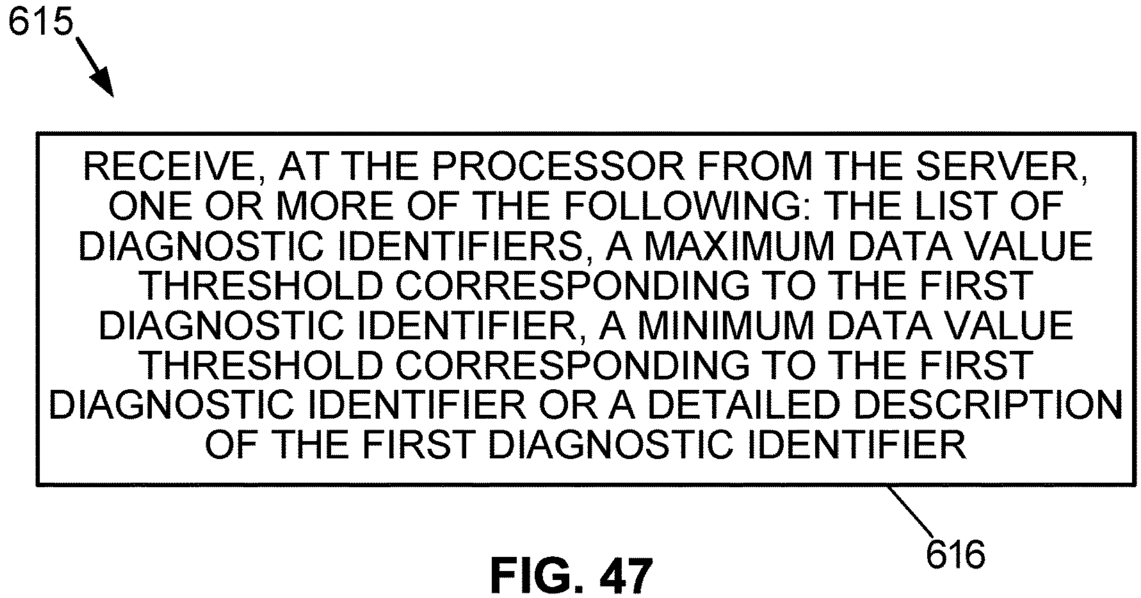

Next, FIG. 47 shows a function set 615. In accordance with the example embodiments, a method including the function(s) of the function set 615 can include one or more functions of the function set 600. Additionally, in accordance with at least some example embodiments, a method including the function(s) of the function set 615 can include one or more functions discussed with respect to any one or more figures of FIG. 45, FIG. 46 and FIG. 48 to FIG. 54.

Block 616 includes receiving, at the processor from the server, one or more of the following: the list of diagnostic identifiers, a maximum data value threshold corresponding to the first diagnostic identifier, a minimum data value threshold corresponding to the first diagnostic identifier, or a detailed description of the first diagnostic identifier. The function(s) of block 616 can be performed by a processor (e.g., one or more hardware processors) configured by machine-readable instructions including a module that is the same or similar to the receiving module 119, in accordance with the example embodiments. As an example, the processor can receive, from the server, one or more of the following: the list of diagnostic identifiers, a maximum data value threshold corresponding to the first diagnostic identifier, a minimum data value threshold corresponding to the first diagnostic identifier, or a detailed description of the first diagnostic identifier, as discussed with respect to the receiving module 119.

Figure 48:
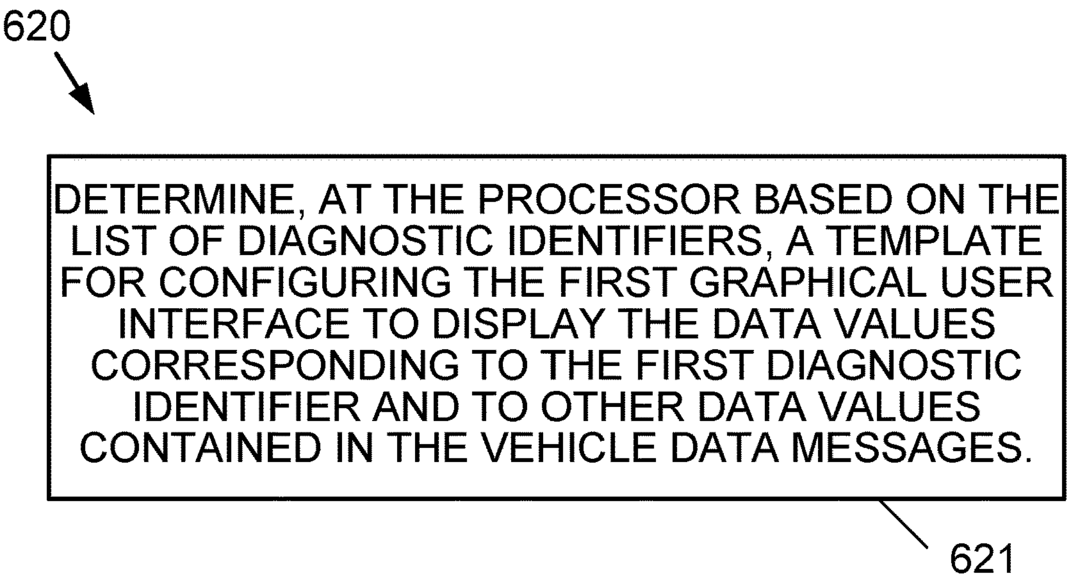

Next, FIG. 48 shows a function set 620. In accordance with the example embodiments, a method including the function(s) of the function set 620 can include one or more functions of the function set 600. Additionally, in accordance with at least some example embodiments, a method including the function(s) of the function set 620 can include one or more functions discussed with respect to any one or more figures of FIG. 45 to FIG. 47 and FIG. 49 to FIG. 54.

Block 621 includes determining, at the processor based on the list of diagnostic identifiers, a template for configuring the first graphical user interface to display the data values corresponding to the first diagnostic identifier and to other data values contained in the vehicle data messages. The function(s) of block 621 can be performed by a processor (e.g., one or more hardware processors) configured by machine-readable instructions including a module that is the same or similar to the template determination module 117, in accordance with the example embodiments. As an example, the processor can determine, based on the list of diagnostic identifiers, a template for configuring the first graphical user interface to display the data values corresponding to the first diagnostic identifier and to other data values contained in the vehicle data messages, as discussed with respect to the template determination module 117.

Figure 49:
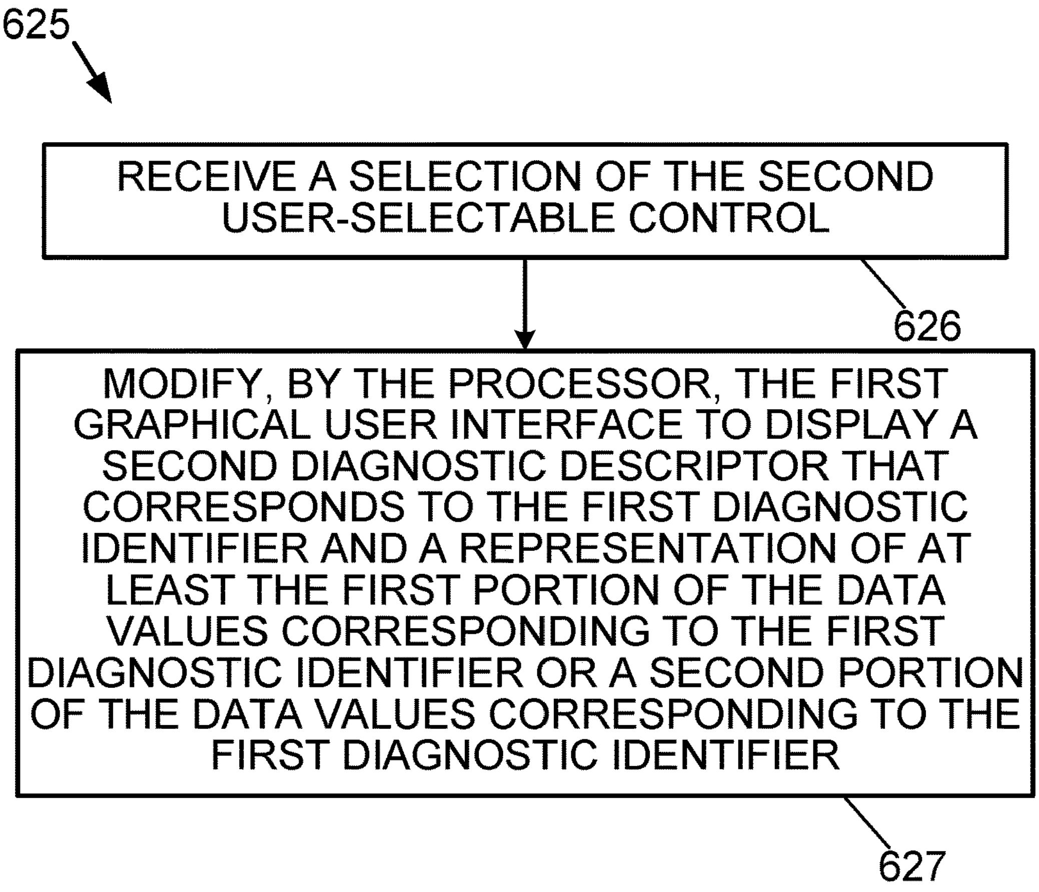

Next, FIG. 49 shows a function set 625. In accordance with the example embodiments, a method including the function(s) of the function set 625 can include one or more functions of the function set 600. Additionally, in accordance with at least some example embodiments, a method including the function(s) of the function set 625 can include one or more functions discussed with respect to any one or more figures of FIG. 1 to FIG. 48 and FIG. 50 to FIG. 54.

Block 626 includes receiving a selection of the second user-selectable control. The function(s) of block 626 can be performed by a processor (e.g., one or more hardware processors) configured by machine-readable instructions including a module that is the same or similar to the USC selection module 112, in accordance with the example embodiments. As an example, the processor can receive a selection of the second user-selectable control, as discussed with respect to the USC selection module 112.

Next, block 627 includes modifying, by the processor, the first graphical user interface to display a second diagnostic descriptor that corresponds to the first diagnostic identifier and a representation of at least the first portion of the data values corresponding to the diagnostic identifier or a second portion of the data values corresponding to the first diagnostic identifier. The function(s) of block 627 can be performed by a processor (e.g., one or more hardware processors) configured by machine-readable instructions including a module that is the same or similar to the GUI modification module 116, in accordance with the example embodiments. As an example, the processor can modify the first graphical user interface to display a second diagnostic descriptor that corresponds to the first diagnostic identifier and a representation of at least the first portion of the data values corresponding to the diagnostic identifier or a second portion of the data values corresponding to the first diagnostic identifier, as discussed with respect to the GUI modification module 116.

Figure 50:
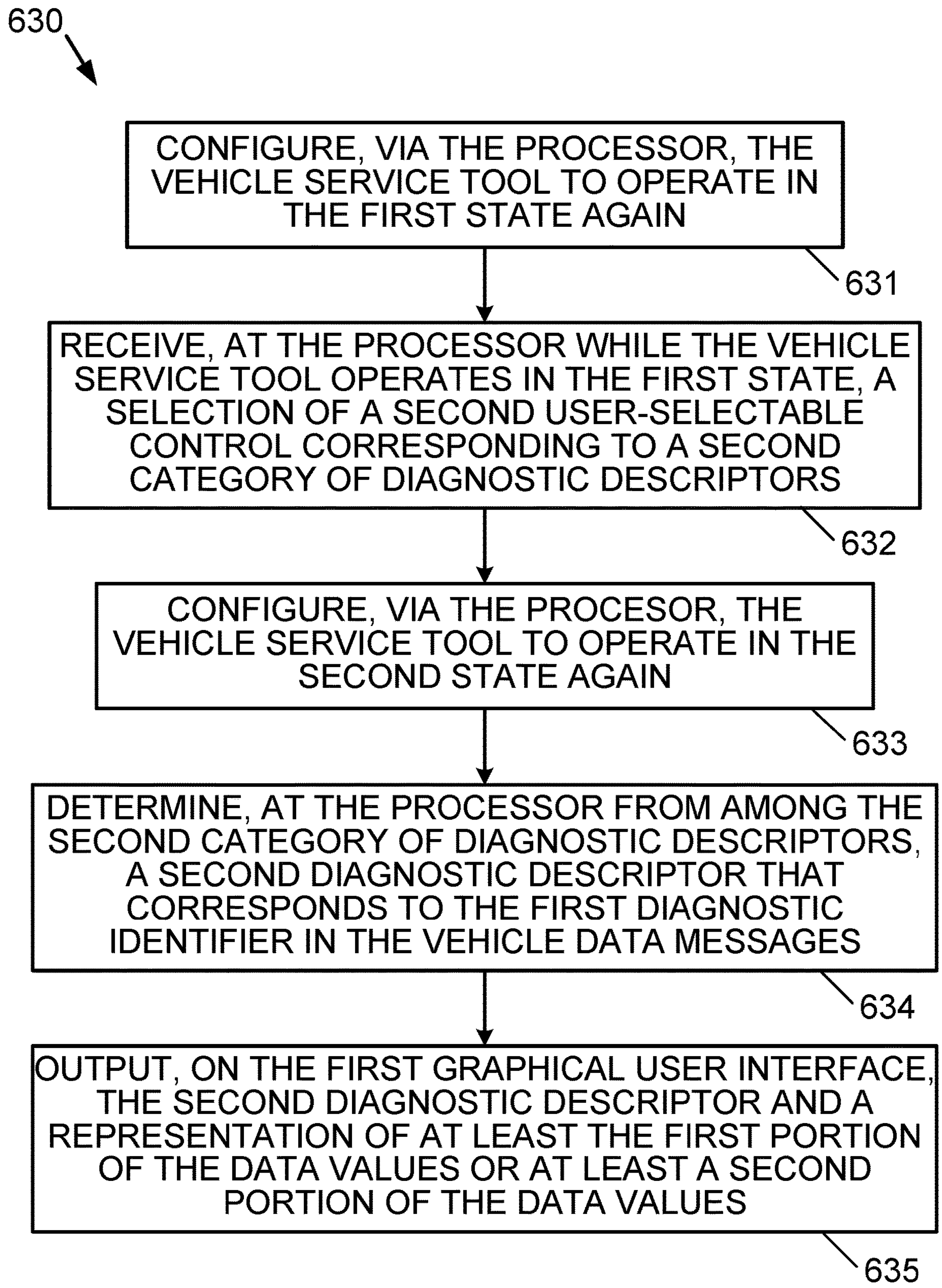

Next, FIG. 50 shows a function set 630. In accordance with the example embodiments, a method including the function(s) of the function set 630 can include one or more functions of the function set 600. Additionally, in accordance with at least some example embodiments, a method including the function(s) of the function set 630 can include one or more functions discussed with respect to any one or more figures of FIG. 45 to FIG. 49 and FIG. 51 to FIG. 54.

Block 631 includes configuring the vehicle service tool to operate in the first state again. The function(s) of block 631 can be performed by a processor (e.g., one or more hardware processors) configured by machine-readable instructions including a module that is the same or similar to the vehicle service tool configuration module 111, in accordance with the example embodiments. As an example, the processor can configure the vehicle service tool to operate in the first state again, as discussed with respect to the vehicle service tool configuration module 111.

Next, block 632 includes receiving, at the processor while the vehicle service tool operates in the first state, a selection of a second user-selectable control corresponding to a second category of diagnostic descriptors. The function(s) of block 632 can be performed by a processor (e.g., one or more hardware processors) configured by machine-readable instructions including a module that is the same or similar to the USC selection module 112, in accordance with the example embodiments. As an example, the processor can receive, while the vehicle service tool operates in the first state, a selection of a second user-selectable control corresponding to a second category of diagnostic descriptors, as discussed with respect to the USC selection module 112.

Next, block 633 includes configuring, via the processor, the vehicle service tool to operate in the second state again. The function(s) of block 633 can be performed by a processor (e.g., one or more hardware processors) configured by machine-readable instructions including a module that is the same or similar to the vehicle service tool configuration module 111, in accordance with the example embodiments. As an example, the processor can configure, via the processor, the vehicle service tool to operate in the second state again, as discussed with respect to the vehicle service tool configuration module 111.

Next, block 634 includes determining, at the processor from among the second category of diagnostic descriptors, a second diagnostic descriptor that corresponds to the first diagnostic identifier in the vehicle data messages. The function(s) of block 634 can be performed by a processor (e.g., one or more hardware processors) configured by machine-readable instructions including a module that is the same or similar to the diagnostic descriptor determination module 114, in accordance with the example embodiments. As an example, the processor can determine, from among the second category of diagnostic descriptors, a second diagnostic descriptor that corresponds to the first diagnostic identifier in the vehicle data messages, as discussed with respect to the diagnostic descriptor determination module 114.

Next, block 635 includes outputting, on the first graphical user interface, the second diagnostic descriptor and a representation of at least the first portion of the data values or at least a second portion of the data values. The function(s) of block 635 can be performed by a processor (e.g., one or more hardware processors) configured by machine-readable instructions including a module that is the same or similar to the GUI output module 115, in accordance with the example embodiments. As an example, the processor can output, on the first graphical user interface, the second diagnostic descriptor and a representation of at least the first portion of the data values or at least a second portion of the data values, as discussed with respect to the GUI output module 115.

Figure 51:
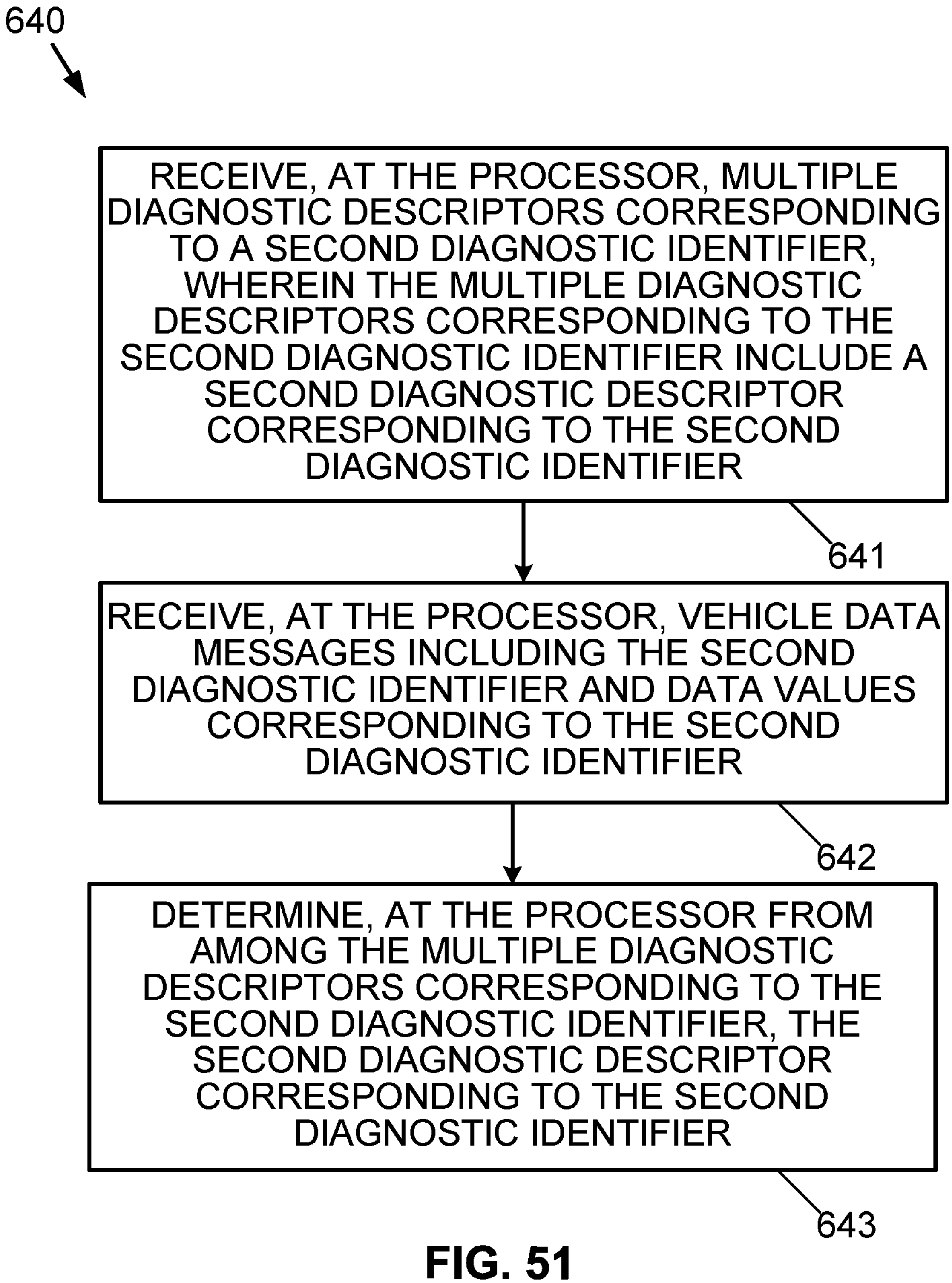

Next, FIG. 51 shows a function set 640. In accordance with the example embodiments, a method including the function(s) of the function set 640 can include one or more functions of the function set 600. Additionally, in accordance with at least some example embodiments, a method including the function(s) of the function set 640 can include one or more functions discussed with respect to any one or more figures of FIG. 45 to FIG. 50 and FIG. 52 to FIG. 54.

Block 641 includes receiving, at the processor, multiple diagnostic descriptors corresponding to a second diagnostic identifier, wherein the multiple diagnostic descriptors corresponding to the second diagnostic identifier include a second diagnostic descriptor corresponding to the second diagnostic identifier. The function(s) of block 641 can be performed by a processor (e.g., one or more hardware processors) configured by machine-readable instructions including a module that is the same or similar to the receiving module 119, in accordance with the example embodiments. As an example, the processor can receive multiple diagnostic descriptors corresponding to a second diagnostic identifier, wherein the multiple diagnostic descriptors corresponding to the second diagnostic identifier include a second diagnostic descriptor corresponding to the second diagnostic identifier, as discussed with respect to the receiving module 119.

Next, block 642 includes receiving, at the processor, vehicle data messages including the second diagnostic identifier and data values corresponding to the second diagnostic identifier. The function(s) of block 642 can be performed by a processor (e.g., one or more hardware processors) configured by machine-readable instructions including a module that is the same or similar to the vehicle data message module 113, in accordance with the example embodiments. As an example, the processor can receive vehicle data messages including the second diagnostic identifier and data values corresponding to the second diagnostic identifier, as discussed with respect to the vehicle data message module 113.

Next, block 643 includes determining, at the processor from among the multiple diagnostic descriptors corresponding to the second diagnostic identifier, the second diagnostic descriptor corresponding to the second diagnostic identifier. The function(s) of block 643 can be performed by a processor (e.g., one or more hardware processors) configured by machine-readable instructions including a module that is the same or similar to the diagnostic descriptor determination module 114, in accordance with the example embodiments. As an example, the processor can determine, from among the multiple diagnostic descriptors corresponding to the second diagnostic identifier, the second diagnostic descriptor corresponding to the second diagnostic identifier, as discussed with respect to the diagnostic descriptor determination module 114.

Figure 52:
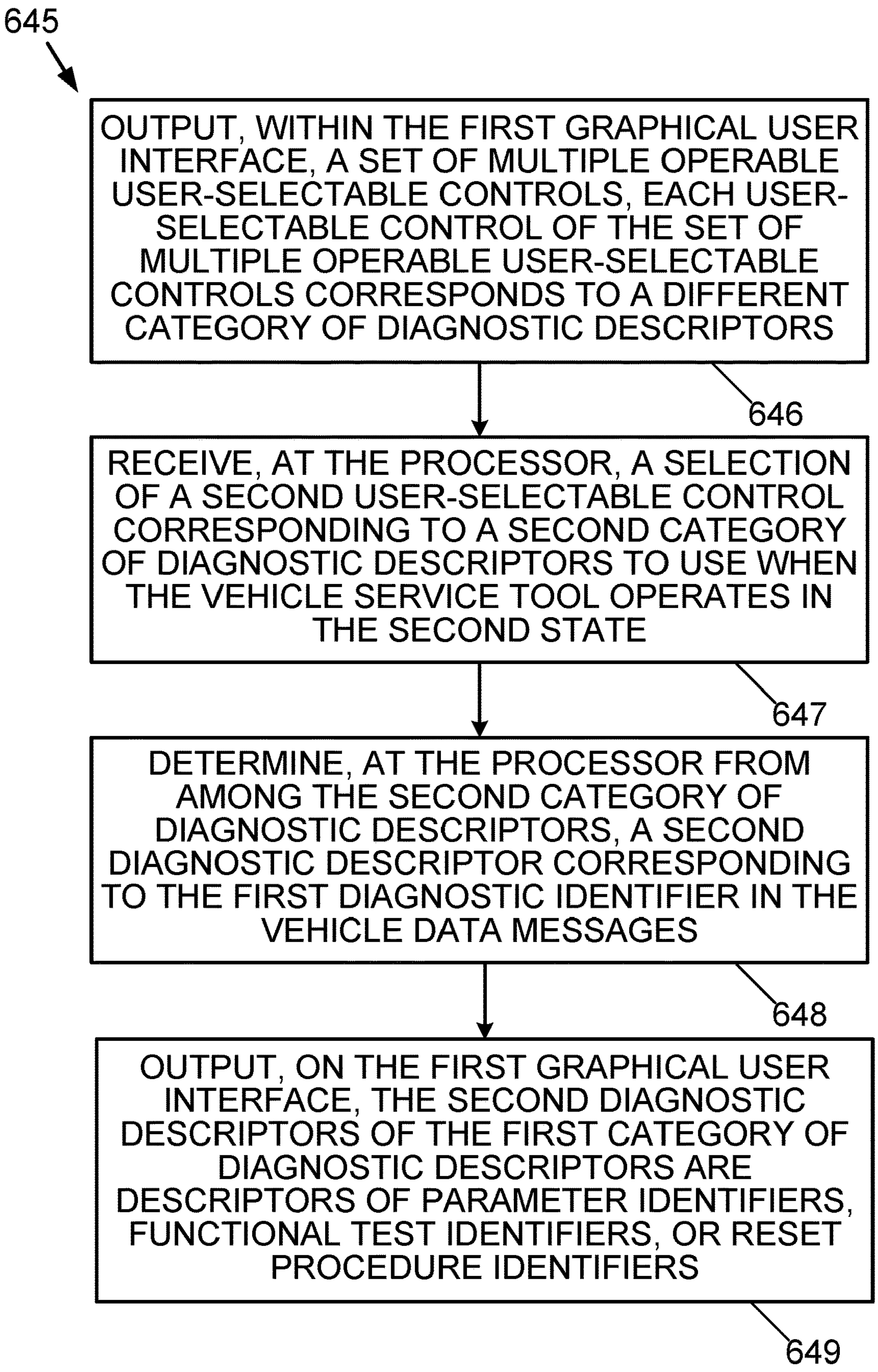

Next, FIG. 52 shows a function set 645. In accordance with the example embodiments, a method including the function(s) of the function set 645 can include one or more functions of the function set 600. Additionally, in accordance with at least some example embodiments, a method including the function(s) of the function set 645 can include one or more functions discussed with respect to any one or more figures of FIG. 45 to FIG. 51, FIG. 53, and FIG. 54.

Block 646 includes outputting, within the first graphical user interface, a set of multiple operable user-selectable controls, each user-selectable control of the set of multiple operable user-selectable controls corresponds to a different category of diagnostic descriptors. The function(s) of block 646 can be performed by a processor (e.g., one or more hardware processors) configured by machine-readable instructions including a module that is the same or similar to the GUI output module 115, in accordance with the example embodiments. As an example, the processor can output, within the first graphical user interface, a set of multiple operable user-selectable controls, each user-selectable control of the set of multiple operable user-selectable controls corresponds to a different category of diagnostic descriptors, as discussed with respect to the GUI output module 115.

Next, block 647 includes receiving, at the processor, a selection of a second user-selectable control corresponding to a second category of diagnostic descriptors to use when the vehicle service tool operates in a second state. The function(s) of block 647 can be performed by a processor (e.g., one or more hardware processors) configured by machine-readable instructions including a module that is the same or similar to the USC selection module 112, in accordance with the example embodiments. As an example, the processor can receive a selection of a second user-selectable control corresponding to a second category of diagnostic descriptors to use when the vehicle service tool operates in a second state, as discussed with respect to the USC selection module 112.

Next, block 648 includes determining, at the processor from among the second category of diagnostic descriptors, a second diagnostic descriptor corresponding to the first diagnostic identifier in the vehicle data messages. The function(s) of block 648 can be performed by a processor (e.g., one or more hardware processors) configured by machine-readable instructions including a module that is the same or similar to the diagnostic descriptor determination module 114, in accordance with the example embodiments. As an example, the processor can determine, from among the second category of diagnostic descriptors, a second diagnostic descriptor corresponding to the first diagnostic identifier in the vehicle data messages, as discussed with respect to the diagnostic descriptor determination module 114.

Next, block 649 includes outputting, on the first graphical user interface, the second diagnostic descriptor and a representation of at least the first portion of the data values or a second portion of the data values. The function(s) of block 649 can be performed by a processor (e.g., one or more hardware processors) configured by machine-readable instructions including a module that is the same or similar to the GUI output module 115, in accordance with the example embodiments. As an example, the processor can output, on the first graphical user interface, the second diagnostic descriptor and a representation of at least the first portion of the data values or a second portion of the data values, as discussed with respect to the GUI output module 115.

Figure 53:
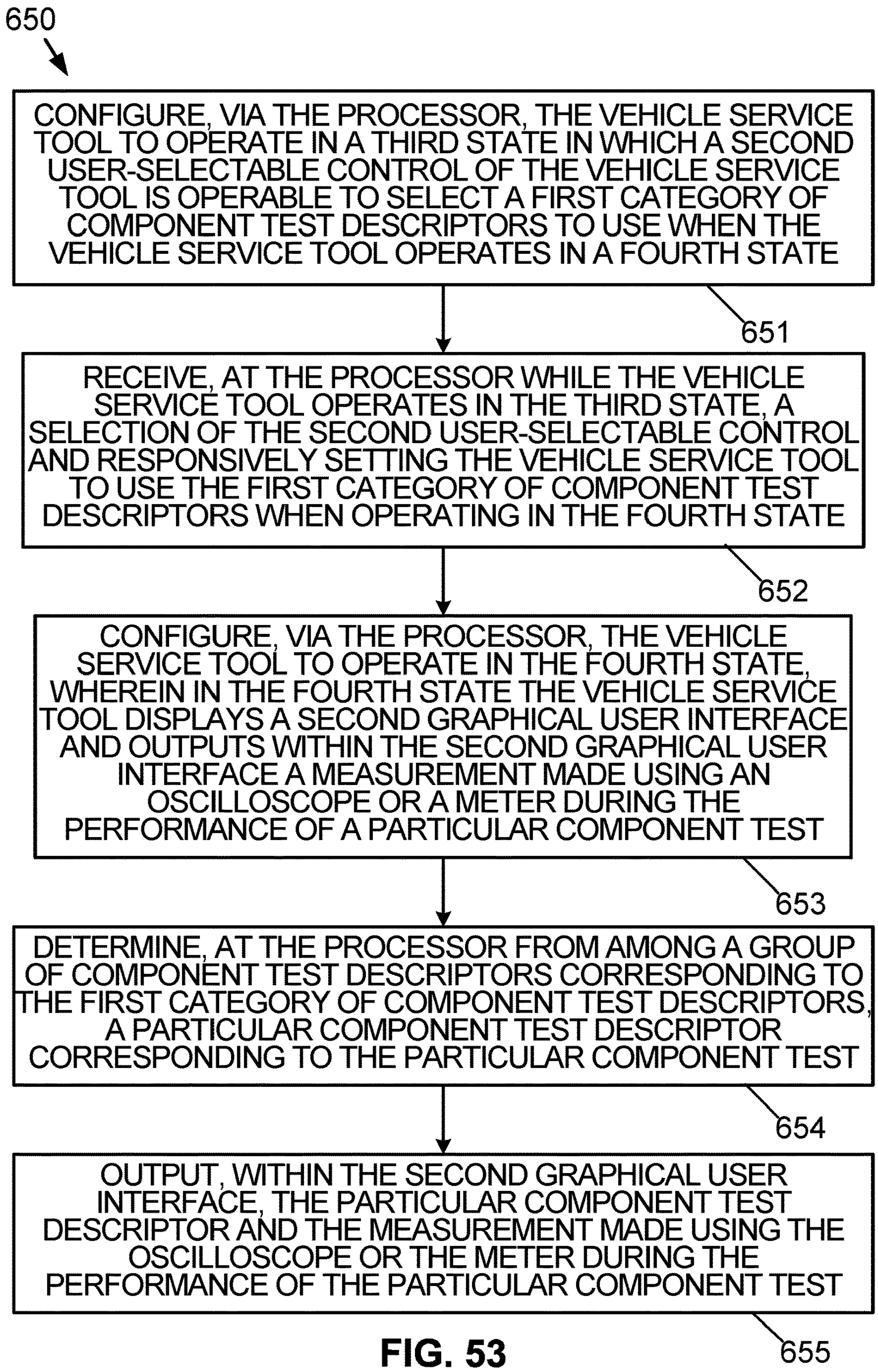

Next, FIG. 53 shows a function set 650. In accordance with the example embodiments, a method including the function(s) of the function set 650 can include one or more functions of the function set 600. Additionally, in accordance with at least some example embodiments, a method including the function(s) of the function set 650 can include one or more functions discussed with respect to any one or more figures of FIG. 45 to FIG. 52 and FIG. 54.

Block 651 includes configuring, via the processor, the vehicle service tool to operate in a third state in which a second user-selectable control of the vehicle service tool is operable for selecting a first category of component test descriptors to use when the vehicle service tool operates in a fourth state. The function(s) of block 651 can be performed by a processor (e.g., one or more hardware processors) configured by machine-readable instructions including a module that is the same or similar to the vehicle service tool configuration module 111, in accordance with the example embodiments. As an example, the processor can configure the vehicle service tool to operate in a third state in which a second user-selectable control of the vehicle service tool is operable for selecting a first category of component test descriptors to use when the vehicle service tool operates in a fourth state, as discussed with respect to the vehicle service tool configuration module 111.

Next, block 652 includes receiving, at the processor while the vehicle service tool operates in the third state, a selection of the second user-selectable control and responsively setting the vehicle service tool to use the first category of component test descriptors when operating in the fourth state. The function(s) of block 652 can be performed by a processor (e.g., one or more hardware processors) configured by machine-readable instructions including a module that is the same or similar to the receiving module 119, in accordance with the example embodiments. As an example, the processor can receive, while the vehicle service tool operates in the third state, a selection of the second user-selectable control and responsively setting the vehicle service tool to use the first category of component test descriptors when operating in the fourth state, as discussed with respect to the receiving module 119.

Next, block 653 includes configuring, via the processor, the vehicle service tool to operate in the fourth state, wherein in the fourth state the vehicle service tool displays a second graphical user interface and outputs within the second graphical user interface a measurement made using an oscilloscope or a meter during performance of a particular component test. The function(s) of block 653 can be performed by a processor (e.g., one or more hardware processors) configured by machine-readable instructions including a module that is the same or similar to the vehicle service tool configuration module 111, in accordance with the example embodiments. As an example, the processor can configure the vehicle service tool to operate in the fourth state, wherein in the fourth state the vehicle service tool displays a second graphical user interface and outputs within the second graphical user interface a measurement made using an oscilloscope or a meter during performance of a particular component test, as discussed with respect to the vehicle service tool configuration module 111.

Next, block 654 includes determining, at the processor from among a group of component test descriptors corresponding to the first category of component test descriptors, a particular component test descriptor corresponding to the particular component test. The function(s) of block 654 can be performed by a processor (e.g., one or more hardware processors) configured by machine-readable instructions including a module that is the same or similar to the component test descriptor determination module 118, in accordance with the example embodiments. As an example, the processor can determine, from among a group of component test descriptors corresponding to the first category of component test descriptors, a particular component test descriptor corresponding to the particular component test, as discussed with respect to the component test descriptor determination module 118.

Next, block 655 includes outputting, within the second graphical user interface, the particular component test descriptor and the measurement made using the oscilloscope or the meter during performance of the particular component test. The function(s) of block 655 can be performed by a processor (e.g., one or more hardware processors) configured by machine-readable instructions including a module that is the same or similar to the GUI output module 115, in accordance with the example embodiments. As an example, the processor can output, within the second graphical user interface, the particular component test descriptor and the measurement made using the oscilloscope or the meter during performance of the particular component test, as discussed with respect to the GUI output module 115.

Figure 54:
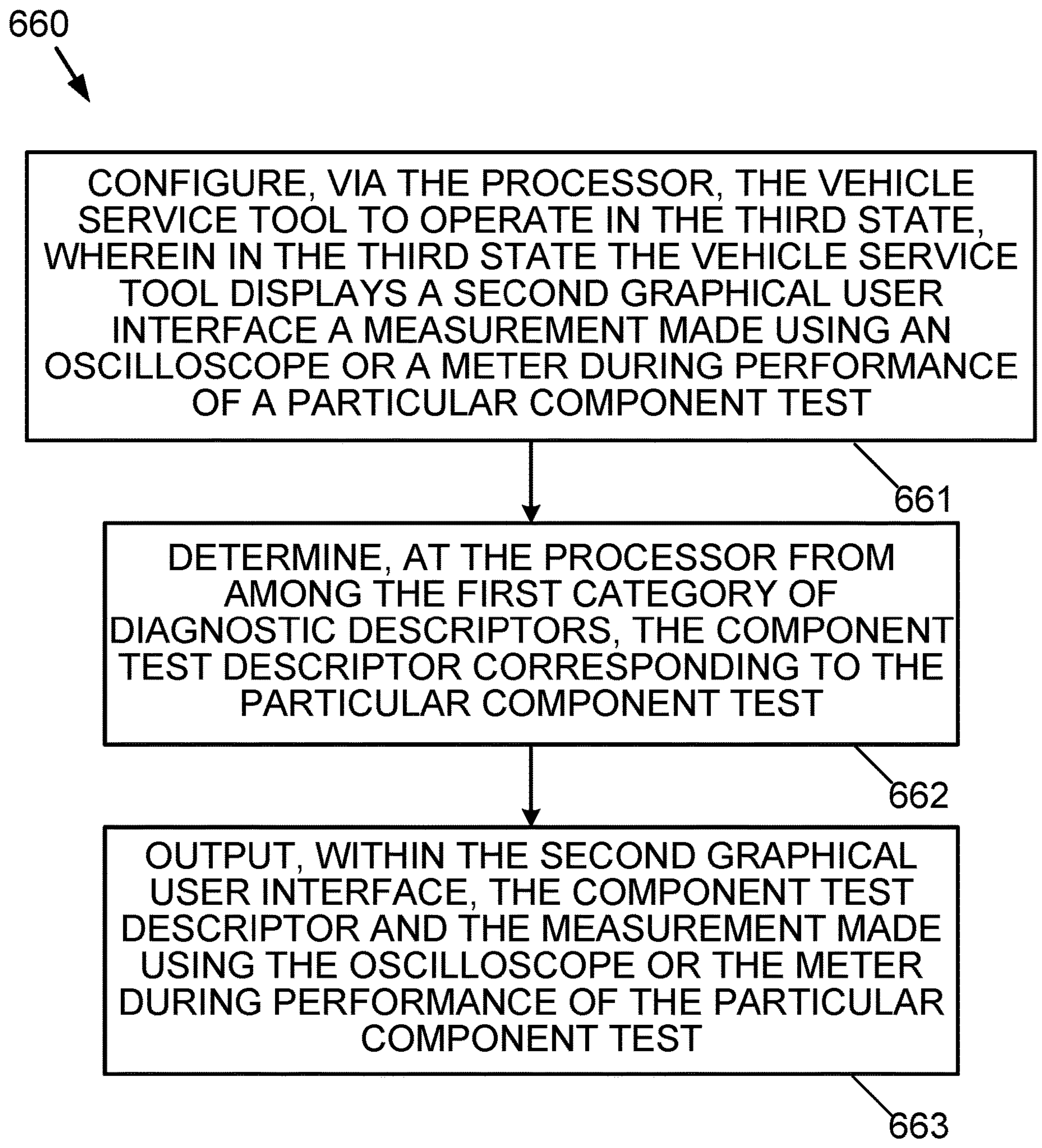

Next, FIG. 54 shows a function set 660. For the function set 660, the first category of diagnostic descriptors includes a component test descriptor to use when the vehicle service tool operates in a third state. In accordance with the example embodiments, a method including the function(s) of the function set 660 can include one or more functions of the function set 600. Additionally, in accordance with at least some example embodiments, a method including the function(s) of the function set 660 can include one or more functions discussed with respect to any one or more figures of FIG. 45 to FIG. 53.

Block 661 includes configuring, via the processor, the vehicle service tool to operate in the third state. In the third state, the vehicle service tool displays a second graphical user interface and outputs within the second graphical user interface a measurement made using an oscilloscope or a meter during performance of a particular component test. The function(s) of block 661 can be performed by a processor (e.g., one or more hardware processors) configured by machine-readable instructions including a module that is the same or similar to the vehicle service tool configuration module 111, in accordance with the example embodiments. As an example, the processor can configure the vehicle service tool to operate in the third state, as discussed with respect to the vehicle service tool configuration module 111. In the third state the vehicle service tool displays a second graphical user interface and outputs within the second graphical user interface a measurement made using an oscilloscope or a meter during performance of a particular component test.

Next, block 662 includes determining, at the processor from among the first category of diagnostic descriptors, the component test descriptor corresponding to the particular component test. The function(s) of block 662 can be performed by a processor (e.g., one or more hardware processors) configured by machine-readable instructions including a module that is the same or similar to the component test descriptor determination module 118, in accordance with the example embodiments. As an example, the processor can determine, from among the first category of diagnostic descriptors, the component test descriptor corresponding to the particular component test, as discussed with respect to the component test descriptor determination module 118.

Next, block 663 includes outputting, within the second graphical user interface, the component test descriptor and the measurement made using the oscilloscope or the meter during performance of the particular component test. The function(s) of block 663 can be performed by a processor (e.g., one or more hardware processors) configured by machine-readable instructions including a module that is the same or similar to the GUI output module 115, in accordance with the example embodiments. As an example, the processor can output, within the second graphical user interface, the component test descriptor and the measurement made using the oscilloscope or the meter during performance of the particular component test, as discussed with respect to the GUI output module 115.

VI. Example Vehicle

A vehicle is a mobile machine that can be used to transport a person, people, and/or cargo. A vehicle can be driven and/or otherwise guided along a path (e.g., a paved road or otherwise) on land, in water, in the air, and/or outer space. A vehicle can be wheeled, tracked, railed, and/or skied. A vehicle can include an automobile, a motorcycle (e.g., a two or three wheel motorcycle), an all-terrain vehicle (ATV) defined by ANSI/SVIA-1-2007, a snowmobile, a watercraft (e.g., a JET SKI® watercraft), a light-duty truck, a medium-duty truck, a heavy-duty truck, a semi-tractor, a drone, and/or a farm machine. A vehicle can include and/or use any appropriate voltage and/or current source, such as a battery, an alternator, a fuel cell, and the like, providing any appropriate current and/or voltage, such as about 12 volts, about 42 volts, 400 volts, 800 volts, or some other voltage level. A vehicle can include and/or use any system and/or engine to provide its mobility. Those systems and/or engines can include vehicle components that use fossil fuels, such as gasoline, diesel fuel, natural gas, propane, and the like, electricity, such as that generated by a battery, magneto, fuel cell, solar cell and the like, wind and hybrids and/or combinations thereof. A vehicle can include an electronic control unit (ECU), an OBDC, and a vehicle network that connects the OBDC to the ECU. A vehicle can be operable to operate as an autonomous vehicle.

A vehicle manufacturer can build various quantities of vehicles each calendar year (i.e., January 1$^{st}$ to December 31$^{st}$). In some instances, a vehicle manufacturer defines a model year for a particular vehicle model to be built. The model year can start on a date other than January 1$^{st}$ and/or can end on a date other than December 31$^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a particular vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can comprise indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMMEF, where each letter in the order shown represents a model year identifier, vehicle make identifier, vehicle model name identifier, engine type identifier, and fuel type identifier, respectively, or YMMF, where each letter in the order shown represents a model year identifier, vehicle make identifier, vehicle model name identifier, and fuel type identifier, respectively, or YMME, where each letter in the order shown represents a model year identifier, vehicle make identifier, vehicle model name identifier, and engine type identifier, respectively, or an abbreviation YMM, where each letter in the order shown represents a model year identifier, vehicle make identifier, and vehicle model name identifier, respectively. As yet another example, any of the aforementioned forms of vehicle identifiers can include information regarding a market such that the vehicle identifiers take the form of YMMM, YMMFM, YMMEM, or YMMEFM, where the last "M" represents a market. The marked for example, could be the United States market, the United Kingdom market, the German market, the Canadian market or the market of some other country or region. Other aspects of a vehicle, such as an engine displacement of internal combustion engines, or sub-models designators, can also be represented with the vehicle identifying information.

An example YMME is 2021/Toyota/Camry/4Cyl, in which "2021" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. Another example YMME is 2016/Freightliner/Cascadia/Cummins ISX15 EPA, in which "2016" represents the model year the vehicle was built, "Freightliner" represents the name of the vehicle manufacturer Daimler Trucks North America, Cleveland, North Carolina, "Cascadia" represents a vehicle model built by that manufacturer, and "Cummins ISX15 EPA" represents an engine manufacturer and model within the vehicle. An example YMM is 2016/Freightliner/Cascadia. An example YM is 2016/Freightliner. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan.

In some cases, different types of vehicles (e.g., vehicles with different YMM, YMMM, YMME, YMMEM, YMMF, YMMFM, YMMEF, or YMMEFM combinations) are part of a vehicle leveraging group. As an example, a vehicle leveraging group may be defined for three different YMM combinations based on different years (e.g., 2022 MM, 2021 MM, and 2020 MM), wherein the make and model name does not change. The leveraging group may be useful because any vehicle within the leveraging group may have a common set of vehicle data messages available to communicate with an off-board computing system. Accordingly, any vehicle within the leveraging group can perform the same functional tests and reset procedures, and be configured to respond to a common set of vehicle data messages.

Some vehicles, such as automobiles, are associated with a unique VIN. Some VINs include seventeen alpha-numeric characters. For at least some seventeen character VINs, the last six characters represent a unique serial number associated with a particular type of vehicle represented by the first eleven alpha-numeric characters of those VINs. The first eleven alpha-numeric characters typically represent at least a YMME or a YMM. In some instances, a vehicle includes a one dimensional or multi-dimensional bar code indicative of a VIN associated with that vehicle.

A vehicle network (e.g., the vehicle network 13 shown in FIG. 2 or the vehicle network 54 shown in FIG. 3) can include one or more conductors (e.g., copper wire conductors) and/or can be wireless. As an example, a vehicle network can include one or two conductors for carrying vehicle data messages in accordance with a vehicle data message (VDM) protocol, such as a bi-directional VDM protocol. A bi-directional VDM protocol can include a SAE® J1850 (PWM or VPW) VDM protocol, an SAER J1939 VDM protocol based on the SAE® J1939_201808 serial control and communications heavy duty vehicle network-top level document, and/or any other core J1939 standard, an ISO® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a CAN 2.0 VDM protocol, standardized in part using an ISO® 11898-1:2015 road vehicle—CAN—Part I: data link layer and physical signaling protocol, a CAN FD VDM protocol (e.g., CAN with flexible data rate VDM protocol), a MOST® Cooperation VDM protocol (such as the MOST Specification Rev. 3.0 E2, or the MOST® Dynamic Specification, Rev. 3.0.2), an Ethernet VDM protocol (e.g., an Ethernet 802.3 protocol using a BROADR-REACH® physical layer transceiver specification for Automotive Applications by Broadcom Inc., San Jose, California), or some other VDM protocol defined for performing communications with or within the vehicle 4, 20, 40. The aforementioned protocols can include definition for at least physical and data link layers of the seven layer Open Systems Interconnection (OSI) model. Each and every VDM discussed in this description is arranged according to a VDM protocol.

In at least some embodiments, a VDM protocol works in conjunction a Unified Diagnostic Services (UDS) protocol, such as the ISO® 14229-1:2020 standard for Road vehicles—UDS—Part 1: application layer, the ISO® 14229-2 standard for Road vehicles—unified diagnostic services, session layer services, or ISO® 14229-3:2022 standard for Road Vehicles—UDS on CAN embodiment (UDSonCAN). A VDM sent on a CAN vehicle bus according the UDS protocol can include a CAN message identifier, a protocol control information filed, a service identifier (SID), and data parameter value requests. Table H shows example SIDs sent to a ECU from a VST and example SIDs sent in response to the VST from the ECU.

TABLE H

| Request SID | Service | Response SID |
|---|---|---|
| $10 | Diagnostic session control | $50 |
| $11 | ECU reset | $51 |
| $14 | Clear DTC | $54 |
| $19 | Read DTC | $59 |
| $22 | Read data by identifier | $62 |
| $23 | Read memory by address | $63 |
| $24 | Read scaling data by identifier | $64 |
| $27 | Security access | $67 |
| $28 | Communication control | $68 |
| $29 | Authentication | $69 |
| $2A | Read data by identifier periodically | $6A |
| $2C | Dynamically define data identifier | $6C |
| $2E | Write data by identifier | $6E |
| $2F | Input Output Control by identifier | $6F |
| $31 | Routine control | $71 |
| $34 | Request download | $74 |
| $35 | Request upload | $75 |
| $36 | Transfer data | $76 |
| $37 | Request transfer exit | $77 |
| $38 | Request file transfer | $78 |
| $3D | Write memory by address | $7D |
| $3E | Tester present | $7E |
| $83 | Access timing parameters | $C3 |
| $84 | Secured data transmission | $C4 |
| $85 | Control DTC settings | $C5 |
| $86 | Response on event | $C6 |
| $87 | Link control | $C7 |

As an example, the processor 62 can transmit a VDM with a SID $2A to request an ECU to transmit VDMs with PID parameter data periodically. Moreover, the processor 62 can include a data rate, such as slow, medium, or fast to set a transmission rate for the ECU, or a data rate of stop to end the periodic transmission of PID parameter data from the ECU for the requested PID.

As another example, the processor 62 can transmit a VDM with a SID $2F to request the ECU to perform a functional test or a reset procedure. In other words, the VST 3, 60 and/or the processor 62 can gain control over an analog or digital input or output of the ECU by sending a VDM with the SID $2F.

As yet another example, the processor 62 can transmit a VDM with a SID $22 to request a PID parameter value from an ECU, a SID $14 to clear DTCs, or a SID $19 to read DTCs. In at least some embodiments, a VDM protocol can be unidirectional instead of bidirectional. For example, a SENT VDM protocol (e.g., a single-edge nibble transmission VDM protocol) is a unidirectional VDM protocol. The SENT VDM protocol has been standardized as the SAE J2716 VDM protocol. A sensor in a vehicle can include a transmitter operable to communicate using the SENT VDM protocol (e.g., a SENT VDM transmitter). A vehicle communication bus can operatively connect the SENT VDM transmitter and an ECU within the vehicle. The transceiver 64 (e.g., the vehicle communications transceiver 73) can include a SENT VDM receiver connectable to the vehicle communication bus operatively connected to the SENT VDM transmitter. The SENT VDM receiver can receive SENT VDM protocol messages representing sensor values output by the sensor with the SENT VDM transmitter.

An OBDC, such as the OBDC 11, 28, 53 can include an on-board diagnostic (OBD) connector, such as an OBD II connector. An OBD II connector can include slots for retaining up to sixteen connector terminals, but can include a different number of slots or no slots at all. As an example, an OBDC can include an OBD II connector that meets the SAE J1962 specification such as a connector 16M, part number 12110252, available from Aptiv LLC of Dublin, Ireland. An OBDC can include conductor terminals that connect to a conductor in a vehicle. For instance, an OBDC can include connector terminals that connect to conductors that respectively connect to positive and negative terminals of a battery or battery pack. An OBDC can include one or more conductor terminals that connect to a conductor of a vehicle communication bus such that the OBDC is operatively connected to one or more ECUs. A computing system, such as the VST 3, 60 can operatively connect to an OBDC in order to receive a VDM from the vehicle including that OBDC. A VDM can carry VDM data. The VDM data can include a PID and parameter values associated with the PID. The VDM data can include a DTC. An operative connection between the OBDC and the VST 3, 60 can occur via the arrangement 8, 9, 10 shown in FIG. 2 or via some other arrangement. A PID can be associated with one or more thresholds. A threshold corresponding to a PID can be dependent upon an operating condition of the vehicle 4. A VDM can be transmitted over a physical communication link, such as a copper wire or an optical cable, or using radio signals over an air interface. In many embodiments, the PID and parameter value are transmitted as binary data. A processor can parse a received VDM to recover a binary representation of a PID and parameter value. The processor can translate the binary representation of a PID and parameter value into a textual a PID and parameter value displayable on a display device.

An ECU can control various aspects of vehicle operation and/or components within a vehicle system. For example, an ECU can include a powertrain (PT) system ECU, an engine control module (ECM) ECU, a supplemental inflatable restraint (SIR) system (e.g., an air bag system) ECU, an entertainment system ECU, or some other ECU. An ECU can receive an electrical or optical input from an ECU-connected input device (e.g., a sensor input), control an ECU-connected output device (e.g., a solenoid) via an electrical or optical signal output by the ECU, generate a vehicle data message (VDM) (such as a VDM based on a received input or a controlled output), and set a DTC to a state (such as active or history). An ECU can perform a functional test in response to receiving a VDM requesting performance of the functional test. The functional test can be used to test an ECU-connected output device. In at least some embodiments, the ECU is operable to perform the functional test and/or provide the DTC in accordance with an industry standard, such as the SAE J1979_201202 and/or ISO 15031-5 standards for E/E diagnostic test modes.

VII. Example Computing System Configuration

Next, FIG. 55 is a block diagram of a computing system 670 in accordance with the example embodiments. In a basic configuration 671, the computing system 670 can include a processor 672 and a system memory 674. A memory bus 679 can be used for communicating between the processor 672 and the system memory 674. Depending on the desired configuration, the processor 672 can be of any type including but not limited to a microprocessor (μP), a microcontroller (μC), a digital signal processor (DSP), or any combination thereof. A memory controller 673 can also be used with the processor 672, or in some embodiments, the memory controller 673 can be an internal part of the processor 672.

Depending on the desired configuration, the system memory 674 can be of any type including but not limited to volatile memory (such as RAM), non-volatile memory (such as ROM, flash memory, etc.) or any combination thereof. The system memory 674 can include one or more applications 675, and program data 677. The application 675 can include an algorithm 676 that is arranged to perform the functions described as being performed by the VST 3, 60 or the server 6, 130. The program data 677 can include system data 678 that could be directed to any number of types of data, such as the computer-readable data stored in the memory 63, 133. In some example embodiments, the applications 675 can be arranged to operate with the program data 677 on an operating system executable by the processor 672.

The computing system 670 can have additional features or functionality, and additional interfaces to facilitate communications between the basic configuration 671 and any devices and interfaces. For example, storage devices 680 can be provided including removable storage devices 681, non-removable storage devices 682, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and non-volatile, non-transitory, removable and non-removable media implemented in any method or technology for storage of information, such as computer-readable program instructions, data structures, program modules, or other data such as the data stored in a computer-readable memory, such at the memory 63, 133.

The system memory 674 and the storage devices 680 are examples of computer-readable memory, such as the memory 63, 133. The system memory 674 and the storage devices 680 can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 670.

The computing system 670 can include or be implemented as a portion of a small-form factor portable (e.g., mobile) electronic device such as a smartphone (e.g., an IPHONE® smartphone from Apple Inc. of Cupertino, California, or a GALAXY S® smartphone from Samsung Electronics Co., Ltd. of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The application 675, or the program data 677 can include an application downloaded to the communication interfaces 687 from the APP STORE® online retail store, from the GOOGLE PLAY® online retail store, or another source of the applications. A component of the VST 3, 60, such as the display 74 and/or the transceiver 64, can be embodied in the small-form factor electronic device.

The computing system 670 can include or be implemented as part of a personal computing system (including both laptop computer and non-laptop computer configurations), or a server. The computing system 670 can be configured as an embedded system in which the processor 672 includes an embedded processor and the system memory 674 includes an embedded memory.

The computing system 670 can also include output interface 683 that can include a graphics processing unit 684, which can be configured to communicate to various external devices such as a display device 686 or a speaker via an A/V port 685 or a communication interface 687. The communication interface 687 can include a network controller 688, which can be arranged to facilitate communications with the other computing system 690 over a network communication via a communication port 689. The communication connection is one example of a communication media. Communication media can be embodied by computer-readable program instructions, data structures, program modules, GUIs, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

For the VST 3, 60, the communication interface 687 can include the network transceiver 72 and/or the vehicle communications transceiver 73, and the communication port 689 can include a communication port connectable to a printer for printing a paper copy of GUI content.

Figure 56:
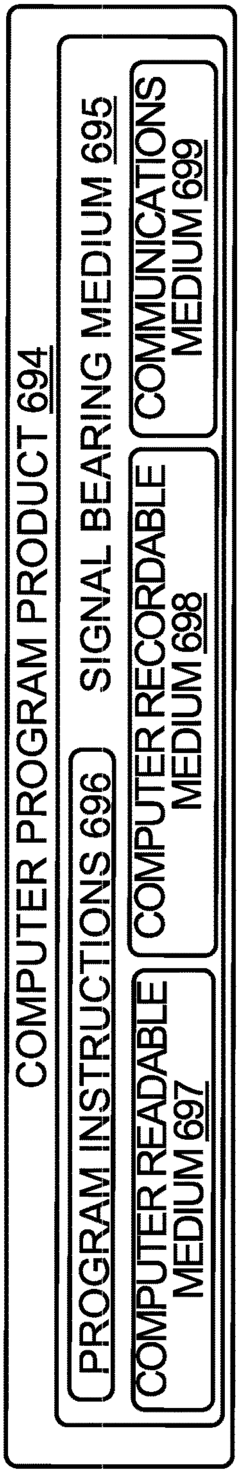
FIG. 56 is a schematic illustrating a conceptual partial view of a computer program product for executing a computer process on a computing system, in accordance with the example embodiments.

In FIG. 56, a schematic illustrating a conceptual partial view of a computer program product 694 is shown. The computer program product 694 includes a computer program for executing a computer process on a computing system, arranged according to at least some embodiments presented herein. That computer program can be encoded on a non-transitory computer-readable storage medium in a machine-readable format, or on another non-transitory medium or article of manufacture.

In at least some embodiments, the computer program product 694 is provided using a signal bearing medium 695. The signal bearing medium 695 can include one or more programming instructions 696 that, when executed by a processor can provide functionality or portions of the functionality described above with respect to FIG. 1 to FIG. 55. In some examples, the signal bearing medium 695 can encompass a computer-readable memory 697, such as, but not limited to, a hard disk drive, a Compact Disc (CD), a Digital Video Disk (DVD), a digital tape, or any other memory described herein. In some embodiments, the signal bearing medium 695 can encompass a computer recordable medium 698, such as, but not limited to, memory, read/write (R/W) CDs, R/W DVDs, etc. In some embodiments, the signal bearing medium 695 can encompass a communications medium 699, such as, but not limited to, a digital and/or an analog communication medium (e.g., a fiber optic cable, a waveguide, a wired communications link, a wireless communication link, etc.). Thus, for example, the signal bearing medium 695 can be conveyed by a wireless form of the communications medium 699 (e.g., a wireless communications medium conforming to the IEEE 802.11 standard or another transmission protocol).

The one or more programming instructions 696 can be, for example, computer executable and/or logic implemented instructions. In some examples, a computing system such as the computer program product 694 of FIG. 56 can be configured to provide various operations, functions, or actions in response to the programming instructions 696 conveyed to the computing system 670 by one or more of the following; the computer-readable memory 697, the computer recordable medium 698, or the communications medium 699.

The VST 3, 60 can include any of the components of the computing system 670. The processor 62 can be configured like the processor 672. The memory 63 can be configured as part of or all of the system memory 674 and/or the storage devices 680. The transceiver 64 can be configured as part of or all of the communication interface 687.

In at least some embodiments, the VST 3, 60, the server 6, 130 and/or the computing system 670 includes a power source. The power source can include a connection to an external power source and circuitry to allow current to flow to other elements connected to the power source. As an example, the external power source can include a wall outlet at which a connection to an alternating current can be made. As another example, the external power source can include an energy storage device (e.g., a battery) or an electric generator.

Additionally or alternatively, a power source can include a connection to an internal power source and power transfer circuitry to allow current to flow to other elements connected to the power source. As an example, the internal power source can include an energy storage device, such as a battery. Furthermore, any power source (e.g., a power supply) described herein can include various circuit protectors and signal conditioners. The power sources described herein can provide a way to transfer electrical currents to other elements that operate electrically.

VIII. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether. Furthermore, various functions described and/or shown in the drawings as being performed by one or more elements can be carried out by a processor executing computer-readable program instructions or by a combination of hardware, firmware, and/or software. For purposes of this description, execution of CRPI contained in a computer-readable memory to perform some function can include executing all of the program instructions of those CRPI or only a portion of those CRP1.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each embodiment including a listed component or function independently and each embodiment including a combination of the listed components or functions. For example, an embodiment described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible embodiments: (i) an embodiment including A, but not B and not C, (ii) an embodiment including B, but not A and not C, (iii) an embodiment including C, but not A and not B, (iv) an embodiment including A and B, but not C, (v) an embodiment including A and C, but not B, (v) an embodiment including B and C, but not A, and/or (vi) an embodiment including A, B, and C. For the embodiments including component or function A, the embodiments can include one A or multiple A. For the embodiments including component or function B, the embodiments can include one B or multiple B. For the embodiments including component or function C, the embodiments can include one C or multiple C. In accordance with the aforementioned example and at least some of the example embodiments, "A" can represent a component, "B" can represent a system, and "C" can represent a symptom.

The use of ordinal numbers such as "first," "second," "third" and so on is to distinguish respective elements rather than to denote an order of those elements unless the context of using those terms explicitly indicates otherwise. The use of the symbol "$" as prefix to a number indicates the number is a hexadecimal number.

Embodiments of the present disclosure can thus relate to one of the enumerated example embodiments (EEEs) listed below.

EEE 1 is a method comprising: configuring, via a processor, a VST to operate in a first state in which a first USC of the VST is operable for selecting a first category of diagnostic descriptors to use when the VST operates in a second state; receiving, at the processor while the VST operates in the first state, a selection of the first USC and responsively configuring the VST to use the first category of diagnostic descriptors when operating in the second state; configuring, via the processor, the VST to operate in the second state, wherein in the second state the VST displays a first GUI and transmits requests for vehicle data messages to a vehicle; receiving, at the processor while the VST operates in the second state, vehicle data messages including a first diagnostic identifier and data values corresponding to the first diagnostic identifier; determining, at the processor from among a group of diagnostic descriptors corresponding to the first category of diagnostic descriptors, a first diagnostic descriptor corresponding to the first diagnostic identifier; and outputting, within the first GUI, the first diagnostic descriptor and a representation of at least a first portion of the data values corresponding to the first diagnostic identifier.

EEE 2 is the method of EEE 1, wherein the group of diagnostic descriptors includes multiple diagnostic descriptors corresponding to the first diagnostic identifier, wherein the multiple diagnostic descriptors include the first diagnostic descriptor corresponding to the first diagnostic identifier, and wherein the multiple diagnostic descriptors correspond to different categories of diagnostic descriptors.

EEE 3 is the method of any one of EEE 1 to 2, further comprising: receiving, at the processor, a selection indicative of a list of diagnostic identifiers selected for displaying within the first GUI; transmitting, from the processor to a server, a list identifier corresponding to the list of diagnostic identifiers; and receiving, at the processor in response to transmitting the list identifier, the group of diagnostic descriptors, wherein the group of diagnostic descriptors includes multiple diagnostic descriptors that correspond to a different diagnostic identifier in the list of diagnostic identifiers, and wherein the multiple diagnostic descriptors include the first diagnostic descriptor.

EEE 4 is the method of EEE 3, wherein transmitting the list identifier and receiving the group of diagnostic descriptors occur via execution of an application programming interface to the server.

EEE 5 is the method of any one of EEE 3 to 4, further comprising: receiving, at the processor from the server, one or more of the following: the list of diagnostic identifiers, a maximum data value threshold corresponding to the first diagnostic identifier, a minimum data value threshold corresponding to the first diagnostic identifier, a detailed description of the first diagnostic identifier, or a facet characteristic.

EEE 6 is the method of EEE 5, wherein the first facet corresponds to a sensor type, an engine cylinder number, an engine bank identifier, a spatial position, a measurement type, or a units type.

EEE 7 is the method of EEE 5, wherein the first facet corresponds to parameter identifiers associated with received parameter values that breach an associated parameter value threshold.

EEE 8 is the method of any one of EEE 3 to 7, further comprising: determining, at the processor based on the list of diagnostic identifiers, a template for configuring the first GUI to display the data values corresponding to the first diagnostic identifier and to other data values contained in the vehicle data messages.

EEE 9 is the method of any one of EEE 1 to 8, wherein configuring the VST to operate in the first state includes the processor outputting a second GUI, and wherein the second GUI includes the first USC.

EEE 10 is the method of EEE 9, wherein the second GUI includes a second USC corresponding to a second category of diagnostic descriptors different than the first category of diagnostic descriptors, and wherein the first category of diagnostic descriptors and the second category of diagnostic descriptors both include a different one of: an original equipment manufacturer category of diagnostic descriptors, an industry standard defined category of diagnostic descriptors, a normalized category of diagnostic descriptors, or a user-defined category of diagnostic descriptors.

EEE 11 is the method of any one of EEE 1 to 10, wherein the first GUI includes a second USC corresponding to a second category of diagnostic descriptors, and wherein the method further comprises: receiving a selection of the second USC; and modifying, by the processor, the first GUI to display a second diagnostic descriptor that corresponds to the first diagnostic identifier and a representation of at least the first portion of the data values corresponding to the first diagnostic identifier or a second portion of the data values corresponding to the first diagnostic identifier.

EEE 12 is the method of any one of EEE 1 to 11, configuring, via the processor, the VST to operate in the first state again; receiving, at the processor while the VST operates in the first state, a selection of a second USC corresponding to a second category of diagnostic descriptors; configuring, via the processor, the VST to operate in the second state again; determining, at the processor from among the second category of diagnostic descriptors, a second diagnostic descriptor that corresponds to the first diagnostic identifier in the vehicle data messages; and outputting, on the first GUI, the second diagnostic descriptor and a representation of at least the first portion of the data values or at least a second portion of the data values.

EEE 13 is the method of any one of EEE 1 to 12, further comprising: receiving, at the processor, multiple diagnostic descriptors corresponding to a second diagnostic identifier, wherein the multiple diagnostic descriptors corresponding to the second diagnostic identifier include a second diagnostic descriptor corresponding to the second diagnostic identifier; receiving, at the processor, vehicle data messages including the second diagnostic identifier and data values corresponding to the second diagnostic identifier; and determining, at the processor from among the multiple diagnostic descriptors corresponding to the second diagnostic identifier, the second diagnostic descriptor corresponding to the second diagnostic identifier, wherein the first GUI further includes the second diagnostic descriptor corresponding to the second diagnostic identifier and a representation of at least a portion of the data values corresponding to the second diagnostic identifier.

EEE 14 is the method of any one of EEE 1 to 13, wherein the first category of diagnostic descriptors is an original equipment manufacturer defined category of diagnostic descriptors, an industry standard defined category of diagnostic descriptors, a normalized category of diagnostic descriptors, or a user-defined category of diagnostic descriptors.

EEE 15 is the method of any one of EEE 1 to 14, wherein the processor includes a first processor at the VST, and wherein configuring the VST to operate in the first state is based on a first communication the first processor receives from a server, and wherein configuring the VST to operate in the second state is based on a second communication the first processor receives from the server.

EEE 16 is the method of any one of EEE 1 to 15, wherein configuring the VST to use the first category of diagnostic descriptors when operating in the second state includes modifying, via the processor, a data setting the processor uses to determine which category of diagnostic descriptors to use while the VST operates in the second state.

EEE 17 is the method of any one of EEE 1 to 16, further comprising: outputting, within the first GUI, a set of multiple operable USCs, each USC of the set of multiple operable USCs corresponds to a different category of diagnostic descriptors; receiving, at the processor, a selection of a second USC corresponding to a second category of diagnostic descriptors to use when the VST operates in the second state; determining, at the processor from among the second category of diagnostic descriptors, a second diagnostic descriptor corresponding to the first diagnostic identifier in the vehicle data messages; and outputting, on the first GUI, the second diagnostic descriptor and a representation of at least the first portion of the data values or a second portion of the data values.

EEE 18 is the method of EEE 17, wherein the diagnostic descriptors of the first category of diagnostic descriptors include descriptors of parameter identifiers, functional test identifiers, or reset procedure identifiers.

EEE 19 is the method of any one of EEE 1 to 18, further comprising: configuring, via the processor, the VST to operate in a third state in which a second USC of the VST is operable for selecting a first category of component test descriptors to use when the VST operates in a fourth state; receiving, at the processor while the VST operates in the third state, a selection of the second USC and responsively setting the VST to use the first category of component test descriptors when operating in the fourth state; configuring, via the processor, the VST to operate in the fourth state, wherein in the fourth state the VST displays a second GUI and outputs within the second GUI a measurement made using an oscilloscope or a meter during performance of a particular component test; determining, at the processor from among a group of component test descriptors corresponding to the first category of component test descriptors, a particular component test descriptor corresponding to the particular component test; and outputting, within the second GUI, the particular component test descriptor and the measurement made using the oscilloscope or the meter during performance of the particular component test.

EEE 20 is the method of any one of EEE 1 to 19, wherein the first category of diagnostic descriptors includes a component test descriptor to use when the VST operates in a third state, and wherein the method further comprises: configuring, via the processor, the VST to operate in the third state, wherein in the third state the VST displays a second GUI and outputs within the second GUI a measurement made using an oscilloscope or a meter during performance of a particular component test; determining, at the processor from among the first category of diagnostic descriptors, the component test descriptor corresponding to the particular component test; and outputting, within the second GUI, the component test descriptor and the measurement made using the oscilloscope or the meter during performance of the particular component test.

EEE 21 is the method of any one of EEE 19 to 20, wherein the particular component test includes a current probe test, a two-channel test, or a voltage test.

EEE 22 is the method of any one of EEE 19 to 21, further comprising: transmitting, from the processor to the oscilloscope or meter, an instruction for configuring the oscilloscope or meter to perform the particular component test.

EEE 23 is the method of any one or EEE 1 to 22, wherein the first GUI includes a second USC, a second diagnostic descriptor corresponding to a second diagnostic identifier, and a representation of data values corresponding to the second diagnostic identifier, wherein the second USC corresponds to a facet filter, and wherein the method further comprises: receiving, at the processor, a selection of the second USC while the VST displays the first GUI; and modifying the first GUI in response to receiving the selection of the second USC.

EEE 24 is the method of EEE 23, wherein the facet characteristic corresponds to the first diagnostic identifier, but not the second diagnostic identifier, and wherein modifying the first GUI includes removing, from the first GUI, the second diagnostic identifier and the data values corresponding to the second diagnostic identifier.

EEE 25 is the method of EEE 23, wherein the facet characteristic corresponds to the second diagnostic identifier, but not the first diagnostic identifier, and wherein modifying the first GUI includes removing, from the first GUI, the first diagnostic identifier and at least the first portion of the data values corresponding to the first diagnostic identifier.

EEE 26 is the method of EEE 23, wherein neither of the first diagnostic identifier nor the second diagnostic identifier corresponds to the facet characteristic, and wherein modifying the first GUI includes removing, from the first GUI, the first diagnostic identifier, at least the first portion of the data values corresponding to the first diagnostic identifier, the second diagnostic identifier, and the data values corresponding to the second diagnostic identifier.

EEE 27 is the method of any one of EEE 1 to 26, wherein outputting the first diagnostic descriptor and the representation of at least a first portion of the data values corresponding to the first diagnostic identifier includes outputting the first diagnostic descriptor and the representation of at least a first portion of the data values corresponding to the first diagnostic identifier within a container.

EEE 28 is the method of any one of EEE 1 to 27, further comprising executing one or more of the following modules: a vehicle service tool configuration module, a USC selection module, a vehicle data message module, a diagnostic descriptor determination module, a GUI output module, a GUI modification module, a template determination module, a component test descriptor determination module, a receiving module, a transmitting a module, a perform component test module, or a state module.

EEE 29 is the method of any one of EEE 1 to 28, further comprising: displaying a GUI including one or more identifiers corresponding to a respective list of parameter identifiers, tests, reset procedures, or test sets; and receiving a selection of a USC corresponding to a particular list of parameter identifiers, tests, reset procedures, or test sets, wherein the VST displays the first GUI in response to receiving a selection of the USC corresponding to the particular list of parameter identifiers, tests, reset procedures, or test sets.

EEE 30 is the method of any one of EEE 1 to 29, further comprising: transmitting, via the processor to the vehicle, a vehicle data message including a test identifier to initiate performance of a functional test by a vehicle component in the vehicle.

EEE 31 is the method of EEE 30, wherein at least a first group of the data values corresponding to the first diagnostic identifier represent functionality of the vehicle component during performance of the functional test.

EEE 32 is the method of EEE 31, wherein at least a second group of the data values corresponding to the first diagnostic identifier represent functionality of the vehicle component before performance of the functional test.

EEE 33 is the method of any one of EEE 31 to 32, wherein at least a third group of the data values corresponding to the first diagnostic identifier represent functionality of the vehicle component after performance of the functional test.

EEE 34 is the method of any one of EEE 1 to 29, further comprising: transmitting, via the processor to the vehicle, a vehicle data message including a procedure identifier to initiate performance of a reset procedure by a vehicle component in the vehicle.

EEE 35 is the method of EEE 34, wherein at least a first group of the data values corresponding to the first diagnostic identifier represent functionality of the vehicle component during performance of the reset procedure.

EEE 36 is the method of EEE 35, wherein at least a second group of the data values corresponding to the first diagnostic identifier represent functionality of the vehicle component before performance of the reset procedure.

EEE 37 is the method of any one of EEE 35 to 36, wherein at least a third group of the data values corresponding to the first diagnostic identifier represent functionality of the vehicle component after performance of the reset procedure.

EEE 38 is the method of any one of EEE 34 to 37, wherein performance of the reset procedure includes calibrating the vehicle component with one or more calibration parameter values.

EEE 39 is the method of any one of EEE 1 to 38, further comprising: receiving, by the processor from a server, a computer-readable file including the group of diagnostic descriptors.

EEE 40 is the method of EEE 39, wherein the computer-readable file includes a markup language file, a comma separated variable file, or a portable document format file.

EEE 41 is the method of any one of EEE 1 to 40, wherein receiving the selection of the first USC includes the processor receiving a digital signal from an application driver of a touch screen display and determining, from mapping data, the digital signal corresponds to the first USC.

EEE 42 is the method of any one of EEE 1 to 40, wherein receiving the selection of the first USC includes the processor determining a voltage signal at an input of the processor and determining, from mapping data, the voltage signal corresponds to the first USC.

EEE 43 is the method of any one of EEE 1 to 42, wherein the first graphical user interface includes a second user-selectable control, wherein the second user-selectable control corresponds to a parameter-identifier, functional test, component test or reset procedure represented by the first diagnostic descriptor, and wherein the method further comprises receiving, at the processor, a selection of the second user-selectable control and responsively modifying the first graphical user interface to display supplemental information corresponding to the parameter-identifier, functional test, component test or reset procedure represented by the first diagnostic descriptor.

EEE 44 is the method of EEE 43, wherein the first graphical user interface includes a first container, wherein the first container includes the first diagnostic descriptor, and wherein modifying the first graphical user interface includes outputting a second container including the supplemental information.

EEE 45 is the method of EEE 43, wherein the second container is arranged as a pop-up container that overlays at least a portion of the first container.

EEE 46 is the method of EEE 43, wherein the second container is arranged as a pop-up container disposed in proximity to the first container without overlaying at least a portion of the first container.

EEE 47 is the method of any one of EEE 43 to 46, wherein the supplemental information includes an operation description corresponding to the parameter-identifier, functional test, component test or reset procedure represented by the first diagnostic descriptor.

EEE 48 is the method of any one of EEE 1 to 47, further comprising executing program instructions to arm the first USC while the first GUI is displayed such that a selection of the first USC causes a signal change at the processor to interrupt the processor to cause the processor to execute program instructions to select the first category of diagnostic descriptors to use when the VST operates in the second state.

EEE 49 is a computing system comprising: a processor; and a non-transitory computer-readable memory storing executable instructions. Execution of the executable instructions by the processor causes the computing system to perform functions comprising: configuring, via the processor, a VST to operate in a first state in which a first USC of the VST is operable for selecting a first category of diagnostic descriptors to use when the VST operates in a second state; receiving, at the processor while the VST operates in the first state, a selection of the first USC and responsively configuring the VST to use the first category of diagnostic descriptors when operating in the second state; configuring, via the processor, the VST to operate in the second state, wherein in the second state the VST displays a first GUI and transmits requests for vehicle data messages to a vehicle; receiving, at the processor while the VST operates in the second state, vehicle data messages including a first diagnostic identifier and data values corresponding to the first diagnostic identifier; determining, at the processor from among a group of diagnostic descriptors corresponding to the first category of diagnostic descriptors, a first diagnostic descriptor corresponding to the first diagnostic identifier; and outputting, within the first GUI, the first diagnostic descriptor and a representation of at least a first portion of the data values corresponding to the first diagnostic identifier.

EEE 50 is a computing system comprising: a processor; and a non-transitory computer-readable memory storing executable instructions to perform the method of any one of EEE 1 to 48.

EEE 51 is a non-transitory computer-readable memory having stored therein instructions executable by a processor to cause a computing system to perform functions comprising: configuring, via the processor, a VST to operate in a first state in which a first USC of the VST is operable for selecting a first category of diagnostic descriptors to use when the VST operates in a second state; receiving, at the processor while the VST operates in the first state, a selection of the first USC and responsively configuring the VST to use the first category of diagnostic descriptors when operating in the second state; configuring, via the processor, the VST to operate in the second state, wherein in the second state the VST displays a first GUI and transmits requests for vehicle data messages to a vehicle; receiving, at the processor while the VST operates in the second state, vehicle data messages including a first diagnostic identifier and data values corresponding to the first diagnostic identifier; determining, at the processor from among a group of diagnostic descriptors corresponding to the first category of diagnostic descriptors, a first diagnostic descriptor corresponding to the first diagnostic identifier; and outputting, within the first GUI, the first diagnostic descriptor and a representation of at least a first portion of the data values corresponding to the first diagnostic identifier.

EEE 52 is a non-transitory computer-readable memory having stored therein instructions executable by a processor to cause a computing system to perform the method of any one of EEE 1 to 48.

What is claimed is:

1. A method comprising:

configuring, by a processor, a vehicle service tool to operate in a first state in which a first user-selectable control of the vehicle service tool is operable for selecting a first category of diagnostic descriptors to use when the vehicle service tool operates in a second state, wherein the vehicle service tool comprises the processor, a display, and a user interface connected to an input of the processor;

determining, by the processor while the vehicle service tool operates in the first state and is configured to use a second category of diagnostic descriptors when operating in the second state, that a selection of the first user-selectable control has occurred based on a voltage at the input of the processor, and, in response, configuring the vehicle service tool to use the first category of diagnostic descriptors instead of the second category of diagnostic descriptors when operating in the second state, wherein the first and second categories of diagnostic descriptors comprise different descriptors for a first diagnostic identifier;

configuring, by the processor, the vehicle service tool to operate in the second state, wherein, in the second state, the vehicle service tool displays a first graphical user interface on the display and transmits requests for vehicle data messages to a vehicle;

receiving, by the processor while the vehicle service tool operates in the second state, vehicle data messages including the first diagnostic identifier and data values corresponding to the first diagnostic identifier;

determining, by the processor from a group of diagnostic descriptors corresponding to the first category of diagnostic descriptors, a first diagnostic descriptor corresponding to the first diagnostic identifier; and outputting, within the first graphical user interface, the first diagnostic descriptor and a representation of at least a first portion of the data values corresponding to the first diagnostic identifier.

2. The method of claim 1, wherein the group of diagnostic descriptors includes multiple diagnostic descriptors corresponding to the first diagnostic identifier, wherein the multiple diagnostic descriptors include the first diagnostic descriptor corresponding to the first diagnostic identifier, and wherein the multiple diagnostic descriptors correspond to different categories of diagnostic descriptors.

3. The method of claim 1, further comprising:

receiving, at the processor, a selection indicative of a list of diagnostic identifiers selected for displaying within the first graphical user interface;

transmitting, from the processor to a server, a list identifier corresponding to the list of diagnostic identifiers; and receiving, at the processor in response to transmitting the list identifier, the group of diagnostic descriptors, wherein the group of diagnostic descriptors includes multiple diagnostic descriptors that correspond to a different diagnostic identifier in the list of diagnostic identifiers, and wherein the multiple diagnostic descriptors include the first diagnostic descriptor.

4. The method of claim 3, wherein transmitting the list identifier and receiving the group of diagnostic descriptors occur via execution of an application programming interface to the server.

5. The method of claim 3, further comprising:
receiving, at the processor from the server, one or more of the following: the list of diagnostic identifiers, a maximum data value threshold corresponding to the first diagnostic identifier, a minimum data value threshold corresponding to the first diagnostic identifier, a detailed description of the first diagnostic identifier, or a facet characteristic.

6. The method of claim 3, further comprising:
determining, at the processor based on the list of diagnostic identifiers, a template for configuring the first graphical user interface to display the data values corresponding to the first diagnostic identifier and to other data values contained in the vehicle data messages.

7. The method of claim 1,
wherein configuring the vehicle service tool to operate in the first state includes the processor outputting a second graphical user interface, and
wherein the second graphical user interface includes the first user-selectable control.

8. The method of claim 7,
wherein the second graphical user interface includes a second user-selectable control corresponding to a second category of diagnostic descriptors different than the first category of diagnostic descriptors, and
wherein the first category of diagnostic descriptors and the second category of diagnostic descriptors both include a different one of:
an original equipment manufacturer category of diagnostic descriptors,
an industry standard defined category of diagnostic descriptors,
a normalized category of diagnostic descriptors, or
a user-defined category of diagnostic descriptors.

9. The method of claim 1,
wherein the first graphical user interface includes a second user-selectable control corresponding to a second category of diagnostic descriptors, and
wherein the method further comprises:
receiving a selection of the second user-selectable control; and
modifying, by the processor, the first graphical user interface to display a second diagnostic descriptor that corresponds to the first diagnostic identifier and a representation of at least the first portion of the data values corresponding to the first diagnostic identifier or a second portion of the data values corresponding to the first diagnostic identifier.

10. The method of claim 1,
configuring, via the processor, the vehicle service tool to operate in the first state again;
receiving, at the processor while the vehicle service tool operates in the first state, a selection of a second user-selectable control corresponding to a second category of diagnostic descriptors;
configuring, via the processor, the vehicle service tool to operate in the second state again;
determining, at the processor from among the second category of diagnostic descriptors, a second diagnostic descriptor that corresponds to the first diagnostic identifier in the vehicle data messages; and outputting, on the first graphical user interface, the second diagnostic descriptor and a representation of at least the first portion of the data values or at least a second portion of the data values.

11. The method of claim 1, further comprising:
receiving, at the processor, multiple diagnostic descriptors corresponding to a second diagnostic identifier, wherein the multiple diagnostic descriptors corresponding to the second diagnostic identifier include a second diagnostic descriptor corresponding to the second diagnostic identifier;
receiving, at the processor, vehicle data messages including the second diagnostic identifier and data values corresponding to the second diagnostic identifier; and
determining, at the processor from among the multiple diagnostic descriptors corresponding to the second diagnostic identifier, the second diagnostic descriptor corresponding to the second diagnostic identifier,
wherein the first graphical user interface further includes the second diagnostic descriptor corresponding to the second diagnostic identifier and a representation of at least a portion of the data values corresponding to the second diagnostic identifier.

12. The method of claim 1, wherein the first category of diagnostic descriptors is an original equipment manufacturer defined category of diagnostic descriptors, an industry standard defined category of diagnostic descriptors, a normalized category of diagnostic descriptors, or a user-defined category of diagnostic descriptors.

13. The method of claim 1,
wherein the processor includes a first processor at the vehicle service tool, and
wherein configuring the vehicle service tool to operate in the first state is based on a first communication the first processor receives from a server, and
wherein configuring the vehicle service tool to operate in the second state is based on a second communication the first processor receives from the server.

14. The method of claim 1, wherein configuring the vehicle service tool to use the first category of diagnostic descriptors when operating in the second state includes modifying, via the processor, a data setting the processor uses to determine which category of diagnostic descriptors to use while the vehicle service tool operates in the second state.

15. The method of claim 1, further comprising:
outputting, within the first graphical user interface, a set of multiple operable user-selectable controls, each user-selectable control of the set of multiple operable user-selectable controls corresponds to a different category of diagnostic descriptors;
receiving, at the processor, a selection of a second user-selectable control corresponding to a second category of diagnostic descriptors to use when the vehicle service tool operates in the second state;
determining, at the processor from among the second category of diagnostic descriptors, a second diagnostic descriptor corresponding to the first diagnostic identifier in the vehicle data messages; and
outputting, on the first graphical user interface, the second diagnostic descriptor and a representation of at least the first portion of the data values or a second portion of the data values.

16. The method of claim 15, wherein the diagnostic descriptors of the first category of diagnostic descriptors include descriptors of parameter identifiers, functional test identifiers, or reset procedure identifiers.

17. The method of claim 1, further comprising:

configuring, via the processor, the vehicle service tool to operate in a third state in which a second user-selectable control of the vehicle service tool is operable for selecting a first category of component test descriptors to use when the vehicle service tool operates in a fourth state;

receiving, at the processor while the vehicle service tool operates in the third state, a selection of the second user-selectable control and responsively setting the vehicle service tool to use the first category of component test descriptors when operating in the fourth state;

configuring, via the processor, the vehicle service tool to operate in the fourth state, wherein in the fourth state the vehicle service tool displays a second graphical user interface and outputs within the second graphical user interface a measurement made using an oscilloscope or a meter during performance of a particular component test;

determining, at the processor from among a group of component test descriptors corresponding to the first category of component test descriptors, a particular component test descriptor corresponding to the particular component test; and outputting, within the second graphical user interface, the particular component test descriptor and the measurement made using the oscilloscope or the meter during performance of the particular component test.

18. The method of claim 1, wherein the first category of diagnostic descriptors includes a component test descriptor to use when the vehicle service tool operates in a third state, and wherein the method further comprises:

configuring, via the processor, the vehicle service tool to operate in the third state, wherein in the third state the vehicle service tool displays a second graphical user interface and outputs within the second graphical user interface a measurement made using an oscilloscope or a meter during performance of a particular component test;

determining, at the processor from among the first category of diagnostic descriptors, the component test descriptor corresponding to the particular component test; and outputting, within the second graphical user interface, the component test descriptor and the measurement made using the oscilloscope or the meter during performance of the particular component test.

19. The method of claim 1, wherein the first graphical user interface includes a second user-selectable control, wherein the second user-selectable control corresponds to a parameter-identifier, functional test, component test or reset procedure represented by the first diagnostic descriptor, and wherein the method further comprises receiving, at the processor, a selection of the second user-selectable control and responsively modifying the first graphical user interface to display supplemental information corresponding to the parameter-identifier, functional test, component test or reset procedure represented by the first diagnostic descriptor.

20. The method of claim 19, wherein the first graphical user interface includes a first container, wherein the first container includes the first diagnostic descriptor, and wherein modifying the first graphical user interface includes outputting a second container including the supplemental information.

21. The method of claim 20, wherein the second container is arranged as a pop-up container that overlays at least a portion of the first container.

22. The method according to claim 1, wherein configuring the vehicle service tool to operate in the first state in which a first user-selectable control is operable for selecting a first category of diagnostic descriptors to use when the vehicle service tool operates in a second state occurs in response to:

selecting a user-selectable control contained in the first graphical user interface displayed while the vehicle service tool operates in the second state, or selecting a user-selectable control contained in a graphical user interface displayed while the vehicle service tool operates in a menu display state.

23. A computing system comprising:

a processor;

a display:

a user interface connected to an input of the processor; and a non-transitory computer-readable memory storing executable instructions, wherein execution of the executable instructions by the processor causes the computing system to perform functions comprising:

configuring, by the processor, the computing system to operate in a first state in which a first user-selectable control of the computing system is operable for selecting a first category of diagnostic descriptors to use when the computing system operates in a second state;

determining, by the processor while the computing system operates in the first state and is configured to use a second category of diagnostic descriptors when operating in the second state, that a selection of the first user-selectable control has occurred based on a volage at the input of the processor, and, in response, configuring the computing system to use the first category of diagnostic descriptors instead of the second category of diagnostic descriptors when operating in the second state, wherein the first and second categories of diagnostic descriptors comprise different descriptors for a first diagnostic identifier;

configuring, by the processor, the computing system to operate in the second state, wherein, in the second state, the computing system displays a first graphical user interface on the display and transmits requests for vehicle data messages to a vehicle;

receiving, by the processor while the computing system operates in the second state, vehicle data messages including the first diagnostic identifier and data values corresponding to the first diagnostic identifier;

determining, by the processor from a group of diagnostic descriptors corresponding to the first category of diagnostic descriptors, a first diagnostic descriptor corresponding to the first diagnostic identifier; and outputting, within the first graphical user interface, the first diagnostic descriptor and a representation of at least a first portion of the data values corresponding to the first diagnostic identifier.

24. The computing system of claim 23, wherein configuring the computing system to operate in the first state in which a first user-selectable control is operable for selecting a first category of diagnostic descriptors to use when the computing system operates in a second state occurs in response to:

selecting a user-selectable control contained in the first graphical user interface displayed while the computing system operates in the second state, or selecting a user-selectable control contained in a graphical user interface displayed while the computing system operates in a menu display state.

25. A non-transitory computer-readable memory having instructions stored therein that, when executed by a processor, cause a computing system comprising a processor, a display, and a user interface to perform functions comprising:

configuring, by the processor, the computing system to operate in a first state in which a first user-selectable control of the computing system is operable for selecting a first category of diagnostic descriptors to use when the computing system operates in a second state;

determining, by the processor while the computing system operates in the first state and is configured to use a second category of diagnostic descriptors when operating in the second state, that a selection of the first user-selectable control has occurred based on a voltage at an input of the processor, and, in response, configuring the computing system to use the first category of diagnostic descriptors instead of the second category of diagnostic descriptors when operating in the second state, wherein the first and second categories of diagnostic descriptors comprise different descriptors for a first diagnostic identifier;

configuring, by the processor, the computing system to operate in the second state, wherein, in the second state, the computing system displays a first graphical user interface on the display and transmits requests for vehicle data messages to a vehicle;

receiving, by the processor while the computing system operates in the second state, vehicle data messages including the first diagnostic identifier and data values corresponding to the first diagnostic identifier;

determining, by processor from a group of diagnostic descriptors corresponding to the first category of diagnostic descriptors, a first diagnostic descriptor corresponding to the first diagnostic identifier; and outputting, within the first graphical user interface, the first diagnostic descriptor and a representation of at least a first portion of the data values corresponding to the first diagnostic identifier.

26. The non-transitory computer-readable memory of claim 25, wherein configuring the computing system to operate in the first state in which a first user-selectable control is operable for selecting a first category of diagnostic descriptors to use when the computing system operates in a second state occurs in response to:

selecting a user-selectable control contained in the first graphical user interface displayed while the computing system operates in the second state, or selecting a user-selectable control contained in a graphical user interface displayed while the computing system operates in a menu display state.

* * * * *